United States Patent
Westby et al.

(10) Patent No.: US 12,458,706 B2
(45) Date of Patent: Nov. 4, 2025

(54) COMPOUNDS AND THERAPEUTIC USES THEREOF

(71) Applicant: AVVINITY THERAPEUTICS LIMITED, London (GB)

(72) Inventors: Michael Westby, Sandwich (GB); Melanie Glossop, Sandwich (GB); Christopher Pickford, Sandwich (GB); Christine Watson, Sandwich (GB)

(73) Assignee: AVVINITY THERAPEUTICS LIMITED, London (GB)

( * ) Notice: Subject to any disclaimer, the term of this patent is extended or adjusted under 35 U.S.C. 154(b) by 1242 days.

(21) Appl. No.: 17/284,388

(22) PCT Filed: Oct. 10, 2019

(86) PCT No.: PCT/GB2019/052889
§ 371 (c)(1),
(2) Date: Apr. 9, 2021

(87) PCT Pub. No.: WO2020/074911
PCT Pub. Date: Apr. 16, 2020

(65) Prior Publication Data
US 2021/0353765 A1    Nov. 18, 2021

(30) Foreign Application Priority Data
Oct. 10, 2018   (GB) ..................................... 1816554

(51) Int. Cl.
*A61K 47/68* (2017.01)
*A61K 45/06* (2006.01)
*C07K 16/28* (2006.01)
*C07K 16/32* (2006.01)

(52) U.S. Cl.
CPC .......... *A61K 47/6807* (2017.08); *A61K 45/06* (2013.01); *A61K 47/6851* (2017.08); *A61K 47/6889* (2017.08); *C07K 16/2863* (2013.01); *C07K 16/2887* (2013.01); *C07K 16/32* (2013.01)

(58) Field of Classification Search
None
See application file for complete search history.

(56) References Cited

U.S. PATENT DOCUMENTS 11,406,683 B2 *   8/2022   Westby .................. A61P 31/04

FOREIGN PATENT DOCUMENTS

| WO | WO 2005/079423 A2 | 9/2005 |
|---|---|---|
| WO | 2007/146847 A2 | 12/2007 |
| WO | 2008/057235 A2 | 5/2008 |
| WO | 2014/151423 A1 | 1/2014 |

(Continued)

OTHER PUBLICATIONS

Hinman et al., Cancer Res (1993) 53 (14): 3336-3342 (Year: 1993).*

(Continued)

*Primary Examiner* — Karl J Puttlitz
(74) *Attorney, Agent, or Firm* — Aura IP Law, PC

(57) ABSTRACT

The invention relates to novel compounds with the ability to link an immune response to a defined therapeutic target, to the use of said compounds in treating cancer and infectious diseases, to compositions containing said compounds, processes for their preparation and to novel intermediates used in said process.

35 Claims, 51 Drawing Sheets
Specification includes a Sequence Listing.

(56) References Cited

FOREIGN PATENT DOCUMENTS

| WO | 2016/196682 | A1 | | 12/2016 | | |
|---|---|---|---|---|---|---|
| WO | 2017/060728 | A1 | | 4/2017 | | |
| WO | 2017/060729 | A1 | | 4/2017 | | |
| WO | WO-2018203087 | A1 | * | 11/2018 | ......... | A61K 31/7004 |

OTHER PUBLICATIONS

Herceptin (trastuzumab) Label—accessdata.fda.gov retrieved Jul. 16, 2024 from https://www.accessdata.fda.gov/drugsatfda_docs/label/2010/103792s5250lbl.pdf (Year: 2010).*
Johnson et al., Oncoimmunology, Published online: Mar. 13, 2018, vol. 7, No. 4, e1408744 (Year: 2018).*
Great Britain Search Report, Apr. 8, 2019.
International Search Report, Dec. 18, 2019.
Wenlan Chen et al: "-Rhamnose Antigen: A Promising Alternative to [alpha]-Gal for Cancer Immunotherapies", ACS Chemical Biology, vol. 6, No. 2, Feb. 18, 2011, pp. 185-191.

* cited by examiner

A

B

COMPOUNDS AND THERAPEUTIC USES THEREOF

CROSS-REFERENCE TO RELATED APPLICATIONS

The present application is a U.S. National Stage entry under 35 U.S.C. § 371 of International Application No. PCT/GB2019/052889 filed on Oct. 10, 2019, designating the United States of America and published in English on Apr. 16, 2020, which claims priority to GB Application No. 1816554.8 filed Oct. 10, 2018, each of which is hereby incorporated by reference in its entirety.

FIELD OF THE INVENTION

The invention relates to novel compounds with the ability to link an immune response to a defined therapeutic target, to the use of said compounds in treating cancer and infectious diseases, to compositions containing said compounds, processes for their preparation and to novel intermediates used in said process.

BACKGROUND OF THE INVENTION

There is a need to find novel ways to recruit an individual's immune system to fight disease. The human immune system continually surveys the body seeking foreign signals to identify potentially harmful pathogens or mutated human cells (that could become a cause of cancerous growth) and targets them for elimination. Natural antibodies exist that can be recruited to said pathogens or mutated human cells to drive the immune system to eliminate the threat.

Cancer is a group of diseases involving abnormal cell growth with the potential to invade or spread to other parts of the body. In 2012, cancer occurred in about 14.1 million people. It caused about 8.2 million deaths or 14.6% of all human deaths. The most common types of cancer in males are lung cancer, prostate cancer, colorectal cancer and stomach cancer. In females the most common types are breast cancer, colorectal cancer, lung cancer, and cervical cancer. It is well established that the immune response plays a vital role in the identification and elimination of cancerous cells. Drugs exist that fight cancer by boosting an individual's immune system to help fight the cancer. There is a need to be able to better target the immune response specifically to the cancer cell and to generate a broader range of the patient's own tumour associated antigens. Targeting pre-existing natural antibodies to the patient's own tumour could meet this need. There is an urgent need to identify novel ways of treating bacterial, viral and fungal infections. Anti-microbial drug resistance is becoming a major global health threat. For example, it is estimated that more than 2 million people in the US are infected with bacteria resistant to one class of antibiotics every year (Centers for Disease Control and Prevention, 2013).

An innovative approach to the treatment of infectious disease or cancer was disclosed in WO 2005/079423 which describes an immunity linker which contains two binding moieties. The first binding moiety is capable of binding to an immune response component of an individual. The second binding moiety is capable of binding to any compound or foreign material such as antigens, pathogens, chemicals, or endogenous materials such as altered cells found in cancer. The resultant effect of said immunity linker molecule is that the pre-existing immune response of the individual is diverted towards the target, i.e. the cancer cell or specific pathogen. Examples of said first binding moieties include compounds or agents which are recognised by the immune system of said individual as foreign and which would therefore trigger an immune response.

Typical examples of first binding moieties include the small molecule hapten dinitrophenyl (DNP), alpha-Gal or β-1,6-glucan. Another such example is a carbohydrate molecule capable of binding to human serum antibodies such as anti-Rhamnose (i.e. L-Rhamnose) resulting in target cell destruction (Kiessling et al (2014) ChemBioChem 15(10), 1393-1398; US 2014/0112975; Li et al (2016) ACS Chem. Biology 11(5), 1205-1209), Wall et al (2018) ACS Chem. Biology (13) 2130-2142).

One strategy for selectively directing the immune system is to employ and exploit multivalent recognition of haptens on a cell surface (Kiessling et al ACS Chem Biol. (2007) 119-127), as stable and long-lived complexes of antibodies increase the productivity of the immune response. Therefore, there is a need for potent cell-targeting agents (second binding moieties) that simultaneously present multivalent haptens, through employment of a multivalent linker, or by exploiting the numerous amino acid conjugation sites present on a peptide scaffold, or the combination of the two, for selectively destroying unwanted cells.

US 2013/0149331 describes immunogenic compositions comprising a T-cell antigen in association with a rhamnose monosaccharide and/or Forssman disaccharide.

Examples of said second binding moieties include antibodies or fragments thereof that bind to a specific target molecule and present opportunity for inherent multivalency. Further examples of said second binding moieties include established therapeutic antibodies or functional fragments thereof. Cells or pathogens targeted in this manner can be recognised by the immune system as foreign and marked for destruction. Thus, natural antibodies can be mobilised to these tumour cells or pathogens and harness the immune system to eliminate the threat. There is therefore a need for linker molecules that enable optimised loading and presentation of rhamnose epitopes relative to the antibody moiety, to maximise the immune response.

Typical examples of linker molecules which contain spacer groups are those which have been optimised to control the number and position of first binding moieties (i.e. the carbohydrate molecule capable of binding to a human anti-rhamnose antibody) relative to the position of the second binding moiety (i.e. the antibody or antigen binding fragment). Such linker molecules are designed to attract natural antibodies in such a way as to be able to optimise the efficacy of immune recruitment while minimising potential side effects and therefore have great utility in the provision of effective anti-cancer therapies and therapies against infective agents.

SUMMARY OF THE INVENTION

According to a first aspect of the invention, there is provided an immunoconjugate comprising an antibody or antigen binding fragment thereof joined via a linker to a rhamnose molecule, characterised in that said linker comprises at least one phenyl ring capable of displaying one or more rhamnose molecules.

According to a second aspect of the invention, there is provided an immunoconjugate which is a compound of formula (A) or a pharmaceutically acceptable salt thereof:

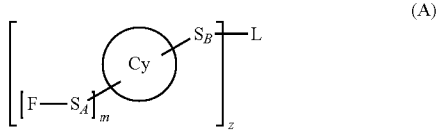

wherein F is rhamnose; Cy is phenyl, biphenyl or triphenyl; $S_A$ and $S_B$ are representative of chosen spacers for optimal distance of F and L; m represents an integer selected from 1 to 5; z represents an integer selected from 1 to 50; and L is an antibody or antigen binding fragment thereof.

According to a further aspect of the invention, there is provided a compound of formula (I) or a pharmaceutically acceptable salt thereof:

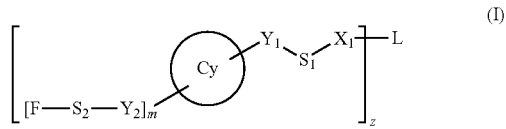

wherein L represents a binding moiety selected from an antibody or antigen binding fragment thereof;
$S_1$ represents a spacer selected from a $—(CH_2)_a—$ or $—(CH_2)_b—(CH_2—CH_2—O)_c—(CH_2)_d—$ group, wherein one to ten of said $—CH_2—$ groups may optionally be substituted by one or more groups selected from $—O—$, $—S—$, $=N(H)—$, $—C(=O)—$, $—C(O)NH—$, $—NHC(O)—$, cyclohexyl or pyrrolidine-2,5-dione;
a represents an integer selected from 1 to 35;
b represents an integer selected from 0 to 5;
c represents an integer selected from 1 to 20;
d represents an integer selected from 1 to 20;
$S_2$ represents a spacer selected from a $—(CH_2)_e—$ or $—(CH_2)_f—(CH_2—CH_2—O)_g—(CH_2)_h—$ group, wherein one to five of said $—CH_2—$ groups may optionally be substituted by one or more groups selected from $—N(H)—$, $—C(O)NH—$ and $—NHC(O)—$;
e represents an integer selected from 1 to 15;
f represents an integer selected from 1 to 10;
g represents an integer selected from 1 to 20;
h represents an integer selected from 1 to 5;
z represents an integer selected from 1 to 50;
$X_1$ represents an antibody or antigen binding fragment attachment moiety;
$Y_1$ and $Y_2$ independently represent a bond, $—O—$, $—S—$, $—NH—$, $—NHC(O)—$, $—C(O)NH—$, $—OC(O)—$, $—C(O)O—$, $—SC(O)—$, $—C(O)S—$, $—NHSO_2—$, $—SO_2NH—$ or $—NHC(O)NH—$ group;
F represents rhamnose;
m represents an integer selected from 1 to 5; and
Cy represents phenyl, biphenyl, triphenyl, such that when Cy represents biphenyl or triphenyl said $—Y_1—S_1—X_1$-L group may be present on any of said phenyl rings and said $[F—S_2—Y_2]_m—$ group or groups may be present on any of said phenyl rings.

DETAILED DESCRIPTION OF THE INVENTION

Figure 1A:
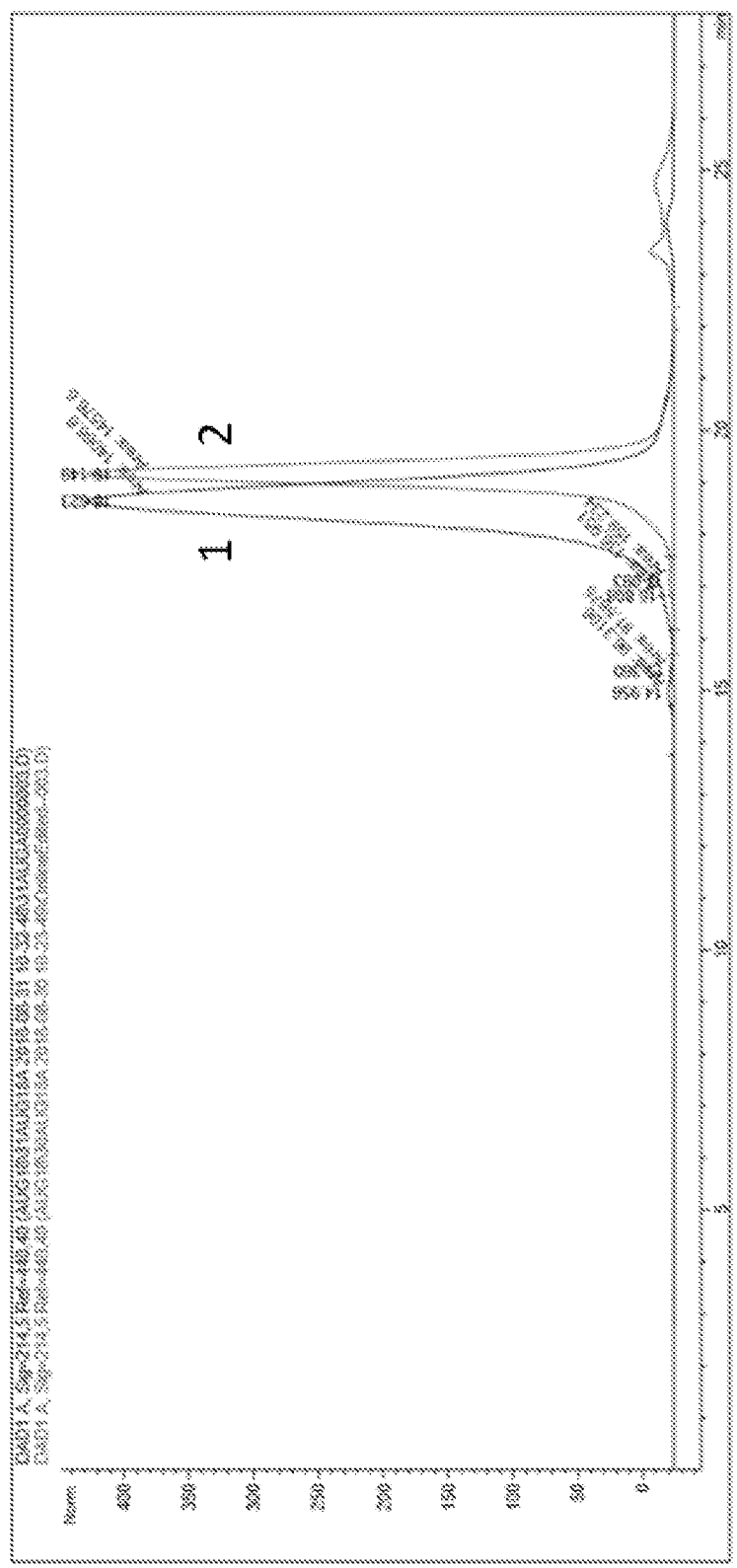
FIG. 1: (A) SEC analysis of Example 1 (peak labelled "1") and Cetuximab-Fab (peak labelled "2"); (B) SDS-PAGE analysis of Example 1 (lane 2) and Cetuximab-Fab (lane 1); and (C) MS analysis of Example 1.

According to a first aspect of the invention, there is provided an immunoconjugate comprising an antibody or antigen binding fragment thereof joined via a linker to a rhamnose molecule, characterised in that said linker comprises at least one phenyl ring capable of displaying one or more rhamnose molecules.

In one embodiment of the first aspect of the invention, said linker comprises a phenyl, biphenyl or triphenyl group. In a further embodiment of the first aspect of the invention, said linker comprises a biphenyl group.

According to a second aspect of the invention, there is provided an immunoconjugate which is a compound of formula (A) or a pharmaceutically acceptable salt thereof:

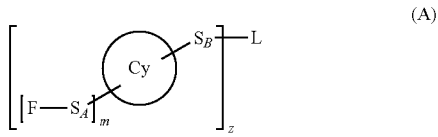

(A)

wherein F is rhamnose; Cy is phenyl, biphenyl or triphenyl; $S_A$ and $S_B$ are representative of chosen spacers for optimal distance of F and L; m represents an integer selected from 1 to 5; z represents an integer selected from 1 to 50; and L is an antibody or antigen binding fragment thereof.

According to a further aspect of the invention, there is provided a compound of formula (I) or a pharmaceutically acceptable salt thereof:

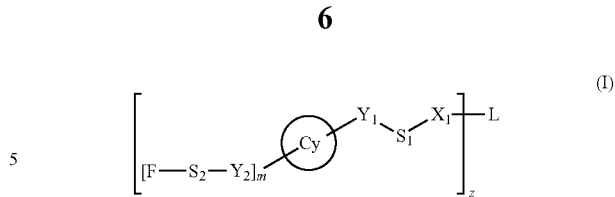

(I)

wherein L represents a binding moiety selected from an antibody or antigen binding fragment thereof;

$S_1$ represents a spacer selected from a $-(CH_2)_a-$ or $-(CH_2)_b-(CH_2-CH_2-O)_c-(CH_2)_d-$ group, wherein one to ten of said $-CH_2-$ groups may optionally be substituted by one or more groups selected from $-O-$, $-S-$, $=N(H)-$, $-C(=O)-$, $-C(O)NH-$, $-NHC(O)-$, cyclohexyl or pyrrolidine-2,5-dione;

a represents an integer selected from 1 to 35;
b represents an integer selected from 0 to 5;
c represents an integer selected from 1 to 20;
d represents an integer selected from 1 to 20;
$S_2$ represents a spacer selected from a $-(CH_2)_e-$ or $-(CH_2)_f-(CH_2-CH_2-O)_g-(CH_2)_h-$ group, wherein one to five of said $-CH_2-$ groups may optionally be substituted by one or more groups selected from $-N(H)-$, $-C(O)NH-$ and $-NHC(O)-$;
e represents an integer selected from 1 to 15;
f represents an integer selected from 1 to 10;
g represents an integer selected from 1 to 20;
h represents an integer selected from 1 to 5;
z represents an integer selected from 1 to 50;
$X_1$ represents an antibody or antigen binding fragment attachment moiety;
$Y_1$ and $Y_2$ independently represent a bond, $-O-$, $-S-$, $-NH-$, $-NHC(O)-$, $-C(O)NH-$, $-OC(O)-$, $-C(O)O-$, $-SC(O)-$, $-C(O)S-$, $-NHSO_2-$, $-SO_2NH-$ or $-NHC(O)NH-$ group;
F represents rhamnose;
m represents an integer selected from 1 to 5; and
Cy represents phenyl, biphenyl, triphenyl, such that when Cy represents biphenyl or triphenyl said $-Y_1-S_1-X_1-L$ group may be present on any of said phenyl rings and said $[F-S_2-Y_2]_m-$ group or groups may be present on any of said phenyl rings.

The invention includes the description and use of novel immunoconjugate linkers that enable capability to display one or multiple epitopes of carbohydrates in addition to conjugation to single or multiple sites on a chosen antibody or fragment thereof, thus enabling the optimal recruitment of natural antibodies concomitant with retaining target binding efficacy. The invention provides for one skilled in the art to fine tune the optimal number of carbohydrates per chosen antibody or fragment thereof for optimal anti-rhamnose recruitment and retain target efficacy.

Monoclonal antibodies have greatly improved the outcome of patients suffering from cancer however certain patient populations demonstrate intrinsic resistance to these therapies and, while good outcomes can be observed, these may be short-lived and acquired resistance to mAb therapy remains an issue and increased antibody efficacy is desirable. Tumours can demonstrate or evolve mechanisms resulting in resistance or reduced response to antibody treatment such as through increased receptor expression or changes to the signalling pathway or reduced immune response (Reslan, L. Mabs 2009, 3, 222). For example, patients can show intrinsic resistance to cetuximab resulting from expression of the KRAS mutation which affects EGFR signalling (Lievre, A, J. Clin. Oncol. 2008, 26, 374). In addition, where patients initially respond well to cetuximab, the majority will eventually acquire resistance (Bianco, R. Endocr. Relat. Cancer 2005, S159; Brand, T M. Cancer Biol. Ther. 2011, 11, 777).

A further example of resistance to a therapeutic antibody is seen in the case of non-Hodgkin lymphoma patients treated with rituximab (an anti-CD20 monoclonal antibody). Resistance to Rituximab is observed in around half of treatment-naïve patients. Patients who show an initial response to rituximab therapy will frequently acquire resistance. Resistance mechanisms are complex and strategies to overcome resistance have shown limited success in patients (Best Pract. Res. Clin. Haematol. 2011, 203-216) thus there remains a compelling need to improve the activity of therapeutic antibodies to increase and prolong patient responses.

Many approaches have been adopted to improve upon the efficacy of therapeutic antibodies including antibody drug conjugates (ADCs), antibody toxin conjugates (immunotoxins) and engineered antibodies with enhanced effector mechanisms e.g. increased antibody dependent cellular cytotoxicity (ADCC). Despite these efforts, few therapies have achieved clinical success with side effects such as toxicity remaining a key issue (Beck, A. Nat. Rev. Drug. Discov. 2017), Thus there is a need for new strategies to modify mAbs to enhance efficacy, to improve patient outcomes.

The compounds of the present invention comprise linker molecules which have been optimised to control and display the number and position of F groups (i.e. the carbohydrate molecule capable of binding to a human anti-alpha-galactosyl antibody) relative to the position of the binding moiety L (i.e. the antibody or fragment thereof). For example, a rigid cyclic group has the advantage of providing a scaffold for the optimal positioning of one or more F groups relative to L. It will be appreciated that the exact number and orientation of F groups relative to L will vary depending on the nature of the L group. Furthermore, the presence of the cyclic group, which contains a single phenyl ring, a biphenyl ring or a triphenyl ring provides the significant advantage of presenting multiple F groups (i.e. the carbohydrate molecule capable of binding to a human anti-rhamnose antibody) to enhance the resultant immune response from the host. Chemical presentation of multiple binding groups was previously known in the art, however, this has been achieved using one or more amino acid groups (for example see WO 2014/178878) or branching linker groups (for example see US 2014/0112975) by contrast to the present invention which uses either a single 6 membered ring system (i.e. phenyl), two 6 membered ring systems joined by a bond (biphenyl) or three membered ring systems joined by 2 bonds (triphenyl). The technical effect of this distinction is that the compounds of the present invention may be prepared more easily than the linkers previously known in art, advantageously avoid the presence of chiral centres and are less liable to protease degradation. Synthesis of the compounds of the present invention also do not make use of resins and therefore provide the advantage of being suitable for scaling for large scale pharmaceutical manufacture. Therefore, the compounds of the invention are not only therapeutically effective but provide the advantage of enhancing the immune response from the host and ease and efficiency of synthesis in high yields with scalability. In addition, the linkers of the present invention are not labile, therefore, do not typically comprise "cleavable linker" components as required by many compounds previously known in the art (see U.S. Pat. No. 8,828,956 for example). Furthermore, the linkers of the present invention allowed the person skilled in the art to choose specific left and right hand combinations of groups with synthetic ease and efficiency to enable the optimal number of F groups per antibody or fragment thereof conjugation site.

Monoclonal antibody fragments such as Fab, Fab', Fab'2, $Fab_2$, $Fab_3$, $F(ab)_2$, Fv, scFv, diabody, triabody, tetrabody, nanobody, are also known in the field of oncology. A number of advantages over full-length mAbs have been reported; including increased tumour penetration resulting from their smaller size, easier production (they can be expressed in E. coli or yeast resulting in increased convenience and more efficient scale up) and reduced immunogenicity. Fragments such as scFvs or Fab fragments can however suffer from reduced efficacy when compared to full-length mAbs. For example, the lack of an Fc domain on a Fab fragment eliminates the potential for ADCC driven efficacy, often a component of the anti-tumour response (Nelson, A. L. mAbs 2009, 2, 77).

In one embodiment, L represents a single domain antibody (sdAb). Such a single domain antibody (sdAb) is also known as a nanobody and typically comprises an antibody fragment consisting of a single monomeric variable antibody domain.

Thus, the benefits of antibody fragments are often offset by the loss of function associated with them. The use of the phenyl containing linkers of the invention to provide new constructs where an optimal number of rhamnose moieties are conjugated to an antibody fragment provides a new approach to enhancing the anti-tumour effects of an antibody fragment.

For both mAbs and their fragments, controlled, site specific conjugation is well known in the art e.g. through the incorporation of additional cysteine residues. Such an approach offers several advantages, in particular by allowing derivatisation of the mAb or fragment without disruption of the target binding epitopes and by enabling the loading to be controlled i.e. a fixed stoichiometry is achieved (Shen, B. Q. Nat. Biotechnol. 2012, 30, 184). One limitation of site-specific conjugation is that a low loading of the conjugated moiety may result which can limit efficacy. Use of the phenyl containing linkers of the invention that enable the presentation of multiple L-Rhamnose moieties per conjugation site provides a method to achieve high rhamnose/antibody ratios (high loading) even when the number of conjugation sites is low.

Linker Definitions

In one embodiment, $S_1$ represents a spacer selected from:
—$(CH_2)_a$—, wherein one to five (such as 2, 3 or 5) of said —$CH_2$— groups may optionally be substituted by one or more groups selected from —S—, =N(H)—, —C(=O)—, —NHC(O)—, cyclohexyl or pyrrolidine-2,5-dione (such as —$(CH_2)_2$—NHCO-cyclohexyl-$CH_2$-3-pyrrolidine-2,5-dione-, —$(CH_2)_2$—NHCO-cyclohexyl-$CH_2$-3-pyrrolidine-2,5-dione-S—$(CH_2)_3$—C(=NH)— or —$(CH_2)_2$—NHCO—$(CH_2)_3$—CO—); or —$(CH_2)_b$—$(CH_2$—$CH_2$—O$)_c$—$(CH_2)_d$—, wherein one to five (such as 2) of said —$CH_2$— groups may optionally be substituted by one or more groups selected from —NHC(O)— or pyrrolidine-2,5-dione (such as —$(CH_2)_2$—NHCO—$(CH_2CH_2O)_4$—$(CH_2)_2$-3-pyrrolidine-2,5-dione-).

In a further embodiment, $S_1$ represents a spacer selected from:
—$(CH_2)_a$—, wherein one to five (such as 2, 3 or 5) of said —$CH_2$— groups may optionally be substituted by one or more groups selected from —S—, =N(H)—, —C(=O)—, —NHC(O)—, cyclohexyl or pyrrolidine- 2,5-dione (such as —(CH$_2$)$_2$—NHCO-cyclohexyl-CH$_2$-3-pyrrolidine-2,5-dione-, —(CH$_2$)$_2$—NHCO-cyclohexyl-CH$_2$-3-pyrrolidine-2,5-dione-S—(CH$_2$)$_3$—C(=NH)— or —(CH$_2$)$_2$—NHCO—(CH$_2$)$_3$—CO—).

In a yet further embodiment, S$_1$ represents a spacer selected from:
—(CH$_2$)$_a$—, wherein one to five (such as 2) of said —CH$_2$— groups may optionally be substituted by one or more groups selected from —C(=O)— and —NHC(O)— (such as —(CH$_2$)$_2$—NHCO—(CH$_2$)$_3$—CO—).

It will be appreciated that a, b, c, d, e, f, g and h are selected to maintain a suitable linker length between groups F and L. Examples of suitable linker lengths between F and L range from about 5 Å to about 50 Å or more in length, about 6 Å to about 45 Å, about 7 Å to about 40 Å, about 8 Å to about 35 Å, about 9 Å to about 30 Å, about 10 Å to about 25 Å, about 11 Å to about 20 Å, about 12 Å to about 15 Å. Thus, in one embodiment, a, b, c, d, e, f, g and h represent a total integer of no more than 45, such as between 5 and 45, such as between 7 and 42, such as no more than 30, such as between 5 and 30, such as between 7 and 29.

In one embodiment, a represents an integer selected from 1 to 30. In a further embodiment, a represents an integer selected from 2 to 30. In a further embodiment, a represents an integer selected from 2, 4, 6, 9, 11, 18 or 30. In a further embodiment, a represents an integer selected from 6 to 30. In a further embodiment, a represents an integer selected from 6, 11, 18 or 30. In a further embodiment, a represents an integer selected from 5 to 15. In a further embodiment, a represents an integer selected from 6 to 11. In a further embodiment, a represents an integer selected from 6, 7 or 11. In a yet further embodiment, a represents an integer selected from 6. In an alternative embodiment, a represents an integer selected from 11. In a particular embodiment, a represents an integer selected from 7.

In one embodiment, b represents an integer selected from 0 to 3. In a further embodiment, b represents an integer selected from 0 or 3. In a further embodiment, b represents an integer selected from 1 to 3. In a further embodiment, b represents an integer selected from 2 or 3. In a yet further embodiment, b represents an integer selected from 3.

In one embodiment, c represents an integer selected from 1 to 15. In a further embodiment, c represents an integer selected from 1 to 12. In a further embodiment, c represents an integer selected from 4 to 12. In a yet further embodiment, c represents an integer selected from 4 or 12. In a yet further embodiment, c represents an integer selected from 4.

In one embodiment, d represents an integer selected from 1 to 15. In a further embodiment, d represents an integer selected from 2 to 13. In a further embodiment, d represents an integer selected from 2, 5 or 13. In a further embodiment, d represents an integer selected from 13. In an alternative embodiment, d represents an integer selected from 3.

In one embodiment, Y$_1$ represents a bond, —C(O)NH— or —O—. In a further embodiment, Y$_1$ represents —C(O)NH—.

In one embodiment, S$_2$ represents a spacer selected from:
—(CH$_2$)$_e$—, wherein one or two of said —CH$_2$— groups are optionally substituted by one or two groups selected from —O—, —N(H)—, —C(O)NH— and —NHC(O)— (such as —(CH$_2$)$_2$—O—(CH$_2$)$_2$—NHCO—CH$_2$—, —(CH$_2$)$_3$—NHCO—CH$_2$—, —(CH$_2$)$_3$—, —(CH$_2$)$_3$—NHCO—(CH$_2$)$_4$—CONH—CH$_2$—, —(CH$_2$)$_3$—NH—CH$_2$— or —(CH$_2$)$_3$—NHCO—(CH$_2$)$_2$—NHCO—CH$_2$—); or
—(CH$_2$)$_f$—(CH$_2$—CH$_2$—O)$_g$—(CH$_2$)$_h$—, wherein one to five of said —CH$_2$— groups are optionally substituted by one to three —O— or —NHC(O)— groups (such as —(CH$_2$)$_2$—O—(CH$_2$)$_2$—NHCO—(CH$_2$CH$_2$O)$_4$—(CH$_2$)$_2$—NHCO—CH$_2$—, —(CH$_2$)$_2$—O—(CH$_2$)$_2$—NHCO—(CH$_2$CH$_2$O)$_{12}$—(CH$_2$)$_2$—NHCO—CH$_2$—, —(CH$_2$)$_3$—NHCO—(CH$_2$CH$_2$O)$_4$—(CH$_2$)$_2$—NHCO—CH$_2$—, —(CH$_2$)$_3$—NHCO—(CH$_2$CH$_2$O)$_{12}$—(CH$_2$)$_2$—NHCO—CH$_2$— or —(CH$_2$)$_3$—NHCO—(CH$_2$)$_3$—NHCO—(CH$_2$CH$_2$O)$_4$—(CH$_2$)$_2$—NHCO—CH$_2$—).

In a further embodiment, S$_2$ represents a spacer selected from:
—(CH$_2$)$_e$—, wherein one or two of said —CH$_2$— groups are optionally substituted by a —O—, —C(O)NH— or —NHC(O)— group (such as —(CH$_2$)$_2$—O—(CH$_2$)$_2$—NHCO—CH$_2$—, —(CH$_2$)$_3$—NHCO—CH$_2$—, —(CH$_2$)$_3$—NHCO—, —(CH$_2$)$_3$—, —(CH$_2$)$_3$—NHCO—(CH$_2$)$_4$—CONH—CH$_2$— or —(CH$_2$)$_3$—NH—CH$_2$—); or
—(CH$_2$)$_f$—(CH$_2$—CH$_2$—O)$_g$—(CH$_2$)$_h$—, wherein one to five of said —CH$_2$— groups are optionally substituted by a —O—, —C(O)NH— or —NHC(O)— group (such as —(CH$_2$)$_2$—O—(CH$_2$)$_2$—NHCO—(CH$_2$CH$_2$O)$_4$—(CH$_2$)$_2$—NHCO—CH$_2$—, —(CH$_2$)$_2$—O—(CH$_2$)$_2$—NHCO—(CH$_2$CH$_2$O)$_{12}$—(CH$_2$)$_2$—NHCO—CH$_2$—, —(CH$_2$)$_3$—NHCO—(CH$_2$)$_2$—(OCH$_2$CH$_2$)$_4$—NHCO—CH$_2$— or —(CH$_2$)$_4$—NHCO—(CH$_2$)$_2$—(OCH$_2$CH$_2$)$_4$—NHCO—CH$_2$—).

In a yet further embodiment, S$_2$ represents a spacer selected from:
—(CH$_2$)$_e$—, wherein one or two of said —CH$_2$— groups are optionally substituted by one or two —O— or —NHC(O)— groups (such as —(CH$_2$)$_2$—O—(CH$_2$)$_2$—NHCO—CH$_2$—, —(CH$_2$)$_3$—NHCO—CH$_2$— or —(CH$_2$)$_3$—NHCO—(CH$_2$)$_3$—NHCO—CH$_2$—); or
—(CH$_2$)$_f$—(CH$_2$—CH$_2$—O)$_g$—(CH$_2$)$_h$—, wherein one to five of said —CH$_2$— groups are optionally substituted by one to three —O— or —NHC(O)— groups (such as —(CH$_2$)$_2$—O—(CH$_2$)$_2$—NHCO—(CH$_2$CH$_2$O)$_4$—(CH$_2$)$_2$—NHCO—CH$_2$—, —(CH$_2$)$_2$—O—(CH$_2$)$_2$—NHCO—(CH$_2$CH$_2$O)$_{12}$—(CH$_2$)$_2$—NHCO—CH$_2$—, —(CH$_2$)$_3$—NHCO—(CH$_2$CH$_2$O)$_4$—(CH$_2$)$_2$—NHCO—CH$_2$—, —(CH$_2$)$_3$—NHCO—(CH$_2$CH$_2$O)$_{12}$—(CH$_2$)$_2$—NHCO—CH$_2$— or —(CH$_2$)$_3$—NHCO—(CH$_2$)$_3$—NHCO—(CH$_2$CH$_2$O)$_4$—(CH$_2$)$_2$—NHCO—CH$_2$—).

In a still yet further embodiment, S$_2$ represents a spacer selected from:
—(CH$_2$)$_e$—, wherein one or two of said —CH$_2$— groups are optionally substituted by one or two groups selected from —O—, —N(H)—, —C(O)NH— and —NHC(O)— (such as —(CH$_2$)$_2$—O—(CH$_2$)$_2$—NHCO—CH$_2$— or —(CH$_2$)$_3$—NHCO—CH$_2$—); or
—(CH$_2$)$_f$—(CH$_2$—CH$_2$—O)$_g$—(CH$_2$)$_h$—, wherein one to five of said —CH$_2$— groups are optionally substituted by one to three —O— or —NHC(O)— groups (such as —(CH$_2$)$_2$—O—(CH$_2$)$_2$—NHCO—(CH$_2$CH$_2$O)$_4$—(CH$_2$)$_2$—NHCO—CH$_2$—, —(CH$_2$)$_2$—O—(CH$_2$)$_2$—NHCO—(CH$_2$CH$_2$O)$_{12}$—(CH$_2$)$_2$—NHCO—CH$_2$— or —(CH$_2$)$_3$—NHCO—(CH$_2$CH$_2$O)$_4$—(CH$_2$)$_2$—NHCO—CH$_2$—.

In a still yet further embodiment, S$_2$ represents a spacer selected from:
—(CH$_2$)$_e$—, wherein one or two of said —CH$_2$— groups are optionally substituted by one or two groups selected from —O—, —N(H)—, —C(O)NH— and —NHC(O)— (such as —(CH$_2$)$_2$—O—(CH$_2$)$_2$—NHCO—CH$_2$— or —(CH$_2$)$_3$—NHCO—CH$_2$—).

In a still yet further embodiment, $S_2$ represents a spacer selected from:
- —$(CH_2)_e$—, wherein one or two of said —$CH_2$— groups are optionally substituted by a —O— or —NHC(O)— group (such as —$(CH_2)_2$—O—$(CH_2)_2$—NHCO—$CH_2$— or —$(CH_2)_3$—NHCO—$CH_2$—); or
- —$(CH_2)_f$—$(CH_2$—$CH_2$—O$)_g$—$(CH_2)_h$—, wherein one to five of said —$CH_2$— groups are optionally substituted by an —O— or —NHC(O)— group (such as —$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$— or —$(CH_2)_3$—NHCO—$(CH_2CH_2O)_4$—$(CH_2)_2$—NHCO—$CH_2$—).

In a still yet further embodiment, $S_2$ represents a spacer selected from:
- —$(CH_2)_e$—, wherein two of said —$CH_2$— groups are optionally substituted by a —O— or —NHC(O)— group (such as —$(CH_2)_2$—O—$(CH_2)_2$—NHCO—$CH_2$—); or
- —$(CH_2)_f$—$(CH_2$—$CH_2$-0$)_g$—$(CH_2)_h$—, wherein three of said —$CH_2$— groups are optionally substituted by an —O— or —NHC(O)— group (such as —$(CH_2)_2$—O—$(CH_2)_2$—NHCO—$(CH_2CH_2O)_4$—$(CH_2)_2$—NHCO—$CH_2$— or —$(CH_2)_2$—O—$(CH_2)_2$—NHCO—$(CH_2CH_2O)_{12}$—$(CH_2)_2$—NHCO—$CH_2$—).

In a still yet further embodiment, $S_2$ represents a spacer selected from:
- —$(CH_2)_f$—$(CH_2$—$CH_2$—O$)_g$—$(CH_2)_h$—, wherein three of said —$CH_2$— groups are optionally substituted by an —O— or —NHC(O)— group (such as —$(CH_2)_2$—O—$(CH_2)_2$—NHCO—$(CH_2CH_2O)_4$—$(CH_2)_2$—NHCO—$CH_2$—).

In one embodiment, e represents an integer selected from 1 to 10. In a further embodiment, e represents an integer selected from 3 to 10. In a further embodiment, e represents an integer selected from 3, 5, 7, 9 or 10. In a further embodiment, e represents an integer selected from 5 to 9. In a further embodiment, e represents an integer selected from 5, 7 or 9. In a further embodiment, e represents an integer selected from 4 to 10. In a yet further embodiment, e represents an integer selected from 4, 5, 7 or 10. In a still yet further embodiment, e represents an integer selected from 5. In a particular embodiment, e represents an integer selected from 7.

In one embodiment, f represents an integer selected from 1 to 8. In a further embodiment, f represents an integer selected from 2 to 8. In a further embodiment, f represents an integer selected from 2 to 6. In a yet further embodiment, f represents an integer selected from 4 to 8. In a yet further embodiment, f represents an integer selected from 4, 6 or 8. In a still yet further embodiment, f represents an integer selected from 4. In a particular embodiment, e represents an integer selected from 6.

In one embodiment, g represents an integer selected from 1 to 15. In a further embodiment, g represents an integer selected from 4 to 12. In a further embodiment, g represents an integer selected from 4, 8 or 12. In a further embodiment, g represents an integer selected from 1 to 5. In a further embodiment, g represents an integer selected from 1 to 4. In a yet further embodiment, g represents an integer selected from 12. In a particular embodiment, g represents an integer selected from 4.

In one embodiment, h represents an integer selected from 1 to 4. In a further embodiment, h represents an integer selected from 4.

In one embodiment, $Y_2$ represents a bond, —O— or —NHC(O)—. In a further embodiment, $Y_2$ represents a bond or —O—. In a yet further embodiment, $Y_2$ represents —O—.

In one embodiment, m represents an integer selected from 1 to 4. In a further embodiment, m represents an integer selected from 1 to 3. In a yet further embodiment, m represents an integer selected from 1 or 3. In a yet further embodiment, m represents an integer selected from 2 or 3. In a yet further embodiment, m represents an integer selected from 1 or 2. In a yet further embodiment, m represents an integer selected from 1. In a yet further embodiment, m represents an integer selected from 2. In a yet further embodiment, m represents an integer selected from 3. In a yet further embodiment, m represents an integer selected from 4.

In a further embodiment, z represents an integer selected from 1 to 40. In a further embodiment, z represents an integer selected from 1 to 36. In a further embodiment, z represents an integer selected from 6 to 36 (such as 6, 11, 12, 12-18, 15, 22 or 24-36). In a further embodiment, z represents an integer selected from 6, 12-18, 22 or 24-36.

In one embodiment, Cy represents phenyl or biphenyl. In a further embodiment, Cy represents biphenyl or triphenyl. In a yet further embodiment, Cy represents phenyl or triphenyl. In a still yet further embodiment, Cy represents biphenyl.

According to a further aspect of the invention, there is provided a compound of formula (I)$^a$ or a pharmaceutically acceptable salt thereof:

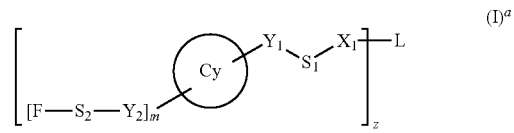

wherein L represents a binding moiety selected from an antibody or antigen binding fragment thereof;
$S_1$ represents a spacer selected from —$(CH_2)_a$—, wherein two of said —$CH_2$— groups may optionally be substituted by one or more groups selected from —NHC(O)—, C(=O)—, cyclohexyl or pyrrolidine-2,5-dione;
a represents an integer selected from 7;
$S_2$ represents a spacer selected from:
- —$(CH_2)_e$—, wherein two of said —$CH_2$— groups is optionally substituted by a —O— or —NHC(O)— group; or
- —$(CH_2)_f$—$(CH_2$—$CH_2$—O$)_g$—$(CH_2)_h$—, wherein three of said —$CH_2$— groups are optionally substituted by an —O— or —NHC(O)— group;

e represents an integer selected from 7;
f represents an integer selected from 4;
g represents an integer selected from 4 or 12;
h represents an integer selected from 4;
z represents an integer selected from 6 to 36;
$X_1$ represents —N(H)—;
$Y_1$ represents —C(O)NH—;
$Y_2$ represents —O—;
F represents rhamnose;
m represents an integer selected from 1 to 3; and
Cy represents biphenyl, such that said —$Y_1$—$S_1$—$X_1$-L group may be present on either of said phenyl rings and said [F—$S_2$—$Y_2$]$_m$— group or groups may be present on either of said phenyl rings.

According to a further aspect of the invention, there is provided a compound of formula (I)$^b$ or a pharmaceutically acceptable salt thereof:

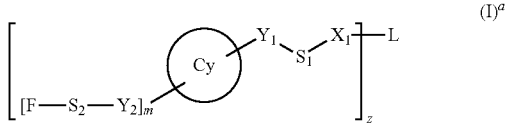

wherein L represents a binding moiety selected from an antibody or antigen binding fragment thereof;
$S_1$ represents a spacer selected from —(CH$_2$)$_a$—, wherein two of said —CH$_2$— groups may optionally be substituted by a —NHC(O)— or C(=O)— group;
a represents an integer selected from 7;
$S_2$ represents a spacer selected from —(CH$_2$)$_f$—(CH$_2$—CH$_2$—O)$_g$—(CH$_2$)$_h$—, wherein three of said —CH$_2$— groups are optionally substituted by an —O— or —NHC(O)— group;
f represents an integer selected from 4;
g represents an integer selected from 4;
h represents an integer selected from 4;
z represents an integer selected from 6 to 36;
$X_1$ represents —N(H)—;
$Y_1$ represents —C(O)NH—;
$Y_2$ represents —O—;
F represents rhamnose;
m represents an integer selected from 1 or 2; and
Cy represents biphenyl, such that said —Y$_1$—S$_1$—X$_1$-L group may be present on either of said phenyl rings and said [F—S$_2$—Y$_2$]$_m$— group or groups may be present on either of said phenyl rings.

In a further embodiment, the invention provides a compound of formula (I) which comprises a compound of Examples 1-40 or a pharmaceutically acceptable salt thereof.

In a further embodiment, the invention provides a compound of formula (I) which is the free base of a compound of Examples 1-40.

In a further embodiment, the invention provides a compound of formula (I) which comprises a compound of Examples 1-20 or a pharmaceutically acceptable salt thereof.

In a further embodiment, the invention provides a compound of formula (I) which is the free base of a compound of Examples 1-20.

In a further embodiment, the invention provides a compound of formula (I) which comprises a compound of Examples 1-4 or a pharmaceutically acceptable salt thereof.

In a further embodiment, the invention provides a compound of formula (I) which is the free base of a compound of Examples 1-4.

In a further embodiment, the invention provides a compound of formula (I) which comprises a compound of Examples 1-4 and 21-40 or a pharmaceutically acceptable salt thereof.

In a further embodiment, the invention provides a compound of formula (I) which is the free base of a compound of Examples 1-4 and 21-40.

References herein to the term "rhamnose" include (2R,3R,4R,5R,6S)-6-Methyloxane-2,3,4,5-tetrol (also known as isodulcit, α-L-Rhamnose, L-Rhamnose, L-Mannomethylose, α-L-Rha, α-L-Rhamnoside, α-L-Mannomethylose, 6-Deoxy-L-mannose, Rhamnopyranose and Rhamnopyranoside). Rhamnose (Rha, Rham) is a naturally occurring deoxy sugar. It can be classified as either a methyl-pentose or a 6-deoxy-hexose. Rhamnose occurs in nature in its L-form as L-rhamnose (6-deoxy-L-mannose). In one embodiment, F is selected from L-Rhamnose. L-Rhamnose is an L-configured, deoxy-sugar monosaccharide capable of binding to and recruiting anti-L-Rha antibodies found in human sera.

In one particular embodiment, F has a structure as shown in one of the following formulae:

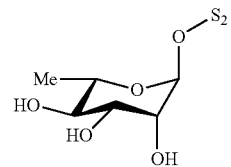

wherein S$_2$ refers to the point of attachment to the S2 group.

Antibodies and Antigen Binding Fragments Thereof

References herein to the terms "antibody" or "antibodies" refer to molecules or active fragments of molecules that bind to known antigens, particularly to immunoglobulin molecules and to immunologically active portions of immunoglobulin molecules, i.e. molecules that contain a binding site that immunospecifically binds an antigen. The immunoglobulin according to the invention can be of any class (IgG, IgM, IgD, IgE, IgA and IgY) or subclass (e.g. IgG1, IgG2, IgG3, IgG4, IgA1 and IgA2) or subclasses (isotypes) of immunoglobulin molecule (e.g. IgG in IgG1, IgG2, IgG3, and IgG4, or IgA in IgA1 and IgA2).

Within the scope of the present invention the terms "antibody" or "antibodies" include monoclonal, polyclonal, chimeric, single chain, bispecific, human and humanized antibodies as well as active fragments thereof. Examples of active fragments of molecules that bind to known antigens include Fab, F(ab')2, scFv and Fv fragments, including the products of an Fab immunoglobulin expression library and epitope-binding fragments of any of the antibodies and fragments mentioned above.

As used herein, the term "monoclonal antibody" refers to an antibody that is mass produced in the laboratory from a single clone and that recognizes only one antigen. Monoclonal antibodies are typically made by fusing a normally short-lived, antibody-producing B cell to a fast-growing cell, such as a cancer cell (sometimes referred to as an "immortal" cell). The resulting hybrid cell, or hybridoma, multiplies rapidly, creating a clone that produces large quantities of the antibody. For the purpose of the present invention, "monoclonal antibody" is also to be understood to comprise antibodies that are produced by a mother clone which has not yet reached full monoclonality.

As used herein, the term "chimeric antibody" refers to a monoclonal antibody comprising a variable region, i.e., binding region, from mouse and at least a portion of a constant region derived from a different source or species, usually prepared by recombinant DNA techniques. Chimeric antibodies comprising a mouse variable region and a human constant region are exemplary embodiments. Such mouse/human chimeric antibodies are the product of expressed immunoglobulin genes comprising DNA segments encoding mouse immunoglobulin variable regions and DNA segments encoding human immunoglobulin constant regions. Other forms of "chimeric antibodies" encompassed by the present disclosure are those in which the class or subclass has been modified or changed from that of the original antibody. Such "chimeric" antibodies are also referred to as "class-switched antibodies." Methods for producing chimeric antibodies involve conventional recombinant DNA and gene transfection techniques now well known in the art. See, e.g., Morrison, S. L., et al., *Proc. Natl. Acad Sci. USA* 81 (1984) 6851-6855; U.S. Pat. Nos. 5,202,238 and 5,204,244.

As used herein the term "humanized antibody" or "humanized version of an antibody" refers to antibodies in which the framework or "complementarity determining regions" (CDR) have been modified to comprise the CDR of an immunoglobulin of different specificity as compared to that of the parent immunoglobulin. In some exemplary embodiments, the CDRs of the VH and VL are grafted into the framework region of human antibody to prepare the "humanized antibody." See e.g. Riechmann, L., et al., *Nature* 332 (1988) 323-327; and Neuberger, M. S., et al., *Nature* 314 (1985) 268-270. The heavy and light chain variable framework regions can be derived from the same or different human antibody sequences. The human antibody sequences can be the sequences of naturally occurring human antibodies. Human heavy and light chain variable framework regions are listed e.g. in Lefranc, M.-P., Current Protocols in Immunology (2000)—Appendix 1P A.1P.1-A.1P.37 and are accessible via IMGT, the international ImMunoGeneTics information System® (http://imgt.cines.fr) or via http://vbase.mrc-cpe.cam.ac.uk, for example. Optionally the framework region can be modified by further mutations. Exemplary CDRs correspond to those representing sequences recognizing the antigens noted above for chimeric antibodies. In some embodiments, such humanized version is chimerized with a human constant region. The term "humanized antibody" as used herein also comprises such antibodies which are modified in the constant region to generate the properties according to the disclosure, especially in regard to C1q binding and/or FcR binding, e.g. by "class switching" i.e. change or mutation of Fc parts (e.g. from IgG1 to IgG4 and/or IgG1/IgG4 mutation).

As used herein the term "human antibody" is intended to include antibodies having variable and constant regions derived from human germ line immunoglobulin sequences. Human antibodies are well-known in the state of the art (van Dijk, M. A., and van de Winkel, J. G., *Curr. Opin. Chem. Biol.* 5 (2001) 368-374). Human antibodies can also be produced in transgenic animals (e.g., mice) that are capable, upon immunization, of producing a full repertoire or a selection of human antibodies in the absence of endogenous immunoglobulin production. Transfer of the human germ-line immunoglobulin gene array in such germ-line mutant mice results in the production of human antibodies upon antigen challenge (see, e.g., Jakobovits, A., et al., *Proc. Natl. Acad. Sci. USA* 90 (1993) 2551-2555; Jakobovits, A., et al., *Nature* 362 (1993) 255-258; Brueggemann, M. D., et al., *Year Immunol.* 7 (1993) 33-40). Human antibodies can also be produced in phage display libraries (Hoogenboom, H. R., and Winter, G., *J. Mol. Biol.* 227 (1992) 381-388; Marks, J. D., et al., *J. Mol. Biol.* 222 (1991) 581-597). The techniques of Cole, A., et al. and Boerner, P., et al. are also available for the preparation of human monoclonal antibodies (Cole, A., et al., Monoclonal Antibodies and Cancer Therapy, Liss, A. R. (1985) p. 77; and Boerner, P., et al., *J. Immunol.* 147 (1991) 86-95). As already mentioned, according to the instant disclosure the term "human antibody" as used herein also comprises such antibodies which are modified in the constant region to generate the properties according to the disclosure, for example in regard to C1q binding and/or FcR binding, e.g. by "class switching" i.e. change or mutation of Fc parts (e.g. from IgG1 to IgG4 and/or IgG1/IgG4 mutation).

As used herein "single chain antibody" refers to single chain Fv molecules (scFv), wherein a VH domain and a VL domain are linked by a peptide linker which allows the two domains to associate to form an antigen binding site (Bird et al., 1988, Science 242:423-426, Huston et al., 1988, *Proc. Natl. Acad. Sci. U.S.A.* 85:5879-5883 or a bispecific single chain Fv (WO 03/11161).

As used herein the term "bispecific antibodies" refers to antibodies that bind to two (or more) different antigens.

As used herein the term "antibody fragments" refers to a portion of a full-length antibody, for example possibly a variable domain thereof, or at least an antigen binding site thereof. Examples of antibody fragments include diabodies, single-chain antibody molecules, and multispecific antibodies formed from antibody fragments. scFv antibodies are, e.g., described in Huston, J. S., *Methods in Enzymol.* 203 (1991) 46-88. Antibody fragments can be derived from an antibody of the present invention by a number of art-known techniques. For example, purified monoclonal antibodies can be cleaved with an enzyme, such as pepsin, and subjected to HPLC gel filtration. The appropriate fraction containing Fab fragments can then be collected and concentrated by membrane filtration and the like. For further description of general techniques for the isolation of active fragments of antibodies, see for example, Khaw, B. A. et al. *J. Nucl. Med.* 23:1011-1019 (1982); Rousseaux et al. *Methods Enzymology,* 121:663-69, Academic Press, 1986.

As used herein the term "specific" and "specifically" are used interchangeably to indicate that other biomolecules do not significantly bind to the antibody that is specifically binding to the biomolecule of interest. In some embodiments, the level of binding to a biomolecule other than a peptide comprising an epitope within a peptide results in a negligible (e.g., not determinable) binding affinity by means of ELISA or an affinity determination.

By "negligible binding" a binding is meant, which is at least about 85%, particularly at least about 90%, more particularly at least about 95%, even more particularly at least about 98%, but especially at least about 99% and up to 100% less than the binding to a peptide comprising an epitope within a peptide.

As used herein the term "epitope" refers to a site on a target molecule (e.g., an antigen, such as a protein) to which an antigen-binding molecule (e.g., an antibody or antibody fragment) binds. Epitopes can be formed both from contiguous or adjacent noncontiguous residues (e.g., amino acid residues) of the target molecule. Epitopes formed from contiguous residues (e.g., amino acid residues) typically are also called linear epitopes. An epitope typically includes at least 5 and up to about 12 residues, mostly between 6 and 10 residues (e.g. amino acid residues).

As used herein, the term "CDR" refers to the hypervariable region of an antibody. The term "hypervariable region", "HVR", or "HV", when used herein refers to the regions of an antibody variable domain which are hypervariable in sequence and/or form structurally defined loops. Generally, antibodies comprise six hypervariable regions; three in the VH (H1, H2, H3), and three in the VL (L1, L2, L3). A number of hypervariable region delineations are in use and are encompassed herein. The Kabat Complementarity Determining Regions are based on sequence variability and are the most commonly used (Kabat et al., Sequences of Proteins of Immunological Interest, 5th Ed. Public Health Service, National Institutes of Health, Bethesda, Md.

(1991)). The letters "HC" and "LC" preceding the term "CDR" refer, respectively, to a CDR of a heavy chain and a light chain.

As used herein, the terms "homology" and "identity" are used interchangeably. Calculations of sequence homology or identity between sequences are performed as follows.

In order to determine the percent (%) identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In a preferred embodiment, the length of a reference sequence aligned for comparison purposes is at least 30%, preferably at least 40%, more preferably at least 50%, even more preferably at least 60%, and even more preferably at least 70%, 75%, 80%, 82%, 84%, 85%, 86%, 87%, 88%, 89%, 90%, 91%, 92%, 93%, 94%, 95%, 96%, 97%, 98%, 99%, or 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

The comparison of sequences and determination of percent identity between two sequences can be accomplished using a mathematical algorithm. In a preferred embodiment, the percent identity between two amino acid sequences is determined using the Needleman et al. (1970) *J. Mol. Biol.* 48:444-453) algorithm which has been incorporated into the GAP program in the GCG software package (available at http://www.gcg.com), using either a BLOSUM 62 matrix or a PAM250 matrix, and a gap weight of 16, 14, 12, 10, 8, 6, or 4 and a length weight of 1, 2, 3, 4, 5, or 6. In yet another preferred embodiment, the percent identity between two nucleotide sequences is determined using the GAP program in the GCG software package (available at http://www.gcg-.com), using a NWSgapdna.CMP matrix and a gap weight of 40, 50, 60, 70, or 80 and a length weight of 1, 2, 3, 4, 5, or 6. A particularly preferred set of parameters (and the one that should be used if the practitioner is uncertain about what parameters should be applied to determine if a molecule is within a sequence identity or homology limitation of the invention) are a BLOSUM 62 scoring matrix with a gap penalty of 12, a gap extend penalty of 4, and a frameshift gap penalty of 5.

Alternatively, the percent identity between two amino acid or nucleotide sequences can be determined using the algorithm of Meyers et al. (1989) *CABIOS* 4:11-17) which has been incorporated into the ALIGN program (version 2.0), using a PAM120 weight residue table, a gap length penalty of 12 and a gap penalty of 4.

As used herein the term "conservative amino acid substitution" refers to replacement of an amino acid residue with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine).

In one embodiment, the antibody is a polyclonal antibody. In one embodiment, the antibody is a humanized antibody, a human antibody, a murine antibody or a chimeric antibody.

In one embodiment, the antigen binding fragment thereof is an antigen-binding fragment (Fab) or a single-chain variable fragment (scFv). In a further embodiment, said fragment is selected from the group consisting of Fab, Fab', F(ab)2, F(ab')2, and scFv.

It will be appreciated that $X_1$ can represent any suitable antibody or antigen binding fragment attachment moiety and that the choice of said group will depend upon the amino acid residue selected as the attachment point within the antibody.

In one embodiment, $X_1$ represents —S— or —N(H)—. In a further embodiment, $X_1$ represents —N(H)—. In this embodiment, L is conjugated to compounds of formula (I) according to one of the two following structures:

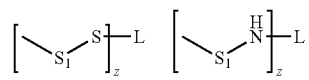

wherein $S_1$ and z are as defined herein, and L represents an antibody or antigen binding fragment thereof terminated with reactive thiol or lysine groups. Such reacting thiol or cysteine groups may be available on the antibody or antigen binding fragment thereof or they may be introduced through site specific modifications to the peptide chain, to deliver additional points of conjugation via engineered amino acid residues (Nat. Biotechnol. 2008, 925; Nat. Biotechnol. 2012, 184). Alternatively, site specific amino acids may be incorporated into the desired peptide chain to enable orthogonal chemical reactivity for site specific conjugation (OPRD (2016), 20, 852-866). Examples of amino acids with orthogonal reactivity include p-acetylphenylalanine (pAcPhe, J. Mol. Biol. 2011, 595), para-azidomethyl-1-phenylalanine (pAMF, Bioconjug. Chem 2014, 351), N6-((2-azidoethoxy)carbonyl)-L-lysine (Bioconjug. Chem. 2015, 2249).

It will be appreciated that the antibody or antigen binding fragments of the present invention will be configured to bind to a therapeutic target which is either a cancer cell or a specific pathogen.

In one embodiment, the antibody or antigen binding fragments are configured to bind to a cancer cell. In a further embodiment, the antibody or antigen binding fragments specifically bind to a tumour-associated antigen whose cell surface expression on a tumour cell is different to its expression on a healthy cell.

In a preferred embodiment, the antibody or antigen binding fragment binds to a target on a cancer cell or pathogen. Preferred targets include: EGFR, HER2, HER3, CD22, EpCAM, PSMA, PSCA, FLT-3, CD30, CD20, CD33, CD23, CD2, CD37, CD25, CD73, CD47, LGR-5, CD80, CD86, CD70, CD74, CD40, CD19, CD79b, CA-125, c-met, CXCR4, DR5, PD-1, PD1L, LeY, MUC1, MUC2, MUC3, MUC4, MUC5ac, MIP-1A, MIP-1B, KIT, TRAIL receptor (R1 and R2), CXCR4, CEACAM, IGF-1R, carbonic anhydrase IX, PDGFRa, CD137, CD276, mesothelin, VEGFR, P-cadherin, CD56, bacterial Psi, bacterial lipopolysaccharide, galactan-III epitope of bacterial LPS, bacterial PcrV, RSV F protein, ROR1, BAFF-R, CD40, CD52, CD71, CD38, CD269, CD319, CD307, CD7, CD123 and CD135.

In a yet preferred embodiment, the antibody or antigen binding fragment binds to a target on a cancer cell or pathogen. Preferred targets include: EGFR, HER2, HER3, CD22, EpCAM, PSMA, PSCA, FLT-3, CD30, CD20, CD33, CD23, CD2, CD37, CD25, CD73, CD47, LGR-5, CD80, CD86, CD70, CD74, CD40, CD19, CD79b, CA-125, c-met, CXCR4, DR5, PD-1, PDlL, LeY, MUC1, MUC2, MUC3, MUC4, MUC5ac, MIP-1A, MIP-1B, KIT, TRAIL receptor (R1 and R2), CXCR4, CEACAM, IGF-1R, carbonic anhydrase IX, PDGFRa, CD137, CD276, mesothelin, VEGFR, P-cadherin, CD56, bacterial Psi, bacterial lipopolysaccharide, galactan-III epitope of bacterial LPS, bacterial PcrV and RSV F protein.

Anti-EGFR Antibodies

In a further embodiment, the antibody or antigen binding fragment is an Epidermal Growth Factor Receptor (EGFR) binding epitope. EGFR is well known to be over-expressed in several human cancer types. The high expression on certain cancer cells makes EGFR an attractive target for new therapies. In one embodiment, the EGFR binding antibody or antigen binding fragment is an epitope which binds to any of the EGFR subfamily selected from: EGFR (ErbB-1), HER2/c-neu (ErbB-2), Her 3 (ErbB-3) and Her 4 (ErbB-4). Examples of suitable EGFR binding antibodies include but are not limited to Cetuximab, Nimotuzumab, Matuzumab, Zalutumumab, and Panitumumab.

In one embodiment, said antibody or antigen binding fragment thereof is selected from an EGFR antibody or a fragment thereof, such as cetuximab, cetuximab Fab or nimotuzumab, in particular an EGFR antibody or fragment thereof, such as cetuximab, cetuximab Fab, having at least 80% sequence identity to SEQ ID NOS: 1 and 2:

| Sequence ID NO | Sequence |
| --- | --- |
| Cetuximab Heavy chain (SEQ ID NO: 1) | QVQLKQSGPGLVQPSQSLSITCTVSGFSLTNYG VHWVRQSPGKGLEWLGVIWSGGNTDYNTPFTSR LSINKDNSKSQVFFKMNSLQSNDTAIYYCARAL TYYDYEFAYWGQGTLVTVSAASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKKVEPKSCDKTHTCPPC PAPELLGGPSVFLFPPKPKDTLMISRTPEVTCV VVDVSHEDPEVKFNWYVDGVEVHNAKTKPREEQ YNSTYRVVSVLTVLHQDWLNGKEYKCKVSNKAL PAPIEKTISKAKGQPREPQVYTLPPSRDELTKN QVSLTCLVKGFYPSDIAVEWESNGQPENNYKTT PPVLDSDGSFFLYSKLTVDKSRWQQGNVFSCSV MHEALHNHYTQKSLSLSPGK |
| Cetuximab Light chain (SEQ ID NO: 2) | DILLTQSPVILSVSPGERVSFSCRASQSIGTNI HWYQQRTNGSPRLLIKYASESISGIPSRFSGSG SGTDFTLSINSVESEDIADYYCQQNNNWPTTFG AGTKLELKRTVAAPSVFIFPPSDEQLKSGTASV VCLLNNFYPREAKVQWKVDNALQSGNSQESVTE QDSKDSTYSLSSTLTLSKADYEKHKVYACEVTH QGLSSPVTKSFNRGEC |

In a further embodiment, the EGFR antibody is cetuximab, a hybrid mouse/human chimeric antibody comprising both heavy and light chain sequences as disclosed in (a) Li et al. (2005) *Cancer Cell* 7, 301-11; (b) Dubois et al. (2008) *Anal. Chem.* 80, 1737-45; and (c) IMGT database available at www.imgt.org; www.drugbank.ca or WO 2016/196682.

In a further embodiment the cetuximab antibody or antigen binding fragment thereof recognises and specifically binds EGFR and has heavy and light chain variable domains having at least 80%, 82%, 84%, 85%, 86%, 87%, 88%, 89%, 90%, 91%, 92%, 93%, 94%, 95%, 96%, 97%, 98%, 99%, or 100% sequence identity to SEQ ID NOS: 1 and 2.

In a further embodiment, fragments of EGFR binding antibodies may be selected as examples of L. Typical examples include but are not limited to cetuximab Fab (Li, S. et al (2005) Cancer Cell 7, 301-311); cetuximab scFv (U.S. Pat. No. 7,060,808); Panitumumab Fab (Sickmier E. A. et al (2016) PLoSOne 11, 9, e0163366); Panitumumab scFv (U.S. Pat. No. 6,235,883) and D2C7 scFv (US 2013/0022598; Clin Cancer Res 2013, 19(17), 4717-4727).

Anti-CD20 Antibodies

In a further embodiment, the antibody or antigen binding fragment is a CD20 binding epitope. Removal of CD20 expressing cells (e.g. B cells), is well known to have therapeutic benefit in the treatment of haematological cancers such as leukemias and lymphomas. Examples of suitable CD20 binding antibodies include but are not limited to rituximab, ocrelizumab, ofatumumab and obinutuzumab.

In one embodiment, said antibody or antigen binding fragment thereof is selected from a CD20 antibody or a fragment thereof, such as rituximab or rituximab Fab, in particular a CD20 antibody or fragment thereof, such as rituximab or rituximab Fab, having at least 80% sequence identity to SEQ ID NOS: 3 and 4:

Rituximab Heavy chain
(SEQ ID NO: 3)
QVQLQQPGAELVKPGASVKMSCKASGYTFTSYNMHWVKQTPGRGLEWIG

AIYPGNGDTSYNQKFKGKATLTADKSSSTAYMQLSSLTSEDSAVYYCAR

STYYGGDWYFNVWGAGTTVTVSAASTKGPSVFPLAPSSKSTSGGTAALG

CLVKDYFPEPVTVSWNSGALTSGVHTFPAVLQSSGLYSLSSVVTVPSSS

LGTQTYICNVNHKPSNTKVDKKAEPKSCDKTHTCPPCPAPELLGGPSVF

LFPPKPKDTLMISRTPEVTCVVVDVSHEDPEVKFNWYVDGVEVHNAKTK

PREEQYNSTYRVVSVLTVLHQDWLNGKEYKCKVSNKALPAPIEKTISKA

KGQPREPQVYTLPPSRDELTKNQVSLTCLVKGFYPSDIAVEWESNGQPE

NNYKTTPPVLDSDGSFFLYSKLTVDKSRWQQGNVFSCSVMHEALHNHYT

QKSLSLSPGK

Rituximab Light Chain
(SEQ ID NO: 4)
QIVLSQSPAILSASPGEKVTMTCRASSSVSYIHWFQQKPGSSPKPWIYA

TSNLASGVPVRFSGSGSGTSYSLTISRVEAEDAATYYCQQWTSNPPTFG

GGTKLEIKRTVAAPSVFIFPPSDEQLKSGTASVVCLLNNFYPREAKVQW

KVDNALQSGNSQESVTEQDSKDSTYSLSSTLTLSKADYEKHKVYACEVT

HQGLSSPVTKSFNRGEC

In a further embodiment, the CD20 antibody is rituximab, a hybrid mouse/human chimeric antibody comprising both heavy and light chain sequences as disclosed in (a) U.S. Pat. No. 5,736,137, (b) Wang, B. et al (2013) Analyst 138, 3058-3065 and (c) IMGT database available at www.imgt.org; www.drugbank.ca.

In a further embodiment the rituximab antibody or antigen binding fragment thereof recognises and specifically binds CD20 and has heavy and light chain variable domains having at least 80%, 82%, 84%, 85%, 86%, 87%, 88%, 89%, 90%, 91%, 92%, 93%, 94%, 95%, 96%, 97%, 98%, 99%, or 100% sequence identity to SEQ ID NOS: 3 and 4.

In a further embodiment, fragments of CD20 binding antibodies may be selected as examples of L. Typical examples include but are not limited to rituximab Fab (Du, J. et al (2007) *J. Biological Chem.* 282, 15073-15080).

In a further embodiment, the CD20 antibody or fragment thereof is selected from rituximab or rituximab Fab.

Anti-HER-2 Antibodies

In a further embodiment, the antibody or antigen binding fragment is a HER-2 binding epitope. Examples of suitable HER-2 binding antibodies include but are not limited to trastuzumab and pertuzumab.

In a further embodiment, the antibody is trastuzumab, a humanised antibody comprising both heavy and light chain sequences as disclosed in (a) Carter, P. L. et al. (1992) *Proc. Natl. Acad. Sci. USA* 89, 4285-9; (b) Kyoto Encyclopedia of Genes and Genomes (KEGG). (KEGG DRUG entry D03257); and (c) IMGT database available at www.imqt.org.

In one embodiment, said antibody or antigen binding fragment thereof is selected from a HER2 antibody or a fragment thereof, such as trastuzumab or trastuzumab Fab, in particular a HER2 antibody or fragment thereof, such as trastuzumab or trastuzumab Fab, having at least 80% sequence identity to SEQ ID NOS: 5 and 6:

| Sequence ID NO | Sequence |
| --- | --- |
| Trastuzumab Heavy chain (SEQ ID NO: 5) | EVQLVESGGG LVQPGGSLRL SCAASGFNIK DTYIHWVRQA PGKGLEWVAR IYPTNGYTRY ADSVKGRFTI SADTSKNTAY LQMNSLRAED TAVYYCSRWG GDGFYAMDYW GQGTLVTVSS ASTKGPSVFP LAPSSKSTSG GTAALGCLVK DYFPEPVTVS WNSGALTSGV HTFPAVLQSS GLYSLSSVVT VPSSSLGTQT YICNVNHKPS NTKVDKKVEP KSCDKTHTCP PCPAPELLGG PSVFLFPPKP KDTLMISRTP EVTCVVVDVS HEDPEVKFNW YVDGVEVHNA KTKPREEQYN STYRVVSVLT VLHQDWLNGK EYKCKVSNKA LPAPIEKTIS KAKGQPREPQ VYTLPPSREE MTKNQVSLTC LVKGFYPSDI AVEWESNGQP ENNYKTTPPV LDSDGSFFLY SKLTVDKSRW QQGNVFSCSV MHEALHNHYT QKSLSLSPG |
| Trastuzumab Light chain (SEQ ID NO: 6) | DIQMTQSPSS LSASVGDRVT ITCRASQDVN TAVAWYQQKP GKAPKLLIYS ASFLYSGVPS RFSGSRSGTD FTLTISSLQP EDFATYYCQQ HYTTPPTFGQ GTKVEIKRTV AAPSVFIFPP SDEQLKSGTA SVVCLLNNFY PREAKVQWKV DNALQSGNSQ ESVTEQDSKD STYSLSSTLT LSKADYEKHK VYACEVTHQG LSSPVTKSFN RGEC |

Pathogen Specific Antibody Targets

In an alternative embodiment, the antibody or antigen binding fragments are configured to bind to a specific pathogen. In a further embodiment, the antibody or antigen binding fragments are configured to bind *S. aureus* and *Pseudomonas aeruginosa* bacteria. Examples of suitable antibodies include but are not limited to those reported in WO 2015/196011, WO 2012/170807 and WO 2014/074528.

Conjugates

Any antibody or fragment thereof disclosed herein may be conjugated to the cyclic spacer linkers described herein containing one or more rhamnose. The invention pertains to the ability to choose the optimal number of rhamnose units per linker per conjugation site whilst retaining efficacy of the antibody or fragment thereof. The type of conjugation may be selected by one skilled in the art to enable the highest yield and purity of the isolated material based on the terminal functionality of the linker and the surface reactivity or selected reactive site of the antibody or fragment thereof. In some embodiments conjugation is facilitated by a thiol addition to a maleimide moiety. Alternatively, conjugation may be facilitated by the amide bond formation between an amino group and an activated ester such as an NHS ester.

When a conjugate includes several reactive sites leading to multiple conjugation reactions, it is to be understood that the aforementioned ranges may refer to the actual or average number of linker molecules per antibody or fragment thereof.

As used herein, the term 'LAR' (Linker:Antibody Ratio) refers to the actual number or average number of linker molecules that have successfully conjugated to the antibody or fragment thereof. LAR is equivalent to the value of the integer defined herein as "z". Various methods of determining the linker loading are known in the art.

Conjugate Properties

In any of the various embodiments described herein, an antibody or fragment thereof will be capable of retaining its binding efficacy to its target whilst enabling optimal recruitment of anti-rhamnose. In one embodiment, cetuximab retains its ability to bind EGFR whilst being conjugated to an average of up to five, such as up to twenty linker molecules.

In some embodiments, a conjugate of the invention may exhibit one or more of the following properties:

a) Conjugation of the linkers to the antibody or fragment thereof may not significantly alter the binding efficacy to the target over the unconjugated counterpart;

b) Conjugation of the rhamnose containing linkers may enable high levels of LAR without concomitantly high levels of aggregation due to the hydrophilic properties of the carbohydrate linker;

c) Addition of the rhamnose containing linkers may enable the antibody or fragment thereof to be more stable;

d) A preference for heavy or light chain conjugation depending on the chosen linker and/or conjugation approach;

e) Conjugation of one chosen linker that comprises a high multiplicity of rhamnose units may exhibit alternative properties over several conjugation sites with equal loadings of rhamnose;

f) Conjugation of the linkers to the antibody or fragment thereof may lead to an enhanced pharmacokinetic profile;

g) The resulting bifunctional antibodies and fragments thereof may exhibit enhanced EC50 binding properties to the target.

Salts and Derivatives Thereof

A reference to a compound of formula (I) and sub-groups thereof also includes ionic forms, salts, solvates, isomers (including geometric and stereochemical isomers), tautomers, N-oxides, esters, isotopes and protected forms thereof, for example, as discussed below; preferably, the salts or tautomers or isomers or N-oxides or solvates thereof; and more preferably, the salts or tautomers or N-oxides or solvates thereof, even more preferably the salts or tautomers or solvates thereof. Hereinafter, compounds and their ionic forms, salts, solvates, isomers (including geometric and stereochemical isomers), tautomers, N-oxides, esters, isotopes and protected forms thereof as defined in any aspect of the invention (except intermediate compounds in chemical processes) are referred to as "compounds of the invention".

Compounds of formula (I) can exist in the form of salts, for example acid addition salts or, in certain cases salts of organic and inorganic bases such as carboxylate, sulfonate and phosphate salts. All such salts are within the scope of this invention, and references to compounds of formula (I) include the salt forms of the compounds. In one embodiment, the compound of formula (I) exists as the phosphate salt.

The salts of the present invention can be synthesized from the parent compound that contains a basic moiety by conventional chemical methods such as methods described in *Pharmaceutical Salts: Properties, Selection, and Use*, P. Heinrich Stahl (Editor), Camille G. Wermuth (Editor), ISBN: 3-90639-026-8, Hardcover, 388 pages, August 2002. Generally, such salts can be prepared by reacting the base forms of these compounds with the appropriate base or acid in water or in an organic solvent, or in a mixture of the two; generally, non-aqueous media such as ether, ethyl acetate, ethanol, isopropanol, or acetonitrile are used.

Acid addition salts (mono- or di-salts) may be formed with a wide variety of acids, both inorganic and organic. Examples of acid addition salts include mono- or di-salts formed with an acid selected from the group consisting of acetic, 2,2-dichloroacetic, adipic, alginic, ascorbic (e.g. L-ascorbic), L-aspartic, benzenesulfonic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, D-gluconic, glucuronic (e.g. D-glucuronic), glutamic (e.g. L-glutamic), α-oxoglutaric, glycolic, hippuric, hydrohalic acids (e.g. hydrobromic, hydrochloric, hydriodic), isethionic, lactic (e.g. (+)-L-lactic, (±)-DL-lactic), lactobionic, maleic, malic, (−)-L-malic, malonic, (±)-DL-mandelic, methanesulfonic, naphthalene-2-sulfonic, naphthalene-1,5-disulfonic, 1-hydroxy-2-naphthoic, nicotinic, nitric, oleic, orotic, oxalic, palmitic, pamoic, phosphoric, propionic, pyruvic, L-pyroglutamic, salicylic, 4-amino-salicylic, sebacic, stearic, succinic, sulfuric, tannic, (+)-L-tartaric, thiocyanic, p-toluenesulfonic, undecylenic and valeric acids, as well as acylated amino acids and cation exchange resins.

One particular group of salts consists of salts formed from acetic, hydrochloric, hydriodic, phosphoric, nitric, sulfuric, citric, lactic, succinic, maleic, malic, isethionic, fumaric, benzenesulfonic, toluenesulfonic, methanesulfonic (mesylate), ethanesulfonic, naphthalenesulfonic, valeric, acetic, propanoic, butanoic, malonic, glucuronic and lactobionic acids. One particular salt is the hydrochloride salt. Another particular salt is the hydrogensulfate salt, also known as a hemisulfate salt.

Salts further include, by way of example only, sodium, potassium, calcium, magnesium, ammonium, tetraalkylammonium, and the like.

Where the compounds of formula (I) contain an amine function, these may form quaternary ammonium salts, for example by reaction with an alkylating agent according to methods well known to the skilled person. Such quaternary ammonium compounds are within the scope of formula (I).

The compounds of the invention may exist as mono- or di-salts depending upon the pKa of the acid from which the salt is formed.

The salt forms of the compounds of the invention are typically pharmaceutically acceptable salts, and examples of pharmaceutically acceptable salts are discussed in Berge et al., 1977, "Pharmaceutically Acceptable Salts," *J. Pharm. Sci.*, Vol. 66, pp. 1-19. However, salts that are not pharmaceutically acceptable may also be prepared as intermediate forms which may then be converted into pharmaceutically acceptable salts. Such non-pharmaceutically acceptable salts forms, which may be useful, for example, in the purification or separation of the compounds of the invention, also form part of the invention.

Those skilled in the art of organic chemistry will appreciate that many organic compounds can form complexes with solvents in which they are reacted or from which they are precipitated or crystallized. These complexes are known as "solvates". For example, a complex with water is known as a "hydrate". Pharmaceutically acceptable solvates of the compound of the invention are within the scope of the invention.

Compounds of formula (I) containing an amine function may also form N-oxides. A reference herein to a compound of formula (I) that contains an amine function also includes the N-oxide.

Where a compound contains several amine functions, one or more than one nitrogen atom may be oxidised to form an N-oxide. Particular examples of N-oxides are the N-oxides of a tertiary amine or a nitrogen atom of a nitrogen-containing heterocycle.

N-Oxides can be formed by treatment of the corresponding amine with an oxidizing agent such as hydrogen peroxide or a per-acid (e.g. a peroxycarboxylic acid), see for example *Advanced Organic Chemistry*, by Jerry March, 4$^{th}$ Edition, Wiley Interscience, pages. More particularly, N-oxides can be made by the procedure of L. W. Deady (*Syn. Comm.* 1977, 7, 509-514) in which the amine compound is reacted with m-chloroperoxybenzoic acid (mCPBA), for example, in an inert solvent such as dichloromethane.

It will be appreciated by those skilled in the art that certain protected derivatives of compounds of formula (I), which may be made prior to a final deprotection stage, may not possess pharmacological activity as such, but may, in certain instances, be administered orally or parenterally and thereafter metabolised in the body to form compounds of the invention which are pharmacologically active. Such derivatives may therefore be described as "prodrugs". All such prodrugs of compounds of the invention are included within the scope of the invention. Examples of pro-drug functionality suitable for the compounds of the present invention are described in Drugs of Today, Volume 19, Number 9, 1983, pp 499-538 and in Topics in Chemistry, Chapter 31, pp 306-316 and in "Design of Prodrugs" by H. Bundgaard, Elsevier, 1985, Chapter 1 (the disclosures in which documents are incorporated herein by reference). It will further be appreciated by those skilled in the art, that certain moieties, known to those skilled in the art as "pro-moieties", for example as described by H. Bundgaard in "Design of Prodrugs" (the disclosure in which document is incorporated herein by reference) may be placed on appropriate functionalities when such functionalities are present within compounds of the invention.

Also included within the scope of the compound and various salts of the invention are polymorphs thereof.

Compounds of formula (I) may exist in a number of different geometric isomeric, and tautomeric forms and references to compounds of formula (I) include all such forms. For the avoidance of doubt, where a compound can exist in one of several geometric isomeric or tautomeric forms and only one is specifically described or shown, all others are nevertheless embraced by formula (I).

The present invention includes all pharmaceutically acceptable isotopically-labeled compounds of the invention, i.e. compounds of formula (I), wherein one or more atoms are replaced by atoms having the same atomic number, but an atomic mass or mass number different from the atomic mass or mass number usually found in nature.

Examples of isotopes suitable for inclusion in the compounds of the invention comprise isotopes of hydrogen, such as $^2$H (D) and $^3$H (T), carbon, such as $^{11}$C, $^{13}$C and $^{14}$C, fluorine, such as $^{18}$F, nitrogen, such as $^{13}$N and $^{15}$N, oxygen, such as $^{15}$O, $^{17}$O and $^{18}$O.

Certain isotopically labelled compounds of formula (I), for example, those incorporating a radioactive isotope, are useful in drug and/or substrate tissue distribution studies. The compounds of formula (I) can also have valuable diagnostic properties in that they can be used for detecting or identifying the formation of a complex between a labelled compound and other molecules, peptides, proteins, enzymes or receptors. The detecting or identifying methods can use compounds that are labelled with labelling agents such as radioisotopes, enzymes, fluorescent substances, luminous substances (for example, luminol, luminol derivatives, luciferin, aequorin and luciferase), etc. The radioactive isotopes tritium, i.e. $^3$H (T), and carbon-14, i.e. $^{14}$C, are particularly useful for this purpose in view of their ease of incorporation and ready means of detection.

Substitution with heavier isotopes such as deuterium, i.e. $^2$H (D), may afford certain therapeutic advantages resulting from greater metabolic stability, for example, increased in vivo half-life or reduced dosage requirements, and hence may be preferred in some circumstances.

Substitution with positron emitting isotopes, such as $^{11}$C, $^{18}$F, $^{15}$O and $^{13}$N, can be useful in Positron Emission Topography (PET) studies for examining target occupancy.

Isotopically-labeled compounds of formula (I) can generally be prepared by conventional techniques known to those skilled in the art or by processes analogous to those described in the accompanying Examples and Preparations using appropriate isotopically-labeled reagents in place of the non-labeled reagent previously employed.

Methods for the Preparation of Compounds of Formula (I)

In this section, as in all other sections of this application unless the context indicates otherwise, references to formula (I) also include all other sub-groups and examples thereof as defined herein.

The compounds pertaining to the invention described herein may be prepared in a stepwise synthetic sequence as illustrated in the Processes and Schemes below. The syntheses involve the preparation of various central constructs which then enable the choice of branching and length of linker with which to connect the two binding moieties. Compounds of formula (I) can be prepared in accordance with synthetic methods well known to the skilled person. For example, one skilled in the art will appreciate that the chemical steps and choice of protecting groups may be managed in any order to enable synthetic success.

In some embodiments, a compound of formula (A) may comprise a linker ($S_B$) that comprises one or more linker components. Exemplary linker components include but are not limited to 6-maleimidocaproyl (MC), maleimidopropanoyl (MP), valine-citrulline (vc) alanine-phenylalanine (ala-phe), N-succinimidyl 4-(2-pyridylthio)pentanoate (SPP) and 4-(n-maleimidomethyl)cyclohexane 1-carboxylate (SMCC).

In some embodiments, a compound of formula (A) may comprise a linker ($S_B$) that is capable of reacting with a free thiol on an antibody to form a covalent bond. The compounds of the invention expressly contemplate but are not limited to antibody conjugates prepared with linker reagents: BMPEO, BMPS, EMCS, GMBS, HBVS, LC-SMCC, MBS, MPBH, SBAP, SIA, SIAB, SMCC, SMPB, sulfo-EMCS, sulfo-GMBS, sulfo-KMUS, sulfo-MBS, sulfo-SIAB, sulfo-SMCC, sulfo-SMPB and SVSB. Other functional groups besides pyrrolidine-2,5-dione (maleimide) which are reactive with a thiol group on an antibody include iodoacetamide, bromocetamide, vinyl pyridine disulphide, pyridyl disulphide, isocyanate, isothiocyanate, activated esters, sulfonyl chlorides and acid chlorides.

In some embodiments, a linker has the functionality that is capable of reacting with electrophilic groups on an antibody. Exemplary electrophilic groups include but are not limited to aldehyde, ketone and carbonyl groups. Additionally, a heteroatom of the reactive functionality of the linker may react with an electrophilic group on an antibody. Typical examples include but are not limited to hydrazine, oxime, amino, hydrazide, thiosemicarbazone, hydrazine carboxylate and aryl hydrazide.

In some embodiments, a compound of formula (A) may comprise a linker ($S_B$) that is capable of reacting with a free amine on an antibody to form a covalent bond. The compounds of the invention expressly contemplate but are not limited to antibody conjugates prepared using carboxylic acid activating agents such as: N-hydroxysuccinimide (NHS), 2-succinimido-1,1,3,3-tetra-methyluronium tetrafluoroborate (TSTU), and benzotriazol-1-yl-oxytripyrrolidinophosphonium hexafluorophosphate (PyBOP).

According to a further aspect of the invention there is provided a process for preparing a compound of formula (I) as defined hereinbefore which comprises:

(a) preparing a compound of formula (IA) wherein $X_1$ represents —NH— by reacting a compound of formula (IIA) wherein $S_1$ is terminated with a N-hydroxysuccinimide group with compounds of formula (IIIA) wherein the antibody or antigen binding fragment contains at least one reactive amino group:

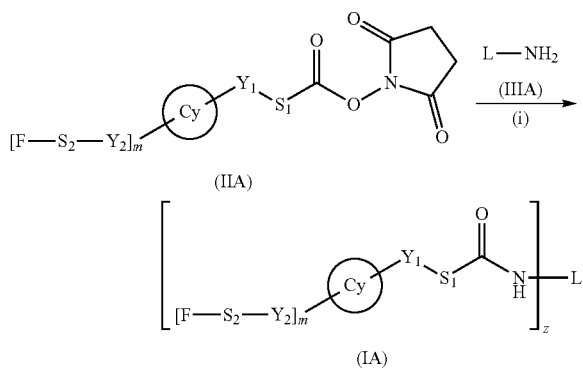

wherein F, $S_2$, $Y_2$, m, z, Cy, $Y_1$, $S_1$ and L are as defined hereinbefore; or (b) preparing a compound of formula (IB) wherein $X_1$ represents —S— by reacting a compound of formula (IIIB) wherein the antibody or antigen binding fragment contains at least one reactive thiol group with a compound of formula (IIB) wherein S1 is terminated with maleimide:

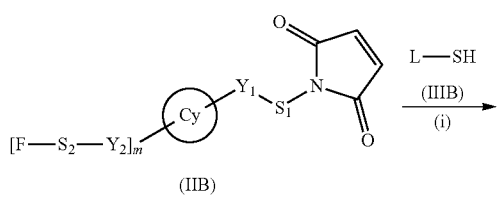

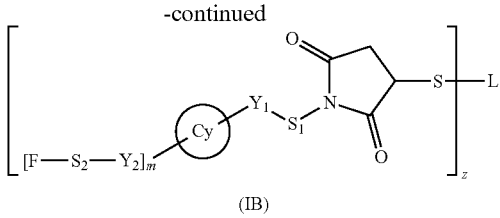

(IB)

wherein F, $S_2$, $Y_2$, m, z, Cy, $Y_1$ and $S_1$ are as defined hereinbefore; and/or (c) interconversion of a compound of formula (I) or protected derivative thereof to a further compound of formula (I) or protected derivative thereof.

Process (a) typically comprises an amide bond formation reaction in the presence of an activated ester. Typical conditions comprise incubation of the linker-NHS ester with antibodies or fragments thereof that contain a reactive amino, in a suitable buffer at room temperature. Typical Linker:Antibody ratios (LAR) are dependent on the number of free amino groups present on the antibody or fragment thereof in combination with the choice of linker equivalents used, but typically range from 2-20.

Process (b) typically comprises a thiol-maleimide reaction; a Michael addition reaction of a reactive thiol group with an α, β-unsaturated ketone such as maleimide. Preferred conditions comprise incubation of the linker-maleimide intermediates with antibodies or fragments thereof that contain a reactive thiol, in a suitable buffer as described herein at room temperature. Typical Linker:Antibody ratios (LAR) are dependent on the number of free thiol groups present on the antibody or fragment thereof, but typically range from 2-8.

Process (c) typically comprises interconversion procedures known by one skilled in the art. For example, in compounds of formula (I), a first substituent may be converted by methods known by one skilled in the art into a second, alternative substituent. A wide range of well-known functional group interconversions are known by a person skilled in the art for converting a precursor compound to a compound of formula (I) and are described in *Advanced Organic Chemistry* by Jerry March, 4$^{th}$ Edition, John Wiley & Sons, 1992. For example possible metal catalysed functionalisations such as using organo-tin reagents (the Stille reaction), Grignard reagents and reactions with nitrogen nucleophiles are described in 'Palladium Reagents and Catalysts' [Jiro Tsuji, Wiley, ISBN 0-470-85032-9] and Handbook of OrganoPalladium Chemistry for Organic Synthesis [Volume 1, Edited by Ei-ichi Negishi, Wiley, ISBN 0-471-31506-0].

If appropriate, the reactions previously described in processes (a) and (b) are followed or preceded by one or more reactions known to the skilled of the art and are performed in an appropriate order to achieve the requisite substitutions defined above to afford other compounds of formula (I). Non-limiting examples of such reactions whose conditions can be found in the literature include:
protection of reactive functions,
deprotection of reactive functions,
halogenation,
dehalogenation,
dealkylation,
alkylation and arylation of amine, aniline, alcohol and phenol,
Mitsunobu reaction on hydroxyl groups,
cycloaddition reactions on appropriate groups,
reduction of nitro, esters, cyano, aldehydes,
transition metal-catalyzed coupling reactions,
acylation,
sulfonylation/introduction of sulfonyl groups,
saponification/hydrolysis of ester groups,
amidification or transesterification of ester groups,
esterification or amidification of carboxylic groups,
halogen exchange,
nucleophilic substitution with amine, thiol or alcohol,
reductive amination,
oxime formation on carbonyl and hydroxylamine groups,
S-oxidation,
N-oxidation,
salification.

Compounds of formula (IIA) and (IIB) may be prepared according to the methods described in Scheme 1 from compounds of formula (V) and (VI), followed by reaction with di(N-succinimydyl)glutarate (DSG) or 4-(N-Maleimidomethyl)cyclohexanecarboxylic acid N-hydroxysuccinimide ester (SMCC):

Scheme 1

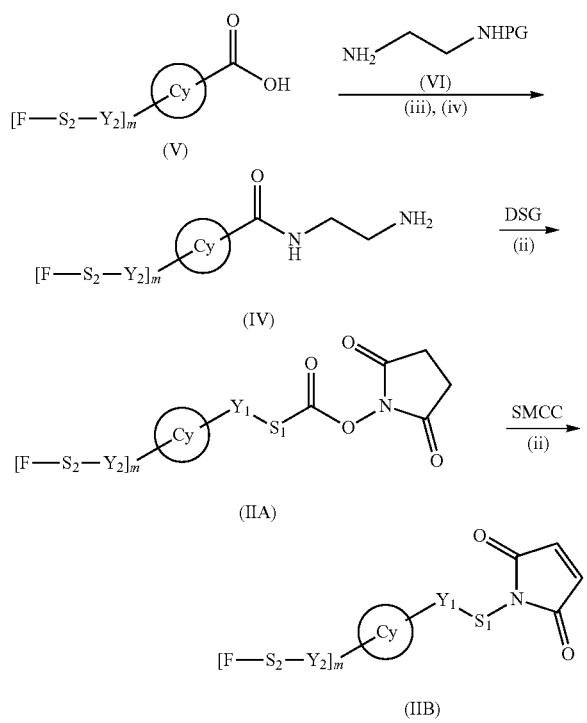

wherein PG is a protecting group such as monomethoxy trityl; $S_1$ is terminated with maleimide or NHS, $Y_1$ is CONH and $S_2$, $Y_2$, m, Cy, and F are as defined hereinbefore.

Compounds of formula (IIA) may be prepared from compounds of formula (IV) by interconversion of a terminal amino group into a reactive NHS group. Preferred conditions comprise reaction with cross-linker di-(N-succinimidyl)glutarate in a suitable anhydrous organic solvent such as DMF and DMSO or a combination thereof.

Compounds of formula (IIB) may be prepared from compounds of formula (IV) by interconversion of a terminal amino group into a reactive maleimide group. Preferred conditions comprise reaction with cross-linker or 4-(N-Maleimidomethyl)cyclohexanecarboxylic acid N-hydroxysuccinimide ester (SMCC) in a suitable anhydrous organic solvent such as DMF and DMSO or a combination thereof.

Compounds of formula (IV) may be prepared from compounds of formula (V) and (VI), according to process steps (iii) and (iv), and amide bond formation step followed by a suitable deprotection step. A typical amide bond formation step comprises activation of a carboxylic acid with either phosphate containing reagents, triazine-based reagents or carbodiimide containing reagents in the presence of an organic base in an organic solvent. Preferred conditions comprise HATU ((1-[bis(dimethylamino)methylene]-1H-1,2,3-triazolo[4,5-b]pyridinium 3-oxid hexafluorophosphate) with either triethylamine or diisopropylethylamine in DMF or a mixture of DMF and DMSO. Wherein PG comprises monomethoxytrityl, the deprotection reaction is mediated with acid. Preferred conditions comprise 0.2M HCl at room temperature.

Compounds of formula (IIA) may also be prepared according to the method described in Scheme 1A from compounds of formula (V) and (XII), followed by deprotection and reaction with TSTU.

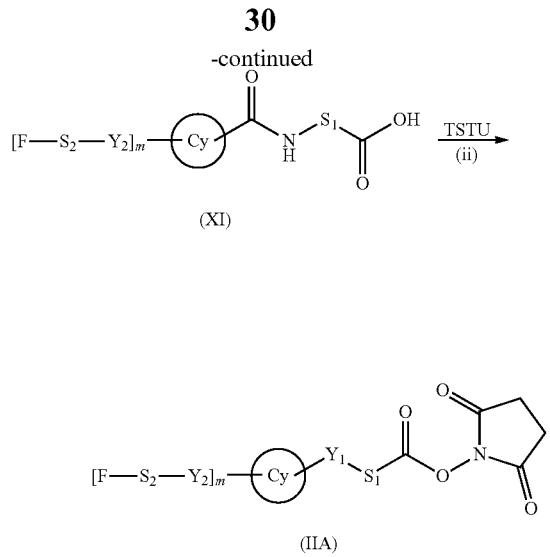

Scheme 1A

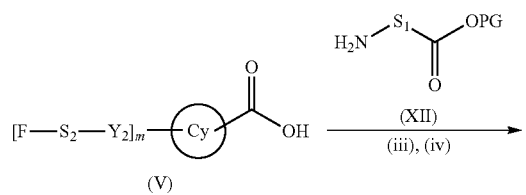

wherein PG is a protecting group such as benzyl; $S_1$ is terminated with NHS, $Y_1$ is CONH and S2, $Y_2$, m, Cy, and F are as defined hereinbefore.

Compounds of formula (V) and (VA) (wherein $S_2$ is terminated with —NHCO—CH$_2$—) may be prepared according to the methods described in Scheme 2 from compounds of formula (VIII), (IX) and (IXA).

Scheme 2

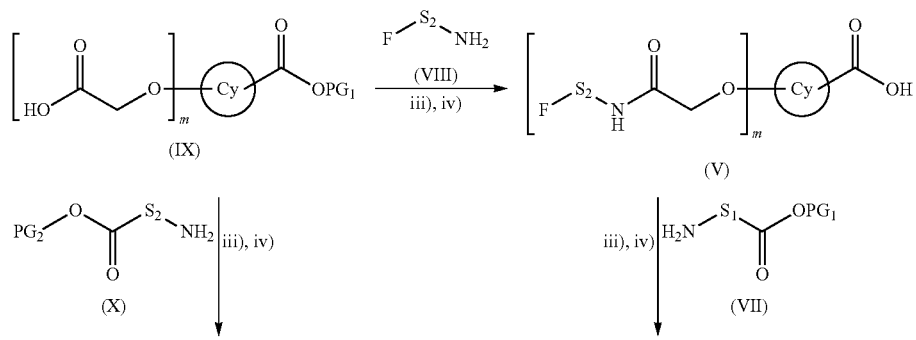

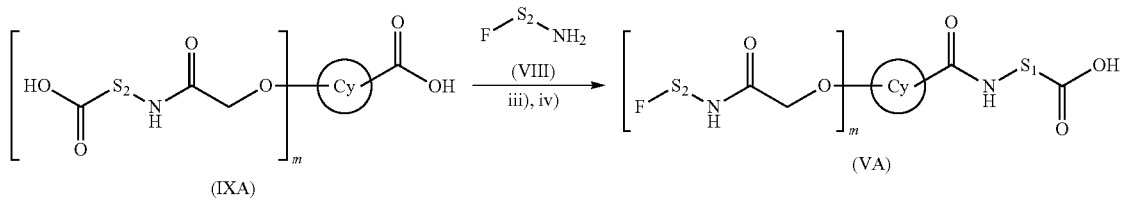

wherein m, Cy, $S_1$, $S_2$ and F are as defined hereinbefore, $PG_1$ is a protecting group comprising either tert-butyl, methyl, ethyl or benzyl and $PG_2$ is an orthogonal protecting group comprising either methyl, ethyl or tert-butyl.

Compounds of formula (V), (IXA) and (VA) may be prepared from compounds of formula (IX) according to process steps (iii) and (iv), an amide bond formation step followed by a suitable deprotection reaction. Wherein PG comprises benzyl, the deprotection reaction is mediated by catalytic hydrogenation. Preferred conditions comprise 10% Pd/C in MeOH/EtOH or water or any combination thereof under an atmosphere of hydrogen (from between 15-225 psi). Alternatively, deprotection may be mediated by a phase transfer reaction. Preferred conditions comprise TEA and water at room temperature for 16 hours.

Wherein PG comprises methyl, ethyl or tert-butyl, an acid or base mediated deprotection reaction as required by the protecting group is employed. Wherein acid mediated deprotection conditions are required, preferred conditions comprise TFA, 4M HCl in dioxane, or 37% HCl in water with a co-solvent of DCM or water as necessary. Wherein base mediated conditions are required, preferred conditions comprise either sodium or lithium hydroxide in aqueous media such as methanol or THE with water.

Compounds of formula (IIIA), (IIIB), (VI), (VIII), (XII), (VII), and (X) are either commercially available, or prepared according to the methods described herein or referenced herein.

One skilled in the art will appreciate that one may choose the appropriate combination of steps described above to generate the highest yields for the Examples and Preparations described herein.

Pharmaceutical Compositions

While it is possible for the compound of formula (I) to be administered alone, it is preferable to present it as a pharmaceutical composition (e.g. formulation).

Thus, according to a further aspect, the invention provides a pharmaceutical composition, and methods of making a pharmaceutical composition comprising (e.g admixing) at least one compound of the invention together with one or more pharmaceutically acceptable excipients and optionally other therapeutic or prophylactic agents, as described herein. It will be appreciated that when the pharmaceutical composition comprises one or more further therapeutic agents, said agents may comprise further differing compounds of formula (I).

The pharmaceutically acceptable excipient(s) can be selected from, for example, carriers (e.g. a solid, liquid or semi-solid carrier), adjuvants, diluents, fillers or bulking agents, granulating agents, coating agents, release-controlling agents, binding agents, disintegrants, lubricating agents, preservatives, antioxidants, buffering agents, suspending agents, thickening agents, flavouring agents, sweeteners, taste masking agents, stabilisers or any other excipients conventionally used in pharmaceutical compositions. Examples of excipients for various types of pharmaceutical compositions are set out in more detail below.

The term "pharmaceutically acceptable" as used herein pertains to compounds, materials, compositions, and/or dosage forms which are, within the scope of sound medical judgment, suitable for use in contact with the tissues of a subject (e.g. human) without excessive toxicity (i.e. generally recognised as safe (GRAS)), irritation, allergic response, or other problem or complication, commensurate with a reasonable benefit/risk ratio. Each carrier, excipient, etc. must also be "acceptable" in the sense of being compatible with the other ingredients of the formulation.

Pharmaceutical compositions containing compounds of the invention can be formulated in accordance with known techniques, see for example, Remington's Pharmaceutical Sciences, Mack Publishing Company, Easton, PA, USA.

The pharmaceutical compositions can be in any form suitable for parenteral, intranasal, intrabronchial, sublingual, ophthalmic, otic, rectal, intra-vaginal, or transdermal administration. Where the compositions are intended for parenteral administration, they can be formulated for intravenous, intramuscular, intraperitoneal, subcutaneous administration or for direct delivery into a target organ or tissue by injection, infusion or other means of delivery. The delivery can be by bolus injection, short term infusion or longer-term infusion and can be via passive delivery or through the utilisation of a suitable infusion pump or syringe driver.

Pharmaceutical formulations adapted for parenteral administration include aqueous and non-aqueous sterile injection solutions which may contain anti-oxidants, buffers, bacteriostats, co-solvents, surface active agents, organic solvent mixtures, cyclodextrin complexation agents, emulsifying agents (for forming and stabilizing emulsion formulations), liposome components for forming liposomes, gellable polymers for forming polymeric gels, lyophilisation protectants and combinations of agents for, inter alia, stabilising the active ingredient in a soluble form and rendering the formulation isotonic with the blood of the intended recipient. Pharmaceutical formulations for parenteral administration may also take the form of aqueous and non-aqueous sterile suspensions which may include suspending agents and thickening agents (R. G. Strickly, Solubilizing Excipients in oral and injectable formulations, Pharmaceutical Research, Vol 21(2) 2004, p 201-230).

The formulations may be presented in unit-dose or multi-dose containers, for example sealed ampoules, vials and prefilled syringes, and may be stored in a freeze-dried (lyophilised) condition requiring only the addition of the sterile liquid carrier, for example water for injections, immediately prior to use.

The pharmaceutical formulation can be prepared by lyophilising a compound of the invention. Lyophilisation refers to the procedure of freeze-drying a composition. Freeze-drying and lyophilisation are therefore used herein as synonyms.

Extemporaneous injection solutions and suspensions may be prepared from sterile powders, granules and tablets.

Pharmaceutical compositions of the present invention for parenteral injection can also comprise pharmaceutically acceptable sterile aqueous or non-aqueous solutions, dispersions, suspensions or emulsions as well as sterile powders for reconstitution into sterile injectable solutions or dispersions just prior to use.

Examples of suitable aqueous and non-aqueous carriers, diluents, solvents or vehicles include water, ethanol, polyols (such as glycerol, propylene glycol, polyethylene glycol, and the like), carboxymethylcellulose and suitable mixtures thereof, vegetable oils (such as sunflower oil, safflower oil, corn oil or olive oil), and injectable organic esters such as ethyl oleate. Proper fluidity can be maintained, for example, by the use of thickening or coating materials such as lecithin, by the maintenance of the required particle size in the case of dispersions, and by the use of surfactants.

The compositions of the present invention may also contain adjuvants such as preservatives, wetting agents, emulsifying agents, and dispersing agents. Prevention of the action of microorganisms may be ensured by the inclusion of various anti-bacterial and antifungal agents, for example, paraben, chlorobutanol, phenol, sorbic acid, and the like. It may also be desirable to include agents to adjust tonicity such as sugars, sodium chloride, and the like. Prolonged absorption of the injectable pharmaceutical form may be brought about by the inclusion of agents which delay absorption such as aluminium monostearate and gelatin.

In one preferred embodiment of the invention, the pharmaceutical composition is in a form suitable for i.v. administration, for example by injection or infusion. For intravenous or subcutaneous administration, the solution can be dosed as is, or can be injected into an infusion bag (containing a pharmaceutically acceptable excipient, such as 0.9% saline or 5% dextrose), before administration.

In another preferred embodiment, the pharmaceutical composition is in a form suitable for subcutaneous (s.c.) administration.

The compound of the invention may be formulated with a carrier and administered in the form of nanoparticles, the increased surface area of the nanoparticles assisting their absorption. In addition, nanoparticles offer the possibility of direct penetration into the cell. Nanoparticle drug delivery systems are described in "Nanoparticle Technology for Drug Delivery", edited by Ram B Gupta and Uday B. Kompella, Informa Healthcare, ISBN 9781574448573, published 13 Mar. 2006. Nanoparticles for drug delivery are also described in J. Control. Release, 2003, 91 (1-2), 167-172, and in Sinha et al., Mol. Cancer Ther. August 1, (2006) 5, 1909.

The pharmaceutical compositions typically comprise from approximately 1% (w/w) to approximately 95% (w/w) active ingredient and from 99% (w/w) to 5% (w/w) of a pharmaceutically acceptable excipient or combination of excipients. Preferably, the compositions comprise from approximately 20% (w/w) to approximately 90% (w/w) active ingredient and from 80% (w/w) to 10% of a pharmaceutically acceptable excipient or combination of excipients. The pharmaceutical compositions comprise from approximately 1% to approximately 95%, preferably from approximately 20% to approximately 90%, active ingredient. Pharmaceutical compositions according to the invention may be, for example, in unit dose form, such as in the form of ampoules, vials, suppositories, pre-filled syringes, dragées, tablets or capsules.

The pharmaceutically acceptable excipient(s) can be selected according to the desired physical form of the formulation and can, for example, be selected from diluents (e.g solid diluents such as fillers or bulking agents; and liquid diluents such as solvents and co-solvents), disintegrants, buffering agents, lubricants, flow aids, release controlling (e.g. release retarding or delaying polymers or waxes) agents, binders, granulating agents, pigments, plasticizers, antioxidants, preservatives, flavouring agents, taste masking agents, tonicity adjusting agents and coating agents.

The skilled person will have the expertise to select the appropriate amounts of ingredients for use in the formulations. For example, tablets and capsules typically contain 0-20% disintegrants, 0-5% lubricants, 0-5% flow aids and/or 0-99% (w/w) fillers/or bulking agents (depending on drug dose). They may also contain 0-10% (w/w) polymer binders, 0-5% (w/w) antioxidants, 0-5% (w/w) pigments. Slow release tablets would in addition contain 0-99% (w/w) release-controlling (e.g. delaying) polymers (depending on dose). The film coats of the tablet or capsule typically contain 0-10% (w/w) polymers, 0-3% (w/w) pigments, and/or 0-2% (w/w) plasticizers.

Parenteral or subcutaneous formulations typically contain 0-20% (w/w) buffers, 0-50% (w/w) co-solvents, and/or 0-99% (w/w) Water for Injection (WFI) (depending on dose and if freeze dried). Formulations for intramuscular depots may also contain 0-99% (w/w) oils.

The compounds of the invention can also be formulated as solid dispersions. Solid dispersions are homogeneous extremely fine disperse phases of two or more solids. Solid solutions (molecularly disperse systems), one type of solid dispersion, are well known for use in pharmaceutical technology (see (Chiou and Riegelman, J. Pharm. Sci., 60, 1281-1300 (1971)) and are useful in increasing dissolution rates and increasing the bioavailability of poorly water-soluble drugs.

The pharmaceutical formulations may be presented to a patient in "patient packs" containing an entire course of treatment in a single package, usually a blister pack. Patient packs have an advantage over traditional prescriptions, where a pharmacist divides a patient's supply of a pharmaceutical from a bulk supply, in that the patient always has access to the package insert contained in the patient pack, normally missing in patient prescriptions. The inclusion of a package insert has been shown to improve patient compliance with the physician's instructions. One example of a patient pack includes a prefilled syringe. Such pre-filled syringes already contain the drug substance. The front-end portion of a pre-filled syringe to which a needle is to be attached is sealed with a nozzle cap. Prior to injection, the nozzle cap is removed from the front-end portion and a needle is attached thereto. A gasket is then slid by pushing a plunger rod toward the front-end portion so that the drug is expelled.

Compositions for nasal delivery include ointments, creams, sprays, patches, gels, liquid drops and inserts (for example intraocular inserts). Such compositions can be formulated in accordance with known methods.

Examples of formulations for rectal or intra-vaginal administration include pessaries and suppositories which may be, for example, formed from a shaped moldable or waxy material containing the active compound. Solutions of the active compound may also be used for rectal administration.

Compositions for administration by inhalation may take the form of inhalable powder compositions or liquid or powder sprays and can be administrated in standard form using powder inhaler devices or aerosol dispensing devices. Such devices are well known. For administration by inhalation, the powdered formulations typically comprise the active compound together with an inert solid powdered diluent such as lactose.

The compound of the invention will generally be presented in unit dosage form and, as such, will typically contain sufficient compound to provide a desired level of biological activity. For example, a formulation may contain from 1 nanogram to 2 grams of active ingredient, e.g. from 1 nanogram to 2 milligrams of active ingredient. Within these ranges, particular sub-ranges of compound are 0.1 milligrams to 2 grams of active ingredient (more usually from 10 milligrams to 1 gram, e.g. 50 milligrams to 500 milligrams), or 1 microgram to 20 milligrams (for example 1 microgram to 10 milligrams, e.g. 0.1 milligrams to 2 milligrams of active ingredient).

The active compound will be administered to a patient in need thereof (for example a human or animal patient) in an amount sufficient to achieve the desired therapeutic effect.

Therapeutic Uses

According to a further aspect of the invention, there is provided a compound of formula (I) as defined herein for use in therapy.

It will be appreciated that the therapeutic use of the compounds of the invention is determined by the selection of the antibody or antigen binding fragment thereof.

For example, in the embodiment when the antibody or antigen binding fragment thereof is an EGFR antibody (e.g. cetuximab or nimotuzumab) or a fragment thereof the compound of formula (I) is for use in the treatment of cancer.

Thus, according to a further aspect of the invention there is provided a compound of formula (I) as defined herein wherein the antibody or antigen binding fragment thereof is an EGFR antibody (e.g. cetuximab or nimotuzumab) or a fragment thereof for use in the treatment of cancer.

According to a further aspect of the invention there is provided a method of treating cancer which comprises administering to an individual in need thereof a compound of formula (I) as defined herein wherein the antibody or antigen binding fragment thereof is EGFR antibody (e.g. cetuximab or nimotuzumab) or a fragment thereof.

Furthermore, in the embodiment when the antibody or antigen binding fragment thereof is a pathogen specific antibody or a fragment thereof, the compound of formula (I) is for use in the treatment of a bacterial infection.

Thus, according to a further aspect of the invention there is provided a compound of formula (I) as defined herein wherein the antibody or antigen binding fragment thereof is a pathogen specific antibody or a fragment thereof, for use in the treatment of a bacterial infection.

According to a further aspect of the invention there is provided a method of treating a bacterial infection which comprises administering to an individual in need thereof a compound of formula (I) as defined herein wherein the antibody or antigen binding fragment thereof is a pathogen specific antibody or a fragment thereof.

The compound of the invention is generally administered to a subject in need of such administration, for example a human or animal patient, preferably a human.

The compound of the invention will typically be administered in amounts that are therapeutically or prophylactically useful and which generally are non-toxic. However, in certain situations (for example in the case of life-threatening diseases), the benefits of administering a compound of the invention may outweigh the disadvantages of any toxic effects or side effects, in which case it may be considered desirable to administer a compound of the invention in amounts that are associated with a degree of toxicity.

The compound of the invention may be administered over a prolonged term (i.e. chronic administration) to maintain beneficial therapeutic effects or may be administered for a short period only (i.e. acute administration). Alternatively, they may be administered in a continuous manner or in a manner that provides intermittent dosing (e.g. a pulsatile manner).

A typical daily dose of the compound of the invention can be in the range from 100 picograms to 100 milligrams per kilogram of body weight, more typically 5 nanograms to 25 milligrams per kilogram of bodyweight, and more usually 10 nanograms to 15 milligrams per kilogram (e.g. 10 nanograms to 10 milligrams, and more typically 1 microgram per kilogram to 20 milligrams per kilogram, for example 1 microgram to 10 milligrams per kilogram) per kilogram of bodyweight although higher or lower doses may be administered where required. The compound of the invention can either be administered on a daily basis or on a repeat basis every 2, or 3, or 4, or 5, or 6, or 7, or 10 or 14, or 21, or 28 days for example. Alternatively, the compound of the invention can be administered by infusion, multiple times per day.

The compound of the invention may be administered in a range of doses, for example 1 to 1500 mg, 2 to 800 mg, or 5 to 500 mg, e.g. 2 to 200 mg or 10 to 1000 mg, particular examples of doses including 10, 20, 50 and 80 mg. The compound of the invention may be administered once or more than once each day. The compound of the invention can be administered continuously (i.e. taken every day without a break for the duration of the treatment regimen). Alternatively, the compound of the invention can be administered intermittently (i.e. taken continuously for a given period such as a week, then discontinued for a period such as a week and then taken continuously for another period such as a week and so on throughout the duration of the treatment regimen). Examples of treatment regimens involving intermittent administration include regimens wherein administration is in cycles of one week on, one week off; or two weeks on, one week off; or three weeks on, one week off; or two weeks on, two weeks off; or four weeks on two weeks off; or one week on three weeks off—for one or more cycles, e.g. 2, 3, 4, 5, 6, 7, 8, 9 or 10 or more cycles.

In one particular dosing schedule, a patient will be given an infusion of a compound of the invention for periods of one hour daily for up to ten days in particular up to five days for one week, and the treatment repeated at a desired interval such as two to four weeks, in particular every three weeks.

More particularly, a patient may be given an infusion of a compound of the invention for periods of one hour daily for 5 days and the treatment repeated every three weeks.

In another particular dosing schedule, a patient is given an infusion over 30 minutes to 1 hour followed by maintenance infusions of variable duration, for example 1 to 5 hours, e.g. 3 hours.

In a further particular dosing schedule, a patient is given a continuous infusion for a period of 12 hours to 5 days, and in particular a continuous infusion of 24 hours to 72 hours.

Ultimately, however, the quantity of compound of the invention administered and the type of composition used will be commensurate with the nature of the disease or physiological condition being treated and will be at the discretion of the physician.

It will be appreciated that the compound of the invention can be used as a single agent or in combination with other therapeutic agents. Combination experiments can be performed, for example, as described in Chou T C, Talalay P. Quantitative analysis of dose-effect relationships: the combined effects of multiple drugs or enzyme inhibitors. Adv Enzyme Regulat 1984; 22: 27-55.

Where the compound of the invention is administered in combination therapy with one, two, three, four or more other therapeutic agents (preferably one or two, more preferably one), the agents can be administered simultaneously or sequentially. In the latter case, the two or more agents will be administered within a period and in an amount and manner that is sufficient to ensure that an advantageous or synergistic effect is achieved. When administered sequentially, they can be administered at closely spaced intervals (for example over a period of 5-10 minutes) or at longer intervals (for example 1, 2, 3, 4 or more hours apart, or even longer periods apart where required), the precise dosage regimen being commensurate with the properties of the therapeutic agent(s). These dosages may be administered for example once, twice or more per course of treatment, which may be repeated for example every 7, 14, 21 or 28 days.

It will be appreciated that the preferred method and order of administration and the respective dosage amounts and regimes for each component of the combination will depend on the particular other medicinal agent and compound of the invention being administered, their route of administration, the particular tumour being treated, and the particular host being treated. The optimum method and order of administration and the dosage amounts and regime can be readily determined by those skilled in the art using conventional methods and in view of the information set out herein.

The weight ratio of the compound of the invention and the one or more other therapeutic agent(s) when given as a combination may be determined by the person skilled in the art. Said ratio and the exact dosage and frequency of administration depends on the particular compound of the invention and the other therapeutic agent(s) used, the particular condition being treated, the severity of the condition being treated, the age, weight, gender, diet, time of administration and general physical condition of the particular patient, the mode of administration as well as other medication the individual may be taking, as is well known to those skilled in the art. Furthermore, it is evident that the effective daily amount may be lowered or increased depending on the response of the treated subject and/or depending on the evaluation of the physician prescribing the compound of present invention. A particular weight ratio for the compound of the invention and another therapeutic agent may range from 1/10 to 10/1, more in particular from 1/5 to 5/1, even more in particular from 1/3 to 3/1.

Anti-Cancer Therapy

Examples of cancers (and their benign counterparts) which may be treated (or inhibited) include, but are not limited to tumours of epithelial origin (adenomas and carcinomas of various types including adenocarcinomas, squamous carcinomas, transitional cell carcinomas and other carcinomas) such as carcinomas of the bladder and urinary tract, breast, gastrointestinal tract (including the esophagus, stomach (gastric), small intestine, colon, rectum and anus), liver (hepatocellular carcinoma), gall bladder and biliary system, exocrine pancreas, kidney, lung (for example adenocarcinomas, small cell lung carcinomas, non-small cell lung carcinomas, bronchioalveolar carcinomas and mesotheliomas), head and neck (for example cancers of the tongue, buccal cavity, larynx, pharynx, nasopharynx, tonsil, salivary glands, nasal cavity and paranasal sinuses), ovary, fallopian tubes, peritoneum, vagina, vulva, penis, cervix, myometrium, endometrium, thyroid (for example thyroid follicular carcinoma), adrenal, prostate, skin and adnexae (for example melanoma, basal cell carcinoma, squamous cell carcinoma, keratoacanthoma, dysplastic naevus); haematological malignancies (i.e. leukemias, lymphomas) and pre-malignant haematological disorders and disorders of borderline malignancy including haematological malignancies and related conditions of lymphoid lineage (for example acute lymphocytic leukemia [ALL], chronic lymphocytic leukemia [CLL], B-cell lymphomas such as diffuse large B-cell lymphoma [DLBCL], follicular lymphoma, Burkitt's lymphoma, mantle cell lymphoma, T-cell lymphomas and leukaemias, natural killer [NK] cell lymphomas, Hodgkin's lymphomas, hairy cell leukaemia, monoclonal gammopathy of uncertain significance, plasmacytoma, multiple myeloma, and post-transplant lymphoproliferative disorders), and haematological malignancies and related conditions of myeloid lineage (for example acute myelogenousleukemia [AML], chronic myelogenousleukemia [CML], chronic myelomonocyticleukemia [CMML], hypereosinophilic syndrome, myeloproliferative disorders such as polycythaemia vera, essential thrombocythaemia and primary myelofibrosis, myeloproliferative syndrome, myelodysplastic syndrome, and promyelocyticleukemia); tumours of mesenchymal origin, for example sarcomas of soft tissue, bone or cartilage such as osteosarcomas, fibrosarcomas, chondrosarcomas, rhabdomyosarcomas, leiomyosarcomas, liposarcomas, angiosarcomas, Kaposi's sarcoma, Ewing's sarcoma, synovial sarcomas, epithelioid sarcomas, gastrointestinal stromal tumours, benign and malignant histiocytomas, and dermatofibrosarcomaprotuberans; tumours of the central or peripheral nervous system (for example astrocytomas, gliomas and glioblastomas, meningiomas, ependymomas, pineal tumours and schwannomas); endocrine tumours (for example pituitary tumours, adrenal tumours, islet cell tumours, parathyroid tumours, carcinoid tumours and medullary carcinoma of the thyroid); ocular and adnexal tumours (for example retinoblastoma); germ cell and trophoblastic tumours (for example teratomas, seminomas, dysgerminomas, hydatidiform moles and choriocarcinomas); and paediatric and embryonal tumours (for example medulloblastoma, neuroblastoma, Wilms tumour, and primitive neuroectodermal tumours); or syndromes, congenital or otherwise, which leave the patient susceptible to malignancy (for example Xeroderma Pigmentosum).

In one embodiment, the cancer is a solid tumor. In a further embodiment, the cancer is breast cancer, ovarian cancer, cervical cancer, colorectal cancer, liver cancer, prostate cancer or lung cancer.

In one embodiment, the cancer comprises a haematological malignancy. In a further embodiment, the haematological malignancy is one of myeloma, non-Hodgkin's lymphoma or chronic lymphocytic leukaemia.

Examples of other anticancer therapeutic agents or treatments that may be administered together (whether concurrently or at different time intervals) with the compound of the invention include but are not limited to:

Topoisomerase I inhibitors;
Antimetabolites;
Tubulin targeting agents;
DNA binder and topoisomerase II inhibitors;
Alkylating Agents;
Monoclonal Antibodies;

Anti-Hormones;

Signal Transduction Inhibitors;

Proteasome Inhibitors;

DNA methyl transferases;

Cytokines and retinoids;

Chromatin targeted therapies;

Radiotherapy; and

Other therapeutic or prophylactic agents, such as immunotherapy agents.

The compound of the invention may also be administered in conjunction with non-chemotherapeutic treatments such as radiotherapy, photodynamic therapy, gene therapy; surgery and controlled diets.

For use in combination therapy with another chemotherapeutic agent, the compound of the invention and one, two, three, four or more other therapeutic agents can be, for example, formulated together in a dosage form containing two, three, four or more therapeutic agents i.e. in a unitary pharmaceutical composition containing all components. In an alternative embodiment, the individual therapeutic agents may be formulated separately and presented together in the form of a kit, optionally with instructions for their use.

Anti-Infective Therapy

Examples of infective agents include any pathogen such as a bacteria, fungus, parasite or virus. Thus, in one embodiment, the disease or disorder mediated by and/or caused by an infective agent is bacterial infection.

Examples of such as bacterial infection include infection by the following bacteria: *Staphylococcus* sp. such as *Staphylococcus aureus* (including methicillin resistant *Staphylococcus aureus* (MRSA)), Clostridia sp (e.g. *Clostridium difficile, Clostridium tetani* and *Clostridium botulinum*), Enterobacter species, *Mycobacterium tuberculosis, Shigella* sp. such as *Shigella dysenteriae, Campylobacter* sp. such as *Campylobacter jejuni, Enterococcus* sp. such as *Enterococcus faecalis, Bacillus anthracis, Yersinia pestis, Bordetella pertussis, Streptococcal species, Salmonella thyphimurim, Salmonella enterica, Chlamydia* species, *Treponema pallidum, Neisseria gonorrhoeae, Borrelia burgdorferi, Vibrio cholerae, Corynebacterium diphtheriae, Helicobacter pylori*, Gram-negative pathogens, such as *Acinetobacter baumannii, Pseudomonas aeruginosa, Klebsiella pneumoniae*, and *Escherichia coli* (and including strains that are resistant to one or more classes of anti-biotics, especially multi-drug resistant (MDR) strains).

Vaccine Therapy

According to a further aspect of the invention, there is provided a vaccine comprising an immunoconjugate as defined herein.

According to a further aspect of the invention, there is provided an adjuvant comprising an immunoconjugate as defined herein.

EXAMPLES

The invention will now be illustrated, but not limited, by reference to the specific embodiments described in the following Examples. Compounds are named using an automated naming package such as AutoNom (MDL) or ChemDraw or are as named by the chemical supplier.

The following synthetic procedures are provided for illustration of the methods used; for a given preparation or step the precursor used may not necessarily derive from the individual batch synthesised according to the step in the description given.

Analytical Methods

LCMS (Method 1)

Instrumentation: Agilent 1100 (quaternary pump)

Mass spectrometer: Waters Micromass ZQ

Column: XBridge-C18, 5 µm, 4.6×50 mm

Conditions:

| Time (mins) | A (%) | B (%) | Flow (mL/min) |
|---|---|---|---|
| 0.00 | 95 | 5 | 2.0 |
| 3.50 | 5 | 95 | 2.0 |
| 4.50 | 5 | 95 | 2.0 |

Wherein A=water (+5% MeCN+10 mM ammonium formate), B=MeCN

Column temperature: 25° C., Injection volume: 5 µL, 2.0 mL/min

LCMS (Method 2)

Instrumentation: Agilent 1100 (quaternary pump)

Mass spectrometer: Waters Micromass ZQ

Column: XBridge-C18, 5 µm, 4.6×50 mm

Conditions:

| Time (mins) | A (%) | B (%) | C (%) | Flow (mL/min) |
|---|---|---|---|---|
| 0.00 | 95 | 0 | 5 | 2.0 |
| 3.50 | 0 | 95 | 5 | 2.0 |
| 4.50 | 0 | 95 | 5 | 2.0 |
| 4.60 | 5 | 0 | 5 | 2.0 |

Wherein A=water, B=MeCN, C=0.05% formic acid in MeCN

Column temperature: 25° C., Injection volume: 5 µL, 2.0 mL/min

LCMS (Method 3)

Instrumentation: Agilent 1100 (quaternary pump)

Mass spectrometer: Waters Micromass ZQ

Column: XBridge-C18, 5 µm, 4.6×50 mm

Conditions:

| Time (mins) | A (%) | B (%) | C (%) | Flow (mL/min) |
|---|---|---|---|---|
| 0.00 | 95 | 0 | 5 | 2.0 |
| 3.50 | 5 | 90 | 5 | 2.0 |
| 8.0 | 5 | 90 | 5 | 2.0 |
| 8.10 | 95 | 0 | 5 | 2.0 |

Wherein A=water, B=MeCN, C=0.05% formic acid in MeCN

Column temperature: 25° C., Injection volume: 5 µL, 2.0 mL/min

UPLC (Method 1)

Instrumentation: Waters Acquity system

Mass spectrometer: Waters Acquity QDa

Column: Waters Acquity UPLC CSH—C18, 1.7 µm, 2.1×50 mm

Conditions:

| Time (mins) | A (%) | B (%) | Flow (mL/min) |
|---|---|---|---|
| 0.00 | 100 | 0 | 0.4 |
| 0.20 | 100 | 0 | 0.4 |
| 3.50 | 0 | 100 | 0.4 |
| 4.50 | 0 | 100 | 0.4 |

Wherein A=water (+5% MeCN+0.1% formic acid), B=MeCN (+5% water+0.1% formic acid)
Column temperature: 40° C., Injection volume: 0.5 μL, 0.4 mL/min
UPLC (Method 2)
Instrumentation: Waters Acquity system
Mass spectrometer: Waters Acquity QDa
Column: Waters Acquity UPLC BEH-C18, 1.7 μm, 2.1×50 mm
Conditions:

| Time (mins) | A (%) | B (%) | Flow (mL/min) |
|---|---|---|---|
| 0.00 | 100 | 0 | 0.4 |
| 0.20 | 100 | 0 | 0.4 |
| 3.50 | 0 | 100 | 0.4 |
| 4.50 | 0 | 100 | 0.4 |

Wherein A=water (+5% MeCN+0.1% aq. ammonia), B=MeCN (+5% water+0.1% aq. ammonia)
Column temperature: 40° C., Injection volume: 0.5 μL, 0.4 mL/min
NMR
NMR details were recorded on an Oxford Instruments AS400 or JEOL JNM-ECZ400R/S1.
Abbreviations
Wherein the following abbreviations have been used, the following meanings apply:
Amu is additional mass units;
aq is aqueous;
δ is chemical shift in ppm;
CDI is 1,1'-carbonyldiimidazole;
d is doublet;
dt is double triplet;
DMF is dimethylformamide;
DMSO is dimethyl sulphoxide;
DSG is di-(N-succinimydyl)glutarate;
EtOAc is ethyl acetate;
EtOH is ethanol;
HATU is O-(7-azabenzotriazol-1-yl)-N,N,N',N'-tetramethyluronium hexafluorophosphate;
HCl is hydrochloric acid;
HPLC is high performance liquid chromatography;
μ is micro;
LCMS is liquid chromatography mass spectrometry;
m is multiplet;
Mal is maleimide;
MeCN is acetonitrile;
MeOH is methanol;
mins is minutes;
mL is millilitre;
$MgSO_4$ is magnesium sulfate;
MMTr is monomethoxytrityl;
MS is mass spectrometry;
NaOH is sodium hydroxide;
NHS is N-hydroxysuccinimide; or N-hydroxysuccinimidyl;
NMR is nuclear magnetic resonance;
Pd/C is (typically 5%-10%) palladium on charcoal hydrogenation catalyst (water-wet);
$Pd(dppf)_2Cl_2$ is [1,1'-Bis(diphenylphosphino)ferrocene]dichloropalladium(II);
Pd EnCat is Pd(0) EnCat® 30NP (Sigma Aldrich);
ppm is parts per million;
Rt is retention time;
s is singlet;
t is triplet;
TBME is tert-butyl methyl ether;
TEA is triethylamine;
THF is tetrahydrofuran;
TFA is trifluoroacetic acid and
TSTU is N,N,N',N'-tetramethyl-O—(N-succinimidyl)uronium tetrafluoroborate;
UPLC is ultra performance liquid chromatography.

Preparations 1-62 describe the methods used to prepare intermediates required for conjugation into the Examples, as described by processes (a)-(c) and Schemes 1-2 as described hereinbefore.

Preparation 1

2,5-Dioxopyrrolidin-1-yl 5-((2-(4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate

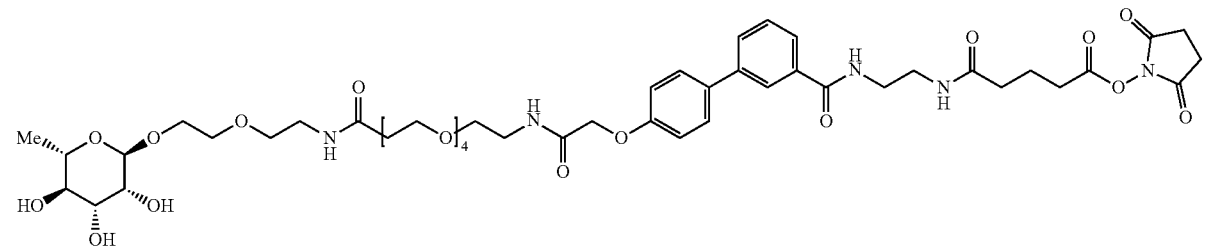

Method 1

A solution of N-(2-aminoethyl)-4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamide (Preparation 2, 24 mmol) was dissolved in 1:1 anhydrous DMF:DMSO (1062 uL) with stirring. Di-(N-succinimidyl)glutarate (39.49 mg, 120 mmol) was added as a 300 mM solution in 1:1 anhydrous DMF:DMSO (400 μL). The reaction was stirred for 1 hour at room temperature under nitrogen. The reaction was purified using reverse phase chromatography eluting with 1-50% MeCN in 0.1% TFA in water. The desired fractions were lyophilised to dryness over 24 hours to afford the desired compound.

Method 2

Alternatively, Preparation 1 may be prepared according to the following method:

5-((2-(4'-((2,18-Dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoic acid (Preparation 12, 60 mg, 0.066 mmol) was dissolved in a mixture of DMSO (0.3 mL) and THF (0.5 mL). TEA (14 mg, 0.14 mmol) was added followed by TSTU (21 mg, 0.069 mmol) and the mixture stirred for 10 minutes. The reaction was concentrated with nitrogen and purified using reverse phase chromatography eluting with 5-50% MeCN in 0.1% TFA in water and immediately lyophilised to afford the title compound as a colourless glass (45 mg, 68%).

LCMS (Method 1): Rt=1.94 mins, ES⁺ MS m/z 1006.5 [M+H]⁺

Preparation 2

N-(2-aminoethyl)-4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamide To a solution of 4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 3, 150 mg, 0.199 mmol) in DMF (2 mL) was added TEA (83 μL, 0.597 mmol) and a solution of N1-((4-methoxyphenyl)diphenylmethyl)ethane-1,2-diamine (Preparation 11, 99 mg, 0.299 mmol) in DMF (2 mL) to afford a colourless solution. HATU (114 mg, 0.299 mmol) was added and the reaction stirred for 1 hour at room temperature. The pH was adjusted to pH 3 using 0.2M HCl and the solution stirred for 3 hours. TEA was used to quench and basify the reaction and the mixture was left to stir for 18 hours. The reaction was continued by acidifying to pH 2 using 0.2M HCl and stirred for 7 hours. The reaction was concentrated in vacuo and purified using reverse phase chromatography eluting with 5-50% MeCN in 0.1% TEA in water to afford the title compound as a yellow glass (58 mg, 37%).

LCMS (Method 1): Rt=1.75 mins, ES⁺ MS m/z 795.7 [M+H]⁺

Alternatively, Preparation 2 may be prepared according to the following method: Benzyl (2-(4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)carbamate (Preparation 17, 327 mg, 0.35 mmol) was dissolved in DMF (6 mL) and water (6 mL). 10% Pd/C (30 mg) was added and the mixture hydrogenated (1 atmosphere) for 2 hours at room temperature. The catalyst was removed by filtration through Celite and the filtrate concentrated in vacuo. The residue was purified using reverse phase chromatography eluting with 3-95% MeCN in water to afford the title compound as a colourless glass (155 mg, 52%).

LCMS (Method 1): Rt=1.74 mins, ES⁺ MS m/z 795.2 [M+H]⁺

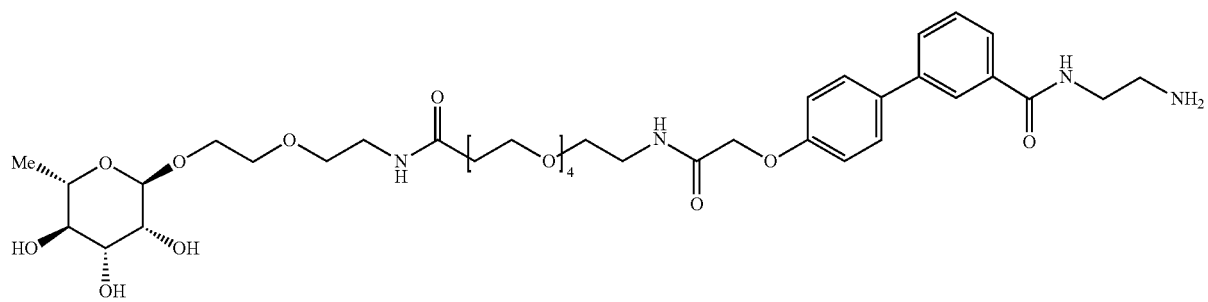

Preparation 3

4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid

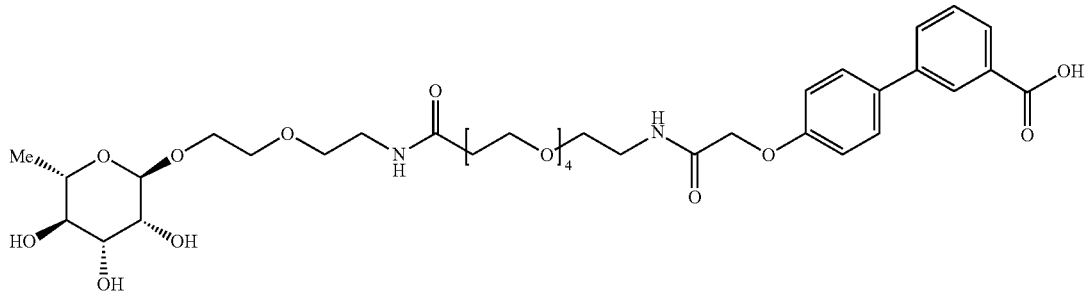

To a solution of benzyl 4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylate (Preparation 4, 335 mg, 0.397 mmol) in MeOH (10 mL) and water (10 mL) was added 5% Pd/C (30 mg). The solution was degassed and stirred under a hydrogen atmosphere (balloon pressure) for 18 hours at room temperature. The reaction was filtered through a syringe filter (0.2 μm), and the solution concentrated in vacuo. The residue was dissolved in water (5 mL) and TEA (5 mL) was added, followed by stirring at 40° C. for 18 hours. The reaction was concentrated in vacuo and the residue dissolved in water (2.5 mL) and MeCN (2.5 mL). The solution was filtered through a syringe filter (0.2 μm), concentrated in vacuo and dried under vacuum to afford the title compound as a yellow oil (294 mg, 98%).

UPLC (Method 1): Rt=1.75 mins, ES+ MS m/z 751.4 [M+H]+

Preparation 4

Benzyl 4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylate

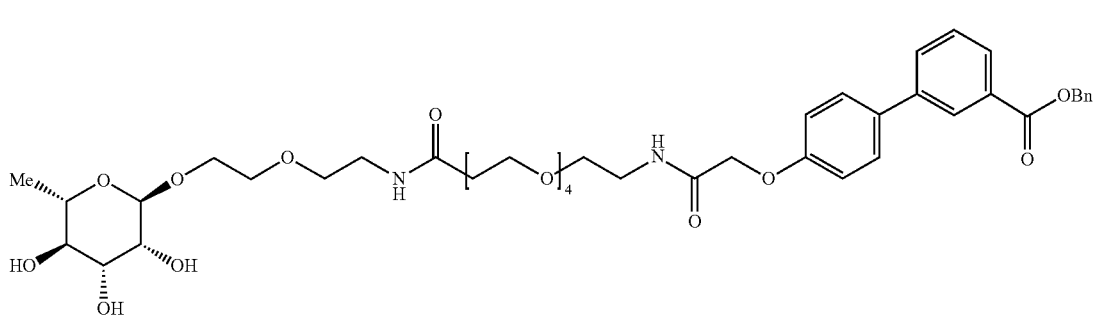

tetrahydro-2H-pyran-3,4,5-triol (Preparation 18, 155 mg, 0.615 mmol) in DMF (5 mL) to give a colourless solution. HATU (235 mg, 0.615 mmol) was added and the reaction stirred for 2 hours at room temperature. Additional HATU (78 mg, 0.205 mmol) and TEA (175 μL, 1.2 mmol) were added and the reaction stirred for 18 hours. The reaction was concentrated in vacuo and purified using reverse phase chromatography eluting with 5-35% MeCN in 0.1% TEA in water to afford the title compound as a yellow glass (335 mg, 97%).

UPLC (Method 1): Rt=2.15 mins; no MS ionisation observed

Preparation 5

1-((3'-((Benzyloxy)carbonyl)-[1,1'-biphenyl]-4-yl)oxy)-2-oxo-6,9,12,15-tetraoxa-3-azaoctadecan-18-oic acid

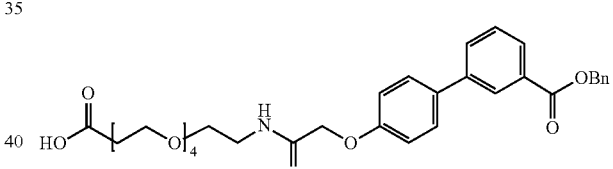

Tert-butyl 1-((3'-((benzyloxy)carbonyl)-[1,1'-biphenyl]-4-yl)oxy)-2-oxo-6,9,12,15-tetraoxa-3-azaoctadecan-18-oate (Preparation 6, 1.22 g, 1.83 mmol) was dissolved in DCM (6 mL) and TFA (6 mL) followed by water (0.6 mL) to give a To a solution of 1-((3'-((benzyloxy)carbonyl)-[1,1'-biphenyl]-4-yl)oxy)-2-oxo-6,9,12,15-tetraoxa-3-azaoctadecan-18-oic acid (Preparation 5, 250 mg, 0.410 mmol) in DMF (5 mL) was added TEA (175 μL, 1.2 mmol) and a solution of (2R,3R,4R,5R,6S)-2-(2-(2-aminoethoxy)ethoxy)-6-methylclear yellow solution. The reaction was stirred at room temperature for 18 hours before concentrating in vacuo. The residue was dissolved in toluene (25 mL) and dioxane (25 mL) and re-concentrated in vacuo to afford an orange oil (1.23 g, >100%).

LCMS (Method 1): Rt=2.74 mins, ES⁻ MS m/z 608.2 [M–H]⁻

1H NMR (396 MHz, CDCl₃): δ ppm 8.24 (1H, s), 8.01 (1H, J=7.9 Hz, d), 7.72 (1H, J=8.5 Hz, d), 7.72 (1H, J=8.5 Hz, d), 7.60-7.31 (9H, m), 7.01 (2H, J=8.5 Hz, d), 5.38 (2H, s), 4.59 (2H, s), 3.74 (2H, J=5.8 Hz, t), 3.69-3.52 (16H, m), 2.59 (2H, J=6.1 Hz, t).

Preparation 6

Tert-butyl 1-((3'-((benzyloxy)carbonyl)-[1,1'-biphenyl]-4-yl)oxy)-2-oxo-6,9,12,15-tetraoxa-3-azaoctadecan-18-oate

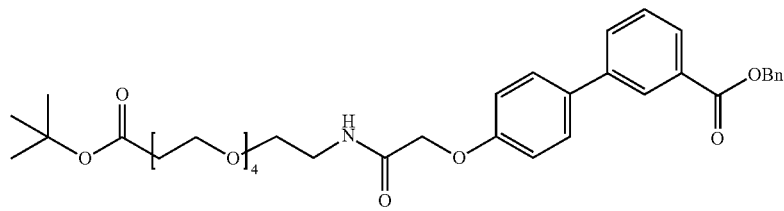

To 2-({3'-[(benzyloxy)carbonyl]-[1,1'-biphenyl]-4-yl}oxy)acetic acid (Preparation 7, 709 mg, 1.956 mmol) dissolved in dry DMF (7 mL) was added TEA (818 μL, 5.868 mmol) and tert-butyl 1-amino-3,6,9,12-tetraoxapentadecan-15-oate (880 mg, 2.738 mmol). HATU (1.12 g, 2.934 mmol) was added and the mixture stirred at room temperature for 2 hours. The solvent was concentrated in vacuo and the residue purified using reverse phase chromatography eluting with 10-80% MeCN in water to afford the title compound as a colourless oil (1.22 g, 93%).

LCMS (Method 1): Rt=3.47 mins, ES⁺ MS m/z 665.8 [M+H]⁺

1H NMR (396 MHz, DMSO-D₆): δ ppm 8.12 (1H, m), 8.08 (1H, J=5.8 Hz, t), 7.92-7.85 (2H, m), 7.63-7.59 (2H, m), 7.56 (1H, J=7.6 Hz, t), 7.47-7.41 (2H, m), 7.41-7.29 (3H, m), 7.03 (2H, J=8.5 Hz, d), 5.35 (2H, s), 4.50 (2H, s), 3.52 (2H, J=6.1 Hz, t), 3.48-3.42 (14H, m), 3.30-3.27 (2H, m), 2.35 (2H, J=6.4 Hz, t), 1.34 (9H, s).

Preparation 7

2-((3'-((Benzyloxy)carbonyl)-[1,1'-biphenyl]-4-yl)oxy)acetic acid

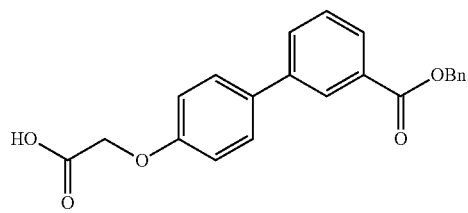 [SMILES: O=C(O)COc1ccc(-c2cccc(C(=O)OCc3ccccc3)c2)cc1]

Benzyl 4'-(2-(tert-butoxy)-2-oxoethoxy)-[1,1'-biphenyl]-3-carboxylate (Preparation 8, 53 g, 126.7 mmol) was added in portions to 4M anhydrous HCl in dioxane (250 mL) and the mixture stirred for 18 hours at room temperature under nitrogen. The solvent was concentrated in vacuo and the residue stirred with diethyl ether (50 mL) and filtered to afford the title compound as a white solid (36.75 g, 80%).

UPLC (Method 1) Rt=3.69 mins, ES⁺ MS m/z 362.2 [M+H]⁺, ES⁻ MS m/z 361.1 [M–H]⁻

1H NMR (396 MHz, CDCl₃): δ ppm 8.24 (1H, s), 8.02 (1H, J=7.9 Hz, d), 7.72 (1H, J=7.9 Hz, d), 7.56 (2H, J=9.1 Hz, d), 7.51-7.42 (3H, m), 7.42-7.32 (3H, m), 7.01 (2H, J=8.5 Hz, d), 5.38 (2H, s), 4.73 (2H, s).

Preparation 8

Benzyl 4'-(2-(tert-butoxy)-2-oxoethoxy)-[1,1'-biphenyl]-3-carboxylate

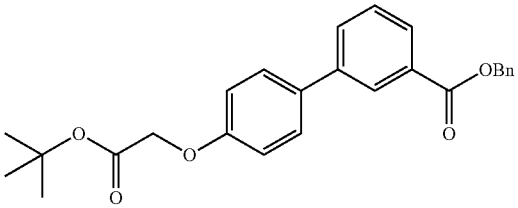 [SMILES: CC(C)(C)OC(=O)COc1ccc(-c2cccc(C(=O)OCc3ccccc3)c2)cc1]

Benzyl 4'-hydroxy-[1,1'-biphenyl]-3-carboxylate (Preparation 9, 43.8 g, 143.9 mmol) was stirred in MeCN (300 mL). Potassium carbonate (23.87 g, 172.7 mmol) was added in small portions followed by tert-butyl 2-bromoacetate (29.48 g, 151.1 mmol) and the mixture stirred for 18 hours at 65° C. under nitrogen. The solvent was removed in vacuo and the residue partitioned between TBME (300 mL) and water (150 mL). The organic phase was washed with water (150 mL), 1M sodium hydroxide (aq) (100 mL), dried (MgSO₄), filtered and concentrated in vacuo. The residue was stirred with TBME (75 mL), filtered, washed with cold TBME (25 mL) and dried to afford the title compound as white solid (45 g, 75%).

UPLC (Method 2): Rt=4.33 mins; no MS ionisation observed

1H NMR (396 MHz, CDCl₃): δ ppm 8.25 (1H, s), 8.00 (1H, J=7.9 Hz, d), 7.72 (1H, J=7.9 Hz, d), 7.53 (2H, J=8.5 Hz, d), 7.49-7.44 (3H, m), 7.41-7.32 (3H, m), 6.97 (2H, J=9.1 Hz, d), 5.38 (2H, s), 4.55 (2H, s), 1.49 (9H, s).

Preparation 9

Benzyl 4'-hydroxy-[1,1'-biphenyl]-3-carboxylate

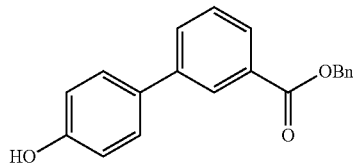 [SMILES: O=C(OCc1ccccc1)c1cccc(-c2ccc(O)cc2)c1]

Benzyl 3-bromobenzoate (Preparation 10, 47.25 g, 162.3 mmol) and 4-hydroxybenzeneboronic acid (28.54 g, 206.9 mmol) were stirred in a mixture of MeCN (350 mL) and water (350 mL). Potassium carbonate (15.66 g, 113.4 mmol) was added in small portions and the mixture degassed with nitrogen for 5 minutes. Pd(dppf)$_2$Cl$_2$ (5.94 g, 8.11 mmol) was added and degassing with nitrogen continued for a further 5 minutes before heating for 45 minutes at 65° C. under nitrogen. The solvent was removed in vacuo and the residue acidified with 2M HCl (600 mL). The aqueous was extracted with TBME (600 mL), washed with water (2×200 mL), dried (MgSO$_4$), filtered and concentrated in vacuo. The residue was dissolved in TBME (600 mL) and filtered. The filtrate was concentrated in vacuo and the residue recrystallised from toluene to afford the title compound as a light brown solid (43.8 g, 88%).

UPLC (Method 2): Rt=3.61 mins, ES$^-$ MS m/z 303.1 [M–H]$^-$

1H NMR (396 MHz, CDCl$_3$): δ ppm 8.24 (1H, s), 8.00 (1H, J=7.3 Hz, d), 7.72 (1H, J=7.9 Hz, d), 7.51-7.45 (5H, m), 7.41-7.31 (3H, m), 6.91 (2H, J=9.1 Hz, d), 5.39 (2H, s), 4.95 (1H, s).

Preparation 10

Benzyl 3-bromobenzoate

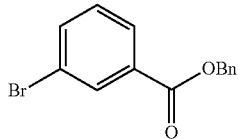

3-Bromobenzoic acid (50 g, 248.7 mmol) was stirred in DMF (200 mL). Potassium carbonate (37.81 g, 273.6 mmol) was added portion wise followed by dropwise addition of benzyl bromide (42.33 g, 247.49 mmol) and the mixture stirred for 2 hours at room temperature. The solvent was concentrated in vacuo and the residue stirred with TBME (300 mL), filtered, and the solids washed with TBME (200 mL). The combined filtrate was washed with water (2×100 mL), dried (MgSO$_4$), filtered and concentrated in vacuo to afford the title compound as a straw-coloured oil (69.85 g, 96.5%).

UPLC (Method 2): Rt=3.93 mins; no MS ionisation observed

1H NMR (396 MHz, CDCl$_3$): δ ppm 8.19 (1H, s), 7.99 (1H, d, J=7.3 Hz), 7.67 (1H, d, J=9.1 Hz), 7.47-7.34 (5H, m), 7.31 (1H, t, J=8.2 Hz), 5.35 (2H, s).

Preparation 11

N1-((4-methoxyphenyl)diphenylmethyl)ethane-1,2-diamine

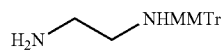

To a solution of ethane-1,2-diamine (54.0 mL, 809.6 mmol) in DCM (175 mL) was added a solution of 1-(chlorodiphenylmethyl)-4-methoxybenzene (25.0 g, 81.0 mmol) in DCM (175 mL), slowly over 1 hour with stirring. The resulting solution was stirred at room temperature for 16 hours. The reaction was washed with 10% aqueous potassium carbonate solution (400 mL) and brine (400 mL). The organic layer was separated, dried (MgSO$_4$) and concentrated in vacuo to afford the title compound as a pale-yellow oil (26.1 g, 97%).

LCMS (Method 1): Rt=2.73 mins; no MS ionisation observed

1H NMR (396 MHz, CDCl$_3$): δ ppm 7.52-7.42 (4H, m), 7.40-7.34 (2H, m), 7.31-7.22 (4H, m), 7.20-7.15 (2H, m), 6.84-6.77 (2H, m), 3.80 (3H, s), 2.84-2.78 (2H, m), 2.27-2.18 (2H, m).

Preparation 12

5-((2-(4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoic acid

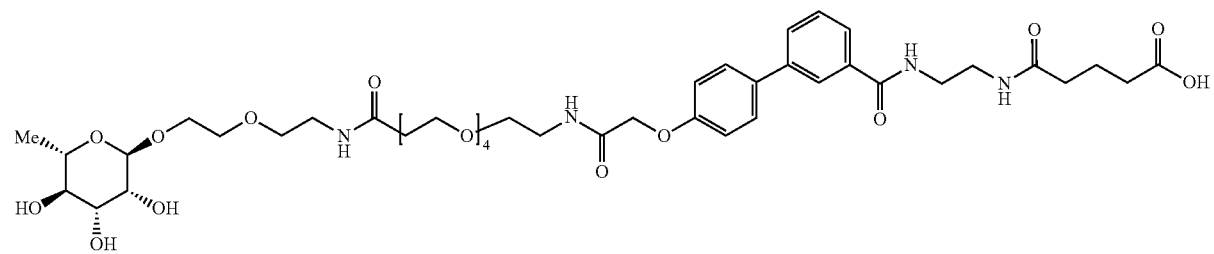

Benzyl 5-((2-(4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate (Preparation 13, 780 mg, 0.78 mmol) was dissolved in a mixture of MeOH (10 mL) and water (10 mL). 10% Pd/C (80 mg) was added and the mixture hydrogenated (1 atmosphere) for 3 hours at room temperature. The mixture was filtered through Dicalite and the filtrate concentrated in vacuo. The residue was dissolved in MeOH and passed through a 0.2 μM syringe filter. The filtrate was concentrated in vacuo to afford the title compound as a colourless gum (550 mg, 100%).

UPLC (Method 1): Rt=1.94 mins, ES⁻ MS m/z 907.5 [M−H]⁻

Preparation 13

Benzyl 5-((2-(4'-((2,18-dioxo-24-(((2R,3R,4R,5R, 6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate

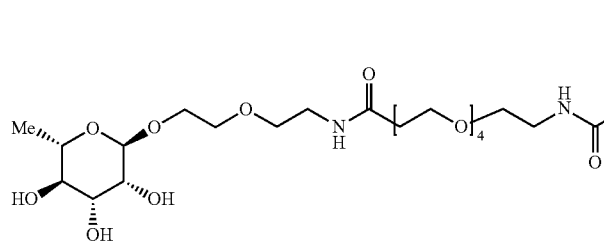

4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 3, 700 mg, 0.93 mmol), benzyl 5-((2-aminoethyl)amino)-5-oxopentanoate hydrochloride (Preparation 14, 420 mg, 1.39 mmol) and TEA (0.78 mL, 5.58 mmol) were dissolved in DMF (10 mL). HATU (532 mg, 1.39 mmol) was added and the mixture stirred at room temperature for 1 hour. The solvent was concentrated in vacuo and the residue purified using reverse phase chromatography eluting with 5-50% MeCN in water to afford the title compound as a colourless gum (780 mg, 84%).

UPLC (Method 2) Rt=2.65 mins, ES⁺ MS m/z 999.6 [M+H]⁺

Preparation 14

Benzyl 5-((2-aminoethyl)amino)-5-oxopentanoate hydrochloride

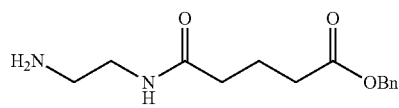 [SMILES: NCCNC(=O)CCCC(=O)OCc1ccccc1]

Benzyl 5-((2-((tert-butoxycarbonyl)amino)ethyl)amino)-5-oxopentanoate (Preparation 15, 20 g, 54.88 mmol) was stirred with 4M anhydrous HCl in dioxane (75 mL) for 30 minutes at room temperature. The solvent was concentrated in vacuo and the residue triturated with dioxane. The reaction was filtered, washed with minimal dioxane/TBME and dried in vacuo to afford the title compound as the hydrochloride salt, as a white solid (12.75 g, 77%).

UPLC (Method 1): Rt=2.59 mins, ES⁺ MS m/z 265.2 [M+H]⁺

1H NMR (396 MHz, DMSO-D₆): δ ppm 8.13 (1H, J=5.4 Hz, t), 8.03 (3H, s), 7.36-7.26 (5H, m), 5.04 (2H, J=14.8 Hz, t), 3.24 (2H, J=6.1 Hz, q), 2.79 (2H, J=6.4 Hz, t), 2.33 (2H, J=7.6 Hz, t), 2.11 (2H, J=7.3 Hz, t), 1.77-1.70 (2H, m).

Preparation 15

Benzyl 5-((2-(((tert-butoxycarbonyl)amino)ethyl)amino)-5-oxopentanoate

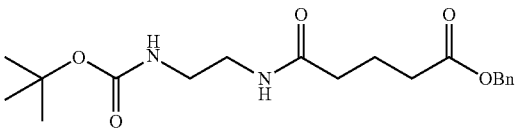 [SMILES: CC(C)(C)OC(=O)NCCNC(=O)CCCC(=O)OCc1ccccc1]

To 5-(benzyloxy)-5-oxopentanoic acid (Preparation 16, 13.95 g, 62.77 mmol) dissolved in DCM (300 mL) was added CDI (10.69 g, 65.9 mmol) in small portions and then

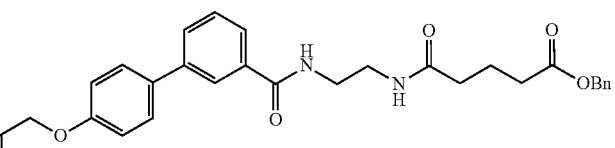

stirred for 1 hour at room temperature under nitrogen. Tert-butyl (2-aminoethyl)carbamate (11.06 g, 69.1 mmol) was added dropwise and the mixture stirred for 18 hours at room temperature. The solvent was concentrated in vacuo and the residue dissolved in TBME (250 mL). This was washed with water (2×100 mL), 1M HCl (aq) (2×50 mL) and 5% sodium hydrogen carbonate (aq) (2×50 mL). The organic phase was dried (MgSO₄), filtered and concentrated in vacuo to afford the title compound as a white solid (20.0 g, 87%).

UPLC (Method 1): Rt=3.20 mins, ES⁺ MS m/z 265.2 [M+H-Boc]⁺

1H NMR (396 MHz, CDCl₃): δ ppm 7.38-7.29 (5H, m), 6.07 (1H, s), 5.11 (2H, s), 4.89 (1H, s), 3.34-3.20 (4H, m), 2.41 (2H, J=7.0 Hz, t), 2.20 (2H, J=7.3 Hz, t), 2.00-1.93 (2H, m), 1.42 (9H, s).

Preparation 16

5-(Benzyloxy)-5-oxopentanoic acid

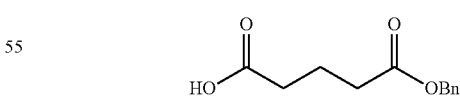

To dihydro-2H-pyran-2,6(3H)-dione (5 g, 43.82 mmol) dissolved in pyridine (50 mL) was added benzyl alcohol (4.98 g, 46.01 mmol) and a catalytic amount of DMAP (50 mg). The solution was stirred for 3 days at room temperature then heated to reflux for 5 hours. The solvent was concentrated in vacuo and the residue dissolved in TBME (100 mL) and washed with 1M HCl (aq) (100 mL). The organic phase was extracted with 5% sodium hydrogen carbonate (aq) (2×75 mL), acidified with concentrated HCl (aq) and extracted with TBME (2×75 mL). The combined extracts were dried (MgSO$_4$), filtered and concentrated in vacuo to afford the title compound as a colourless gum (3.95 g, 41%).

1H NMR (396 MHz, CDCl$_3$): δ ppm 7.38-7.28 (5H, m), 5.11 (2H, s), 2.46-2.36 (4H, m), 2.01-1.91 (2H, m).

Preparation 17

Benzyl (2-(4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)carbamate

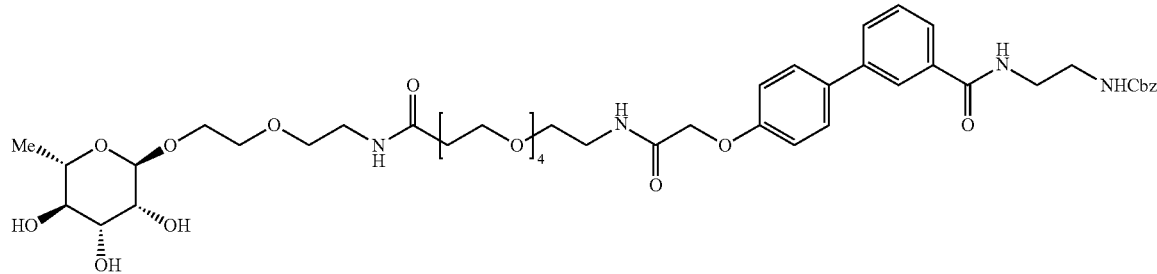

4'-((2,18-Dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 3, 294 mg, 0.391 mmol), benzyl N-(2-aminoethyl)carbamate hydrochloride (135 mg, 0.585 mmol) and TEA (0.22 mL, 1.56 mmol) were dissolved in DMF (10 mL) and stirred under nitrogen. HATU (223 mg, 0.566 mmol) was added and the mixture stirred at room temperature for 1 hour. The solvent was concentrated in vacuo and purified using reverse phase chromatography eluting with 5-45% MeCN in water to afford the title compound as a colourless oil (327 mg, 95%).

LCMS (Method 1): Rt=2.21 mins, ES$^+$ MS m/z 929.7 [M+H]$^+$

Preparation 18

(2R,3R,4R,5R,6S)-2-(2-(2-Aminoethoxy)ethoxy)-6-methyltetrahydro-2H-pyran-3,4,5-triol

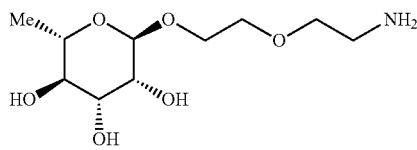 [SMILES: C[C@@H]1O[C@@H](OCCOCCN)[C@H](O)[C@H](O)[C@H]1O]

Benzyl (2-(2-(((2R,3R,4R,5R,6S)-3,4,5-trihydroxy-6-methyltetrahydro-2H-pyran-2-yl)oxy)ethoxy)ethyl)carbamate (Preparation 19, 33 g, 85.6 mmol) was dissolved in MeOH (330 mL). 10% Pd/C (3.0 g) was added and the mixture hydrogenated (17 atmospheres) for 18 hours at room temperature. The catalyst was removed by filtration through Celite and the filtrate concentrated in vacuo. The residue was purified by ion-exchange chromatography, eluting with MeOH and then 10% TEA in MeOH to afford the title compound as a yellow oil (19.33 g, 90%).

UPLC (Method 1): Rt=0.86 mins, ES$^+$ MS m/z 252.2 [M+H]$^+$

1H NMR (396 MHz, CD$_3$OD): δ ppm 4.69 (1H, s), 3.79-3.74 (2H, m), 3.62-3.55 (5H, m), 3.49 (2H, t), 3.34 (1H, t), 2.76 (2H, t), 1.23 (3H, d).

Preparation 19

Benzyl (2-(2-(((2R,3R,4R,5R,6S)-3,4,5-trihydroxy-6-methyltetrahydro-2H-pyran-2-yl)oxy)ethoxy)ethyl)carbamate

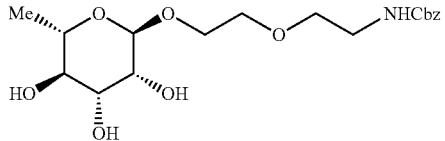 [SMILES: C[C@@H]1O[C@@H](OCCOCCNC(=O)OCc2ccccc2)[C@H](O)[C@H](O)[C@H]1O]

(2R,3R,4R,5S,6S)-2-(2-(2-(((Benzyloxy)carbonyl)amino)ethoxy)ethoxy)-6-methyltetrahydro-2H-pyran-3,4,5-triyl triacetate (Preparation 20, 49.16 g, 96.1 mmol) was dissolved in MeOH (400 mL) under nitrogen. Sodium methoxide (1.3 g, 24 mmol) was added and the mixture stirred for 18 hours. The solvent was removed in vacuo and the residue dissolved in THF (400 mL) and filtered through a pad of silica gel, washing through with THF (2×400 mL). The filtrate was concentrated in vacuo and the residue purified using reverse phase chromatography eluting with 5-50% MeCN in water to afford the title compound as a colourless gum (28.7 g, 77%).

1H NMR (396 MHz, CD$_3$OD): δ ppm 7.37-7.25 (5H, m), 5.05 (2H, s), 4.68 (1H, J=1.2 Hz, d), 3.79-3.69 (2H, m), 3.63-3.50 (7H, m), 3.34 (1H, J=9.7 Hz, t), 3.29-3.22 (2H, m), 1.23 (3H, J=6.1 Hz, d).

UPLC (Method 1) Rt=2.32 min, ES$^+$ MS m/z 386.2 [M+H]$^+$

Preparation 20

(2R,3R,4R,5S,6S)-2-(2-(2-(((benzyloxy)carbonyl)amino)ethoxy)ethoxy)-6-methyltetrahydro-2H-pyran-3,4,5-triyl triacetate

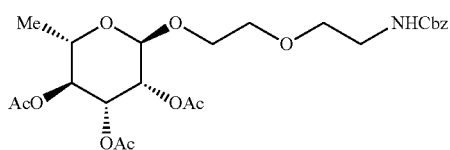 [SMILES: CC(=O)O[C@@H]1[C@@H](OC(C)=O)[C@H](C)O[C@@H](OCCOCCNC(=O)OCc2ccccc2)[C@@H]1OC(C)=O]

(3R,4R,5S,6S)-6-Methyltetrahydro-2H-pyran-2,3,4,5-tetrayl tetraacetate (Preparation 21, 45 g, 0.135 mol) and benzyl (2-(2-hydroxyethoxy)ethyl)carbamate (Preparation 22, 46.98 g, 0.196 mol) were stirred in DCM (500 mL) under nitrogen while cooling in an ice/water bath. Boron trifluoride diethyl etherate (57.66 g, 0.406 mol) was added dropwise and the mixture stirred for 18 hours at room temperature. The reaction was basified with saturated aqueous sodium hydrogen carbonate (500 mL) and the organic phase collected. The organic phase was washed again with saturated aqueous sodium hydrogen carbonate (250 mL), brine (250 mL), dried (MgSO$_4$), filtered and concentrated in vacuo. The residue was purified using reverse phase chromatography eluting with 5-100% MeCN in water to afford the title compound as a colourless gum (49.1 g, 71%).

1H NMR (396 MHz, CDCl$_3$): δ ppm 7.37-7.27 (5H, m), 5.35-5.28 (2H, m), 5.23 (1H, J=1.8 Hz, q), 5.15-5.01 (3H, m), 4.79 (1H, J=1.8 Hz, d), 3.94-3.87 (1H, m), 3.78-3.72 (1H, m), 3.66-3.49 (5H, m), 3.39 (2H, J=5.2 Hz, q), 2.11 (3H, s), 2.01 (3H, s), 1.96 (3H, s), 1.20 (3H, J=6.1 Hz, d).

UPLC (Method 2): Rt=3.18 mins, ES$^+$ MS m/z 512.2 [M+H]$^+$

Preparation 21

(3R,4R,5S,6S)-6-Methyltetrahydro-2H-pyran-2,3,4,5-tetrayl tetraacetate

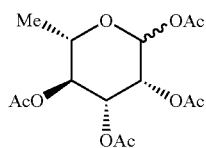

L-Rhamnose monohydrate (25.0 g, 137 mmol) was dissolved in pyridine (200 mL). DMAP (250 mg, catalytic) was added and the mixture stirred under nitrogen in an ice/water bath. Acetic anhydride (77.8 mL, 823 mmol) was added dropwise and the mixture stirred for 18 hours at room temperature. The solvent was concentrated in vacuo and the residue was dissolved in EtOAc (500 mL), washed with water (2×250 mL), 1M aqueous HCl (2×250 mL), saturated aqueous sodium hydrogen carbonate (2×250 mL), dried over MgSO$_4$, filtered and concentrated in vacuo to afford the title compound as a colourless gum (45.6 g, 100%).

UPLC (Method 2): Rt=2.63 mins and 2.78 mins; no MS ionisation observed

Preparation 22

Benzyl (2-(2-hydroxyethoxy)ethyl)carbamate

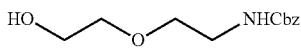

To 2-(2-aminoethoxy)ethan-1-ol (22 g, 209 mmol) dissolved in DCM (250 mL) was added TEA (58.33 mL, 419 mmol) and the mixture cooled in an ice/water bath under nitrogen. Benzyl (2,5-dioxopyrrolidin-1-yl) carbonate (52.15 g, 209 mmol) was added in portions and stirred for 18 hours at room temperature. The reaction was washed with water (2×200 mL), 2M HCl (200 mL), saturated aqueous sodium hydrogen carbonate (200 mL), dried over MgSO$_4$, filtered and concentrated in vacuo to afford the title compound as a colourless oil (47.5 g, 95%).

UPLC (Method 2): Rt=2.37 mins; no MS ionisation observed

1H NMR (396 MHz, CDCl$_3$): δ ppm 7.42-7.27 (5H, m), 5.23 (1H, s), 5.09 (2H, s), 3.71 (2H, J=4.8 Hz, q), 3.54 (4H, J=4.2 Hz, t), 3.39 (2H, J=5.0 Hz, q), 2.22 (1H, J=5.4 Hz, t).

Preparation 23

2,5-Dioxopyrrolidin-1-yl 5-((2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate

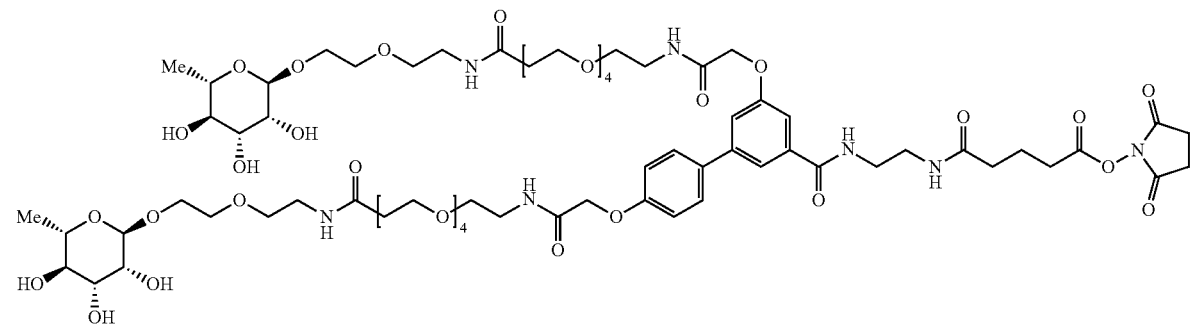

Method 1

Preparation 23 (2,5-dioxopyrrolidin-1-yl 5-((2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate) was prepared according to the method described for Preparation 1 using Preparation 24

1,1'-((2,2'-((5-((2-aminoethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12-tetraoxapentadecan-15-amide)

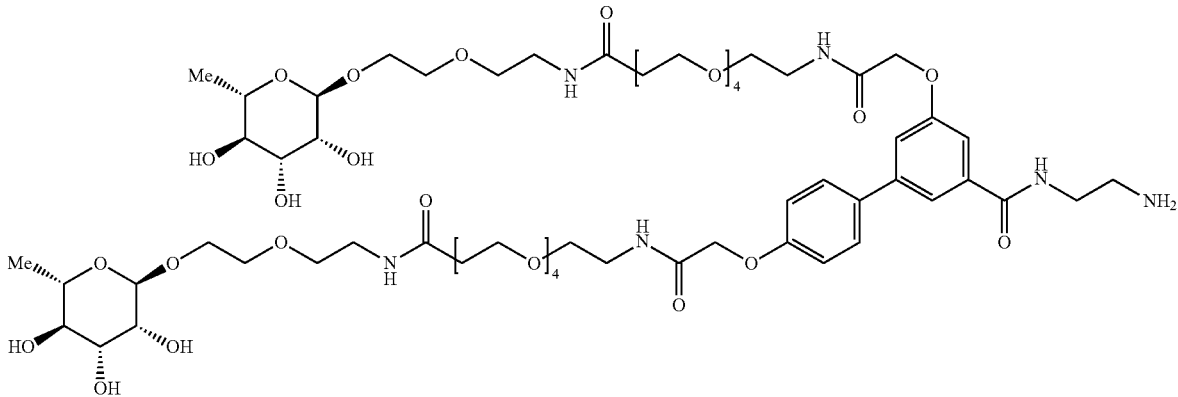

1,1'-((2,2'-((5-((2-aminoethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12-tetraoxapentadecan-15-amide) (Preparation 24).

To a solution of 1,1'-((2,2'-((5-((2-aminoethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12-tetraoxapentadecan-15-amide) (Preparation 24, 50 mg, 37 μmol) in DMSO (617 μL) was added a solution of DSG in DMF (617 μL of a 300 mM solution, 185 μmol) and the reaction was stirred at room temperature for 24 hours. The reaction was purified directly using reverse phase chromatography eluting with 1-30% MeCN in 0.1% aqueous TFA followed by lyophilisation to afford the title compound as a white solid (136 mg, 60%).

Method 2

Alternatively, Preparation 23 may be prepared according to the following method:

5-((2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoic acid (Preparation 33, 300 mg, 0.205 mmol) was dissolved in a mixture of DMSO (1 mL) and THF (2 mL). TEA (44 mg, 0.431 mmol) was added followed by TSTU (65 mg, 0.215 mmol) and stirred for 30 minutes at room temperature. The reaction was concentrated with nitrogen and purified using reverse phase chromatography eluting with 5-45% MeCN in 0.1% TFA in water and immediately lyophilised to afford the title compound as a colourless glass (242 mg, 76%).

LCMS (Method 1): Rt=1.78 mins, ES+ MS m/z 1560.8 [M+H]+

To a solution of 4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 25, 59 mg, 0.45 mmol) in DMF (5 mL) was added TEA (19 μL, 0.135 mmol) and a solution of N1-((4-methoxyphenyl)diphenylmethyl)ethane-1,2-diamine (Preparation 11, 22 mg, 0.68 mmol) in DMF (2 mL) to give a colourless solution. HATU (26 mg, 0.68 mmol) was added and the reaction stirred for 2 hours at room temperature. Additional HATU (9 mg, 0.23 mmol) and TEA (19 μL, 0.135 mmol) were added and the reaction stirred for 72 hours at room temperature. The pH was adjusted to pH=3 using 0.2M HCl and the solution stirred for 2 hours. The reaction was concentrated in vacuo and purified using reverse phase chromatography eluting with 5-35% MeCN in 0.1% TFA in water to afford the title compound as a colourless glass (29 mg, 47%).

UPLC (Method 1): Rt=2.23 mins, ES+ MS m/z 675.7 [M+2H/2]+

Alternatively, Preparation 24 may be prepared according to the following method:

Benzyl (2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)carbamate (Preparation 35, 345 mg, 0.233 mmol) was dissolved in IPA (15 mL) and water (15 mL). Pd EnCat (400 mg) was added and the mixture hydrogenated (15 atmospheres) for 20 hours at 40° C. followed by 48 hours at room temperature (1 atmosphere). The catalyst was removed by filtration (0.2 μM syringe filter) and the filtrate concentrated in vacuo to afford the title compound as a pale-yellow oil (292 mg, 93%).

LCMS (Method 1): Rt=1.74 mins, ES− MS m/z 1347.9 [M−H]−

Preparation 25

4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid

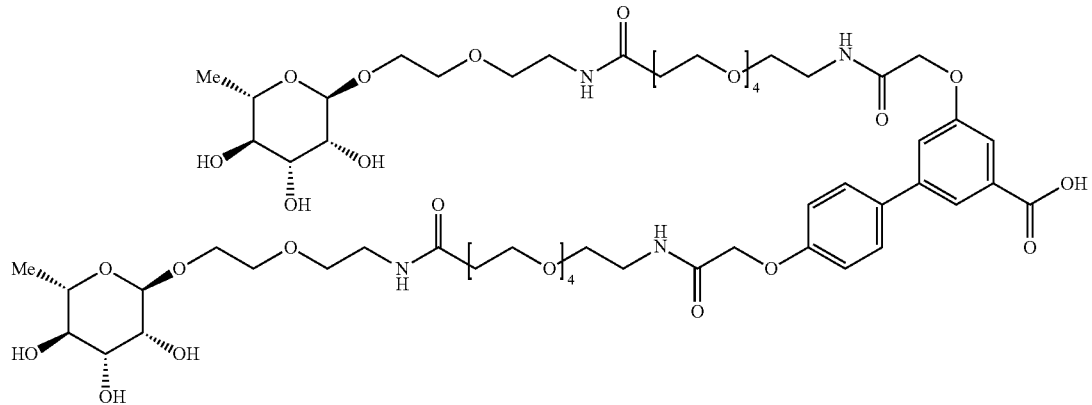

Benzyl 4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylate (Preparation 26, 9.13 g, 6.533 mmol) was dissolved in MeOH (90 mL) and water (90 mL) by warming to 60° C. and cooling to 30° C. 10% Pd/C (30 mg) was added and the reaction was degassed and stirred under a hydrogen atmosphere (balloon pressure) for 2 hours at room temperature. The reaction was filtered through Hyflo and the solution concentrated in vacuo to afford the title compound as a pale-yellow oil (8.24 g, 97%).

LCMS (Method 1): Rt=1.59 mins, ES$^+$ MS m/z 1308.0 [M+H]$^+$

1H NMR (396 MHz, DMSO-D$_6$): δ ppm 8.12 (1H, J=5.8 Hz, t), 8.07 (1H, J=5.8 Hz, t), 7.90-7.82 (2H, m), 7.71 (1H, s), 7.60 (2H, J=8.5 Hz, d), 7.39 (1H, s), 7.32 (1H, s), 7.02 (2H, J=9.1 Hz, d), 4.56 (2H, s), 4.52 (2H, J=1.2 Hz, d), 4.50 (2H, s), 3.64-3.04 (67H, m), 2.27 (4H, J=6.7 Hz, t), 1.09 (6H, J=6.7 Hz, d).

Preparation 26

Benzyl 4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylate

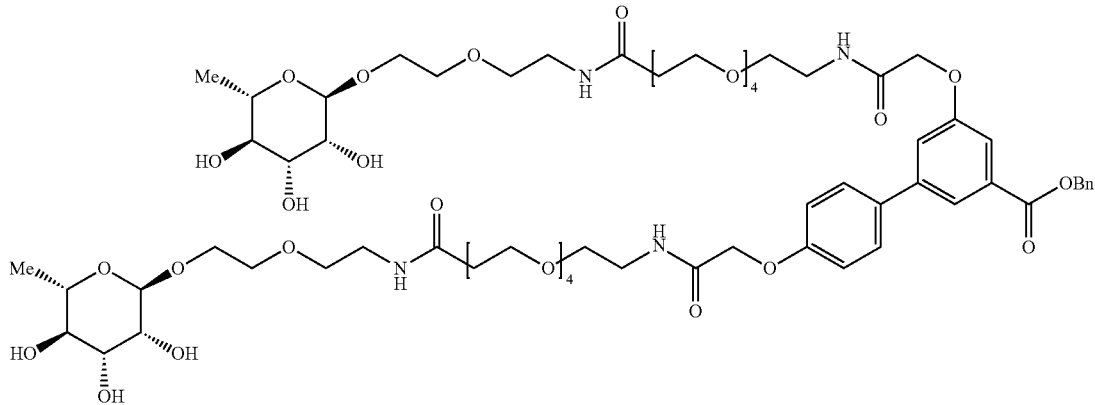

To a solution of 1,1'-((5-((benzyloxy)carbonyl)-[1,1'-biphenyl]-3,4'-diyl)bis(oxy))bis(2-oxo-6,9,12,15-tetraoxa-3-azaoctadecan-18-oic acid) (Preparation 27, 51 mg, 0.55 mmol) in DMF (2 mL) was added TEA (46 µL, 0.330 mmol) and a solution of (2R,3R,4R,5R,6S)-2-(2-(2-aminoethoxy)ethoxy)-6-methyltetrahydro-2H-pyran-3,4,5-triol (Preparation 18, 41 mg, 0.165 mmol) in DMF (2 mL) to afford a colourless solution. HATU (63 mg, 0.165 mmol) was added and the reaction stirred for 1 hour at room temperature. The reaction was concentrated in vacuo and purified using reverse phase chromatography eluting with 10-65% MeCN in 0.1% TEA in water to afford the title compound as a colourless glass (74 mg, 96%).

LCMS (Method 1): Rt=2.20 mins, ES⁺ MS m/z 1397.7 [M+H]⁺

Preparation 27

1,1'-((5-((Benzyloxy)carbonyl)-[1,1'-biphenyl]-3,4'-diyl)bis(oxy))bis(2-oxo-6,9,12,15-tetraoxa-3-azaoctadecan-18-oic acid)

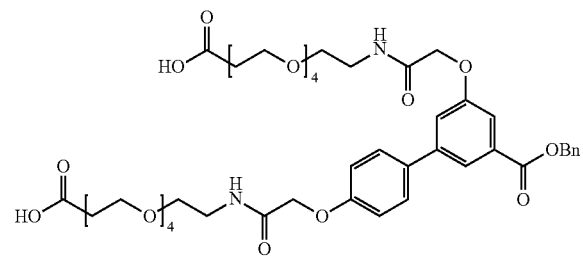

To a solution of di-tert-butyl 1,1'-((5-((benzyloxy)carbonyl)-[1,1'-biphenyl]-3,4'-diyl)bis(oxy))bis(2-oxo-6,9,12,15-tetraoxa-3-azaoctadecan-18-oate) (Preparation 28, 7.95 g, 7.62 mmol) in DCM (40 mL), was added TFA (40 mL) and water (4.0 mL) to give a clear yellow solution. The reaction was stirred at room temperature for 1 hour. The reaction was concentrated in vacuo and dissolved in toluene (25 mL) and dioxane (25 mL) and re-concentrated in vacuo to give a yellow oil. The residue was dissolved in toluene (50 mL) and concentrated in vacuo to afford a yellow oil (8.50 g, >100%, ~83% pure due to presence of toluene).

LCMS (Method 1): Rt=2.10 mins, ES⁻ MS m/z 929.4 [M–H]⁻

1H NMR (396 MHz, CDCl₃): δ ppm 7.91 (1H, s), 7.57-7.54 (5H, m), 7.45 (2H, J=6.7 Hz, d), 7.41-7.32 (4H, m), 7.02 (2H, J=9.1 Hz, d), 5.38 (2H, s), 4.65 (2H, s), 4.60 (2H, s), 3.72-3.49 (36H, m), 2.55 (4H, J=11.5, 5.1 Hz, dt).

Preparation 28

Di-tert-butyl 1,1'-((5-((benzyloxy)carbonyl)-[1,1'-biphenyl]-3,4'-diyl)bis(oxy))bis(2-oxo-6,9,12,15-tetraoxa-3-azaoctadecan-18-oate)

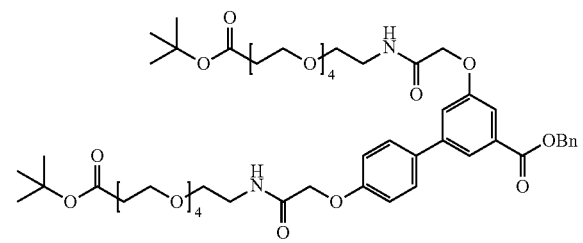

To 2,2'-((5-((benzyloxy)carbonyl)-[1,1'-biphenyl]-3,4'-diyl)bis(oxy))diacetic acid (Preparation 29, 4.0 g, 9.17 mmol) dissolved in dry DMF (40 mL) was added tert-butyl 1-amino-3,6,9,12-tetraoxapentadecan-15-oate (6.48 g, 20.17 mmol) and TEA (7.67 mL, 55.02 mmol). HATU (10.46 g, 27.51 mmol) was added and the reaction stirred at room temperature for 18 hours. The reaction was concentrated in vacuo and purified using reverse phase chromatography eluting with 10-80% MeCN in water. The resultant yellow oil was suspended in water, diluted with brine (100 mL) and extracted with EtOAc (3×100 mL). The combined extracts were dried (MgSO₄) and concentrated in vacuo to afford the title compound as an orange oil (7.95 g, 83%).

LCMS (Method 1): Rt=3.48 mins, ES⁺ MS m/z 1060.7 [M+H₂O]⁺

1H NMR (396 MHz, CDCl₃): δ ppm 7.90 (1H, s), 7.55-7.51 (3H, m), 7.46-7.43 (2H, m), 7.41-7.32 (3H, m), 7.29 (1H, J=2.1 Hz, t), 7.14-7.06 (2H, m), 7.02-6.97 (2H, m), 5.38 (2H, s), 4.57 (2H, s), 4.53 (2H, s), 3.67 (4H, J=6.5 Hz, q), 3.62-3.55 (32H, m), 2.47 (4H, J=6.1 Hz, q), 1.41 (18H, s).

Preparation 29

2,2'-((5-((Benzyloxy)carbonyl)-[1,1'-biphenyl]-3,4'-diyl)bis(oxy))diacetic acid

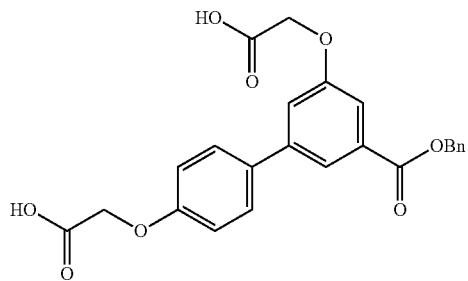 [SMILES: O=C(O)COc1ccc(-c2cc(OCC(=O)O)cc(C(=O)OCc3ccccc3)c2)cc1]

To a solution of di-tert-butyl 2,2'-((5-((benzyloxy)carbonyl)-[1,1'-biphenyl]-3,4'-diyl)bis(oxy))diacetate (Preparation 30, 9.80 g, 17.86 mmol) in DCM (50 mL) was added TFA (50 mL) and water (5.0 mL) to afford a clear solution. The reaction was stirred at room temperature for 16 hours. The reaction was concentrated in vacuo and the resultant residue was triturated with toluene/dioxane (40 mL/40 mL) and concentrated in vacuo to afford a pale yellow solid. The solid was further triturated with toluene (60 mL) and filtered to afford the title compound as a white solid (8.10 g, 99%).

LCMS (Method 1): Rt=1.87 mins, ES⁻ MS m/z 434.9 [M–H]⁻

1H NMR (396 MHz, DMSO-D₆): δ ppm 13.1 (2H, br s), 7.77 (1H, s), 7.63-7.49 (2H, m), 7.49-7.47 (2H, m), 7.44-7.37 (5H, m), 7.03-7.01 (2H, m), 5.39 (2H, s), 4.86 (2H, s), 4.74 (2H, s).

Preparation 30

Di-tert-butyl 2,2'-((5-((benzyloxy)carbonyl)-[1,1'-biphenyl]-3,4'-diyl)bis(oxy))diacetate

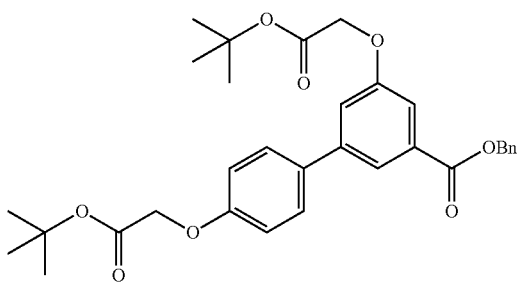 [SMILES: CC(C)(C)OC(=O)COc1ccc(-c2cc(OCC(=O)OC(C)(C)C)cc(C(=O)OCc3ccccc3)c2)cc1]

To benzyl 4',5-dihydroxy-[1,1'-biphenyl]-3-carboxylate (Preparation 31, 815 mg, 2.54 mmol) dissolved in DMF (10 mL) was added tert-butyl bromoacetate (752 μL, 5.09 mmol) and potassium carbonate (1.58 g, 11.5 mmol). The resulting suspension was stirred for 5 hours at room temperature under nitrogen. The reaction was concentrated in vacuo and the residue suspended in water (30 mL) and extracted with EtOAc (2×30 mL). The combined extracts were washed with brine (30 mL), 2M NaOH (aq) (30 mL), dried (MgSO$_4$) and concentrated in vacuo to afford the title compound as a yellow solid (1.49 g, >100%).

LCMS (Method 3): Rt=4.23 mins; no MS ionisation observed

1H NMR (396 MHz, CD$_3$OD): δ ppm 7.85 (1H, t), 7.60-7.55 (2H, m), 7.50-7.35 (7H, m), 7.05-5 6.95 (2H, m), 5.40 (2H, s), 4.70 (2H, s), 4.65 (2H, s), 1.50 (9H, s), 1.45 (9H, s).

Preparation 31

Benzyl 4',5-dihydroxy-[1,1'-biphenyl]-3-carboxylate

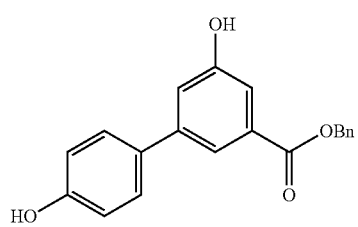 [SMILES: O=C(OCc1ccccc1)c1cc(O)cc(-c2ccc(O)cc2)c1]

A mixture of benzyl 3-bromo-5-hydroxybenzoate (Preparation 32, 1.05 g, 3.42 mmol), sodium carbonate (1.27 g, 12.0 mmol) and (4-hydroxyphenyl)boronic acid (565 mg, 4.10 mmol) dissolved in dioxane/water (3:1 v/v, 30 mL) were degassed for 30 minutes with nitrogen. Pd(PPh$_3$)$_4$ (395 mg, 0.341 mmol) was added and the reaction heated to 100° C. for 5 hours under nitrogen. After cooling to room temperature, EtOAc (50 mL) and water (30 mL) were added and the layers separated. The aqueous layer was extracted with EtOAc (2×50 mL) and the combined organic extracts were washed with brine (50 mL), dried (MgSO$_4$) and concentrated in vacuo. The residue was purified using silica gel chromatography eluting with 5-40% EtOAc in heptane to afford the title compound as a yellow solid (815 mg, 74%).

LCMS (Method 2): Rt=2.94 mins, ES$^-$ MS m/z 319.3 [M−H]$^-$

1H NMR (396 MHz, CD$_3$OD): δ ppm 7.70 (1H, t), 7.50-7.35 (8H, m), 7.20 (1H, t), 6.85-6.80 (2H, m), 5.35 (2H, s).

Preparation 32

Benzyl 3-bromo-5-hydroxybenzoate

To a solution of 3-bromo-5-hydroxybenzoic acid (4.08 g, 18.8 mmol) dissolved in DMF (25 mL) was added potassium carbonate (2.60 g, 18.8 mmol). The reaction was stirred at room temperature for 5 minutes before benzyl bromide (2.24 mL, 18.8 m mol) was added dropwise over 10 minutes. The reaction was stirred at room temperature under nitrogen for 16 hours. Additional potassium carbonate (520 mg, 3.76 mmol) and benzyl bromide (450 μL, 3.79 mmol) were added and the reaction stirred for 3 hours at room temperature. The reaction was concentrated in vacuo and the residue partitioned between EtOAc (30 mL) and water (30 mL). The aqueous layer was extracted with EtOAc (2×20 mL) and the combined organic extracts washed with brine (30 mL), dried (MgSO$_4$) and concentrated in vacuo. The residue was purified by silica gel chromatography eluting with 5% EtOAc in heptane to afford the title compound as a colourless solid (3.88 g, 67%).

LCMS (Method 2): Rt=3.36 mins, ES$^-$ MS m/z 307.2 [M−H]$^-$

1H NMR (396 MHz, CDCl$_3$): δ ppm 7.75 (1H, t), 7.50-7.45 (1H, m), 7.45-7.30 (5H, m), 7.20 (1H, t), 5.30 (2H, s), 5.30 (1H, br s).

Preparation 33

5-((2-(4',5-Bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoic acid

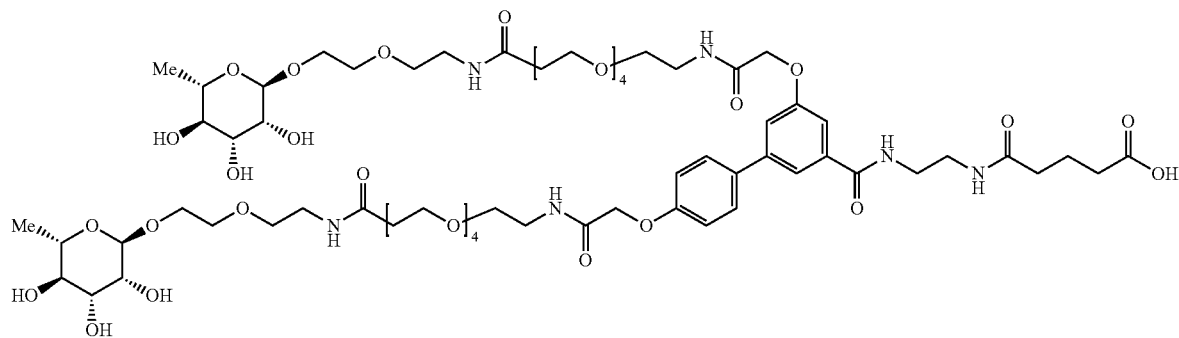

Benzyl 5-((2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl)amino)-5-oxopentanoate (Preparation 34, 6.60 g, 4.377 mmol) was dissolved was dissolved in MeOH (51 mL) and water (51 mL), and 10% Pd/C (680 mg) added. The reaction was degassed and stirred under a hydrogen atmosphere (balloon pressure) for 2 hours at room temperature. The reaction was filtered through Hyflo and the filtrate concentrated in vacuo to afford the title compound as a pale-yellow gum (5.86 g, 94%).

LCMS (Method 1): Rt=1.62 mins, ES⁻ MS m/z 1461.6 [M−H]⁻

1H-NMR (396 MHz, DMSO-D6): δ ppm 8.68 (1H, J=5.1 Hz, t), 8.25 (1H, J=5.8 Hz, t), 8.10 (1H, J=5.4 Hz, t), 7.97 (1H, J=5.4 Hz, t), 7.85 (2H, J=5.4 Hz, t), 7.71-7.61 (3H, m), 7.38 (1H, s), 7.30 (1H, s), 7.04 (2H, J=8.5 Hz, d), 4.58 (2H, s), 4.52 (2H, s), 4.50 (2H, s), 3.62-3.06 (71H, m), 2.27 (4H, J=6.7 Hz, t), 2.06 (4H, J=6.7 Hz, t), 1.70-1.63 (2H, m), 1.08 (6H, J=6.1 Hz, d).

Preparation 34

Benzyl 5-((2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy) [1,1'-biphenyl]-3-carboxamido)ethyl)amino)-5-oxopentanoate

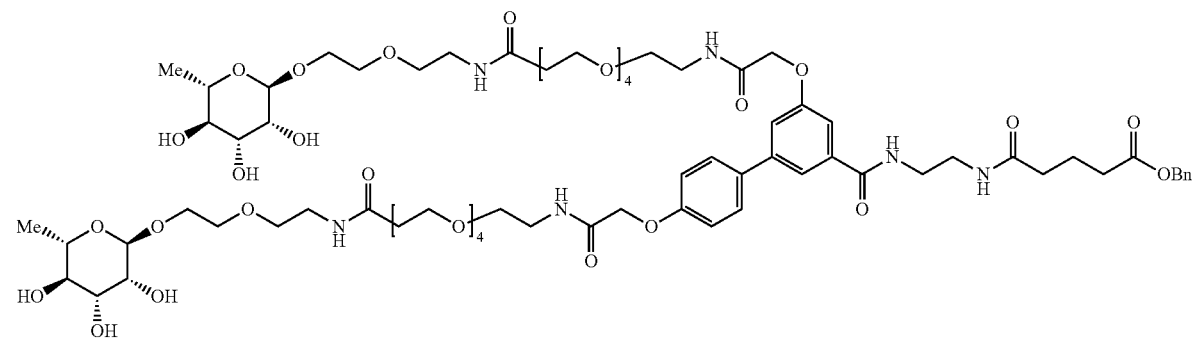

4',5-Bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 25, 3.0 g, 2.295 mmol), benzyl 5-((2-aminoethyl)amino)-5-oxopentanoate hydrochloride (Preparation 14, 828 mg, 2.754 mmol) and TEA (1.28 mL, 3.443 mmol) were dissolved in DMF (30 mL). HATU (1.31 g, 1.84 mmol) was added and the mixture stirred at room temperature for 16 hours. The solvent was concentrated in vacuo and the residue purified using reverse phase chromatography eluting with 5-50% MeCN in water to afford the title compound as a pale-yellow oil (3.14 g, 88%).

LCMS (Method 1): Rt=2.04 mins, ES⁺ MS m/z 1554.4 [M+H]⁺

1H NMR (396 MHz, DMSO-D6): δ ppm 8.55 (1H, J=5.4 Hz, t), 8.12-8.07 (2H, m), 7.93 (1H, J=5.8 Hz, t), 7.84 (2H, J=5.4 Hz, t), 7.67-7.64 (3H, m), 7.38-7.26 (7H, m), 7.04 (2H, J=8.5 Hz, d), 5.02 (2H, s), 4.67 (4H, J=4.8 Hz, t), 4.56 (2H, s), 4.52-4.46 (6H, m), 3.61-3.34 (49H, m), 3.32-3.26 (5H, m), 3.22-3.10 (7H, m), 2.34-2.25 (6H, m), 2.09 (2H, J=7.3 Hz, t), 1.77-1.69 (2H, m), 1.09 (6H, J=6.1 Hz, d).

Preparation 35

Benzyl (2-(4',5-bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamido)ethyl) carbamate

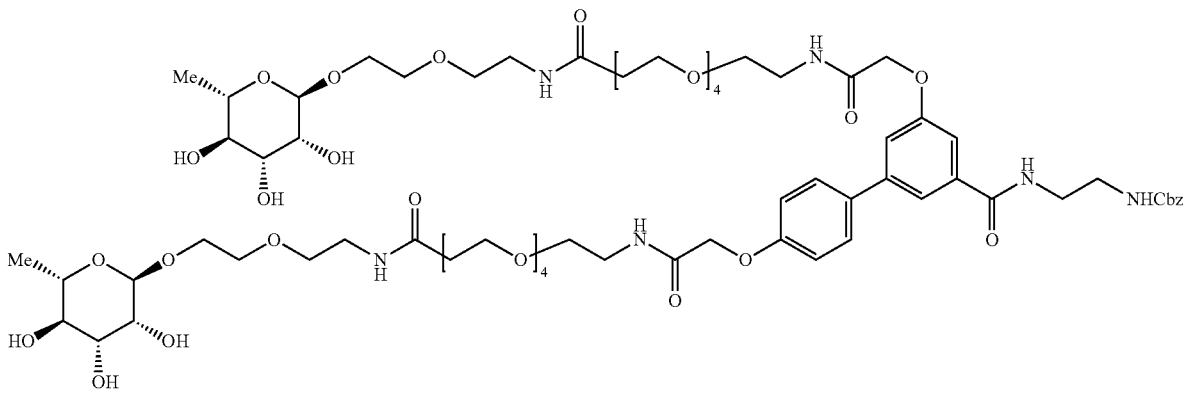

4',5-Bis((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxylic acid (Preparation 25, 338 mg, 0.259 mmol), benzyl N-(2-aminoethyl)carbamate hydrochloride (90 mg, 0.389 mmol) and TEA (0.144 mL, 1.04 mmol) were dissolved in DMF (10 mL) and stirred under nitrogen. HATU (148 mg, 0.389 mmol) was added and the mixture stirred at room temperature for 1 hour. The reaction was concentrated in vacuo and the residue purified using reverse phase chromatography eluting with 5-45% MeCN in water to afford the title compound as a colourless oil (345 mg, 90%).

LCMS (Method 1): Rt=2.06 mins, ES⁻ MS m/z 1482.2 [M−H]⁻

Preparation 36

2,5-Dioxopyrrolidin-1-yl 5-oxo-5-((2-(4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxamido)ethyl)amino)pentanoate

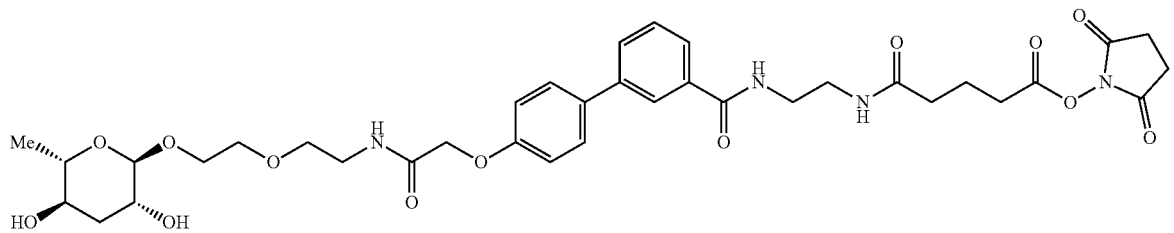 [SMILES: C[C@@H]1O[C@@H](OCCOCCNC(=O)COc2ccc(-c3cccc(C(=O)NCCNC(=O)CCCC(=O)ON4C(=O)CCC4=O)c3)cc2)[C@H](O)C[C@H]1O]

Preparation 36 was prepared according to Method 1 described for Preparation 1 using Preparation 37 in neat DMSO and di-(N-succinimidyl)glutarate in neat DMF. The reaction was stirred at room temperature for 2 hours and purified using reverse phase chromatography eluting with 1-40% MeCN in 0.1% TFA in water. (46 mg, 22%).

UPLC (Method 1): Rt=2.24 mins, ES− MS m/z 757.3 [M−H]−

Preparation 37

N-(2-Aminoethyl)-4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxamide

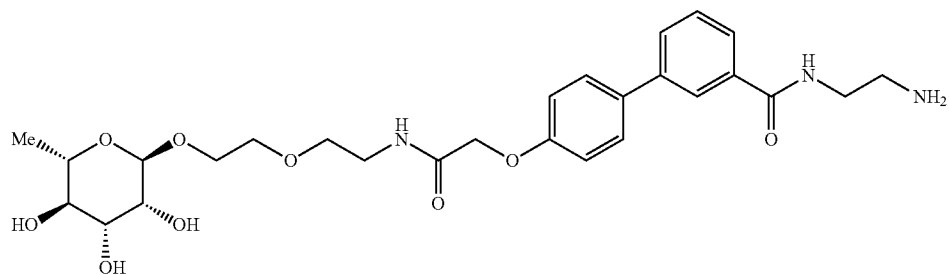 [SMILES: C[C@@H]1O[C@@H](OCCOCCNC(=O)COc2ccc(-c3cccc(C(=O)NCCN)c3)cc2)[C@H](O)[C@H](O)[C@H]1O]

Benzyl (2-(4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxamido)ethyl)carbamate (Preparation 38, 288 mg, 0.422 mmol) was dissolved in a mixture of THF (50 mL) and water (50 mL). Pd EnCat (400 mg) was added and the mixture hydrogenated (6 atmospheres) for 18 hours at room temperature. The catalyst was removed by filtration (0.2 μM syringe filter) and the filtrate concentrated in vacuo to afford the title compound as a pale-yellow glass (235 mg, >100%, contained water).

LCMS (Method 1): Rt=1.73 mins, ES+ MS m/z 548.3 [M+H]+

1H NMR (396 MHz, DMSO-$D_6$): δ ppm 8.84 (1H, J=5.4 Hz, t), 8.13-8.05 (2H, m), 7.79-7.72 (2H, m), 7.66 (2H, J=9.1 Hz, d), 7.49 (1H, J=7.9 Hz, t), 7.04 (2H, J=9.1 Hz, d), 4.53 (1H, J=1.8 Hz, d), 4.51 (2H, s), 3.75-2.99 (18H, m), 2.97-2.81 (3H, m), 1.08 (3H, J=6.1 Hz, d).

Preparation 38

Benzyl (2-(4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxamido)ethyl)carbamate

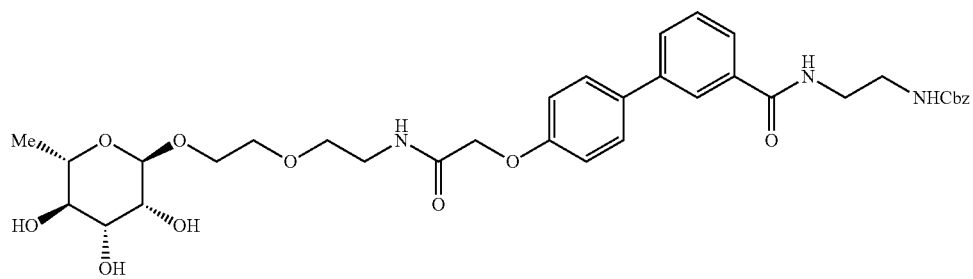 [SMILES: C[C@@H]1O[C@@H](OCCOCCNC(=O)COc2ccc(-c3cccc(C(=O)NCCNC(=O)OCc4ccccc4)c3)cc2)[C@H](O)[C@H](O)[C@H]1O]

Preparation 38 was prepared according to the method described for Preparation 17 using Preparation 39 and benzyl (2-aminoethyl)carbamate hydrochloride. Purification using reverse phase chromatography eluting with 5-55% MeCN in water to afforded the title compound as a colourless oil (288 mg, 83%).

LCMS (Method 1): Rt=2.24 mins, ES⁺ MS m/z 682.5 [M+H]⁺

Preparation 39

4'-(2-Oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylic acid

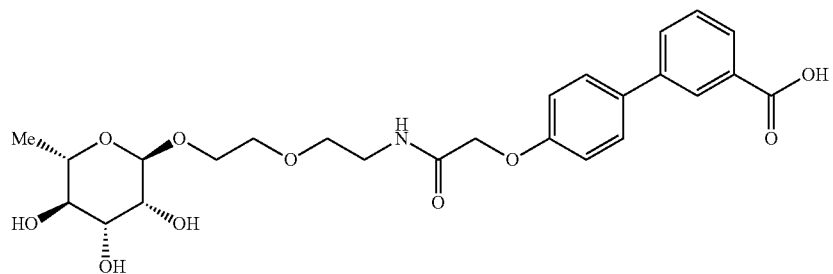 [SMILES: C[C@@H]1O[C@@H](OCCOCCNC(=O)COc2ccc(-c3cccc(C(=O)O)c3)cc2)[C@H](O)[C@H](O)[C@H]1O]

Benzyl 4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylate (Preparation 40, 312 mg, 0.524 mmol) was dissolved in a mixture of EtOH (15 mL) and water (15 mL). 5% Pd/C (40 mg) was added and the mixture hydrogenated (1 atmosphere) for 2 hours at room temperature. The catalyst was removed by filtration (0.2 µM syringe filter) and the filtrate concentrated in vacuo to afford the title compound as a colourless glass (256 mg, 97%).

LCMS (Method 1): Rt=1.73 mins, ES⁻ MS m/z 504.2 [M−H]⁻

Preparation 40

Benzyl 4'-(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylate

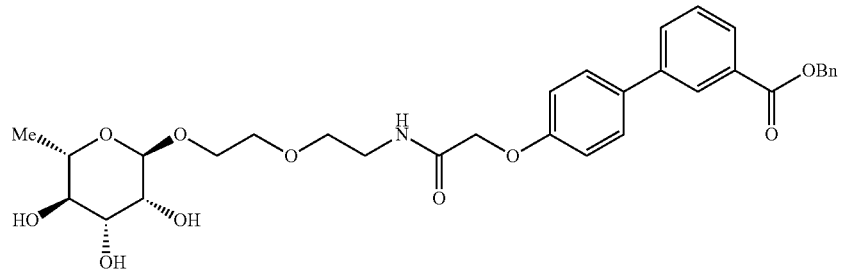 [SMILES: C[C@@H]1O[C@@H](OCCOCCNC(=O)COc2ccc(-c3cccc(C(=O)OCc4ccccc4)c3)cc2)[C@H](O)[C@H](O)[C@H]1O]

Preparation 40 was prepared according to the method described for Preparation 4 using Preparation 7 and Preparation 18. Purification using reverse phase chromatography eluting with 5-45% MeCN in water to afforded the title compound as a colourless oil (312 mg, 86%).

LCMS (Method 1): Rt=2.57 mins, ES⁺ MS m/z 596.4 [M+H]⁺

Preparation 41

2,5-Dioxopyrrolidin-1-yl 5-((2-(4',5-bis(2-oxo-2-((2-(2-(((2R,3R,4R,5R,6S)-3,4,5-trihydroxy-6-methyl-tetrahydro-2H-pyran-2-yl)oxy)ethoxy)ethyl)amino)ethoxy)-[1,1'-biphenyl]-3-carboxamido)ethyl)amino)-5-oxopentanoate

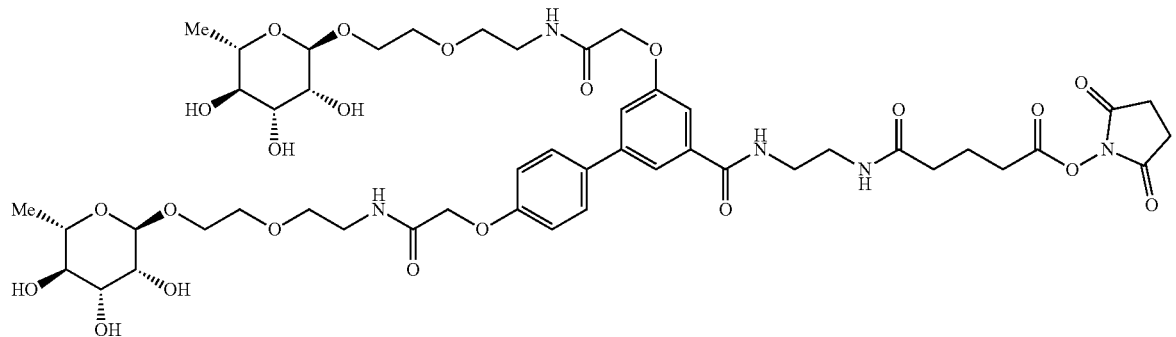 [SMILES: C[C@@H]1O[C@@H](OCCOCCNC(=O)COc2ccc(-c3cc(OCC(=O)NCCOCCO[C@@H]4O[C@@H](C)[C@H](O)[C@@H](O)[C@H]4O)cc(C(=O)NCCNC(=O)CCCC(=O)ON4C(=O)CCC4=O)c3)cc2)[C@H](O)[C@H](O)[C@H]1O]

Preparation 41 was prepared according to Method 1 described for Preparation 1 using Preparation 42 in neat DMSO and di-(N-succinimidyl)glutarate in neat DMF. The reaction was stirred at room temperature for 2 hours and purified using reverse phase chromatography eluting with 1-30% MeCN in 0.1% TFA in water. (55 mg, 25%).

UPLC (Method 1): Rt=2.09 mins, ES$^-$ MS m/z 1064.5 [M−H]$^-$

Preparation 42

2,2'-((5-((2-Aminoethyl)carbamoyl)-[1,1'-biphenyl]-3,4'-diyl)bis(oxy))bis(N-(2-(2-(((2R,3R,4R,5R,6S)-3,4,5-trihydroxy-6-methyltetrahydro-2H-pyran-2-yl)oxy)ethoxy)ethyl)acetamide)

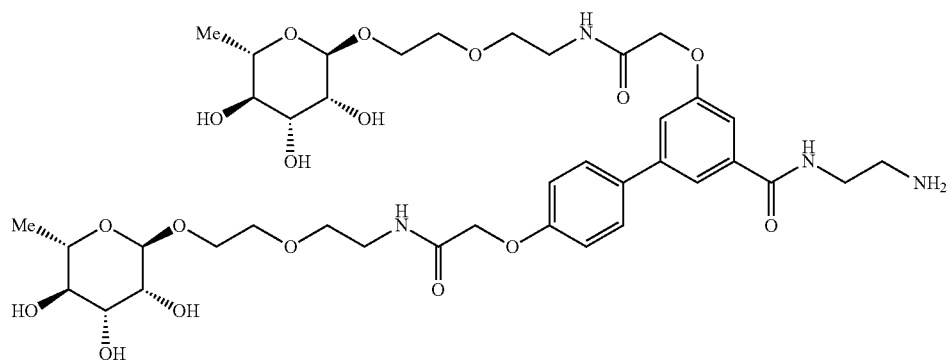 [SMILES: C[C@@H]1O[C@@H](OCCOCCNC(=O)COc2ccc(-c3cc(OCC(=O)NCCOCCO[C@@H]4O[C@@H](C)[C@H](O)[C@@H](O)[C@H]4O)cc(C(=O)NCCN)c3)cc2)[C@H](O)[C@H](O)[C@H]1O]

Preparation 42 was prepared according to the method described for Preparation 37 using Preparation 43.

LCMS (Method 1): Rt=1.75 mins, ES$^+$ MS m/z 855.8 [M+H]$^+$

Preparation 43

Benzyl (2-(4',5-bis(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxamido)ethyl)carbamate

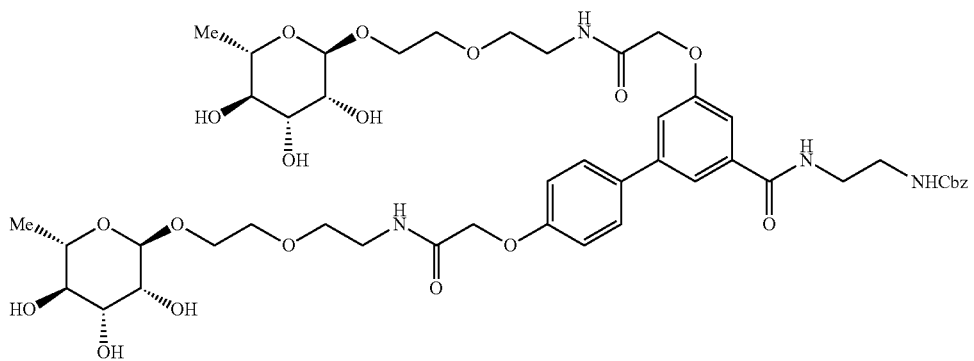 [SMILES: C[C@@H]1O[C@@H](OCCOCCNC(=O)COc2ccc(-c3cc(OCC(=O)NCCOCCO[C@@H]4O[C@@H](C)[C@H](O)[C@@H](O)[C@H]4O)cc(C(=O)NCCNC(=O)OCc4ccccc4)c3)cc2)[C@H](O)[C@H](O)[C@H]1O]

Preparation 43 was prepared according to the method described for Preparation 17 using Preparation 44.

LCMS (Method 1): Rt=2.05 mins, ES+ MS m/z 989.7 [M+H]+

Preparation 44

4',5-Bis(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylic acid

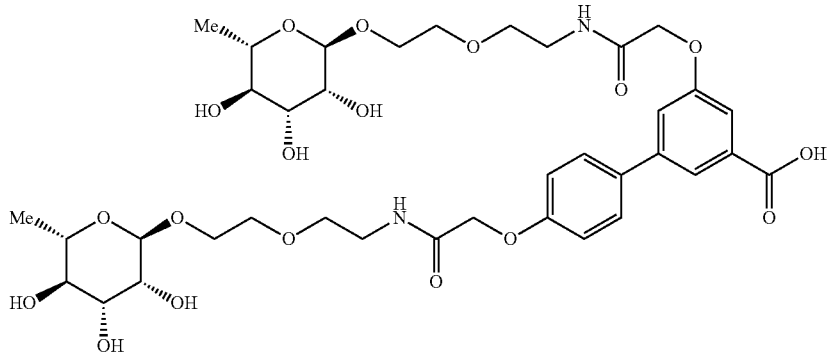 [SMILES: C[C@@H]1O[C@@H](OCCOCCNC(=O)COc2ccc(-c3cc(OCC(=O)NCCOCCO[C@@H]4O[C@@H](C)[C@H](O)[C@@H](O)[C@H]4O)cc(C(=O)O)c3)cc2)[C@H](O)[C@H](O)[C@H]1O]

Benzyl 4',5-bis(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylate (Preparation 45, 201 mg, 0.223 mmol) was dissolved in a mixture of EtOH (15 mL) and water (15 mL). 5% Pd/C (20 mg) was added and the mixture hydrogenated (1 atmosphere) for 2 hours at room temperature. The catalyst was removed by filtration (0.2 μM syringe filter) and the filtrate concentrated in vacuo to afford the title compound as a colourless glass (178 mg, 98%).

LCMS (Method 1): Rt=1.61 mins, ES− MS m/z 811.4 [M−H]−

Preparation 45

Benzyl 4',5-bis(2-oxo-2-((2-(2-(((2R,3R,4R,5R,6S)-3,4,5-trihydroxy-6-methyltetrahydro-2H-pyran-2-yl)oxy)ethoxy)ethyl)amino)ethoxy)-[1,1'-biphenyl]-3-carboxylate

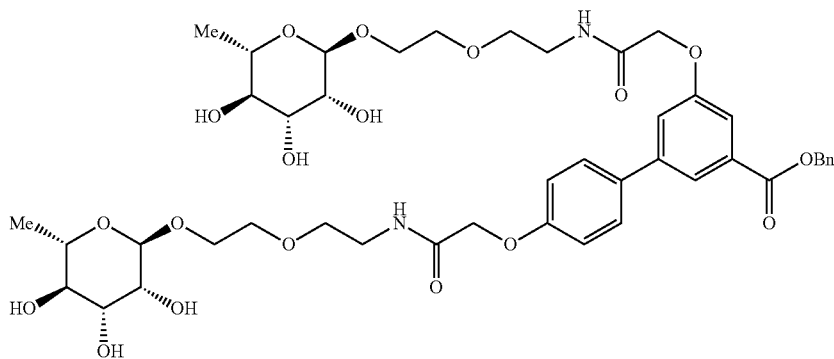 [SMILES: C[C@@H]1O[C@@H](OCCOCCNC(=O)COc2ccc(-c3cc(OCC(=O)NCCOCCO[C@@H]4O[C@@H](C)[C@H](O)[C@@H](O)[C@H]4O)cc(C(=O)OCc4ccccc4)c3)cc2)[C@H](O)[C@H](O)[C@H]1O]

Preparation 45 was prepared according to the method described for Preparation 4 using Preparation 7 and Preparation 29. Purified using reverse phase chromatography eluting with 5-45% MeCN in water to afford the title compound as a colourless oil (201 mg, 62%).

LCMS (Method 1): Rt=2.22 mins, ES$^+$ MS m/z 903.7 [M+H]$^+$

Preparation 46

2,5-Dioxopyrrolidin-1-yl 5-((2-(4'-((2,42-dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxamido)ethyl)amino)-5-oxopentanoate

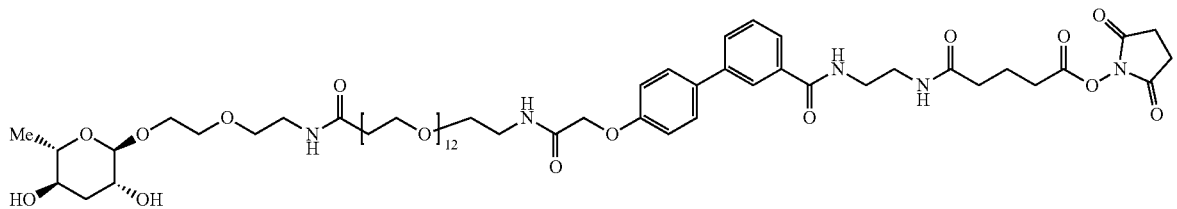

Preparation 46 was prepared according to Method 1 described for Preparation 1 using Preparation 47 in neat DMSO and di-(N-succinimidyl)glutarate in neat DMF. Stirred at room temperature for 18 hours and purified using reverse phase chromatography eluting with 1-40% MeCN in 0.1% TFA in water. The desired fractions were lyophilised immediately to dryness over 24 hours to afford the desired compound as a colourless oil (50 mg, 24%).

UPLC (Method 1): Rt=2.28 mins, ES$^+$ MS m/z 680.2 [M+2H]/2; theoretical mass: 1358.5

Alternatively, Preparation 46 may be prepared according to the following method:

5-((2-(4'-((2,42-Dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxamido)ethyl)amino)-5-oxopentanoic acid (acid Preparation 58, 300 mg, 0.24 mmol) and 1-hydroxypyrrolidine-2,5-dione (41 mg, 0.36 mmol) were dissolved in DMF (3 mL). 1-ethyl-3-(3-dimethylaminopropyl)carbodiimide hydrochloride (68 mg, 0.36 mmol) was added and the mixture stirred at room temperature for 4.5 hours. The reaction was purified using reverse phase chromatography eluting with 5-50% MeCN in 0.1% TFA in water and immediately lyophilised to give the title compound as a colourless gum (152 mg, 47%).

LCMS (Method 1): Rt=2.03 mins, ES$^+$ MS m/z 1358.5 [M+H]$^+$

Preparation 47

N-(2-Aminoethyl)-4'-((2,42-dioxo-48-(((2R,3R,4R, 5R,6S)-3,4,5-trihydroxy-6-methyltetrahydro-2H-pyran-2-yl)oxy)-6,9,12,15,18,21,24,27,30,33,36,39, 46-tridecaoxa-3,43-diazaoctatetracontyl)oxy)-[1,1'-biphenyl]-3-carboxamide 2,2,2-trifluoroacetate

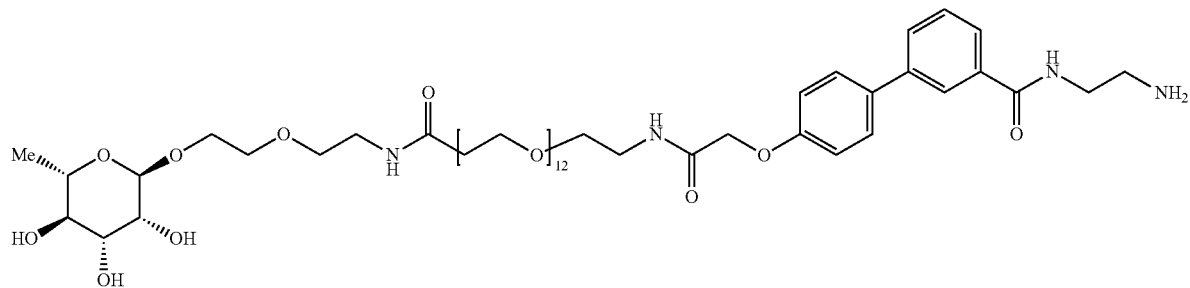

4'-((2,42-Dioxo-48-(((2R,3R,4R,5R,6S)-3,4,5-trihydroxy-6-methyltetrahydro-2H-pyran-2-yl)oxy)-6,9,12,15, 18,21,24,27,30,33,36,39,46-tridecaoxa-3,43-diazaoctatetracontyl)oxy)-[1,1'-biphenyl]-3-carboxylic acid (Preparation 48, 222 mg, 0.2 mmol), tert-butyl (2-aminoethyl)carbamate (48 mg, 0.3 mmol) and TEA (0.113 mL, 0.8 mmol) were dissolved in DMF (10 mL) under nitrogen. HATU (114 mg, 0.3 mmol) was added and the mixture stirred for 1 hour at room temperature. The solvent was concentrated in vacuo and the residue stirred in a mixture of DCM (10 mL) and TFA (10 mL) for 1 hour at room temperature. The solvent was concentrated in vacuo and the residue purified using reverse phase chromatography eluting with 10-55% MeCN in 0.1% TFA in water to afford the title compound as a colourless oil, as the TFA salt (178 mg, 70%).

LCMS (Method 1): Rt=1.89 mins, ES⁻ MS m/z 1145.8 [M−H]⁻

Preparation 48

4'-((2,42-Dioxo-48-(((2R,3R,4R,5R,6S)-3,4,5-trihydroxy-6-methyltetrahydro-2H-pyran-2-yl)oxy)-6,9, 12,15,18,21,24,27,30,33,36,39,46-tridecaoxa-3,43-diazaoctatetracontyl)oxy)-[1,1'-biphenyl]-3-carboxylic acid

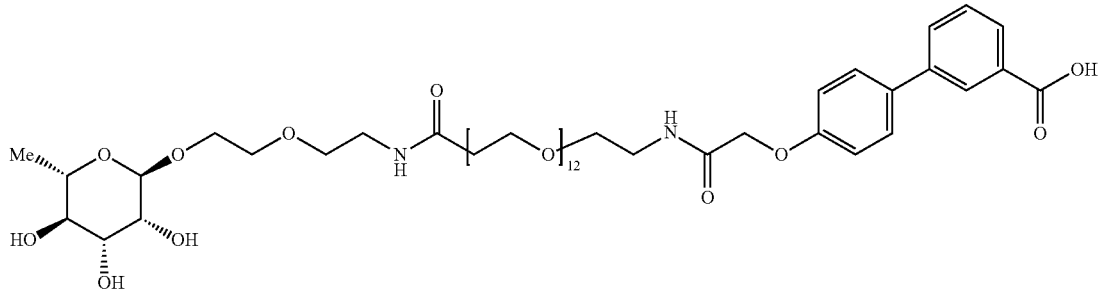

Benzyl 4'-((2,42-dioxo-48-(((2R,3R,4R,5R,6S)-3,4,5-trihydroxy-6-methyltetrahydro-2H-pyran-2-yl)oxy)-6,9,12,15, 18,21,24,27,30,33,36,39,46-tridecaoxa-3,43-diazaoctatetracontyl)oxy)-[1,1'-biphenyl]-3-carboxylate (Preparation 49, 364 mg, 0.305 mmol) was dissolved in a mixture of EtOH (25 mL) and water (25 mL). 5% Pd/C (40 mg) was added and the mixture hydrogenated (1 atmosphere) for 2 hours at room temperature. The catalyst was removed by filtration (0.2 μM syringe filter) and the filtrate concentrated in vacuo to give the title compound as a colourless glass (332 mg, 98%)

LCMS (Method 1): Rt=1.87 min, MS m/z ES⁺ 1122.8 [M+H₂O]⁺, ES⁻ 1103.8 [M−H]⁻

Preparation 49

Benzyl 4'-((2,42-dioxo-48-((((2R,3R,4R,5R,6S)-3,4,
5-trihydroxy-6-methyltetrahydro-2H-pyran-2-yl)
oxy)-6,9,12,15,18,21,24,27,30,33,36,39,46-tridecaoxa-3,43-diazaoctatetracontyl)oxy)-[1,_1'-biphenyl]-3-carboxylate

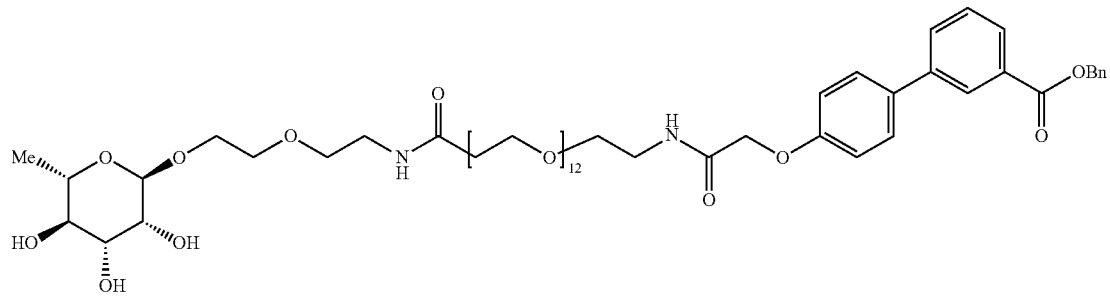

Preparation 49 was prepared according to the method described for Preparation 4 using Preparation 50 and Preparation 18. Purified using reverse phase chromatography eluting with 10-45% MeCN in water to afford the title compound as a colourless oil (364 mg, 88%).

LCMS (Method 1): Rt=2.51 mins, MS m/z ES$^+$1195.8 [M+H]$^+$

Preparation 50

1-((3'-((Benzyloxy)carbonyl)-[1,1'-biphenyl]-4-yl)
oxy)-2-oxo-6,9,12,15,18,21,24,27,30,33,36,39-dodecaoxa-3-azadotetracontan-42-oic acid

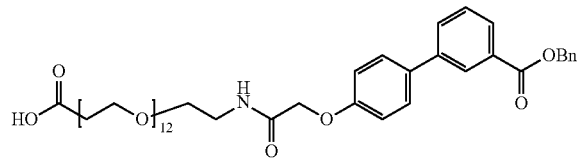

Tert-butyl 1-((3'-((benzyloxy)carbonyl)-[1,1'-biphenyl]-4-yl)oxy)-2-oxo-6,9,12,15,18,21,24,27,30,33,36,39-dodecaoxa-3-azadotetracontan-42-oate (Preparation 51, 355 mg, 0.344 mmol) was dissolved in DCM (8 mL) and TFA (8 mL) added. This was stirred at room temperature for 1 hour and the solvent concentrated under reduced pressure. This was concentrated from 1:1 toluene:dioxane (30 ml) and TBME (30 ml) to give a colourless glass (335 mg, 100%)

LCMS (Method 1): Rt=2.45 mins, MS m/z ES$^-$ 960.6 [M−H]$^-$

Preparation 51

Tert-butyl 1-((3'-((benzyloxy)carbonyl)-[1,1'-biphenyl]-4-yl)oxy)-2-oxo-6,9,12,15,18,21,24,27,30,33,36,39-dodecaoxa-3-azadotetracontan-42-oate

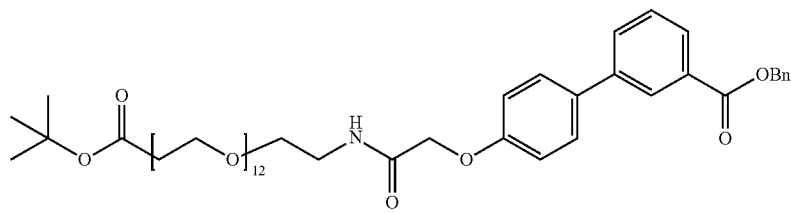

Preparation 51 was prepared according to the method described for Preparation 6 using Preparation 7 and tert-butyl 1-amino-3,6,9,12,15,18,21,24,27,30,33,36-dodecaoxanonatriacontan-39-oate. Purified using reverse phase chromatography eluting with 10-75% MeCN in water to afford the title compound as a white solid (355 mg, 91%).

LCMS (Method 1): Rt=2.93 mins, MS m/z ES$^+$1035.8 [M+H$_2$O]$^+$

Preparation 52

2,5-Dioxopyrrolidin-1-yl 5-((2-(4',5-bis((2,42-dioxo-48-(((2R,3R,4R,5R,6S)-3,4,5-trihydroxy-6-methyl-tetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxamido)ethyl)amino)-5-oxopentanoate

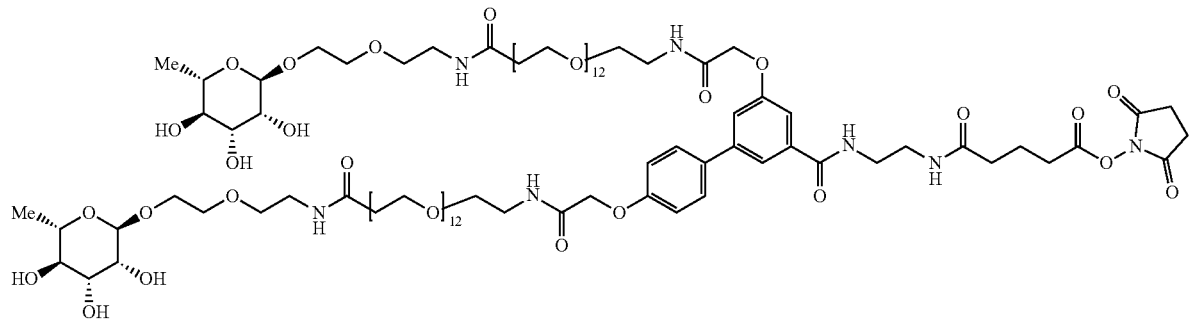

To 1,1'-((2,2'-((5-((2-Aminoethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12,15,18,21,24,27,30,33,36-dodecaoxanonatriacontan-39-amide) 2,2,2-trifluoroacetate (Preparation 53, 128 mg, 0.062 mmol) dissolved in dry DMSO (1.5 mL) was added di(N-succinimidyl) glutarate (102 mg, 0.312 mmol) dissolved in dry DMF (1.5 mL) to give a yellow solution. The reaction was stirred at room temperature for 2 hours. TEA (44 µL, 0.312 mmol) was added and stirring continued at room temperature for 18 hours. The reaction was purified using reverse phase chromatography eluting with 1-40% MeCN in 0.1% TFA in water followed by immediate lyophilisation to dryness over 24 hours to afford the desired compound as a colourless oil (100 mg, 71%).

UPLC (Method 1): Rt=2.28 mins, ES$^+$ MS 1133.6 [M+2H]/2; theoretical mass: 2265.5

Preparation 53

1,1'-((2,2'-((5-((2-Aminoethyl)carbamoyl)-[1,1'-biphenyl]-3,4'-diyl)bis(oxy))bis(acetyl))bis(azanediyl)) bis(N-(2-(2-(((2R,3R,4R,5R,6S)-3,4,5-trihydroxy-6-methyltetrahydro-2H-pyran-2-yl)oxy)ethoxy)ethyl)-3,6,9,12,15,18,21,24,27,30,33,36-dodecaoxanonatriacontan-39-amide) 2,2,2-trifluoroacetate

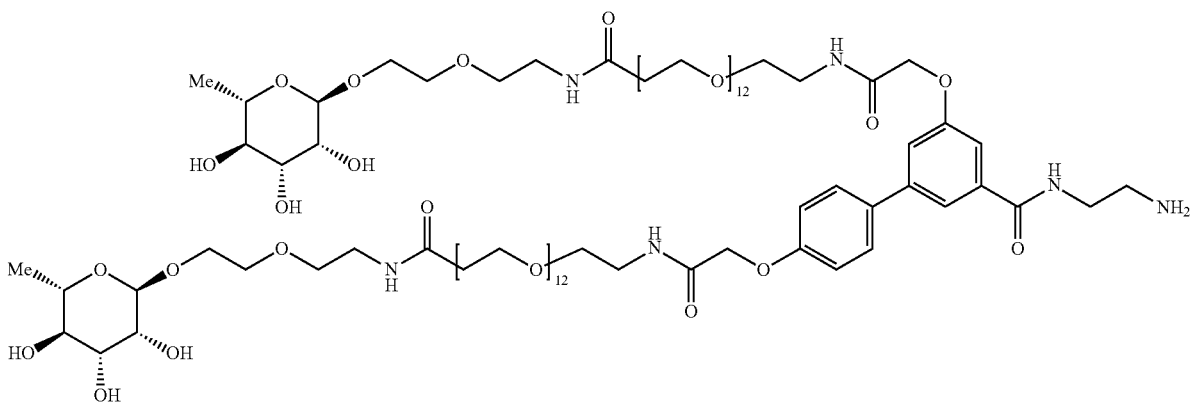

Preparation 53 was prepared according to the method described for Preparation 47 using Preparation 54.

LCMS (Method 1): Rt=1.84 mins, ES' MS m/z 1028.1 [M+2H]/2; theoretical mass: 2054.3

Preparation 54

4',5-Bis((2,42-dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxylic acid

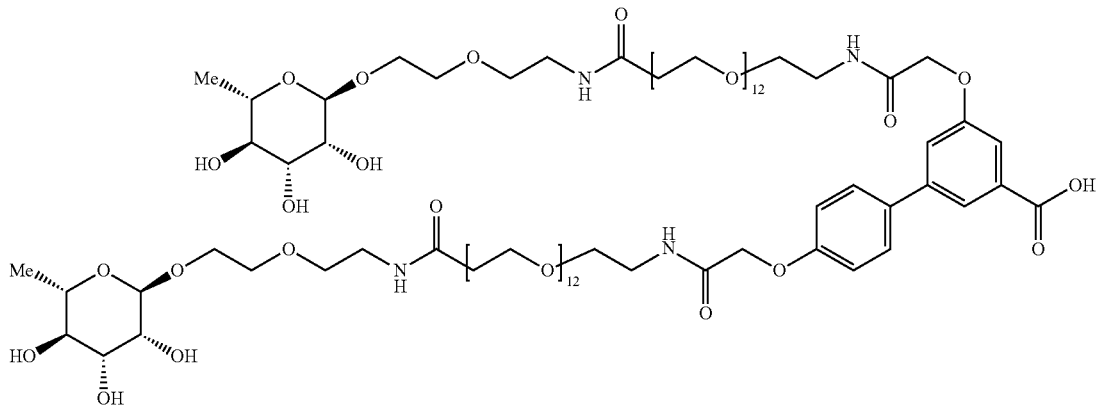

Preparation 54 was prepared according to the method described for Preparation 39 using Preparation 55.

LCMS (Method 1): Rt=1.82 mins, MS m/z ES⁻ 1007.1 [M+2H/2]; theoretical mass: 2102.2

Preparation 55

Benzyl 4',5-bis((2,42-dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxylate

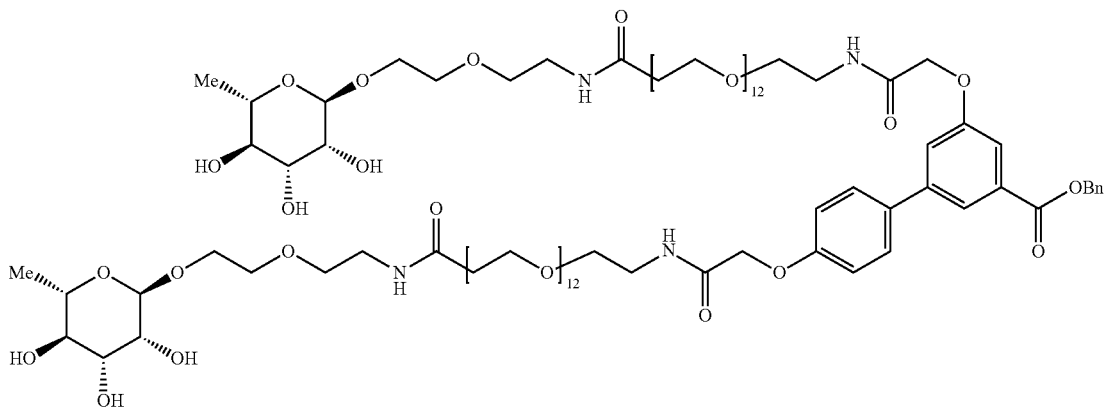

Preparation 55 was prepared according to the method described for Preparation 4 using Preparation 56 and Preparation 18. Purified using reverse phase chromatography eluting with 10-50% MeCN in water to afford the title compound as a colourless oil (335 mg, 92%).

LCMS (Method 1): Rt=2.23 mins, MS m/z ES⁻ 1052.2 [M+2H/2]; theoretical mass: 2102.4

Preparation 56

1,1'-((5-((benzyloxy)carbonyl)-[1,1'-biphenyl]-3,4'-diyl)bis(oxy))bis(2-oxo-6,9,12,15,18,21,24,27,30,33,36,39-dodecaoxa-3-azadotetracontan-42-oic acid)

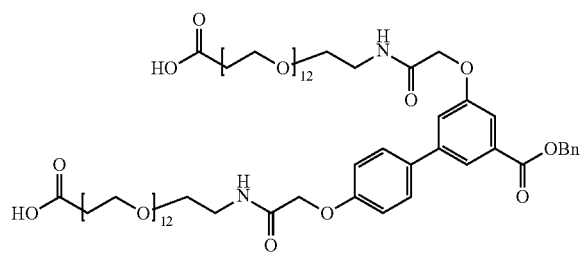

Di-tert-butyl 1,1'-((5-((benzyloxy)carbonyl)-[1,1'-biphenyl]-3,4'-diyl)bis(oxy))bis(2-oxo-6,9,12,15,18,21,24,27,30,33,36,39-dodecaoxa-3-azadotetracontan-42-oate) (Preparation 57, 301 mg, 0.172 mmol) was suspended in DCM (8 mL). TFA (8 mL) was added and the mixture stirred under nitrogen for 1 hour. The solvent was concentrated in vacuo and the residue azeotroped with toluene, dioxane and TBME to afford the title compound as a colourless oil (282 mg, 100%).

LCMS (Method 1): Rt=2.17 min, MS m/z ES⁻ 1634.0 [M−H]⁻

Preparation 57

Di-tert-butyl 1,1'-((5-((benzyloxy)carbonyl)-[1,1'-biphenyl]-3,4'-diyl)bis(oxy))bis(2-oxo-6,9,12,15,18,21,24,27,30,33,36,39-dodecaoxa-3-azadotetracontan-42-oate)

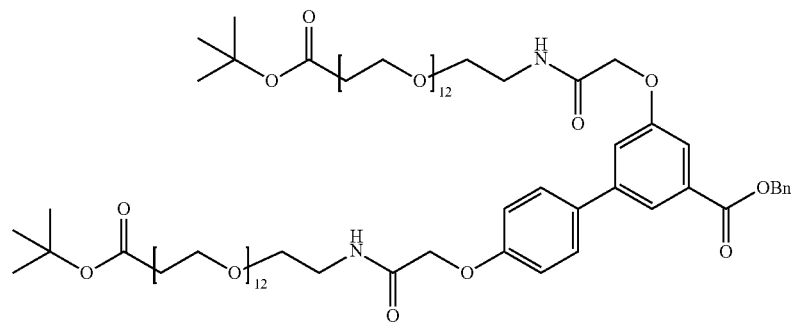

Preparation 57 was prepared according to the method described for Preparation 6 using Preparation 29 and tert-butyl 1-amino-3,6,9,12,15,18,21,24,27,30,33,36-dodecaoxanonatriacontan-39-oate. Purified using reverse phase chromatography eluting with 5-55% MeCN in water to afford the title compound as a colourless solid (301 mg, 77%).

LCMS (Method 1): Rt=2.78 mins, MS m/z ES⁻ 1749.2 [M−H]⁻

Preparation 58

5-((2-(4'-((2,42-Dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxamido)ethyl)amino)-5-oxopentanoic acid

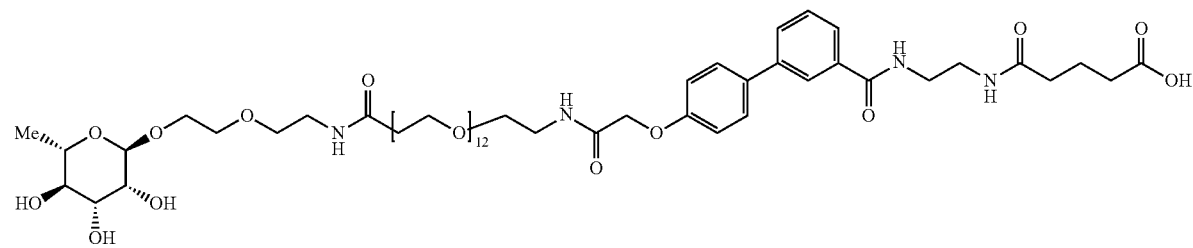

4'-((2,42-Dioxo-48-(((2R,3R,4R,5R,6S)-3,4,5-trihydroxy-6-methyltetrahydro-2H-pyran-2-yl)oxy)-6,9,12,15,18,21,24,27,30,33,36,39,46-tridecaoxa-3,43-diazaoctatetracontyl)oxy)-[1,1'-biphenyl]-3-carboxylic acid (Preparation 48, 800 mg, 0.72 mmol), benzyl 5-((2-aminoethyl)amino)-5-oxopentanoate hydrochloride (Preparation 14, 327 mg, 1.09 mmol) and TEA (0.61 mL, 4.34 mmol) were dissolved in DCM (15 mL) and DMF (0.5 mL). HATU (413 mg, 1.09 mmol) was added and the mixture stirred for 2 hours at room temperature. The reaction was concentrated in vacuo and purified by reverse phase chromatography eluting with 5-50% MeCN in water. The residue was dissolved in a mixture of MeOH (10 mL) and water (10 mL). 10% Pd/C (85 mg) was added and the mixture hydrogenated (1 atmosphere) for 3 hours at room temperature. The catalyst was removed by filtration (0.2 μM syringe filter) and the filtrate concentrated in vacuo to afford the title compound as a colourless gum (777 mg, 98%).

LCMS (Method 1): Rt=1.79 mins, MS m/z ES+ 1261.8 [M+H]+

Preparation 59

N-(2-(4-((2,5-Dioxo-2,5-dihydro-1H-pyrrol-1-yl)methyl)cyclohexane-1-carboxamido)ethyl)-4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamide]

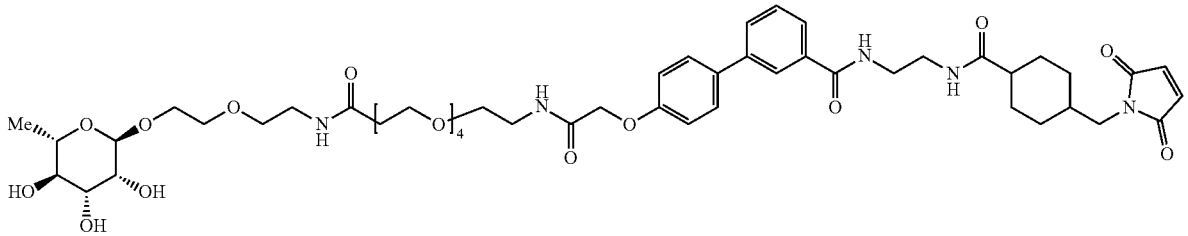

To N-(2-aminoethyl)-4'-((2,18-dioxo-24-(((2R,3R,4R,5R,6S)-3,4,5-trihydroxy-6-methyltetrahydro-2H-pyran-2-yl)oxy)-6,9,12,15,22-pentaoxa-3,19-diazatetracosyl)oxy)-[1,1'-biphenyl]-3-carboxamide (Preparation 2, 20 mg, 0.025 mmol) dissolved in dry DMF (200 μL) and DMSO (200 μL) was added TEA (10.5 μL, 0.075 mmol) followed by 2,5-dioxopyrrolidin-1-yl 4-[(2,5-dioxo-2,5-dihydro-1H-pyrrol-1-yl)methyl]cyclohexane-1-carboxylate (7.57 mg, 0.023 mmol) dissolved in DMF (200 μL) and the mixture stirred at room temperature for 16 hours. The reaction was concentrated in vacuo to afford the title compound as an orange oil (25.7 mg, 100%).

LCMS (Method 1): Rt=2.09 mins, ES+ MS m/z 1014.7 [M+H]+

Preparation 60

1,1'-((2,2'-((5-((2-(4-((2,5-Dioxo-2,5-dihydro-1H-pyrrol-1-yl)methyl)cyclohexane-1-carboxamido)ethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12-tetraoxapentadecan-15-amide)

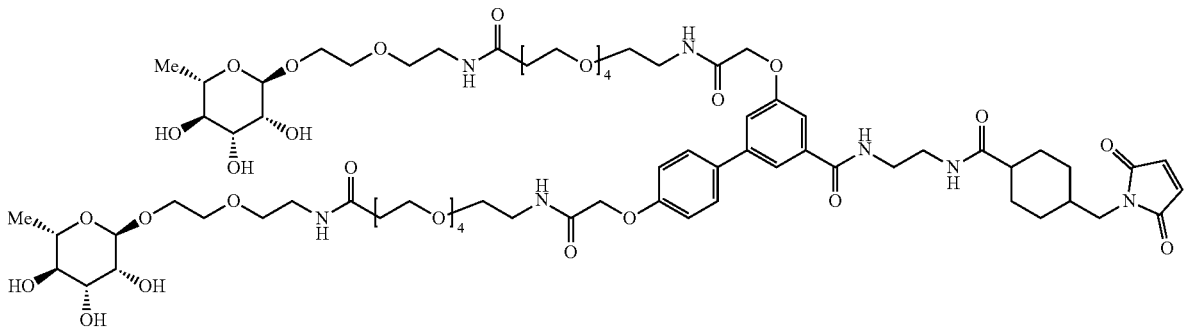

To 1,1'-((2,2'-((5-((2-aminoethyl)carbamoyl)-[1,1'-biphenyl]-3,4'-diyl)bis(oxy))bis(acetyl))bis(azanediyl))bis(N-(2-(2-(((2R,3R,4R,5R,6S)-3,4,5-trihydroxy-6-methyltetrahydro-2H-pyran-2-yl)oxy)ethoxy)ethyl)-3,6,9,12-tetraoxapentadecan-15-amide) (Preparation 24, 11.5 mg, 0.009 mmol) dissolved in dry DMF (115 µL) and DMSO (115 µL) was added TEA (3.6 µL, 0.026 mmol) followed by 2,5-dioxopyrrolidin-1-yl 4-[(2,5-dioxo-2,5-dihydro-1H-pyrrol-1-yl)methyl]cyclohexane-1-carboxylate (2.60 mg, 0.008 mmol) dissolved in DMF (115 µL) and the mixture stirred at room temperature for 16 hours. The reaction was concentrated in vacuo to afford the title compound as an orange oil (13.7 mg, 100%).

LCMS (Method 1): Rt=1.90 mins, ES$^+$ MS m/z 1570.3 [M+H]$^+$

Prophetic Preparations

Preparation 61

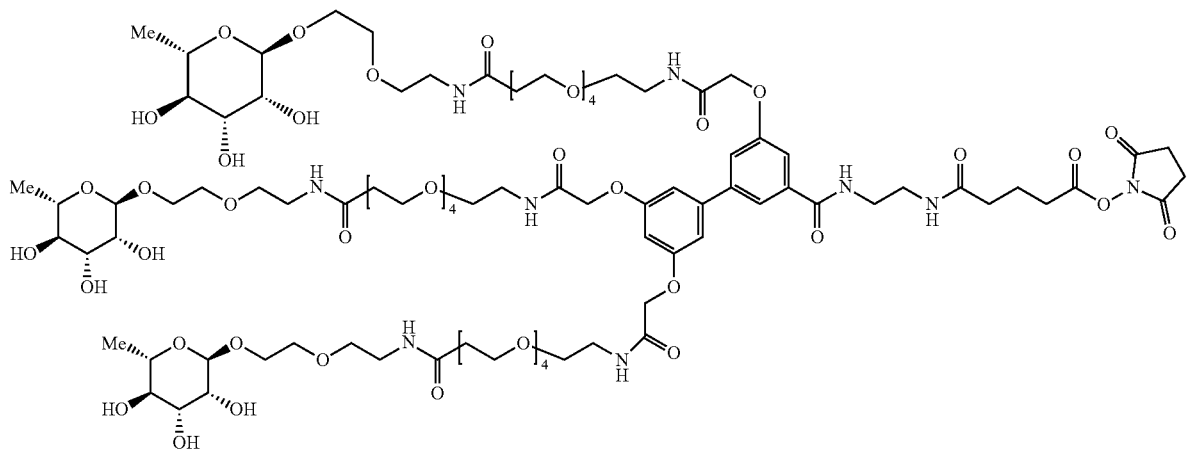

Preparation 61 may be prepared according to Method 1 for Preparation 1 using Preparation 62 and DSG.

Preparation 62

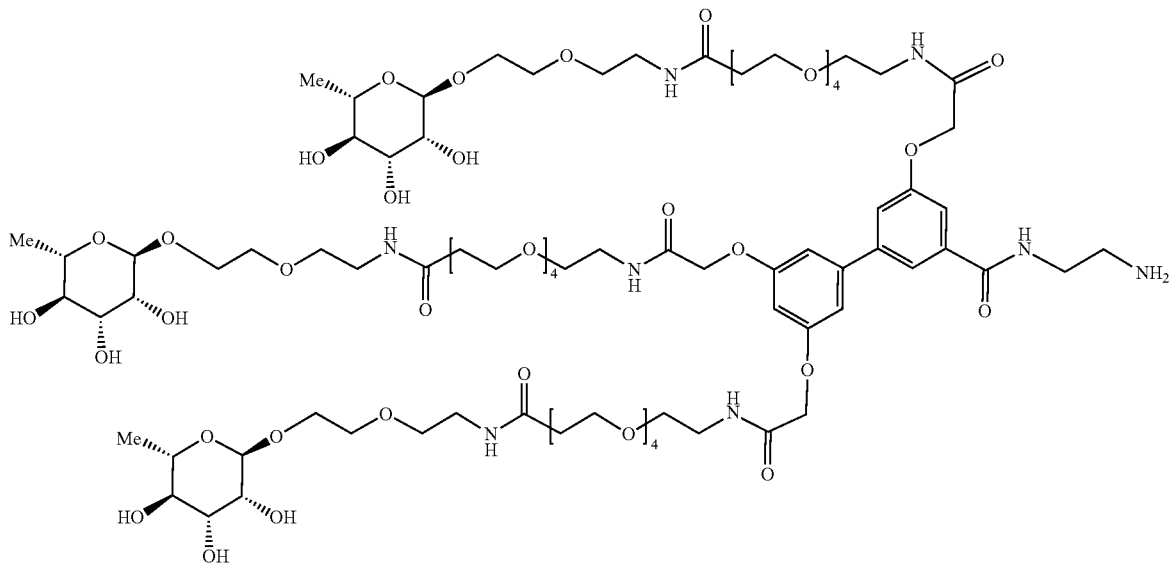

Preparation 62 may be prepared according to the procedures described for Preparation 2 using (2R,3R,4R,5R,6S)-2-(2-(2-aminoethoxy)ethoxy)-6-methyltetrahydro-2H-pyran-3,4,5-triol (Preparation 18) and the corresponding tricarboxylic acid benzyl ester (WO2017 060729).

EXAMPLES

Data for the respective Examples is exemplified in FIGS. 1-39.

Analysis of Monomer Content by Size Exclusion HPLC (SEC)

The aggregate content of each conjugate was assessed by chromatography on a TOSOH TSKgel G3000SWXL 7.8 mm×30 cm, 5 μm column at 0.5 mL/min in 10% IPA, 0.2M Potassium Phosphate, 0.25M Potassium Chloride, pH 6.95. Samples were loaded neat and data collected at 214, 252 and 280 nm. All reported data are at 280 nm.

MS Analysis Method 1

The Fab fragment conjugates were analysed by mass spectrometry as described below:
Instrument: Waters Synapt G2-Si Samples were introduced by microLC on a Waters Acquity m-class UPLC.

Method: 1 uL of each sample was desalted on-line on a microbore C4 column and the resulting mass/charge envelopes were processed with the maxent algorithm to give uncharged masses for the intact proteins.

MS Analysis Method 2

The Fab fragment conjugates were analysed by mass spectrometry as described below: Electrospray mass spectra were recorded on a Bruker micrOTOF-Q II mass spectrometer. An aliquot of each sample, corresponding to approximately 20 picomoles of protein was desalted on-line by reverse-phase HPLC on a Phenomenex Jupiter C4 column (5 μm, 300 Å, 2.0 mm×50 mm) running on an Agilent 1100 HPLC system at a flow rate of 0.2 ml/min using a short water, acetonitrile, 0.05% trifluoroacetic acid gradient. The eluent was monitored at 280 nm and then directed into the electrospray source, operating in positive ion mode, at 4.5 kV and mass spectra recorded from 500-3000 m/z. Data was analysed and deconvoluted to give uncharged protein masses with Bruker's Compass Data Analysis software.

LAR

Linker loading has either been calculated using MS analysis or estimated using SDS-PAGE Gel analysis. It will be appreciated that there will batch to batch variation with respect to the linker-antibody ratios (LARs). For example, certain linker-antibody combinations will generate varying LAR values.

Antibody (Cetuximab)

Cetuximab (Merck Serono; Lot No: 223155, exp: September. 2020, with a molecular weight of 152,000 Da was used for the conjugations below. Calculations were based on an $Abs_{0.1\%}$ 280 nm of 1.45 $cm^{-1}$ $mg/mL^{-1}$, a UV analysis of 4.7 mg/mL and calibration curves by SEC at 214 nm.

Cetuximab Preparation into Conjugation-Suitable Buffer

Cetuximab (20 mg) was bound to Protein A resin (GE Healthcare, HiTrap MabSelect Sure, 1 mL) and column washed with a solution of 50 mM KPi, 50 mM NaCl and 2 mM EDTA at pH=8. The antibody was eluted with 100 mM citrate buffer at pH=3 and buffer exchanged into Lysine conjugation buffer (50 mM NaPi, 150 mM NaCl, 2 mM EDTA, pH=8) with concentration to approximately 6 mg/mL. The solution was analysed by SEC to afford cetuximab in a solution suitable for lysine conjugation (18.2 mg, 91% yield, at 6.4 mg/mL, 100% monomer content).

Digestion of Cetuximab to Cetuximab-Fab

Cetuximab (60 mg, 4.7 mg/mL) was buffer exchanged into digestion buffer (20 mM NaPi, 20 mM cysteine, 10 mM EDTA at pH=7) and concentrated to 3 mL at 20 mg/mL. Immobilised papain (3 mL, Thermo Fisher #20341, loading: 250 ug/mL resin, activity: 16-40 BAEE/mg papain) was equilibrated in digestion buffer and incubated with the concentrated cetuximab at 37° C. for 15 hours. The digest products were collected by filtration and eluted through a protein A column. The non-binding Fab fragments passed through the column and the flow through was collected. The Fab fragments were subject to discontinuous diafiltration via vivaspin centrifugation (10 kDa MWCO filter) into 50 mM NaPi, 150 mM NaCl and 2 mM EDTA at pH=8. The final concentration achieved was 5.6 mg/mL (see FIG. 5).

Antibody (Rituximab)

Rituximab (Roche-Rituxan, Lot No: B6105B92U1) formulated in polysorbate 80 (0.7 mg/mL) with sodium citrate dehydrate (7.35 mg/mL) sodium chloride (9 mg/mL) and water. Rituximab was pH adjusted to pH=7.9 with 500 mM phosphate buffer (50 mM NaPi, 150 mM NaCl, 2 mM EDTA, pH=8).

Digestion of Rituximab to Rituximab-fAb

Rituximab (60 mg, 4.7 mg/mL) was buffer exchanged into digestion buffer (20 mM NaPi, 20 mM cysteine, 10 mM EDTA at pH=7) and concentrated to 20 mg/mL. Immobilised papain (w/w 1/160, Thermo Fisher #20341, loading: 250 ug/mL resin, activity: 16-40 BAEE/mg papain) was equilibrated in digestion buffer and incubated with the concentrated rituximab at 37° C. for 5-18 hours. The digest products were collected by filtration and eluted through a protein A column. The non-binding Fab fragments passed through the column and the flow through was collected. The Fab fragments were subject to discontinuous diafiltration via vivaspin centrifugation (10 kDa MWCO filter) into 50 mM NaPi, 150 mM NaCl and 2 mM EDTA at pH=8. (see FIG. 34).

General mAb Lysine Conjugation Method

The antibody was formulated at concentrations ~8 mg/mL in phosphate/EDTA buffer at ~pH 8 and incubated with the desired molar equivalents of desired linker as described below: To a solution of Cetuximab (50 mM NaPi, 150 mM NaCl, 2 mM EDTA pH7.8, at initial 7.8 mg/mL concentration) was added a solution of the desired NHS linker (100 mM/DMSO with 6% v/v DMF). The reaction was incubated at 30° C. for 2 hours at a protein concentration of 7.3 mg/mL, then quenched by the addition of glycine to a final 1 mM concentration. The conjugate was desalted into PBS pH7.4 via G25 resin filtration. The residual NHS linker was removed via 8-12× diavolume diafiltration in PBS pH7.4 with a 30 kDa MWCO filter. The conjugate was filtered (0.2 μm filtration) and stored at −80° C.

General fAb Lysine Conjugation Method

The antibody fragment was formulated at concentrations~8 mg/mL in phosphate/EDTA buffer at~pH 8 and incubated with the desired molar equivalents of desired linker as described below:

To a solution of Cetuximab-fAb (50 mM NaPi, 150 mM NaCl, 2 mM EDTA pH7.8, at initial 7.7 mg/mL concentration) was added a solution of the desired NHS linker (100 mM/DMSO with 6% v/v DMF). The reaction was incubated at 30° C. for 2 hours at a protein concentration of 7.2 mg/mL, then quenched by the addition of glycine to a final 1 mM concentration. The conjugate was desalted into PBS pH7.4 via G25 resin filtration. The residual NHS linker was removed via 7-12× diavolume diafiltration in PBS pH7.4 with a 10 kDa MWCO filter. The conjugate was filtered (0.2 μm filtration) and stored at −80° C.

General mAb Cysteine Conjugation Method

The antibody was formulated at concentrations~8 mg/mL in phosphate/EDTA buffer at ~ pH 8, TCEP reduced and subsequently incubated with the desired molar equivalents of desired linker as described below:

To achieve the desired number of reactive cysteines for conjugation the antibody interchain disulphides were partially reduced with a mild reductant (TCEP) at 20° C. for 90 minutes. The extent of reduction was analysed through addition of an excess of a maleimide-linked auristatin, with the drug-loading analysed by hydrophobic interaction chromatography (HIC).

The maleimide-linker was dissolved in a compatible polar solvent (DMA, DMSO, DMF) and was added in sufficient excess to achieve full conjugation of the reactive interchain cysteines. The conjugation was performed at 20° C. for 1 hour, at <20% v/v co-solvent, pH 8.

The conjugation reaction was quenched through addition of N-acetyl cysteine at 1:1 equivalent to the maleimide-linker. The conjugate was formulated by G-25 resin purification, with additional concentration/diafiltration followed by 0.2 µm filtration of the isolated product.

Examples 1-4 and Examples 21-40 were prepared according to the general mAb/fAb lysine or cysteine conjugation protocols using the stated molar equivalents of NHS- or Mal-terminated linkers.

Example 1

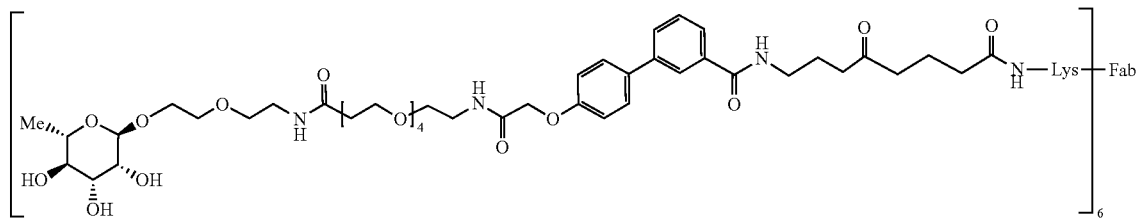

Example 1 was prepared according to the General Lysine Conjugation Method using 20 equivalents of Preparation 1 (Method 1) and cetuximab-Fab.

Av. LAR: 6; Av. total no of rhamnose units: 6. MS (Method 1): 55138 (amu 892)

Figure 1B:
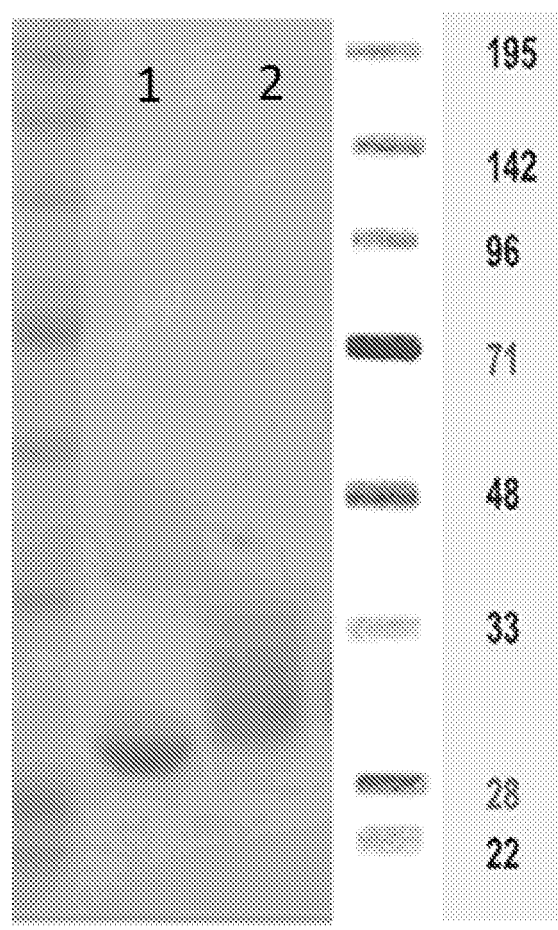
Figure 1C:
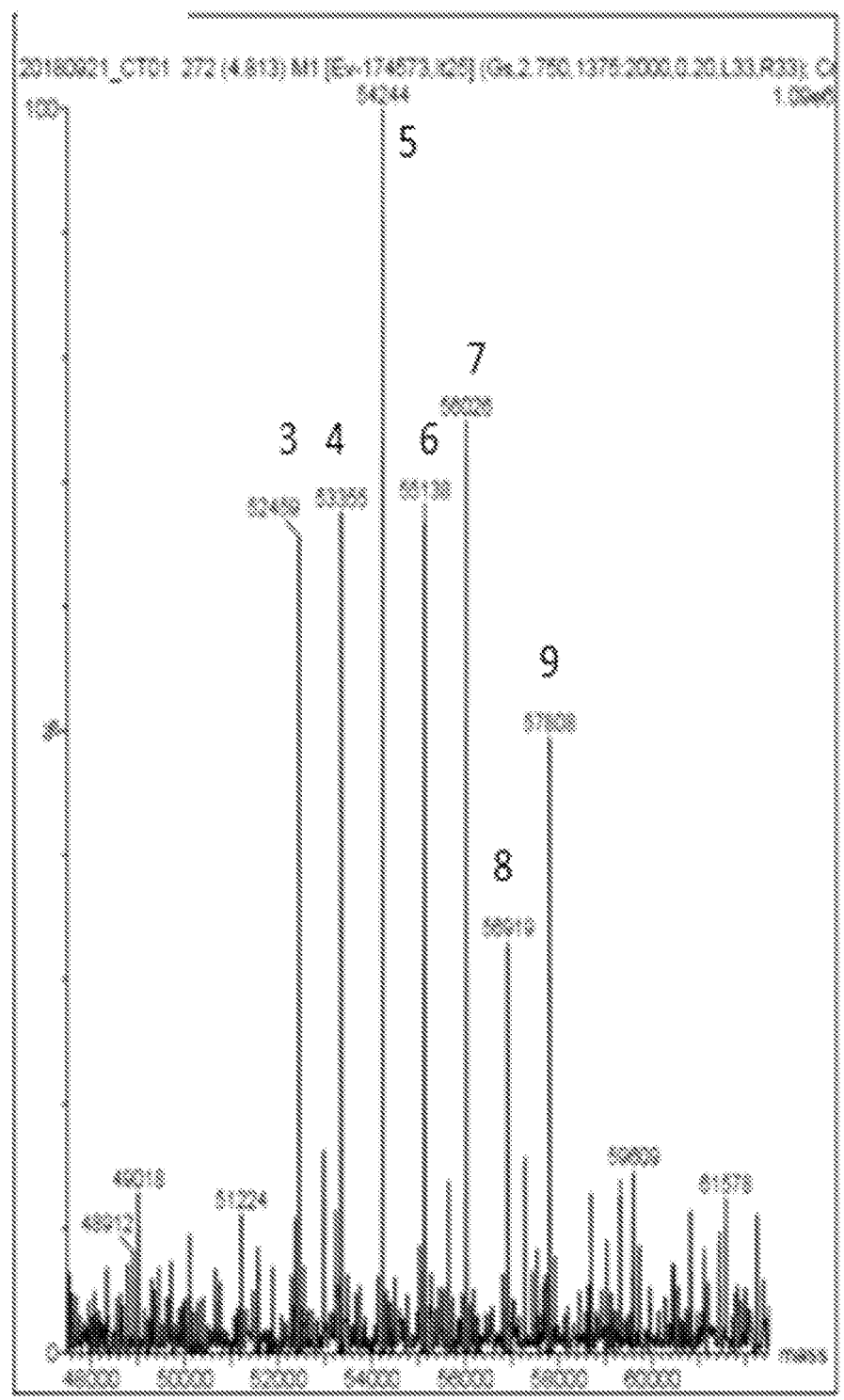

SEC Analysis: Rt=18.623 minutes, 98.4% monomer content (FIG. 1)

Example 2

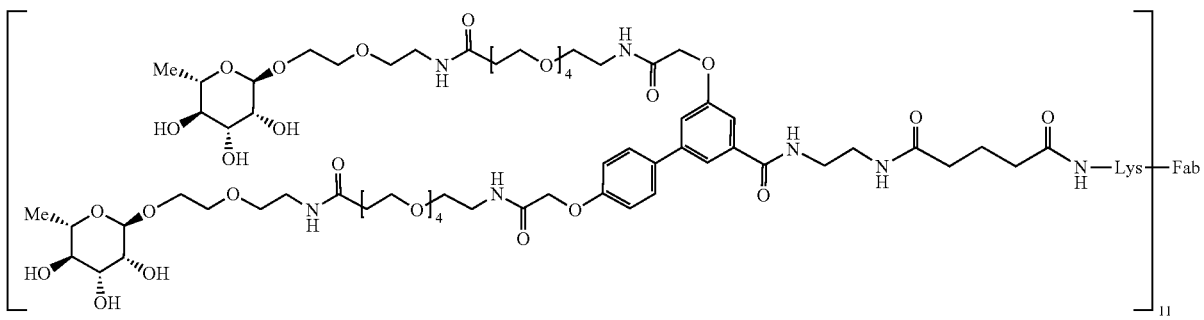

Example 2 was prepared according to the General Lysine Conjugation Method using 20 equivalents of Preparation 23 (Method 1) and cetuximab-Fab.

Av. LAR: 11; Av. total no of rhamnose units: 22. MS (Method 1): 65691 (amu 1446)

Figure 2A:
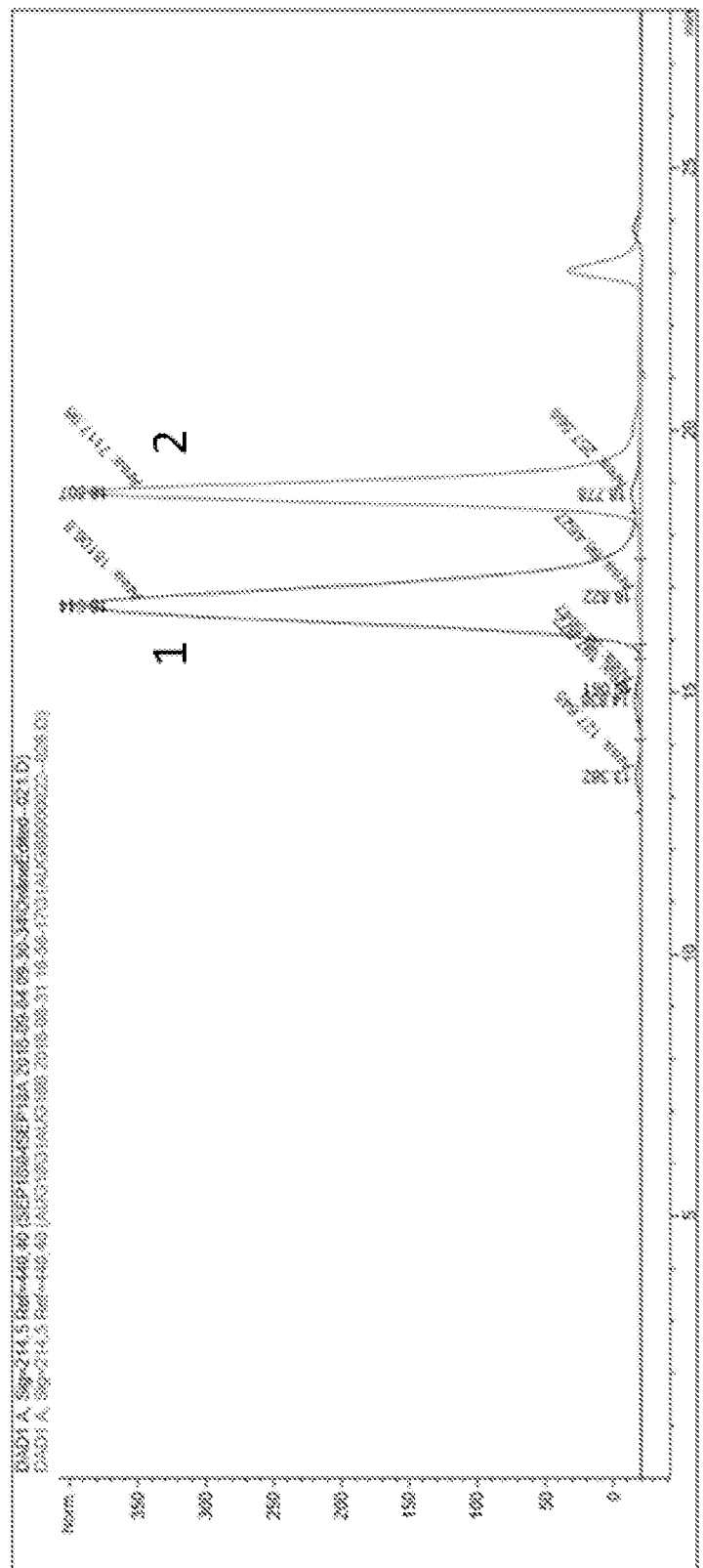
FIG. 2: (A) SEC analysis of Example 2 (peak labelled "1") and Cetuximab-Fab (peak labelled "2"); (B) SDS-PAGE analysis of Example 2 (lane 2) and Cetuximab-Fab (lane 1); and (C) MS analysis of Example 2.
Figure 2B:
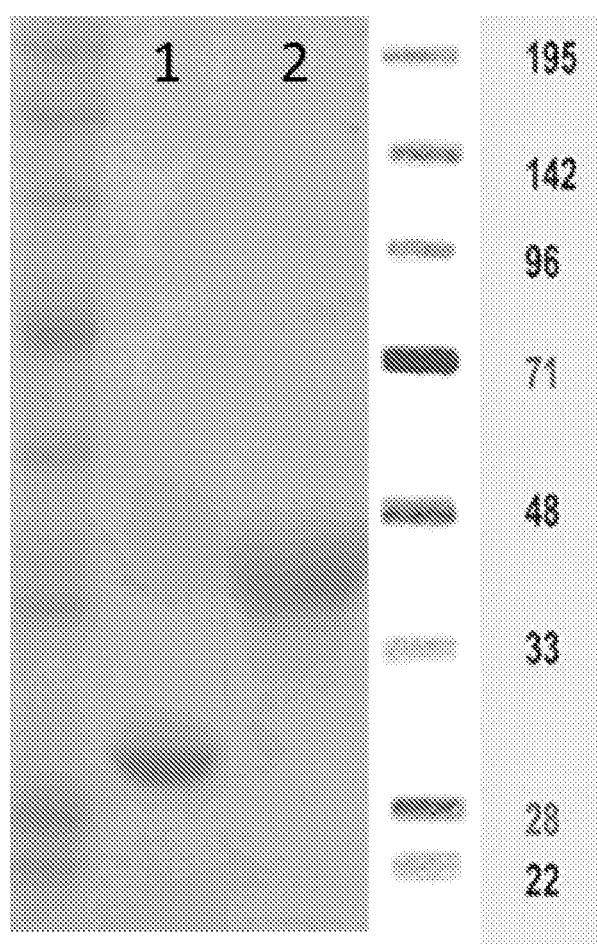
Figure 2C:
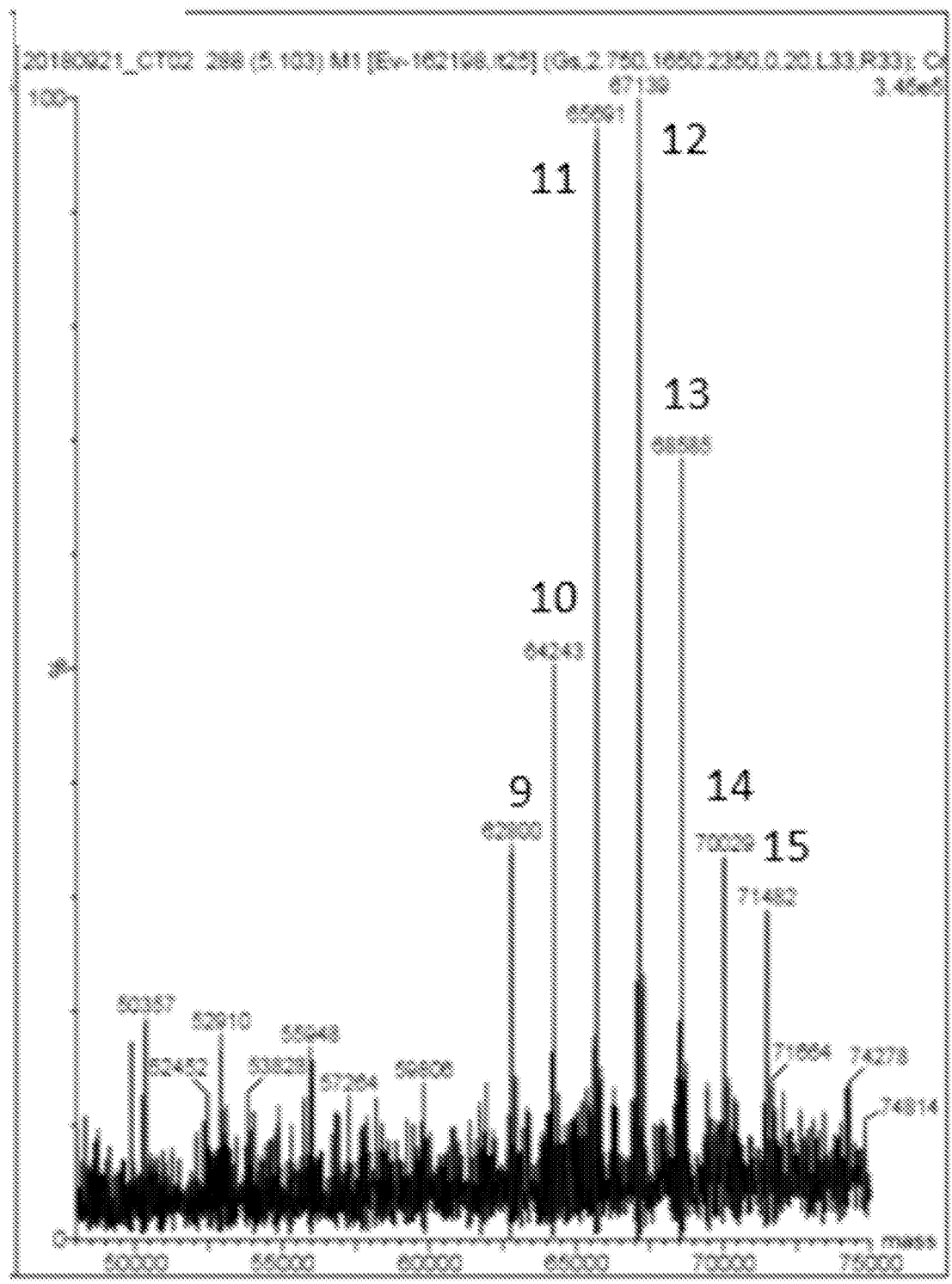

SEC Analysis: Rt=16.644 minutes, 96.9% monomer content (FIG. 2)

Example 3

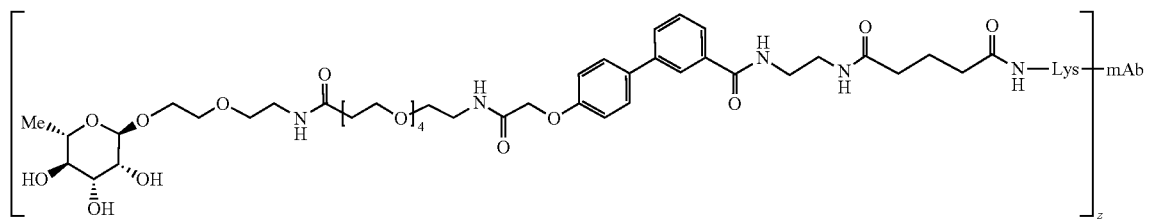

Example 3 was prepared according to the General Lysine Conjugation Method using 40 equivalents of Preparation 1 (Method 1) and cetuximab.

Estimated Av. LAR: z=12-18; Av. total no of rhamnose units: 12-18

Figure 3A:
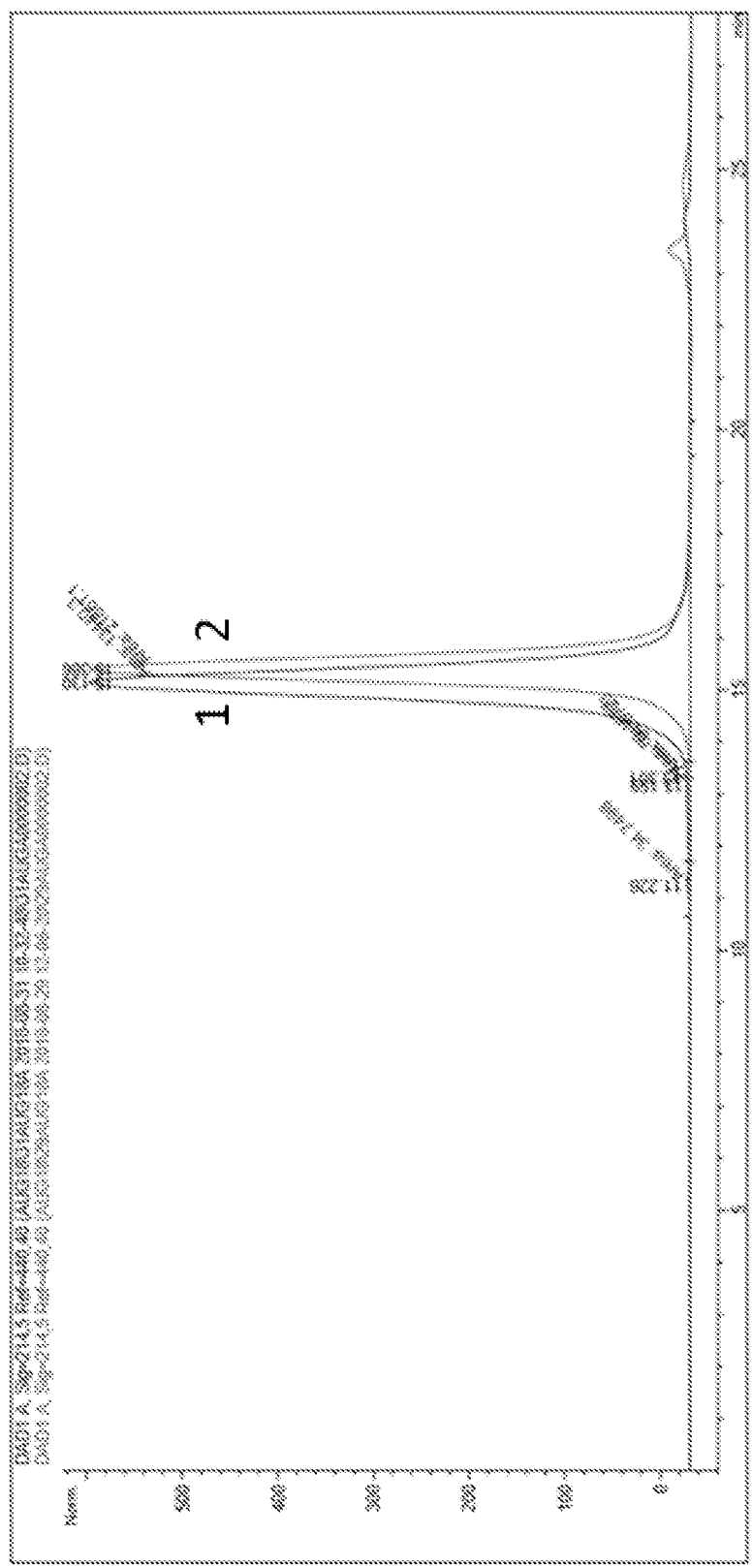
FIG. 3: (A) SEC analysis of Example 3 (peak labelled "1") and Cetuximab (peak labelled "2"); and (B) SDS-PAGE analysis of Example 3 (lane 2) and Cetuximab (lane 1).
Figure 3B:
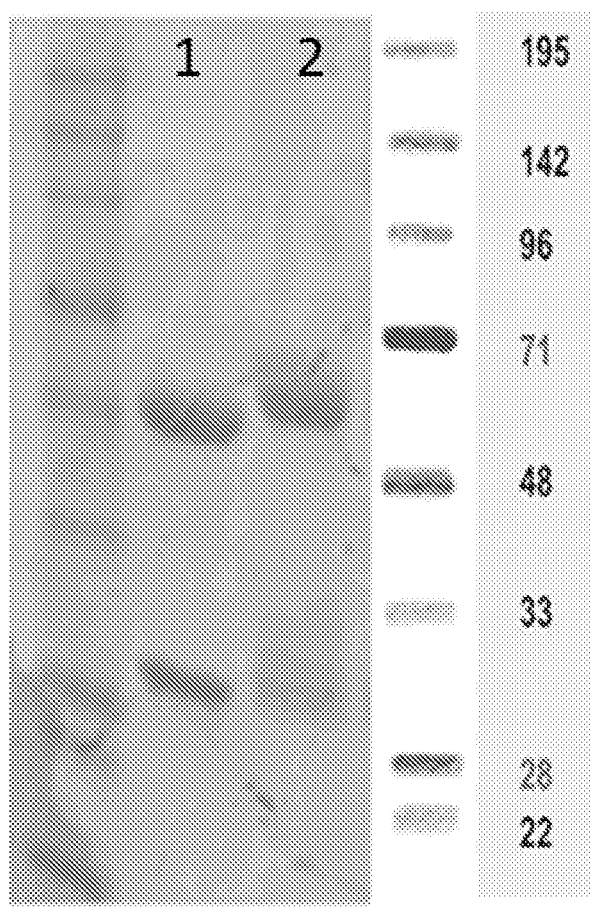

SEC Analysis: Rt=15.380 minutes, 99.0% monomer content (FIG. 3)

Example 4

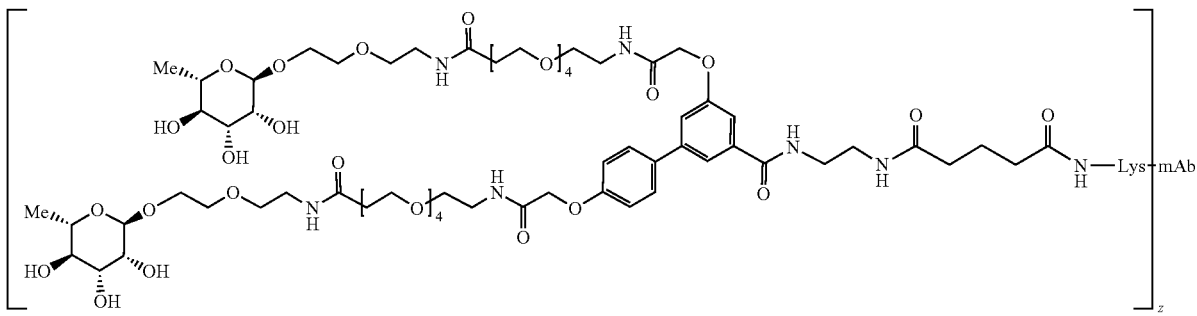

Example 4 was prepared according to the General Lysine Conjugation Method using 40 equivalents of Preparation 23 (Method 1) and cetuximab.

Estimated Av. LAR: z=12-18; Av. total no of rhamnose units: 24-36

Figure 4A:
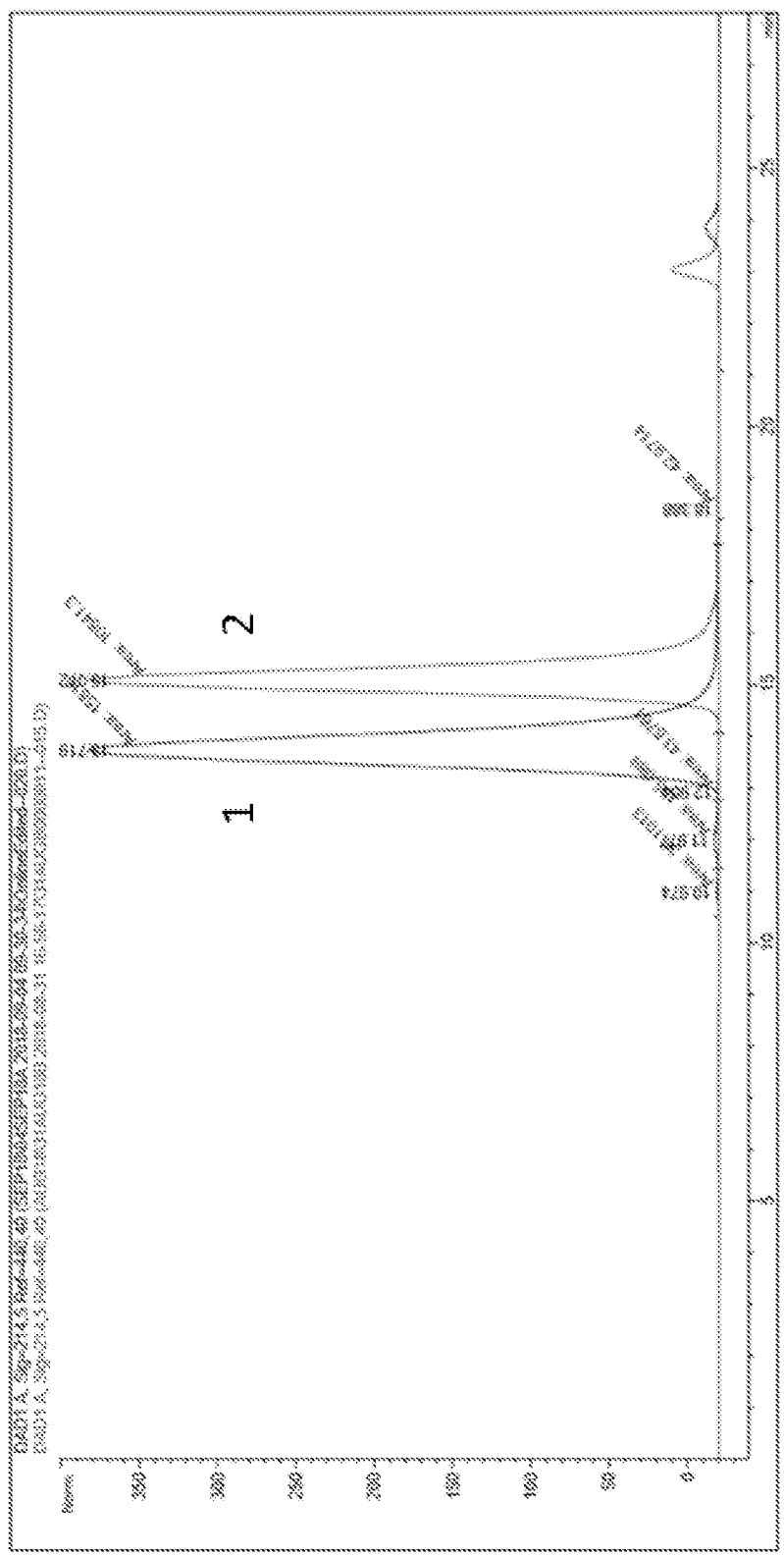
FIG. 4: (A) SEC analysis of Example 4 (peak labelled "1") and Cetuximab (peak labelled "2"); and (B) SDS-PAGE analysis of Example 4 (lane 2) and Cetuximab (lane 1).
Figure 4B:
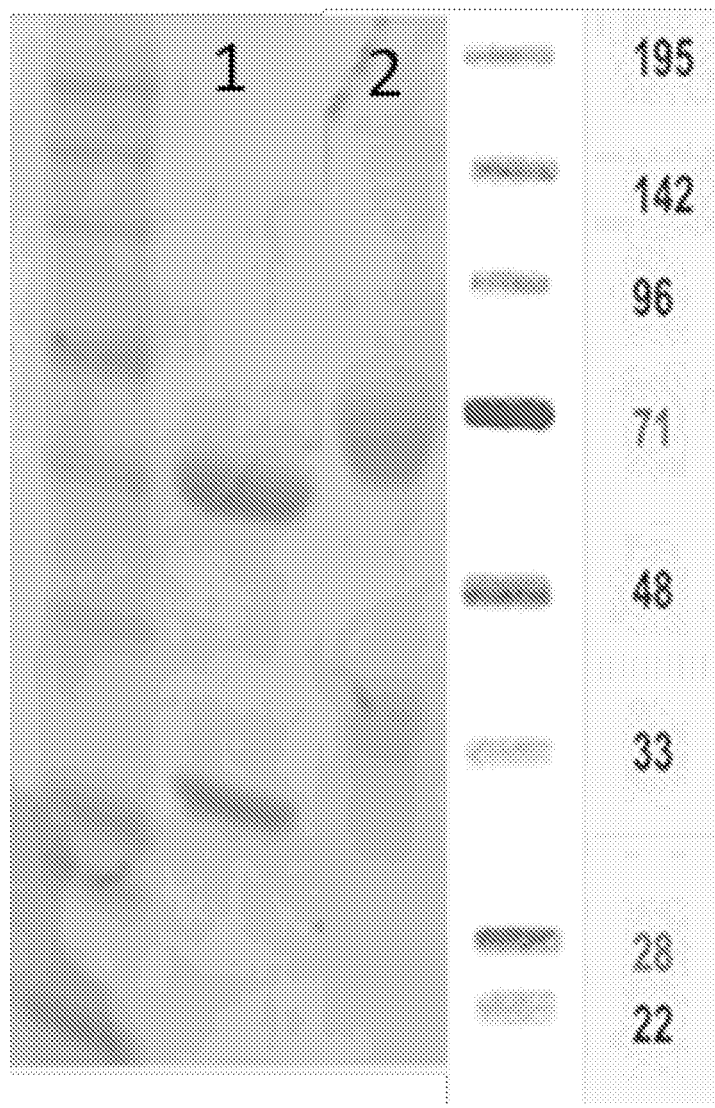
Figure 5A:
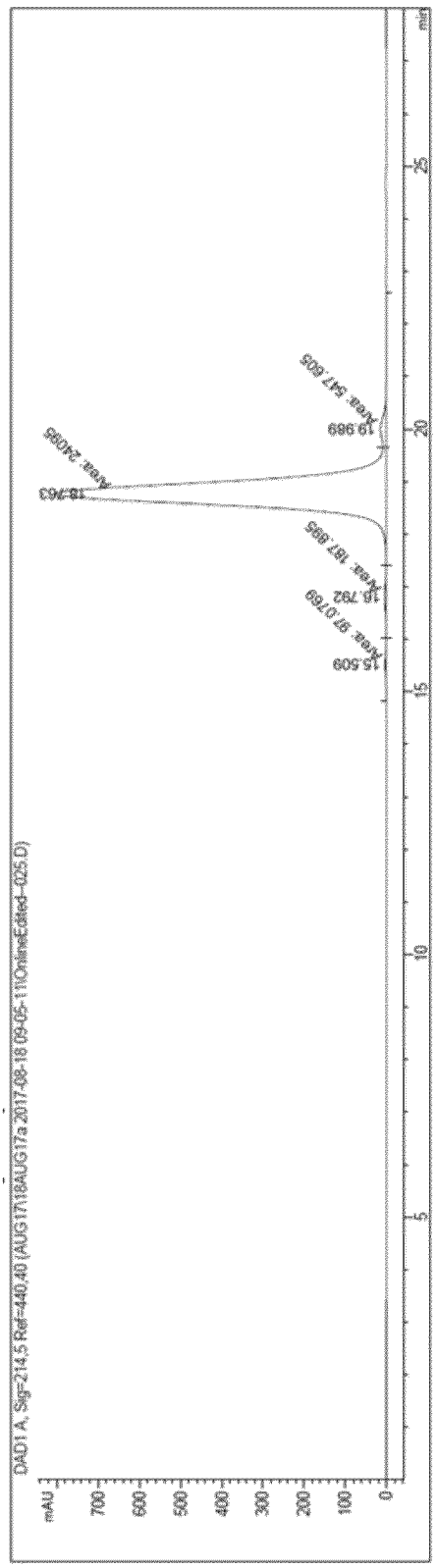
FIG. 5: (A) SEC analysis of cetuximab-Fab; (B) SDS-PAGE analysis of cetuximab-Fab; and (C) MS analysis of cetuximab-Fab.
Figure 5B:
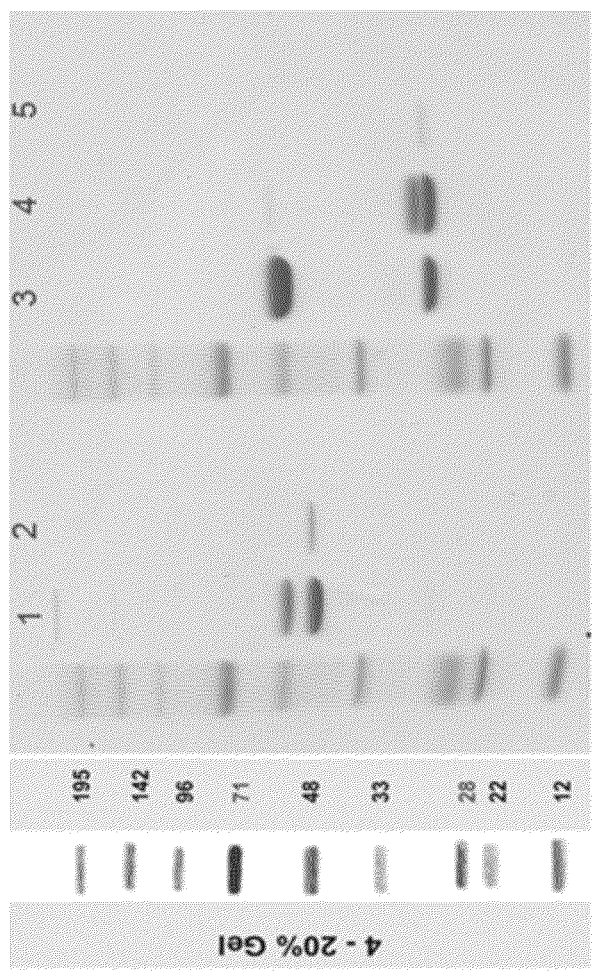
Figure 5C:
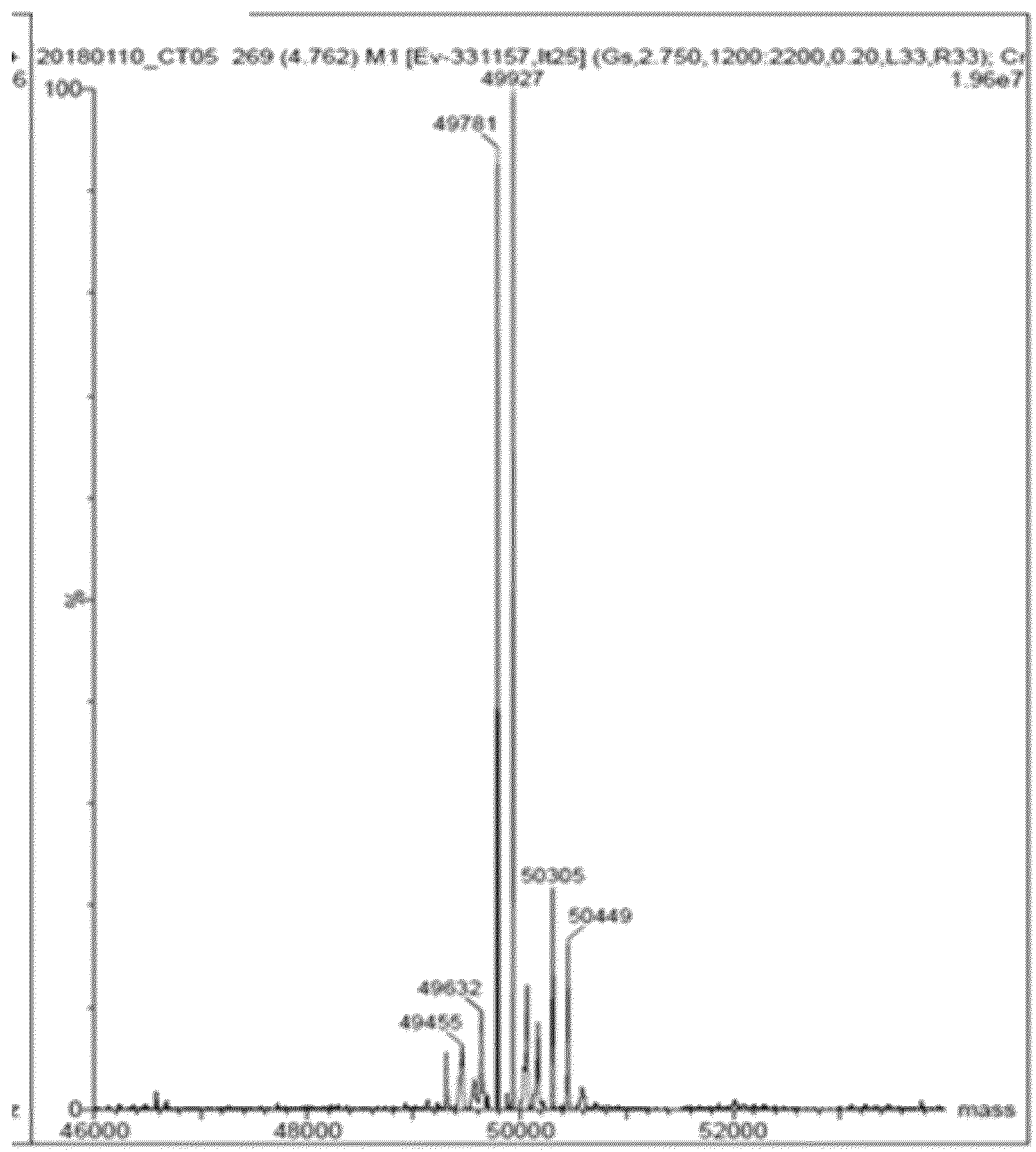

SEC Analysis: Rt=13.719 minutes, 99.1% monomer content (FIG. 4)

Example 21

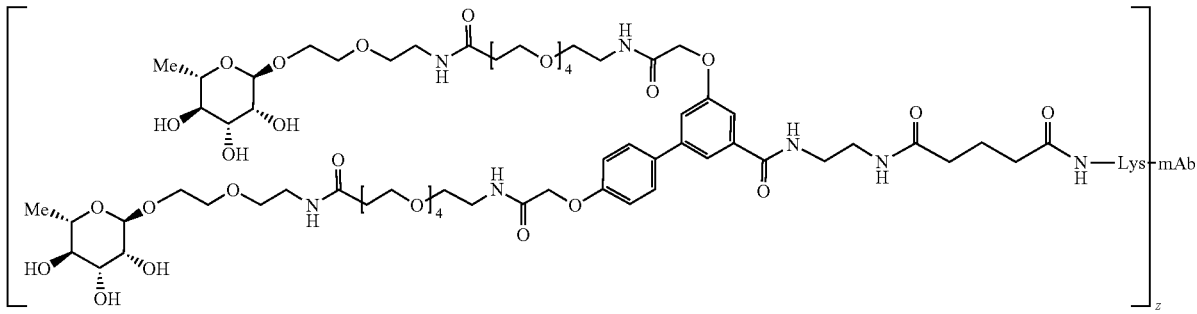

Example 21 may be prepared according to the General Lysine Conjugation Method using 60 equivalents of Preparation 23 (Method 1) and cetuximab.

Est. Av. LAR wherein z=>18

SEC Analysis: Rt=13.91 minutes, 99.0% monomer content

Example 22

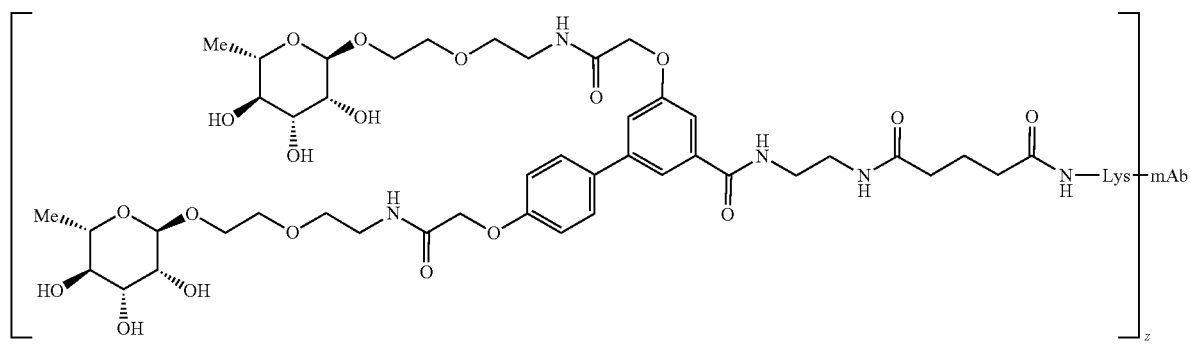

Example 22 may be prepared according to the General Lysine Conjugation Method using 40 equivalents of Preparation 41 and cetuximab.

Est. Av. LAR wherein z=12-18

SEC Analysis: Rt=14.67 minutes, 92.0% monomer content

Example 23

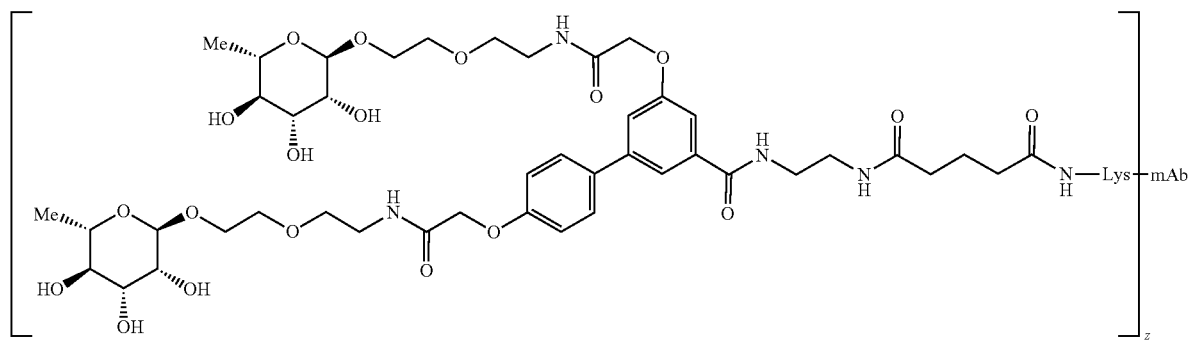

Example 23 may be prepared according to the General Lysine Conjugation Method using 60 equivalents of Preparation 41 and cetuximab.

Est. Av. LAR wherein z=>18

SEC Analysis: Rt=14.54 minutes, 90.0% monomer content

Example 24

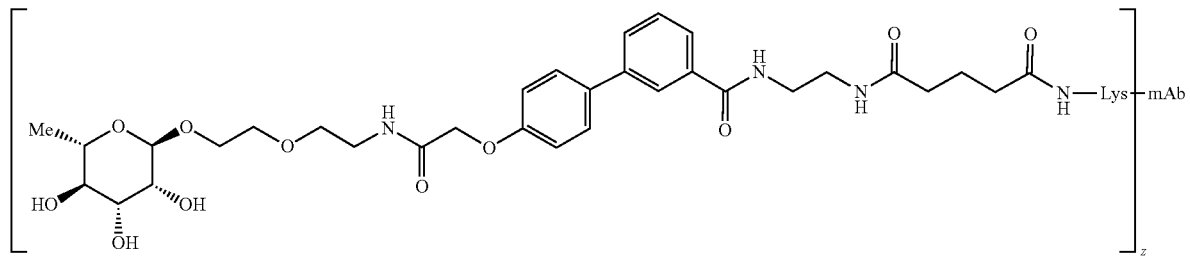

Example 24 may be prepared according to the General Lysine Conjugation Method using 60 equivalents of Preparation 36 and cetuximab.

Est. Av. LAR wherein z=>18

SEC Analysis: Rt=15.37 minutes, 92.0% monomer content

Example 25

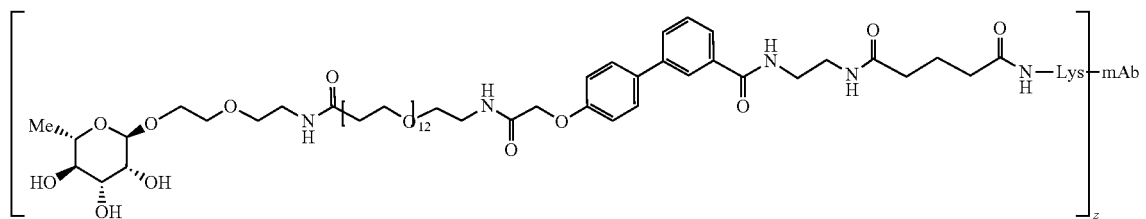

Example 25 may be prepared according to the General Lysine Conjugation Method using 60 equivalents of Preparation 46 and cetuximab.

Est. Av. LAR wherein z=>18

SEC Analysis: Rt=13.64 minutes, 99.0% monomer content

Example 26

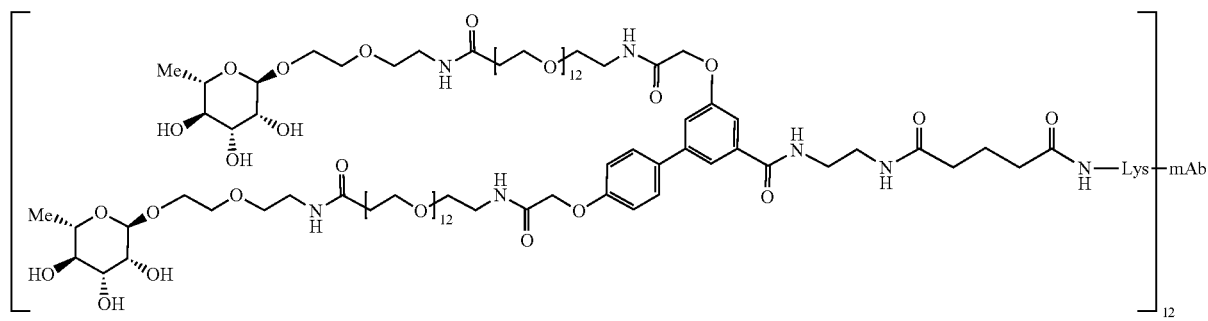

Example 26 may be prepared according to the General Lysine Conjugation Method using 60 equivalents of Preparation 52 and cetuximab.

Est. Av. LAR wherein z=>18

SEC Analysis: Rt=13.02 minutes, 100.0% monomer content

Example 27

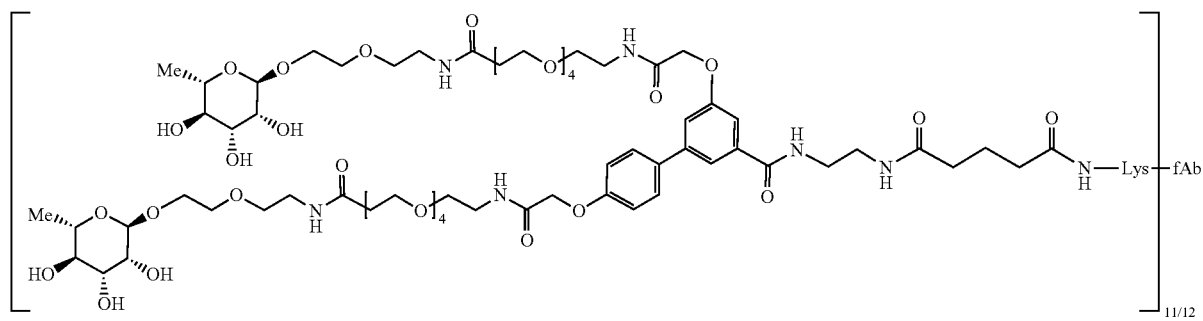

Example 27 may be prepared according to the General Lysine Conjugation Method using 30 equivalents of Preparation 23 (Method 1) and cetuximab-fAb.

Av. LAR wherein z=11-12. MS (Method 2): 65686/67132 (amu 1446)

SEC Analysis: Rt=15.94 minutes, 99.0% monomer content

Example 28

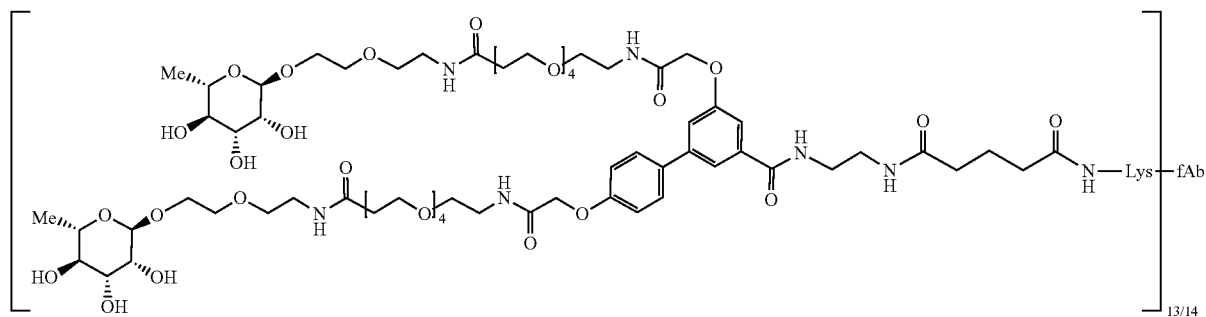

Example 28 may be prepared according to the General Lysine Conjugation Method using 40 equivalents of Preparation 23 (Method 1) and cetuximab-fAb.

Av. LAR wherein z=13-14. MS (Method 2): 65686/67132 (amu 1446)

SEC Analysis: Rt=16.74 minutes, 97.0% monomer content

Example 29

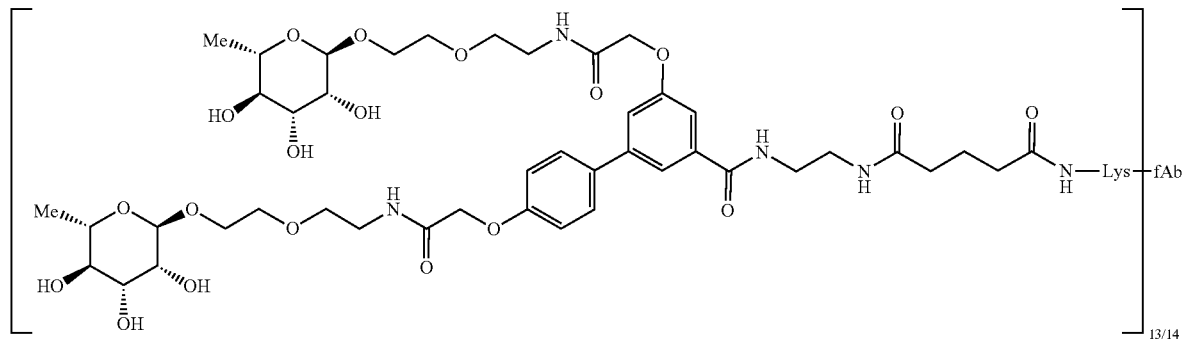

Example 29 may be prepared according to the General Lysine Conjugation Method using 40 equivalents of Preparation 41 and cetuximab-fAb.

Av. LAR wherein z=13-14. MS (Method 2): 65953/66902 (amu 952)

SEC Analysis: Rt=17.50 minutes, 92.0% monomer content

Example 30

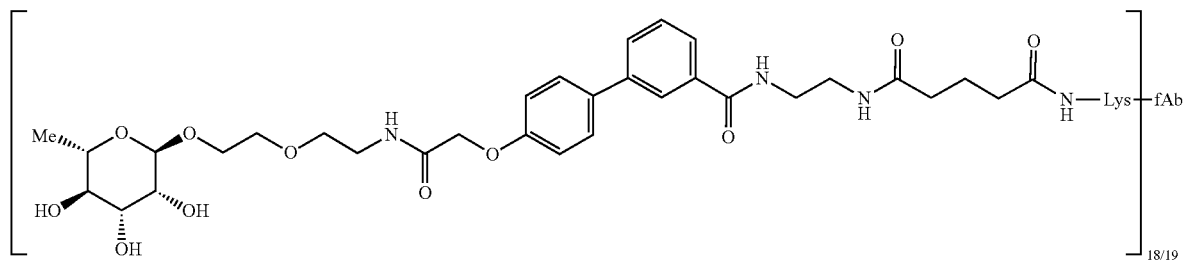

Example 30 may be prepared according to the General Lysine Conjugation Method using 40 equivalents of Preparation 36 and cetuximab-fAb.

Av. LAR wherein z=18-19. MS (Method 2): 61370/62013 (amu 645)

SEC Analysis: Rt=18.50 minutes, 94.0% monomer content

Example 31

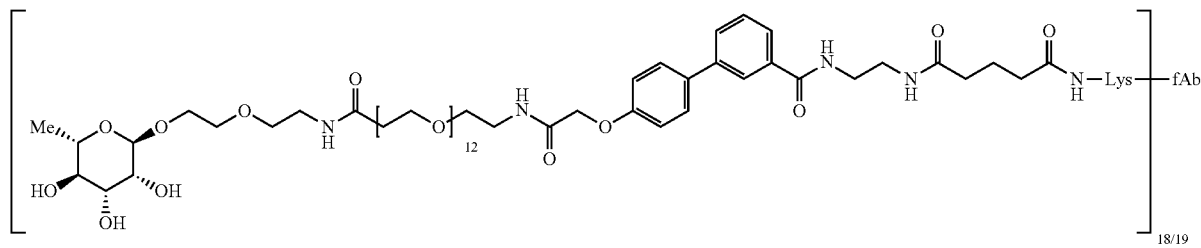

Example 31 may be prepared according to the General Lysine Conjugation Method using 40 equivalents of Preparation 46 and cetuximab-fAb.

Av. LAR wherein z=18-19. MS (Method 2): 72168/73410 (amu 1244)

SEC Analysis: Rt=16.50 minutes, 92.0% monomer content

Example 32

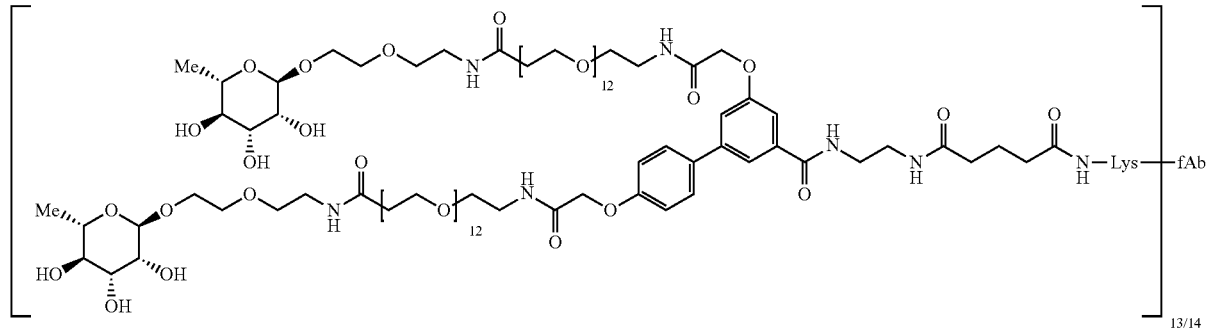

Example 32 may be prepared according to the General Lysine Conjugation Method using 40 equivalents of Preparation 52 and cetuximab-fAb.

Av. LAR wherein z=13-14. MS (Method 2): 77739/79889 (amu 2151)

SEC Analysis: Rt=15.60 minutes, 99.0% monomer content

Example 33

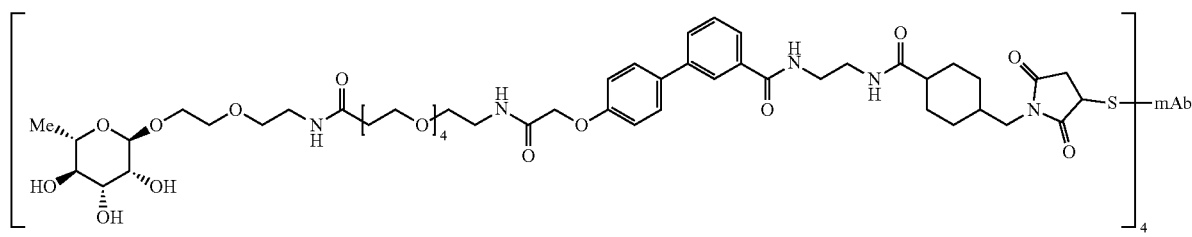

Example 33 may be prepared according to the General Cysteine Conjugation Method using 8 equivalents of Preparation 59 and cetuximab.

Est. Av. LAR wherein z=4

SEC Analysis: Rt=15.45 minutes, 99.3% monomer content

Example 34

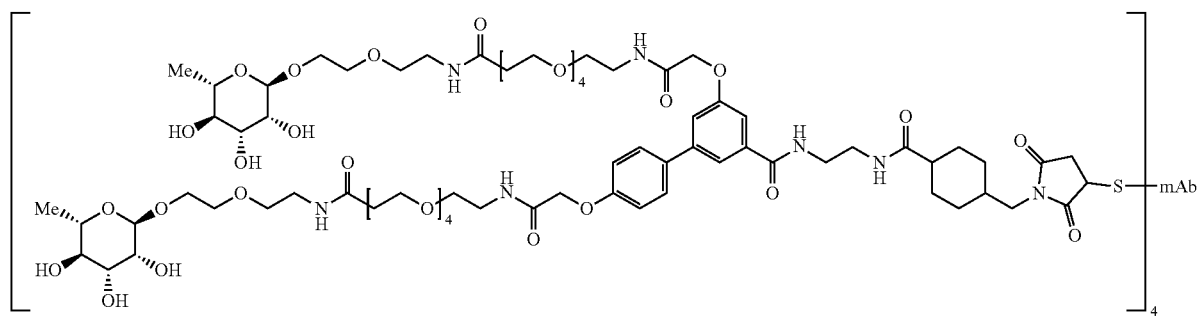

Example 34 may be prepared according to the General Cysteine Conjugation Method using 6 equivalents of Preparation 60 and cetuximab.

Est. Av. LAR wherein z=4

SEC Analysis: Rt=15.43 minutes, 98.7% monomer content

Example 35

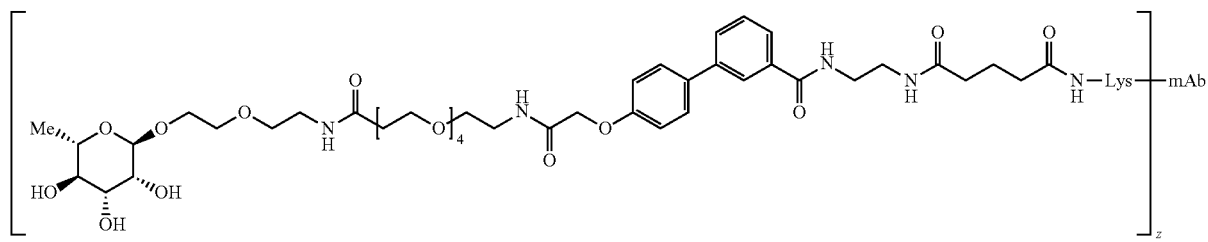

Example 35 may be prepared according to the General Lysine Conjugation Method using 10 equivalents of Preparation 1 (Method 2) and cetuximab.

Est. Av. LAR wherein z=5-6

SEC Analysis: Rt=15.06 minutes, 99.6% monomer content

Example 36

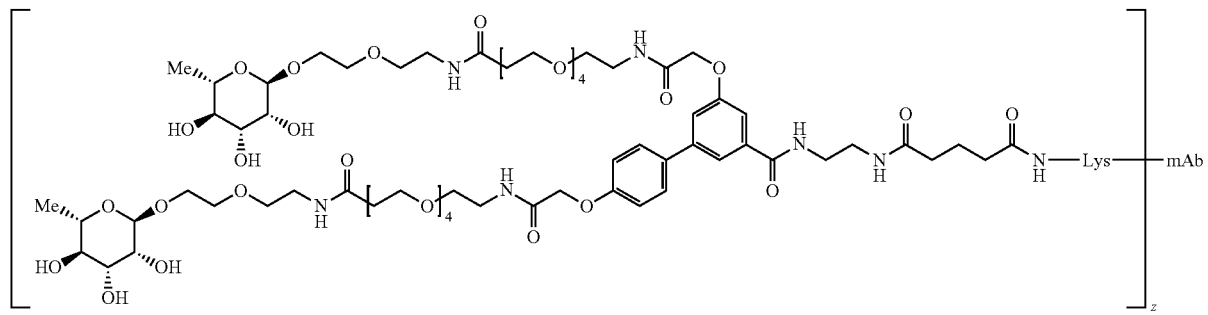

Example 36 may be prepared according to the General Lysine Conjugation Method using 10 equivalents of Preparation 23 (Method 2) and cetuximab.

Est. Av. LAR wherein z=5-6

SEC Analysis: Rt=14.77 minutes, 99.5% monomer content

Example 37

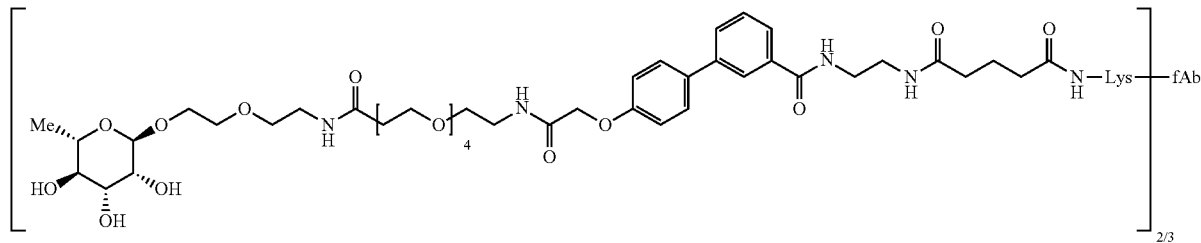

Example 37 may be prepared according to the General Lysine Conjugation Method using 10 equivalents of Preparation 1 (Method 2) and cetuximab-fAb.

Av. LAR wherein z=2-3. MS (Method 2): 51568/52456 (amu 892)

SEC Analysis: Rt=18.62 minutes, 99.0% monomer content

Example 38

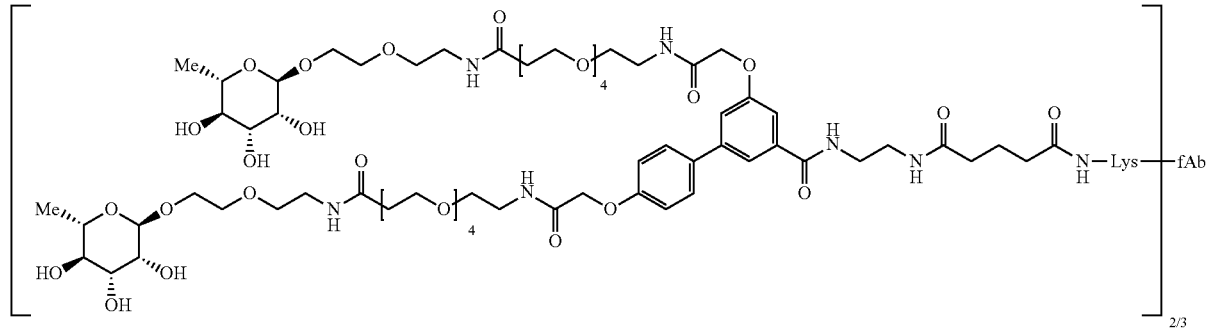

Example 38 may be prepared according to the General Lysine Conjugation Method using 10 equivalents of Preparation 23 (Method 2) and cetuximab-fAb.

Av. LAR wherein z=2-3. MS (Method 2): 52677/54122 (amu 1446)

SEC Analysis: Rt=18.24 minutes, 98.9% monomer content

Example 39

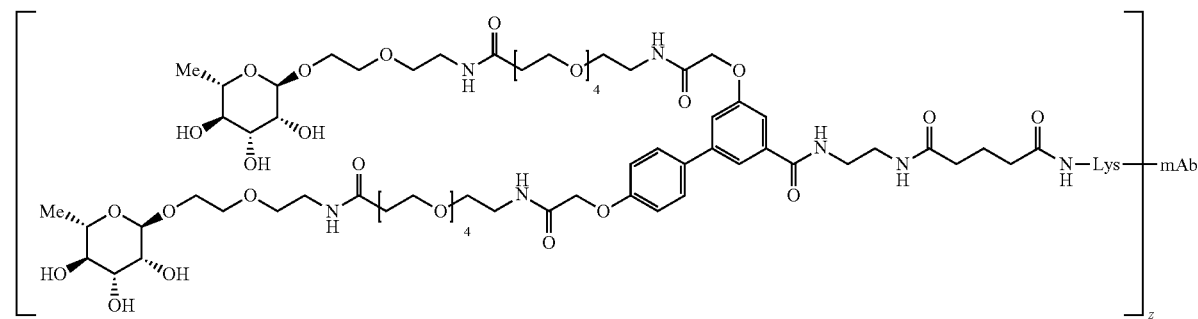

Example 39 may be prepared according to the General Lysine Conjugation Method using 40 equivalents of Preparation 23 and rituximab.

Est. Av. LAR wherein z=12-18

SEC Analysis: Rt=13.79 minutes, 99.2% monomer content

Example 40

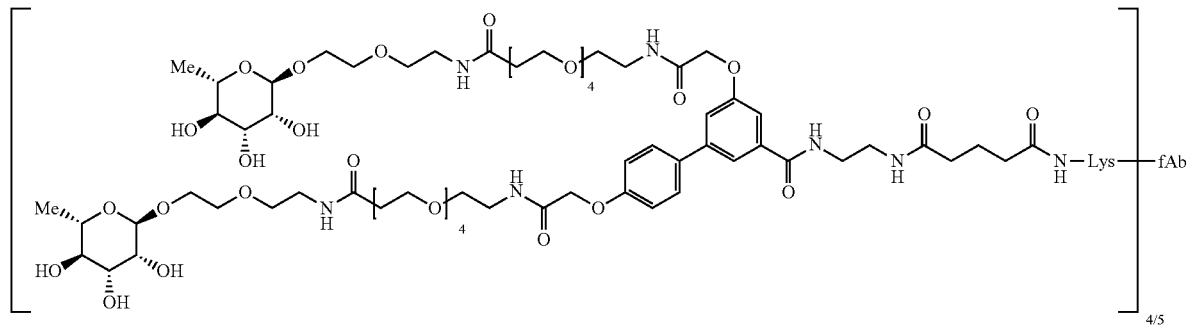

Example 40 may be prepared according to the General Lysine Conjugation Method using 20 equivalents of Preparation 23 (Method 2) and rituximab-fAb.

Av. LAR wherein z=4-5. MS (Method 2): 52961/54406 (amu 1446)

SEC Analysis: Rt=7.69 minutes, 97.2% monomer content

Prophetic Examples

Examples 5 to 20 may be prepared as described below:

Example 5

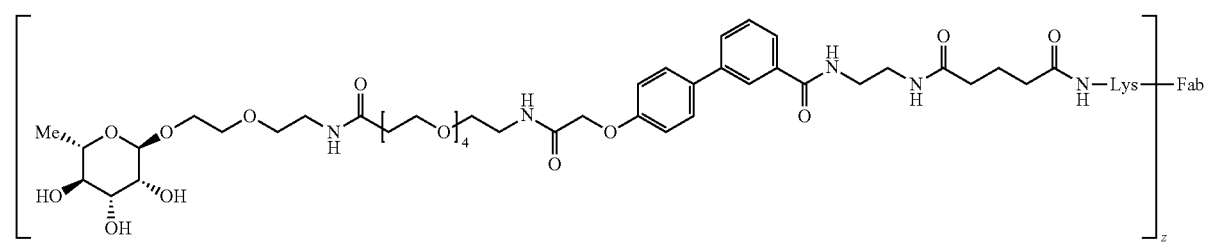

Example 5 may be prepared according to the General Lysine Conjugation Method using 40 equivalents of Preparation 1 (Method 1) and cetuximab-Fab.

Est. Av. LAR wherein z=12

Example 6

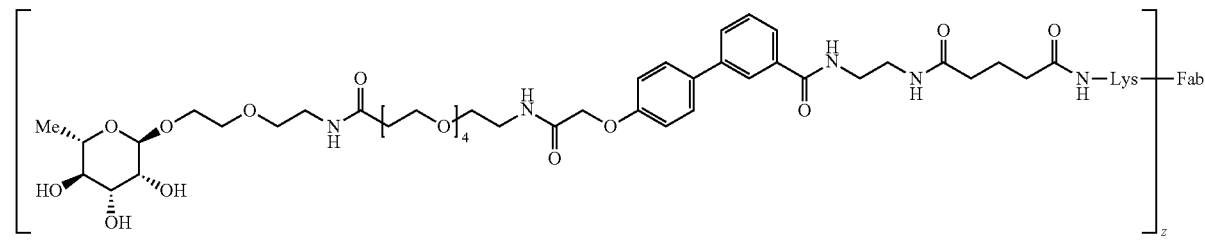

Example 6 may be prepared according to the General Lysine Conjugation Method using 60 equivalents of Preparation 1 (Method 1) and cetuximab-Fab.

Est. Av. LAR wherein z=15

Example 7

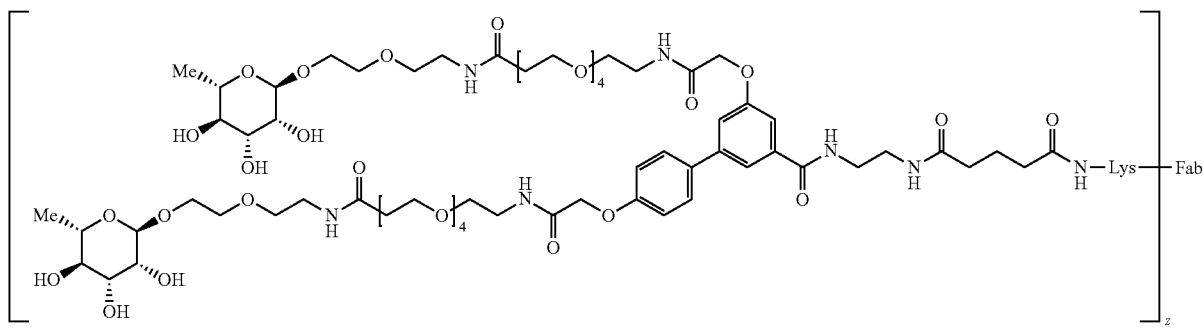

Example 7 may be prepared according to the General Lysine Conjugation Method using 40 equivalents of Preparation 23 (Method 1) and cetuximab-Fab.

Est. Av. LAR wherein z=15

Example 8

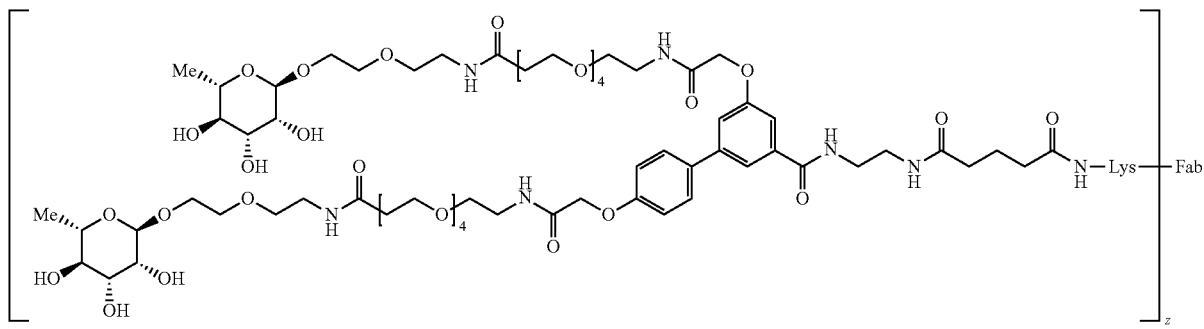

Example 8 may be prepared according to the General Lysine Conjugation Method using 10 equivalents of Preparation 23 (Method 1) and cetuximab-Fab.

Est. Av. LAR wherein z=6

Example 9

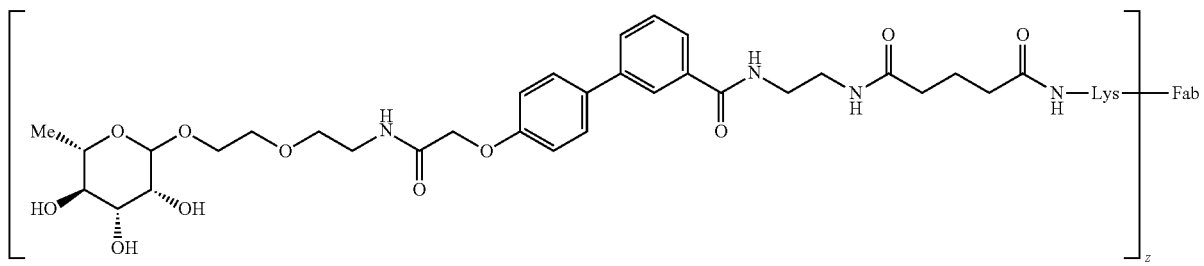

Example 9 may be prepared according to the General Lysine Conjugation Method using 40 equivalents of NHS-terminated Preparation 36 and cetuximab-Fab.

Est. Av. LAR wherein z=11

Example 10
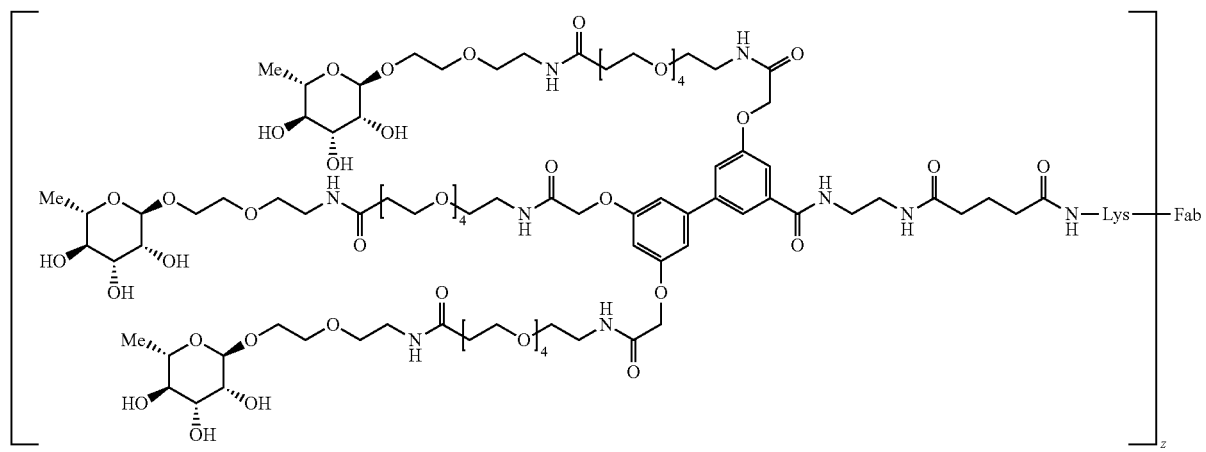
Example 10 may be prepared according to the General Lysine Conjugation Method using 20 equivalents of NHS-terminated Preparation 61 and cetuximab-Fab.
Est. Av. LAIR wherein z=12
Example 11
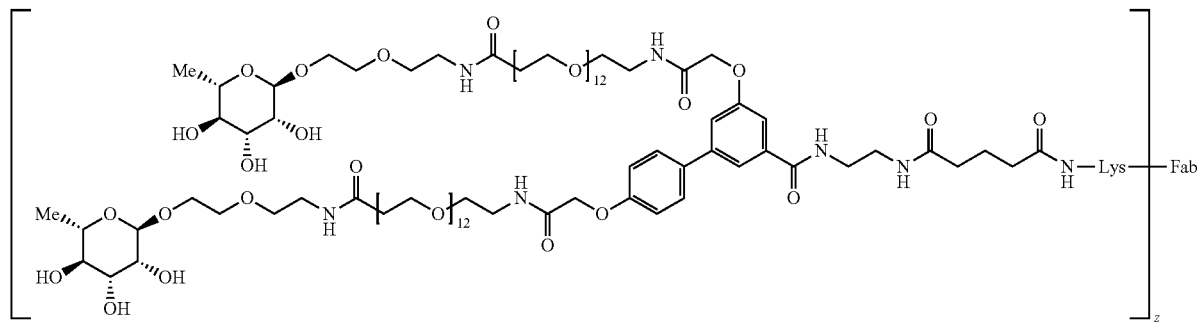
Example 11 may be prepared according to the General Lysine Conjugation Method using 20 equivalents of NHS-terminated Preparation 52 and cetuximab-Fab.
Est. Av. LAR wherein z=12
Example 12
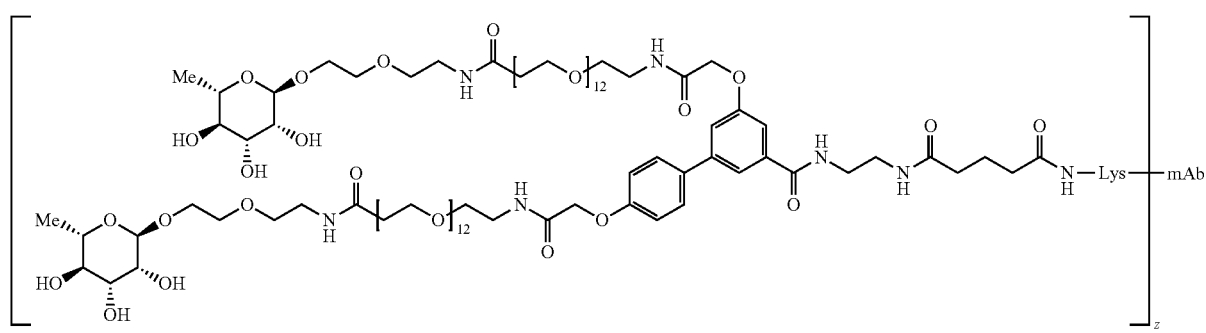

Example 12 may be prepared according to the General Lysine Conjugation Method using 40 equivalents of NHS-terminated Preparation 52 and cetuximab.

Est. Av. LAR wherein z=12-18

Example 13

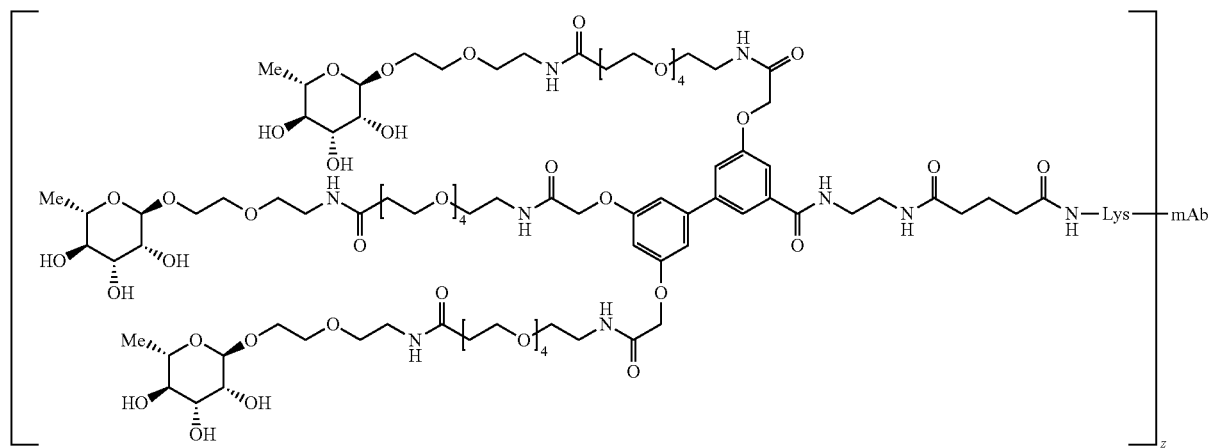

Example 13 may be prepared according to the General Lysine Conjugation Method using 40 equivalents of NHS-terminated Preparation 61 and cetuximab.

Est. Av. LAR wherein z=12-18

Example 14

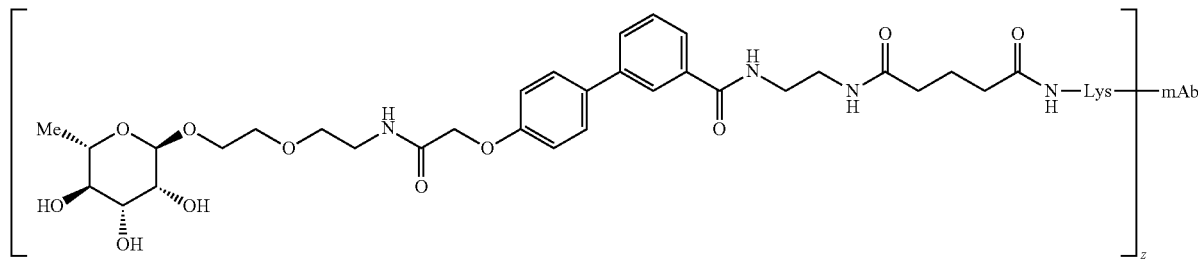

Example 14 may be prepared according to the General Lysine Conjugation Method using 40 equivalents of NHS-terminated Preparation 36 and cetuximab.

Est. Av. LAR wherein z=12-18

Example 15

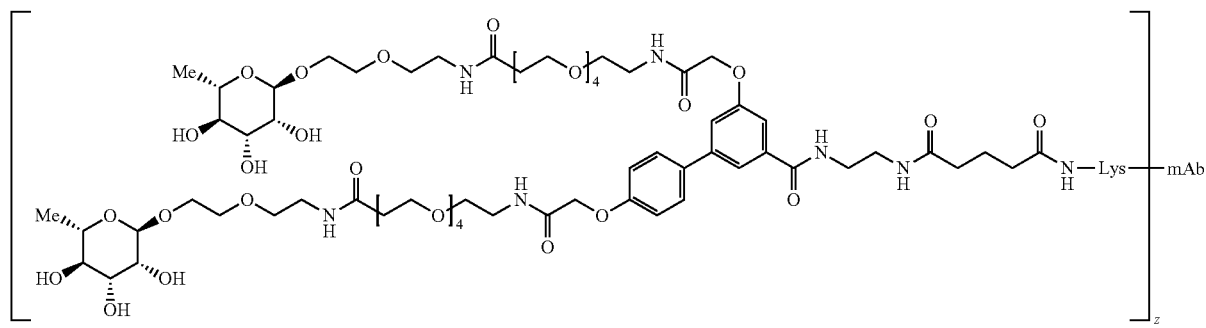

Example 15 may be prepared according to the General Lysine Conjugation Method using 20 equivalents of Preparation 23 (Method 1) and cetuximab.

Est. Av. LAR wherein z=6

Example 16

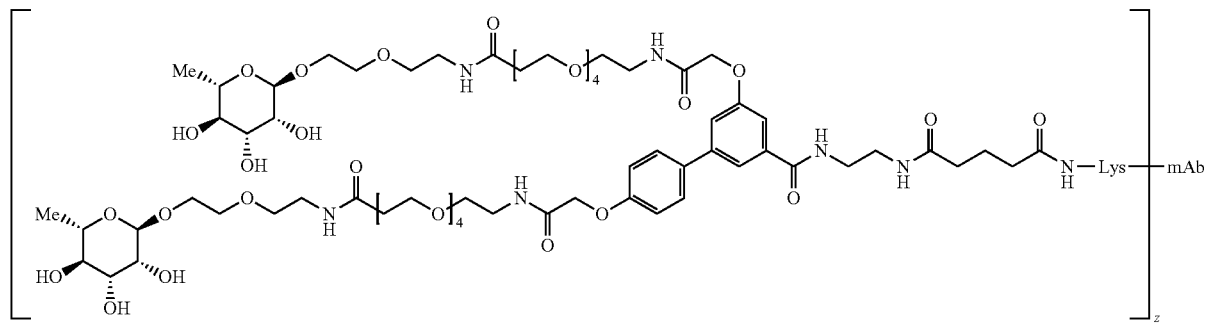

Example 16 may be prepared according to the General Lysine Conjugation Method using 60 equivalents of Preparation 23 (Method 1) and cetuximab.

Est. Av. LAR wherein z=>18

Example 17

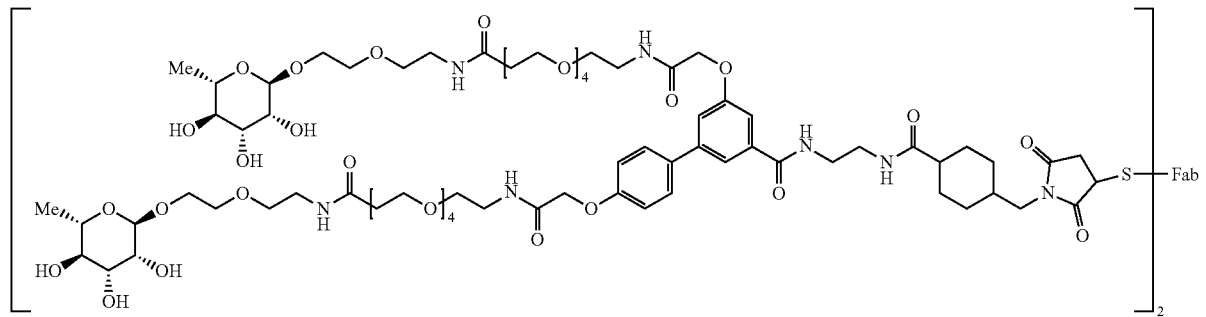

Example 17 may be prepared according to known maleimide conjugation protocols (OPRD (2016), 20, 852-866 or as described herein) using Preparation 60 and SMCC.

Est. Av. LAR wherein z=2

Example 18

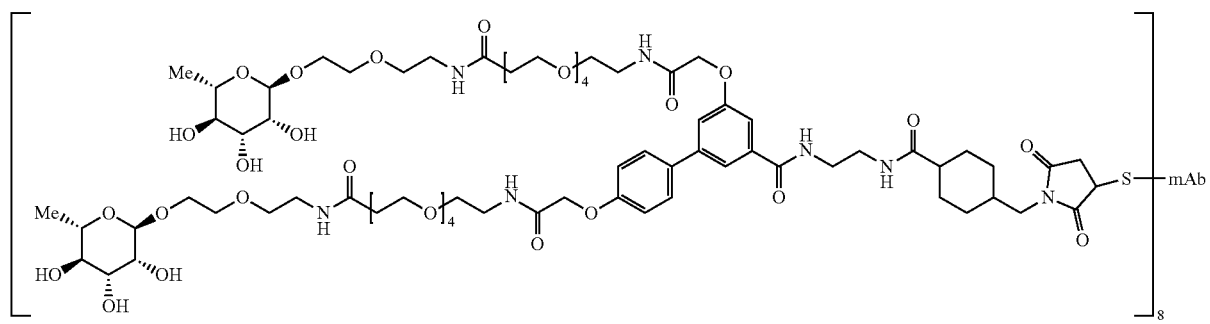

Example 17 may be prepared according to known maleimide conjugation protocols (OPRD (2016), 20, 852-866 or as described herein) using Preparation 60 and SMCC.

Est. Av. LAR wherein z=8

Example 19

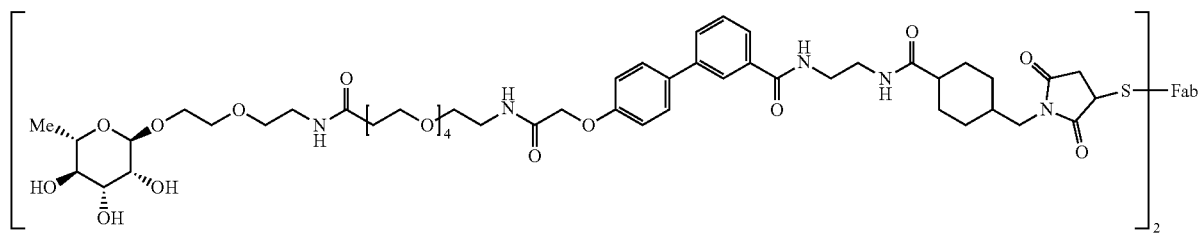

Example 19 may be prepared according to known maleimide conjugation protocols (OPRD (2016), 20, 852-866 or as described herein) using Preparation 59 and SMCC.

Est. Av. LAR wherein z=2

Example 20

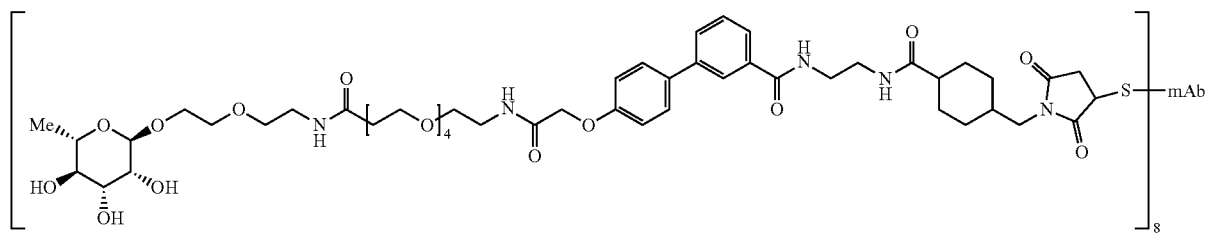

Example 20 may be prepared according to known maleimide conjugation protocols (OPRD (2016), 20, 852-866 or as described herein) using Preparation 59 and SMCC.

Est. Av. LAR wherein z=8

Biological Assays

Flow Cytometry Assay Using Anti-Rhamnose IgG Antibodies on A431 Cells

Flow cytometry was used to demonstrate binding of the compound to the EGFR receptor on a human cell line (as cetuximab) and recruitment of the human anti-rhamnose antibodies.

A431 cells are used to capture the EGFR binding mAb (cetuximab) as it is well known that the cells significantly over-express the EGFR receptor. An anti-rhamnose IgG antibody, and phycoerythrin (PE) labelled anti-human IgG antibodies were used to detect binding of the compound to the cell line.

A431 cells (ATCC CRL-1555) were harvested and resuspended at $5 \times 10^6$ cells/mL in phosphate buffered saline (PBS) (Sigma D8537). $2.5 \times 10^5$ cells were then incubated with compound at 100 nM (top dose), buffer alone or 100 nM Cetuximab/Cetuximab Fab Fragment at room temperature, shaking at 450 rpm for 1 hour. The cells were washed with 150 µL PBS (Sigma D8662)+0.1% BSA (Bovine Serum Albumin—Sigma A2153), prior to adding 50 µL of anti-Rhamnose IgG (50 µg/ml) antibody (custom purification from Human Gamma Globulin, MP Biomedicals 82310) in PBS+0.1% BSA and incubating at 4° C. for 30 minutes.

The cells were washed with 150 µL PBS+0.1% BSA, prior to adding 100 µL of secondary anti-IgG-PE (clone HP6017, Biolegend 409304). The cells were incubated at 4° C. for 30 minutes in dark.

After a final wash of 150 µL PBS+0.1% BSA the cells were resuspended in 100 µL PBS+0.1% BSA and evaluated on a flow cytometer (CytoFLEX Beckman Coulter). Data from all samples were analysed in the FlowJo software package (Version 10, FlowJo, LLC).

Figure 6A:
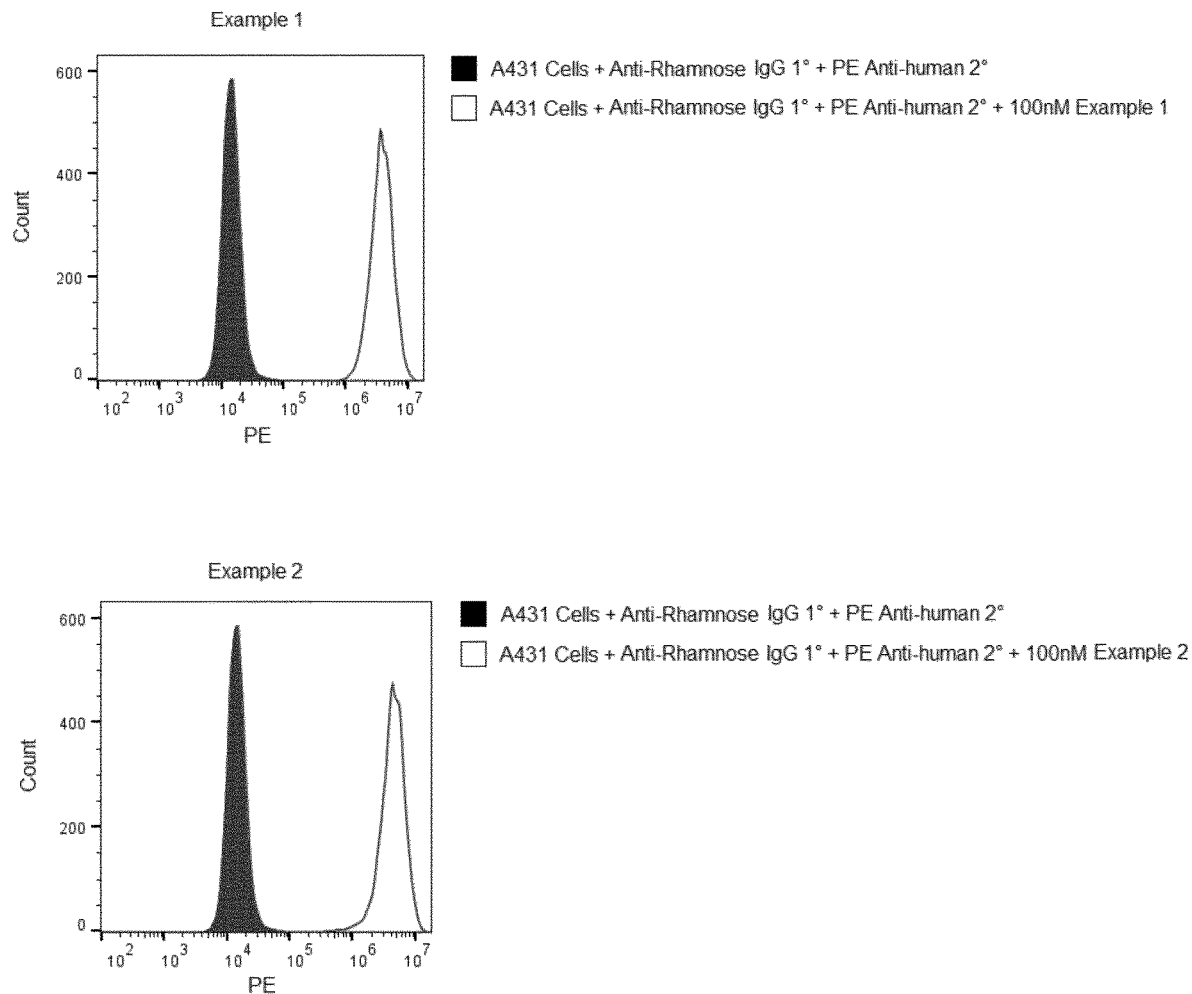
FIG. 6: Capture of anti-rhamnose IgG antibodies to the cell surface using Examples 1-4.
Figure 6B:
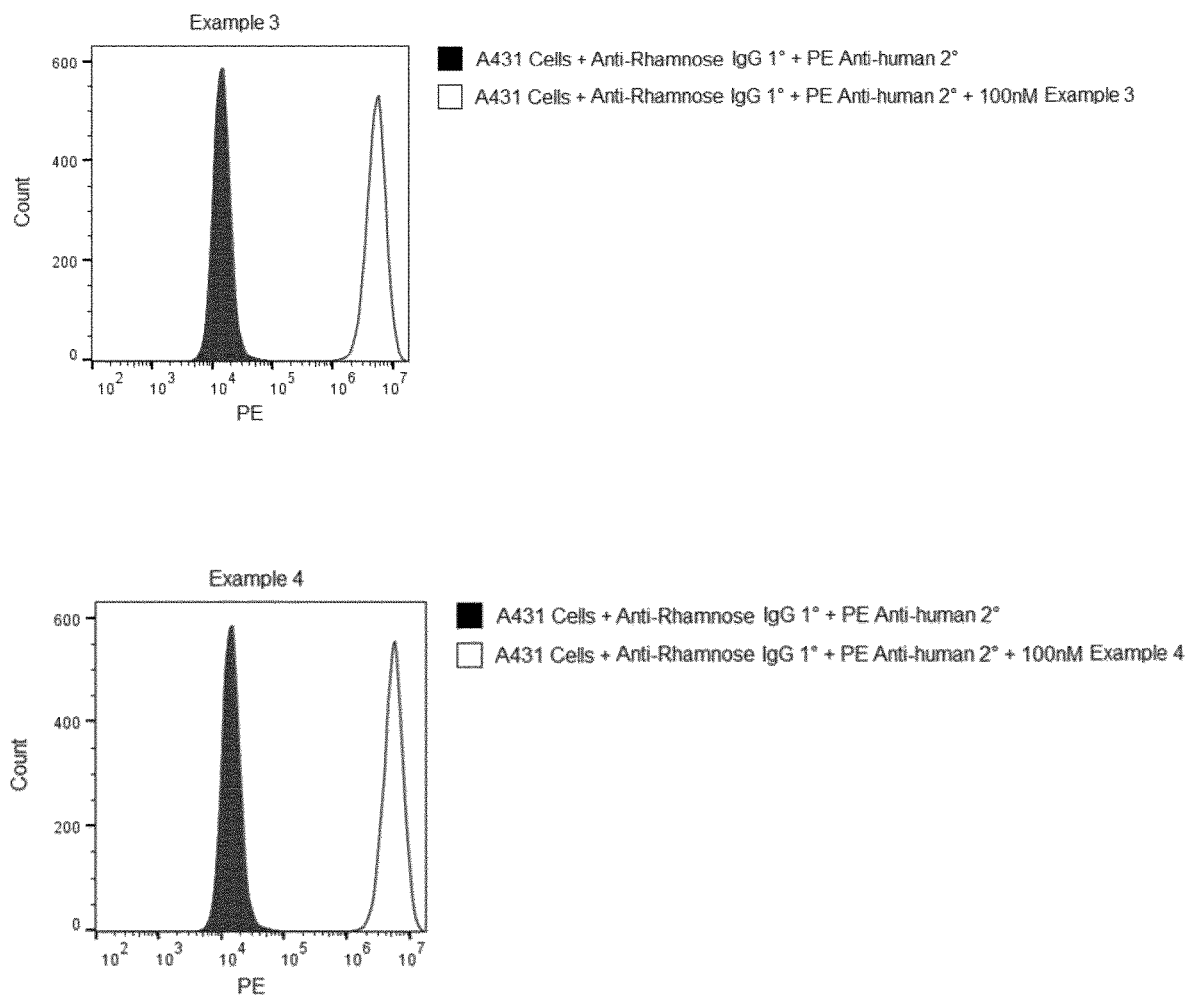
Figure 7:
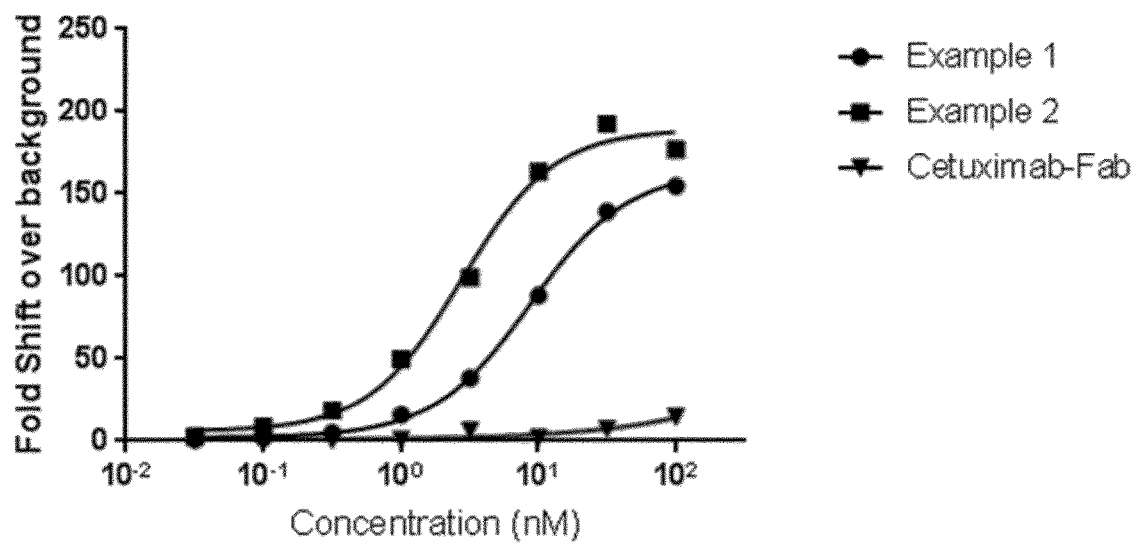
FIG. 7: (A) Demonstrates the level of recruitment of anti-rhamnose IgG by Examples 1 and 2 compared with the unconjugated Fab fragment in dose response from 100 to 0 nM; and (B) Demonstrates the level of recruitment of anti-rhamnose IgG by Examples 3 and 4 compared with the unconjugated cetuximab in dose response from 100 to 0 nM.
Figure 7:
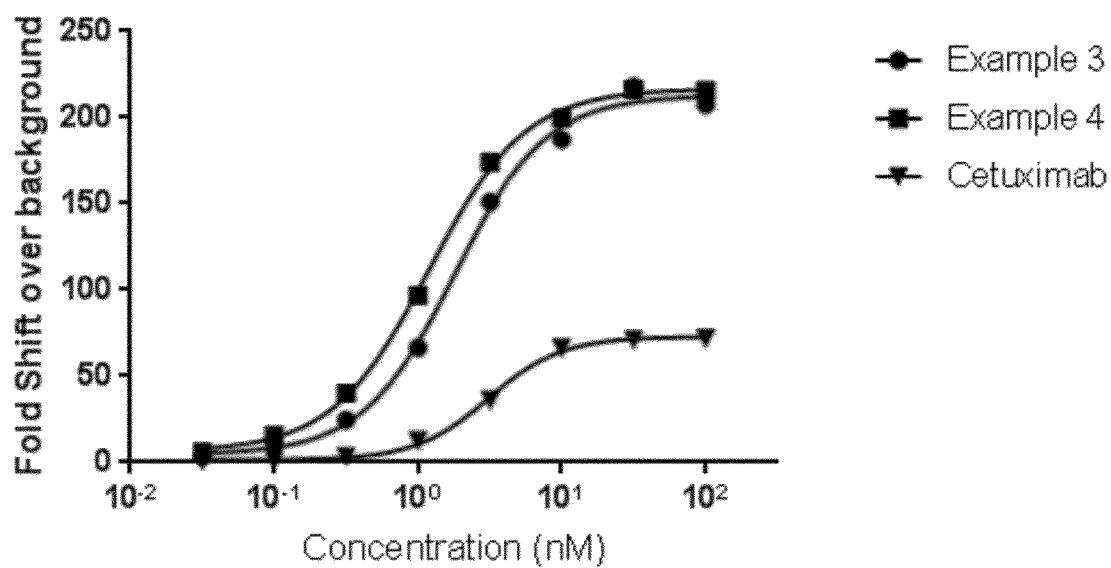

FIG. 6 demonstrates the capture of anti-rhamnose IgG antibodies to the cell surface using Examples 1-4. The shift in fluorescence intensity (PE) occurs due to the binding event at each end of the molecule.

FIGS. 7A and 7B demonstrate the level of the compound recruitment of anti-rhamnose IgG compared with the unconjugated Fab fragment or cetuximab in dose response from 100 to 0 nM. The results in FIGS. 7A and 7B demonstrate dose related, compound driven recruitment of anti-Rhamnose IgG antibodies to A431 cells for Examples 1-4 compared to cetuximab and cetuximab-Fab where minimal recruitment is observed.

Table 1 demonstrates binding activity of Examples 1-4 and 21-38 using the flow cytometry assay described above. The fold shift over background was calculated by dividing the Mean Fluorescence Intensity (MFI) obtained in the presence of 100 nM of compound by the Mean Fluorescence Intensity (MFI) obtained in the absence of compound. The data is reported as a mean with standard error in brackets. The number of independent experiments is also reported.

TABLE 1

| Compound | Maximum Fold Shift at 100 nM Mean (S.E.) | Number of Tests (n) |
| --- | --- | --- |
| Example 1 | 207.3 (80.0) | n = 2 |
| Example 2 | 160.5 (52.2) | n = 2 |
| Example 3 | 204.7 (64.7) | n = 2 |
| Example 4 | 189.9 (50.0) | n = 2 |
| Example 21 | 232.2 (58.3) | n = 2 |
| Example 22 | 207.1 (60.8) | n = 2 |
| Example 23 | 213.65 (58.8) | n = 2 |
| Example 24 | 200.3 (53.4) | n = 2 |
| Example 25 | 224.5 (46.5) | n = 2 |
| Example 26 | 203.7 (67.9) | n = 2 |
| Example 27 | 241.9 (10.7) | n = 2 |
| Example 28 | 278.2 (0.3) | n = 2 |
| Example 29 | 303.7 (18.2) | n = 2 |
| Example 30 | 314.1 (19.8) | n = 2 |
| Example 31 | 194.4 (61.2) | n = 2 |
| Example 32 | 237.1 (5.0) | n = 2 |
| Example 33 | 140.1 (34.1) | n = 2 |
| Example 34 | 158.4 (44.1) | n = 2 |
| Example 35 | 174.6 (48.7) | n = 2 |
| Example 36 | 177.8 (49.2) | n = 2 |
| Example 37 | 169.7 (36.5) | n = 2 |
| Example 38 | 166.1 (36.5) | n = 2 |

Flow Cytometry Assay Using Anti-Rhamnose IgG Antibody on Raji Cells

Flow cytometry was used to demonstrate binding of the compound to the CD20 on a human cell line (as Rituximab Fab) and recruitment of the human rhamnose antibody. Raji cells are used to capture the CD20 binding Fabs as it is well known that the cells significantly over-express the CD20 receptor. A secondary phycoerythrin (PE) labelled anti-human IgG antibody was used to detect binding of the anti-rhamnose IgG antibody to the compound.

Raji cells (ATCC CRL-86) were harvested and resuspended at $5 \times 10^6$ cells/mL in phosphate buffered saline (PBS) (Sigma D8537). $2.5 \times 10^1$ cells were then incubated with 100 nM compound at room temperature, shaking at 450 rpm for 1 hour.

The cells were washed with 1×150 µL PBS (Sigma D8662)+0.1% BSA (Bovine Serum Albumin—Sigma A2153), prior to adding 50 µL of Anti-rhamnose IgG antibody (custom purification from Human Gamma Globulin, MP Biomedicals 82310) at 50 µg/mL in PBS+0.1% BSA and incubating at 4° C. for 30 minutes. The cells were washed with 1×150 µL PBS+0.1% BSA, prior to adding 100 µL of secondary Anti-IgG-PE (clone HP6017, Biolegend 409304). The cells were incubated at 4° C. for 30 minutes in the dark.

After a final wash of 1×150 µL PBS+0.1% BSA the cells were resuspended in 100 µL PBS+0.1% BSA and evaluated on a flow cytometer (CytoFLEX Beckman Coulter). Data from all samples were analysed in in the FlowJo software package (Version 10, FlowJo, LLC).

Figure 35:
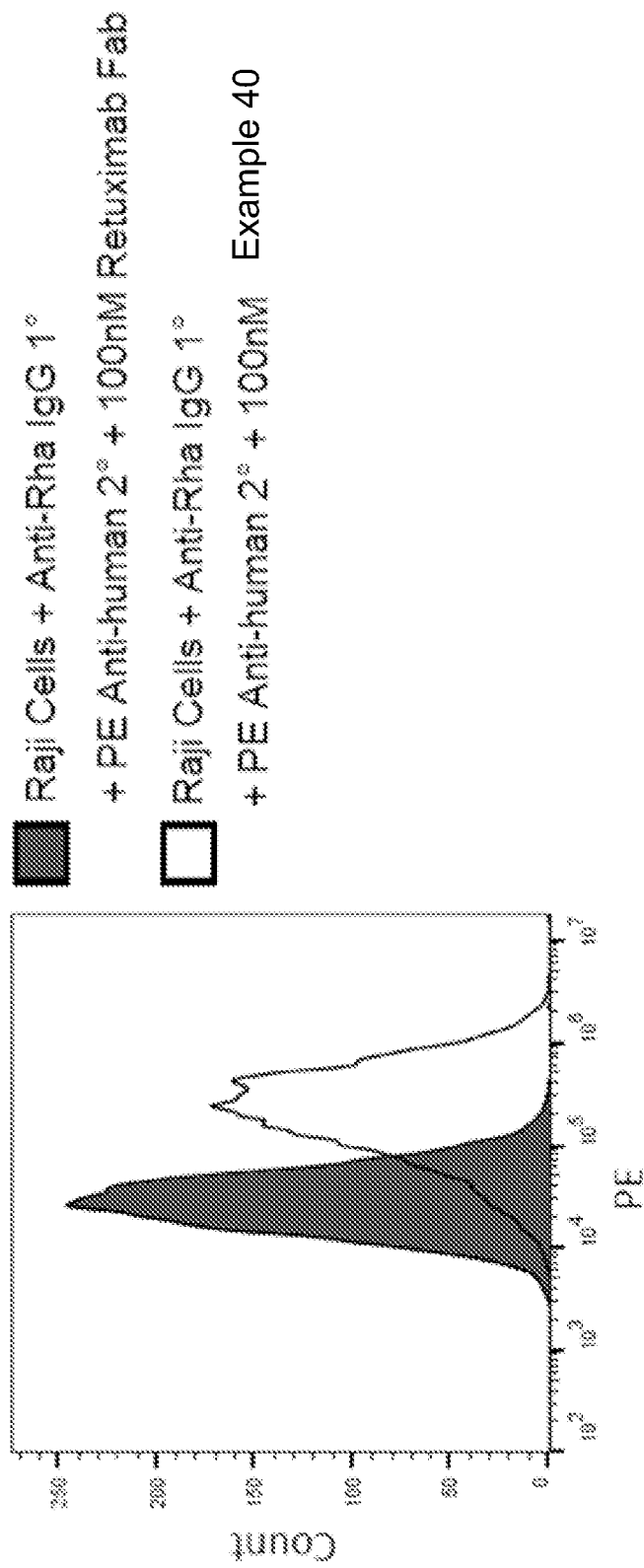
FIG. 35: Capture of Anti-Rhamnose IgG antibodies to the cell surface using Example 40 at 100 nM compared with 100 nM of the unconjugated Retuximab Fab fragment.
Figure 36:
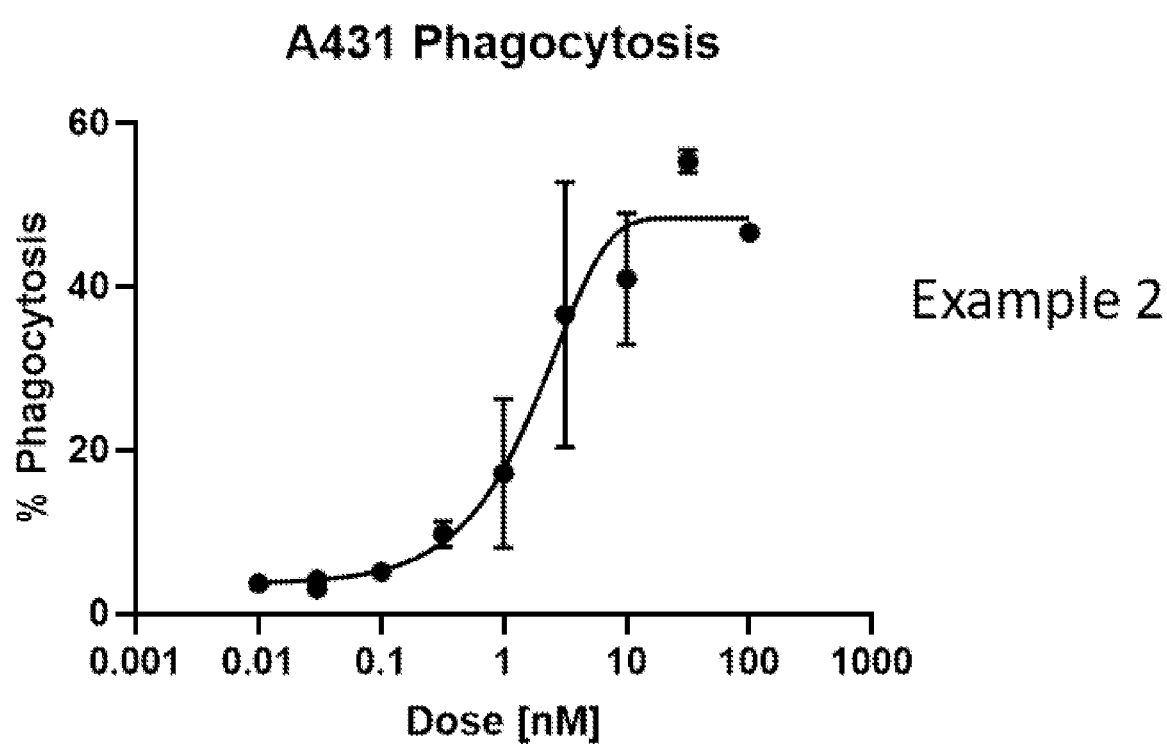
FIG. 36: Phagocytosis data (dose response) for Example 2.
Figure 37:
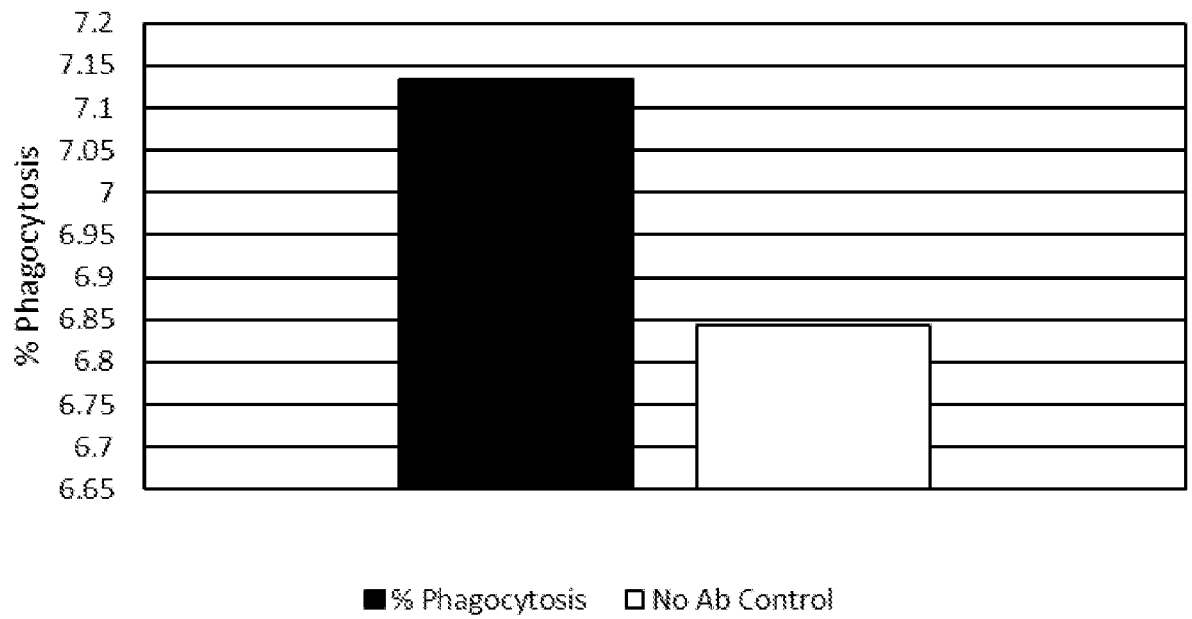
FIG. 37: Phagocytosis data (single point at 100 nM) for cetuximab-fAb and Example 1.
Figure 37:
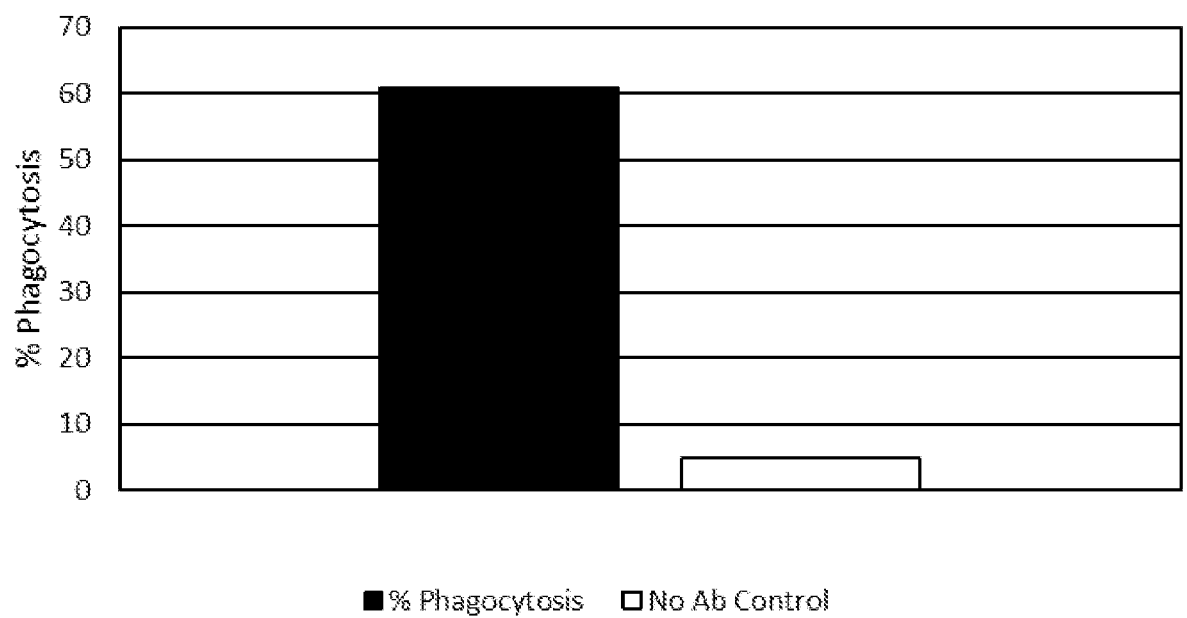
Figure 38A:
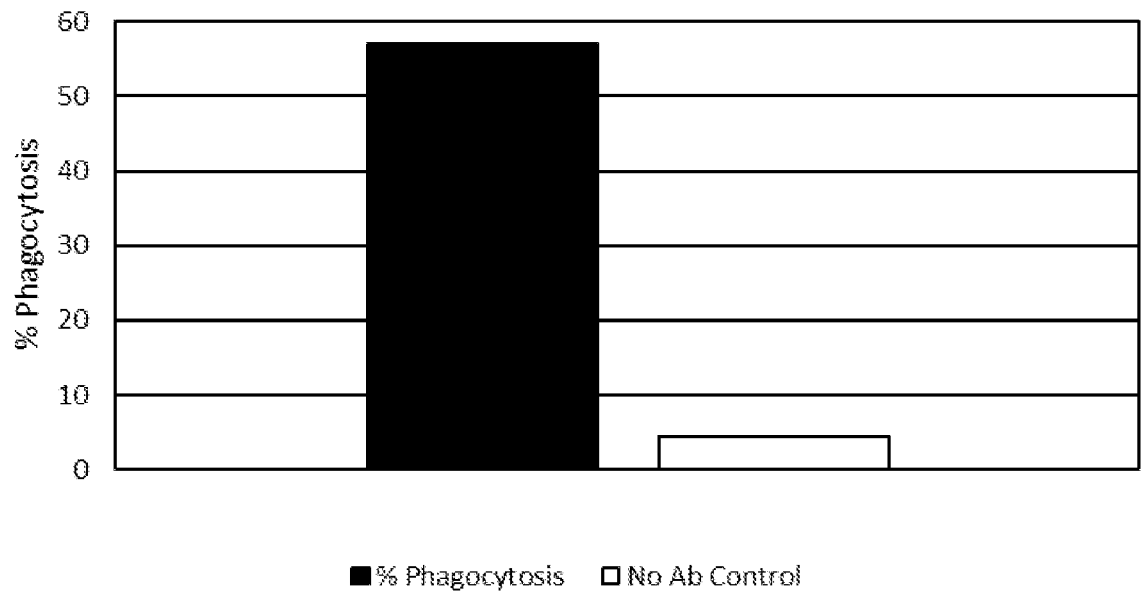
FIG. 38: Phagocytosis data (single point at 100 nM) for cetuximab-fAb Examples 27-30.
Figure 38A:
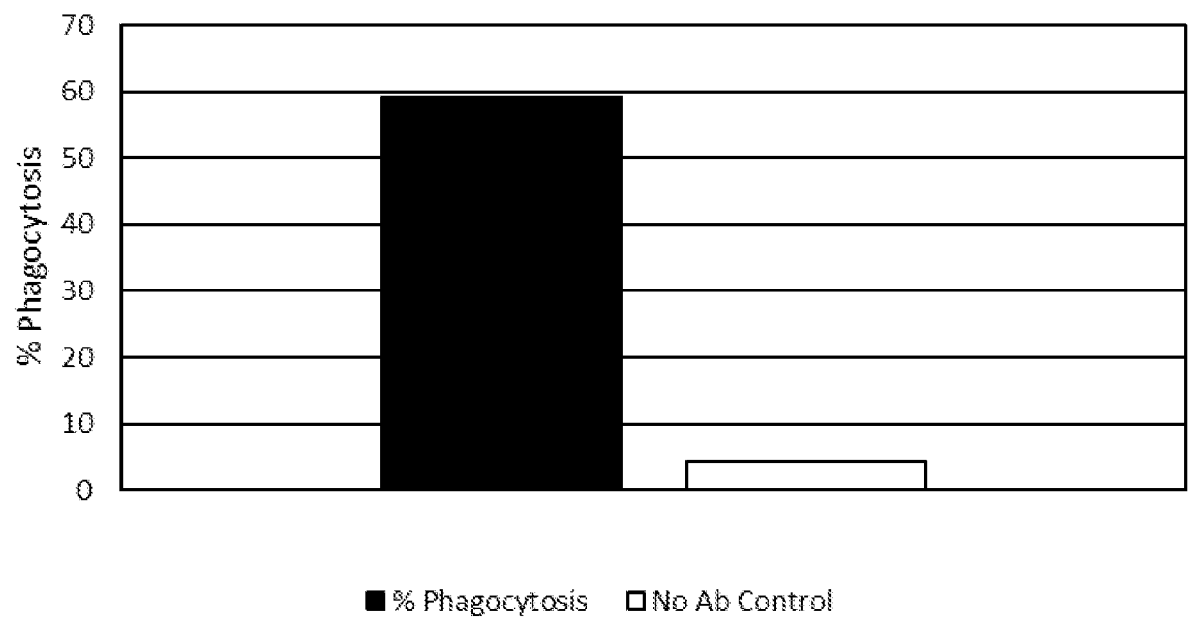
Figure 38B:
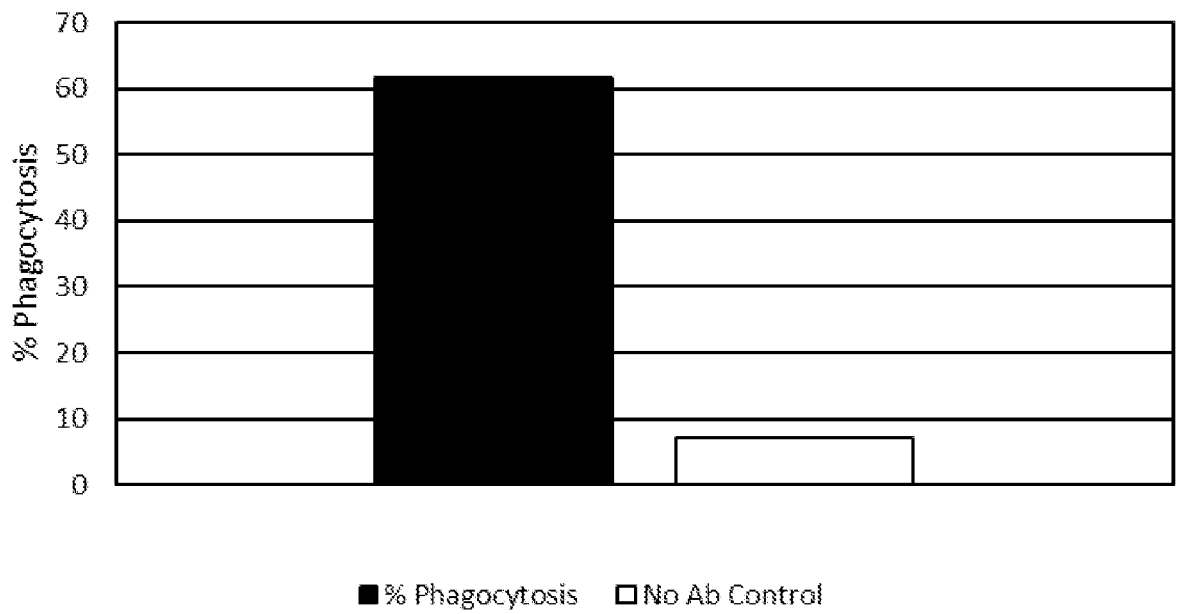
Figure 38B:
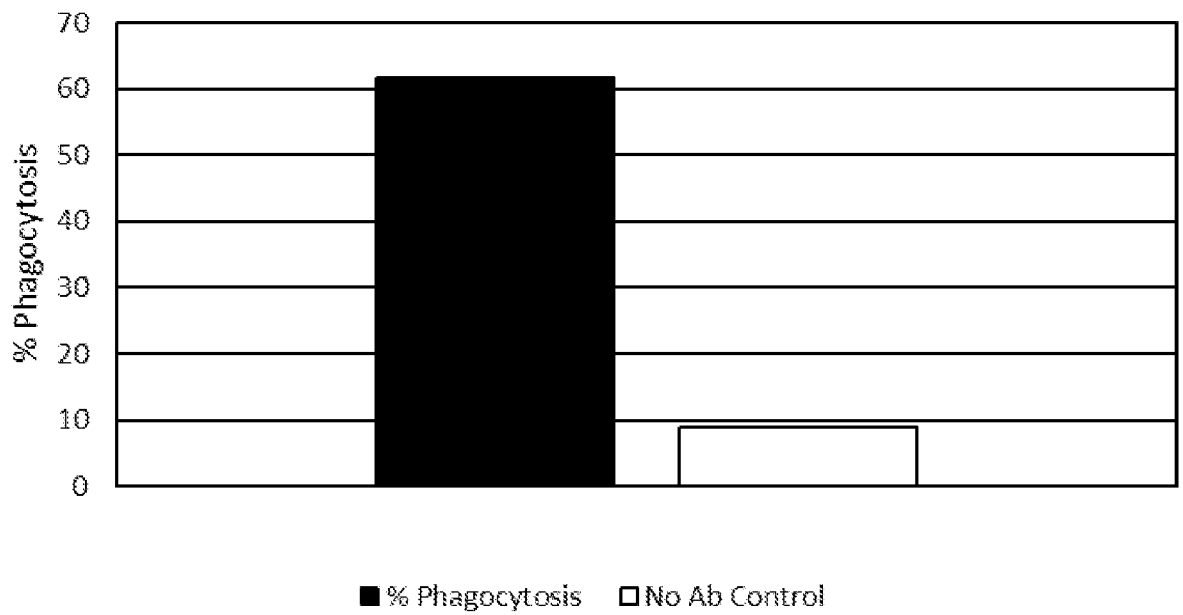
Figure 39A:
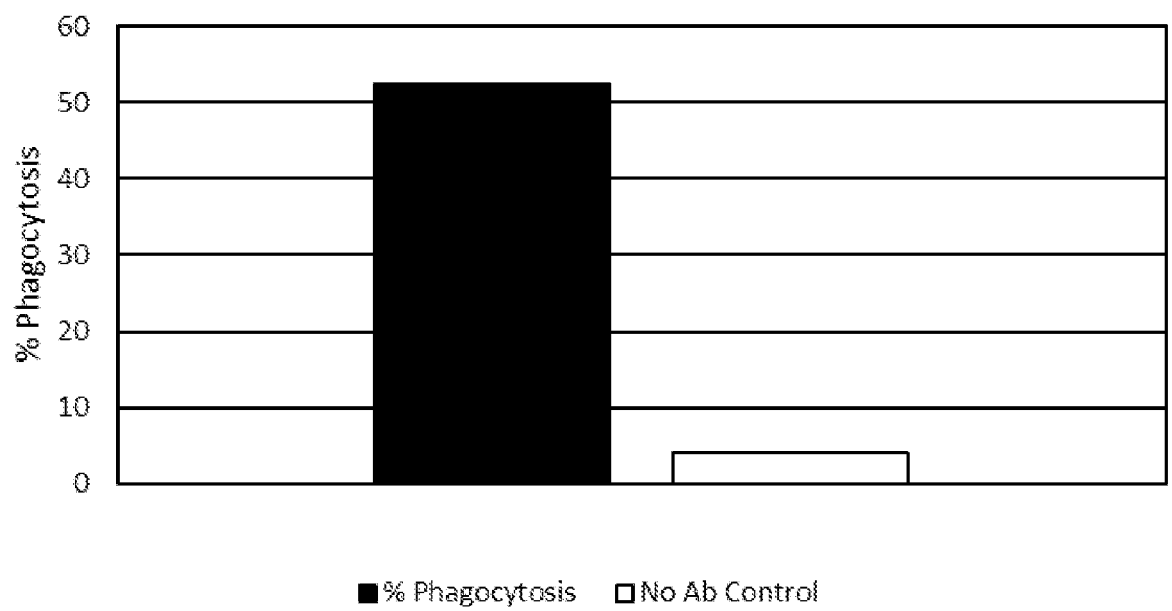
FIG. 39: Phagocytosis data (single point at 100 nM) for cetuximab-fAb Examples 31, 32, 37 and 38.
Figure 39A:
Figure 39B:
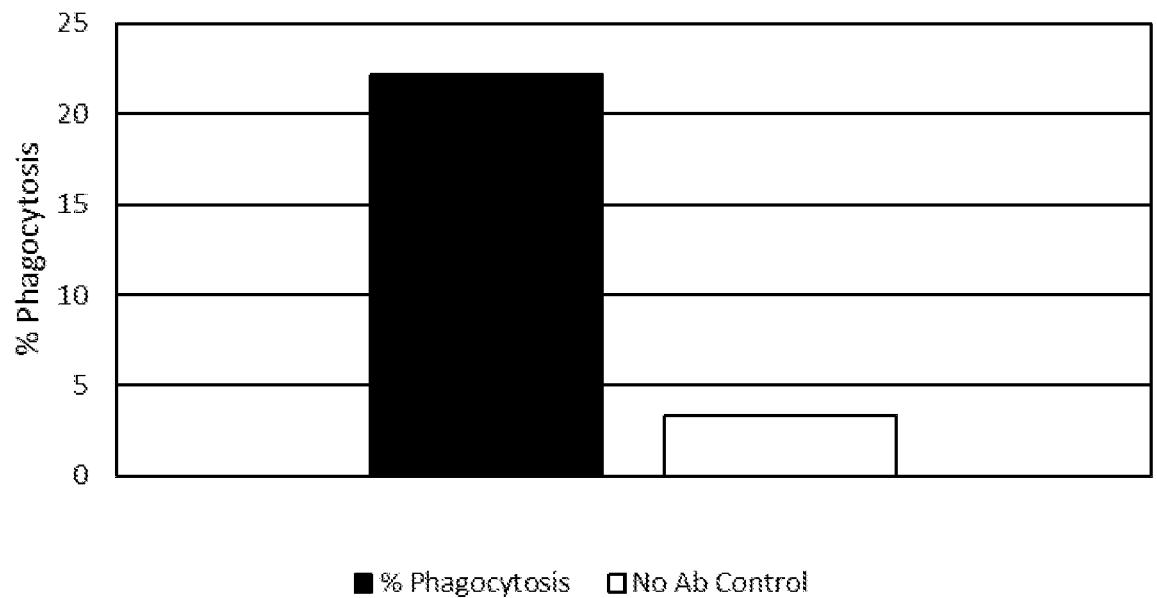
Figure 39B:
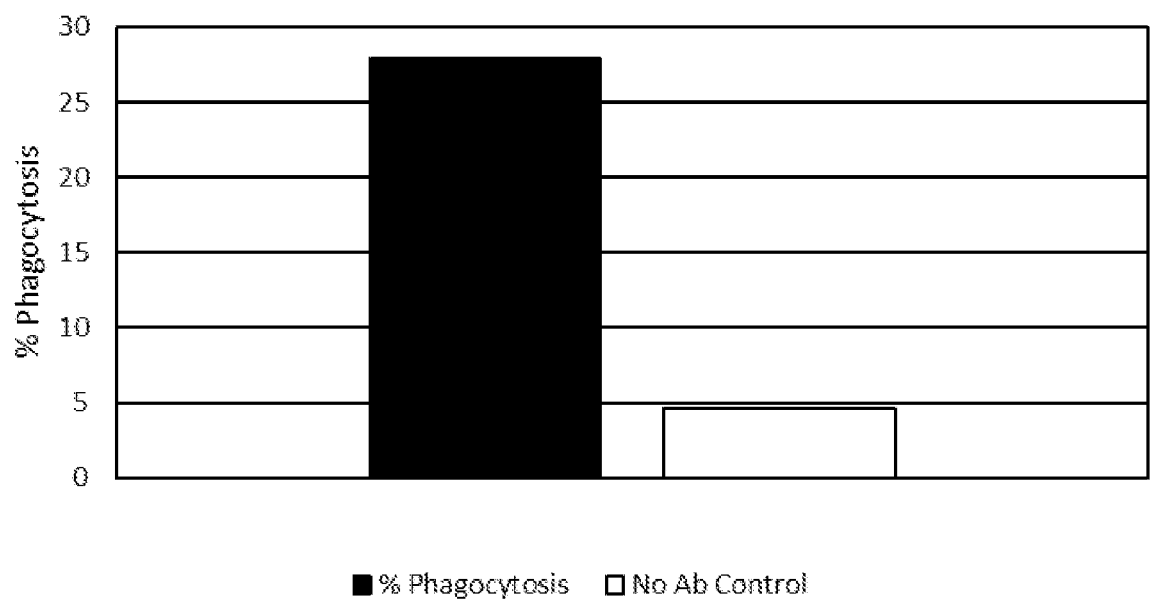

FIG. 35 demonstrates the capture of anti-Rhamnose IgG antibodies to the cell surface using Example 40 at 100 nM compared with 100 nM of the unconjugated Rituximab Fab fragment. The shift in fluorescence intensity (PE) occurs due to the binding event at each end of the molecule.

Flow Cytometry Assay Using c3b Antibodies

Flow cytometry was used to demonstrate binding of the compounds to a cell line of interest and recruitment of the C3b complement component to the cell and subsequently cell viability was analysed.

A431 cells are used to capture the EGFR binding mAb (cetuximab) or antibody fragment, as it is well known that the cells significantly over-express the EGFR receptor. Anti-C3b antibody conjugated to phycoerythrin (PE) was used to detect recruitment of C3b molecules to cells from serum after addition of the compounds at various concentrations. The addition of SYTOX Blue (Invitrogen S34857) also allows for evaluation of the cell viability after addition of the compounds at various concentrations.

A431 cells (ATCC CRL-1555) were harvested and resuspended at $5 \times 10^6$ cells/mL in phosphate buffered saline (PBS) (Sigma D8537). $5 \times 10^5$ cells were then incubated with compound at 100 nM (top dose), buffer alone or 100 nM (top dose) Cetuximab/Cetuximab Fab Fragment at room temperature, shaking at 450 rpm for 1 hour. The cells were washed with 150 µL PBS (Sigma D8662)+0.1% BSA (Bovine Serum Albumin—Sigma A2153), prior to adding 100 µL PBS and 50 µL of 60% Human Serum (HS) (Patricell 23590) or Heat Inactivated Human Serum (HI HS) with 75 µg/ml anti-Rhamnose IgG (custom purification from Human Gamma Globulin, MP Biomedicals 82310) and incubated at 37° C. for 30 minutes.

The cells were washed with 2×150 µL PBS+0.1% BSA, prior to adding 100 µL of anti-C3b-PE (Biolegend 846104). The cells were incubated at 4° C. for 30 minutes in dark.

After a final wash of 150 µL PBS+0.1% BSA the cells were resuspended in 100 µL PBS+0.1% BSA+1:1000 dilution of viability stain SYTOX Blue (Invitrogen S34857) and evaluated on a flow cytometer (CytoFLEX Beckman Coulter). Data from all samples were analysed in the FlowJo software package (Version 10, FlowJo, LLC).

Figure 8A:
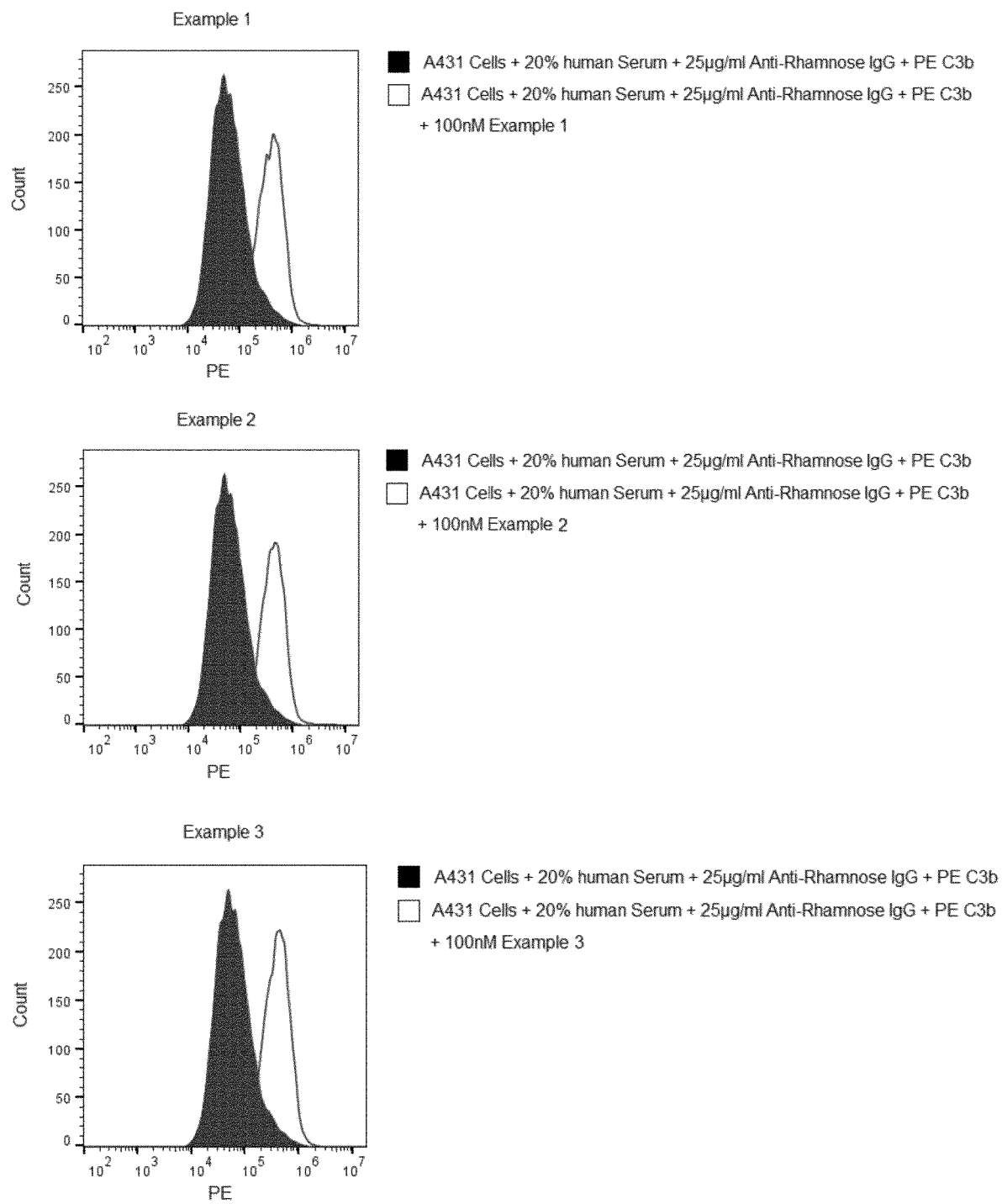
FIG. 8: Demonstrates the level of C3b deposition on A431 cells using Examples 1-4.
Figure 8B:
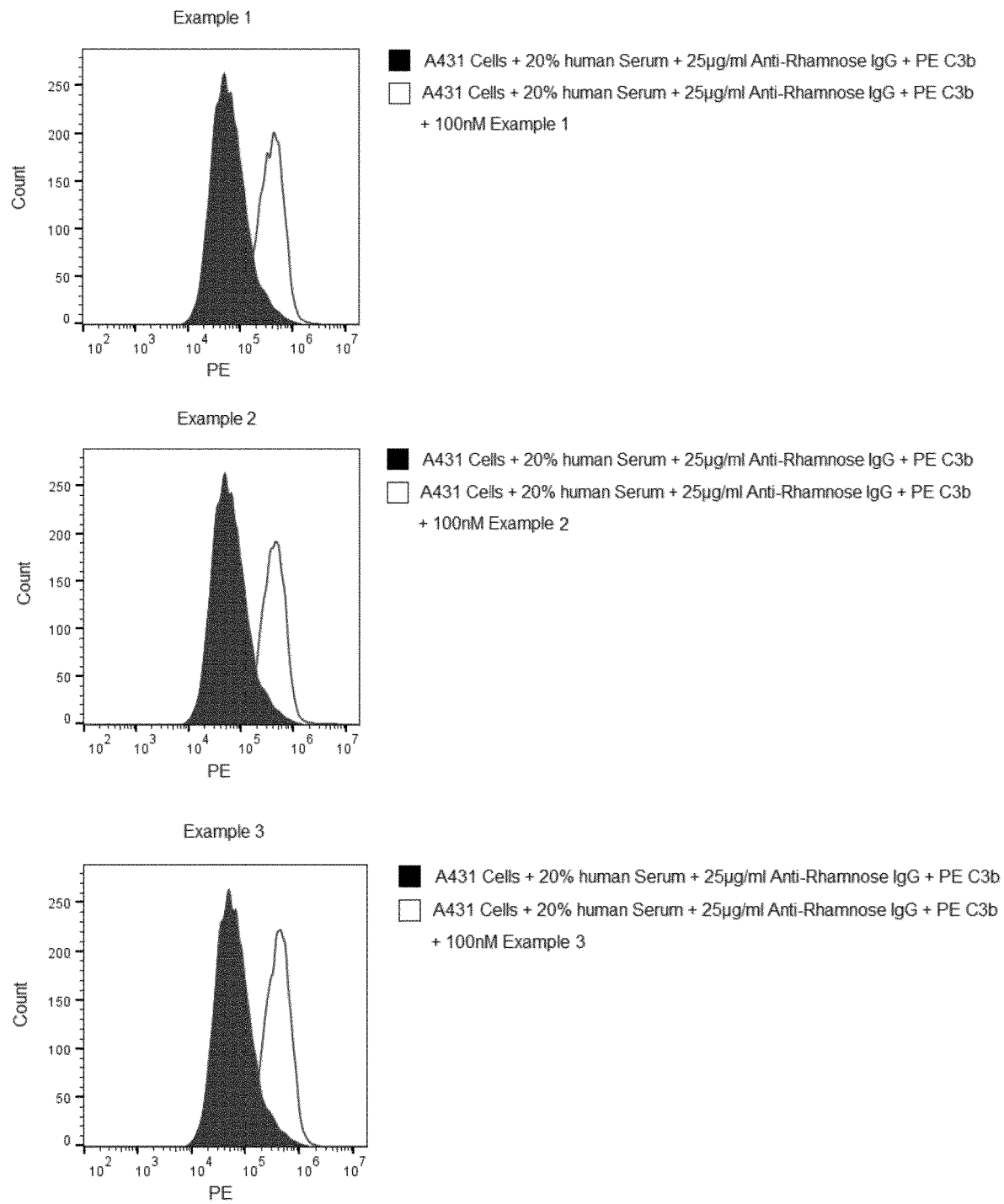

FIG. 8 demonstrates the level of C3b deposition on A431 using Examples 1-4.

Figure 9:
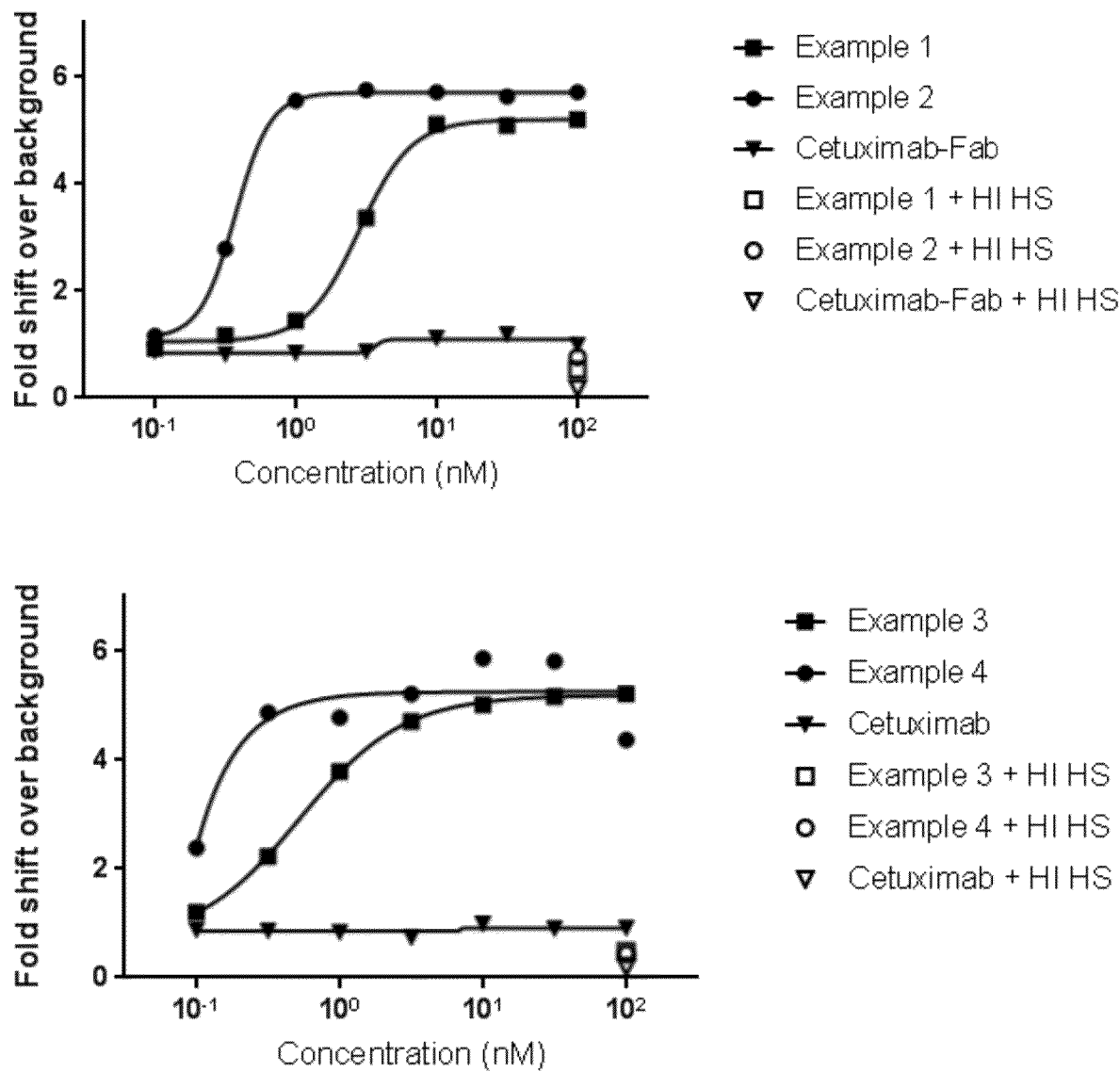
FIG. 9: Demonstrates the level of C3b deposition on A431 cells with varying concentrations of Examples 1-4, compared to cetuximab Fab fragment and/or cetuximab.
Figure 10:
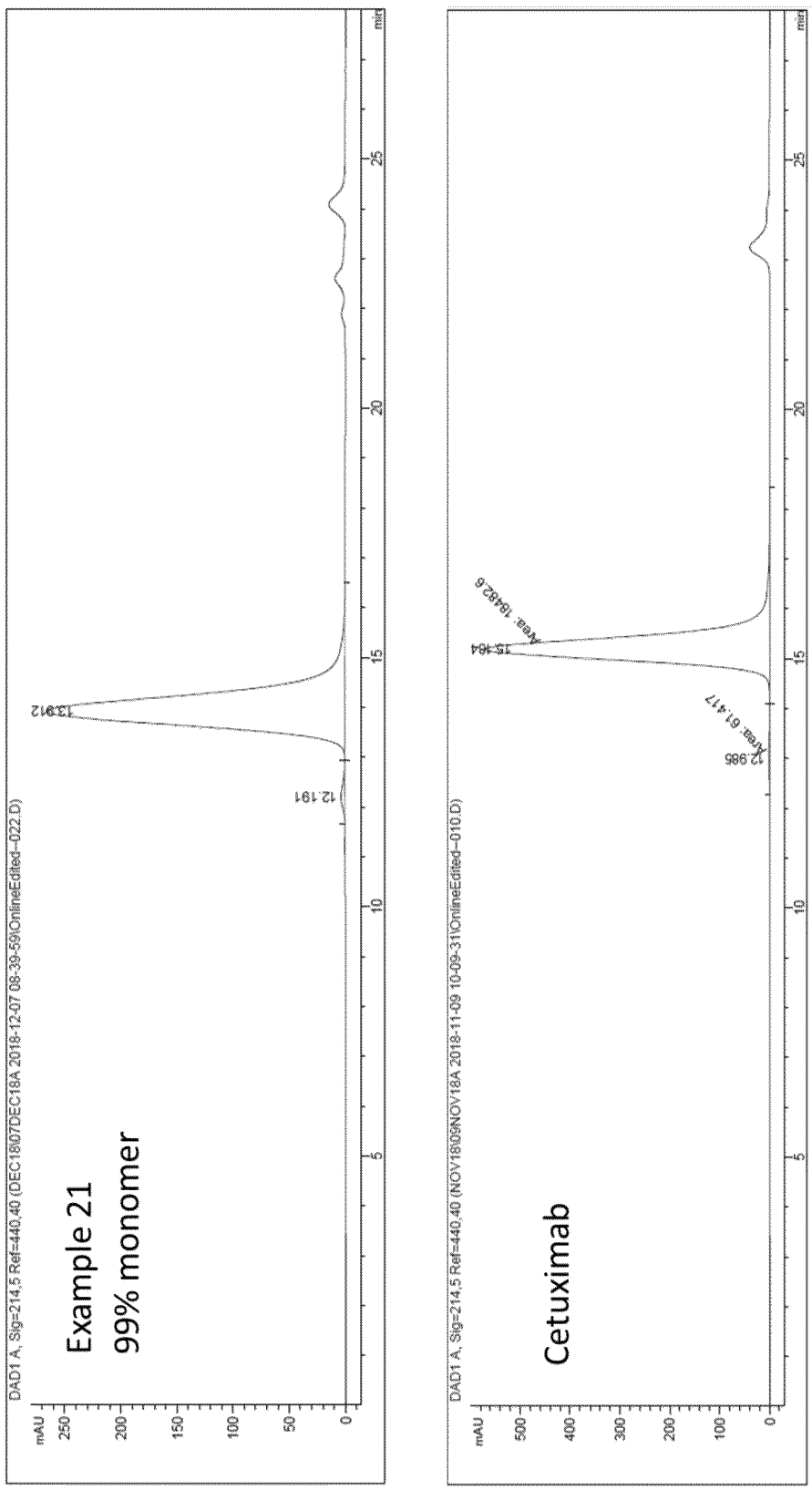
FIG. 10: Analysis of monomer content: SEC for Example 21 compared to cetuximab.
Figure 11:
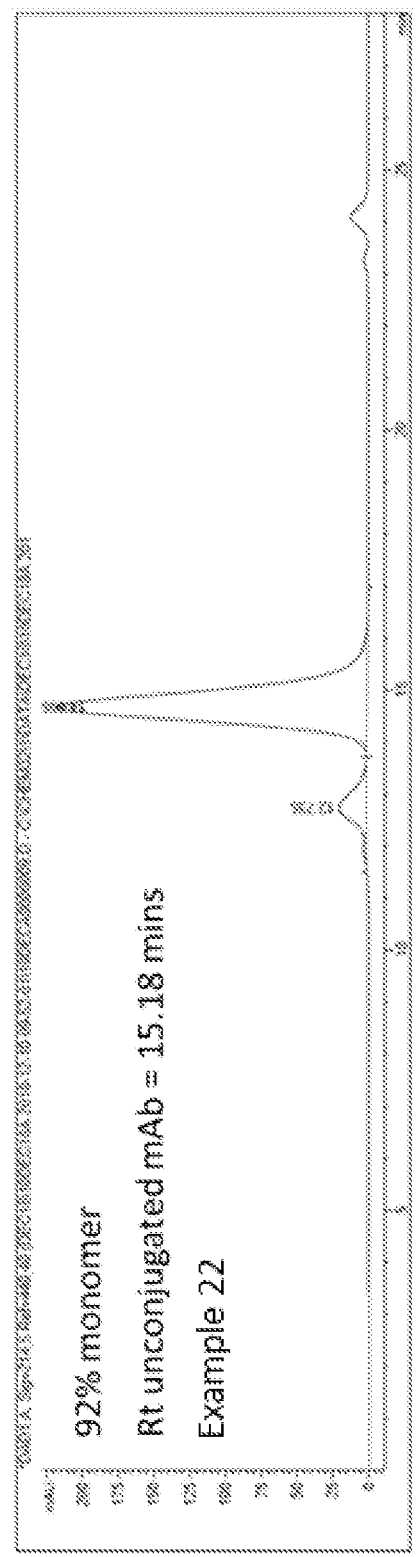
FIG. 11: Analysis of monomer content: SEC for Example 22 compared to cetuximab.
Figure 12:
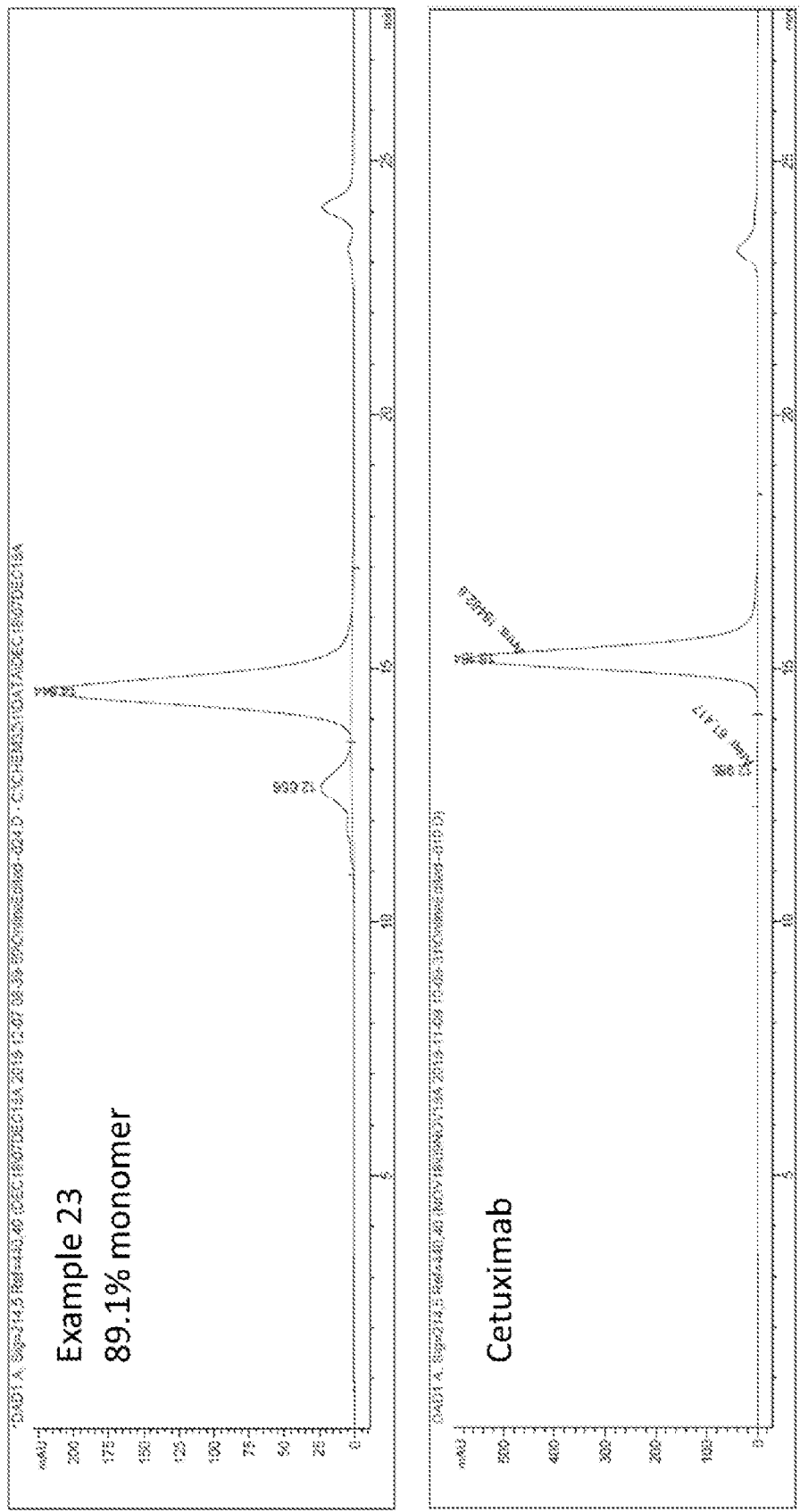
FIG. 12: Analysis of monomer content: SEC for Example 23 compared to cetuximab.
Figure 13:
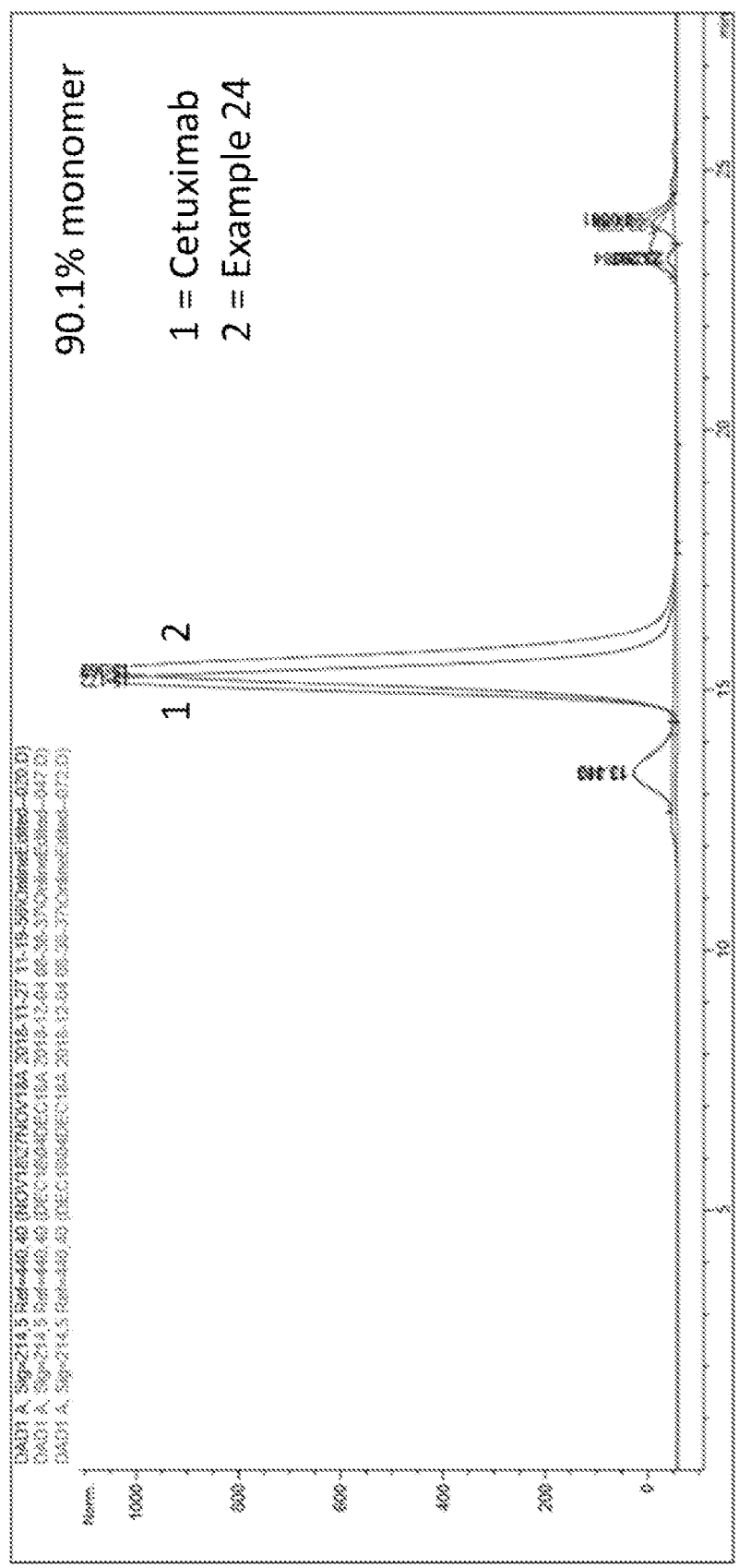
FIG. 13: Analysis of monomer content: SEC for Example 24 compared to cetuximab.
Figure 14:
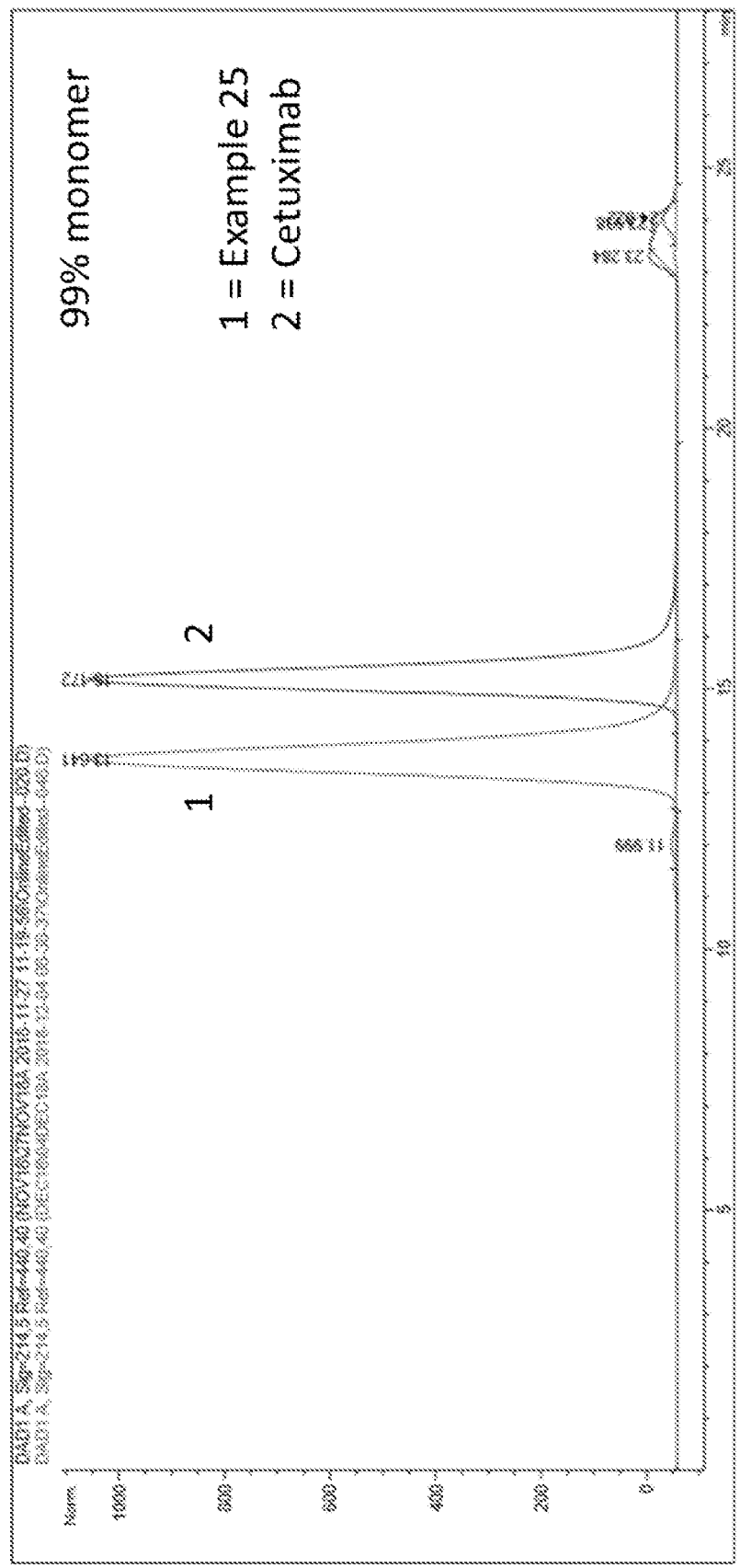
FIG. 14: Analysis of monomer content: SEC for Example 25 compared to cetuximab.
Figure 15:
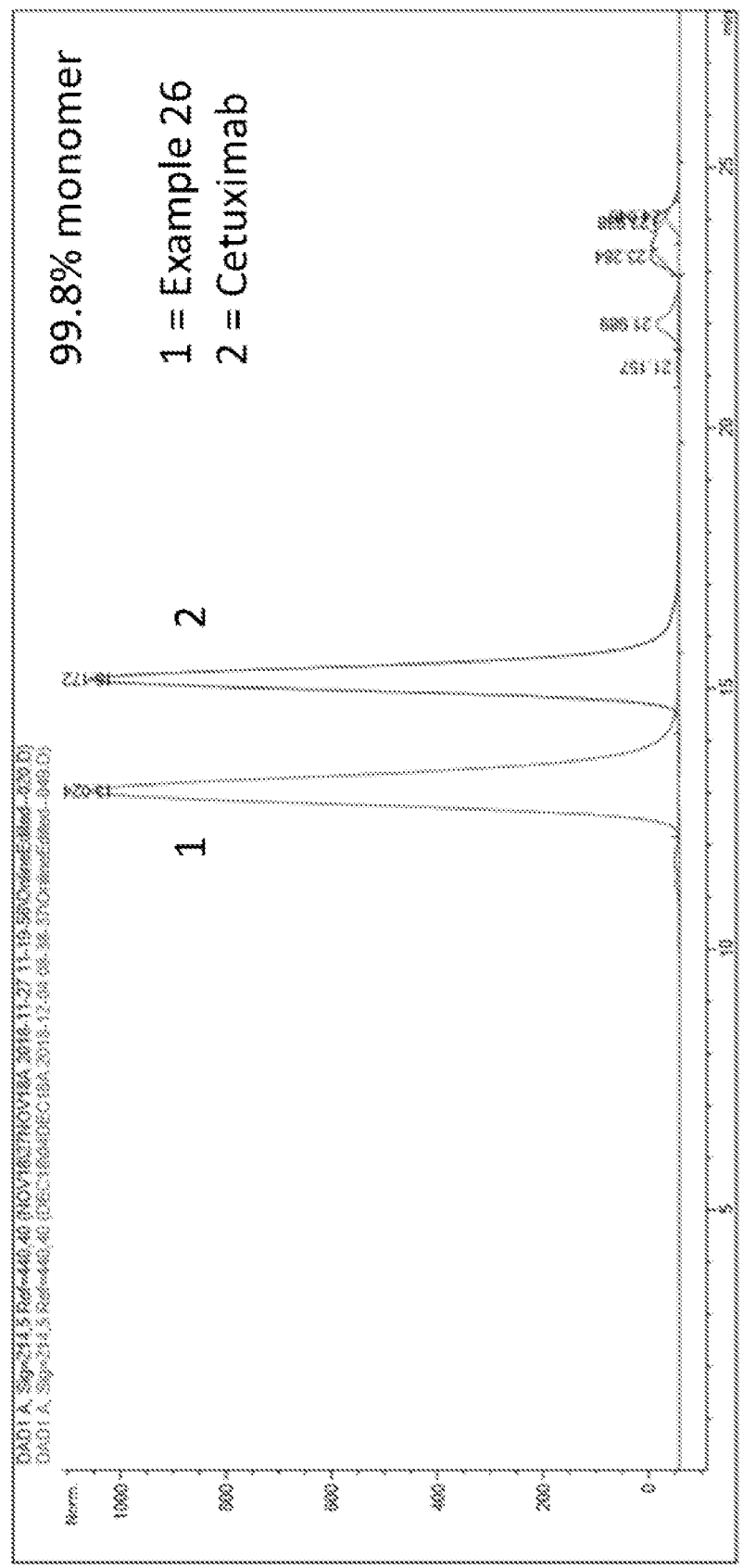
FIG. 15: Analysis of monomer content: SEC for Example 26 compared to cetuximab.
Figure 16:
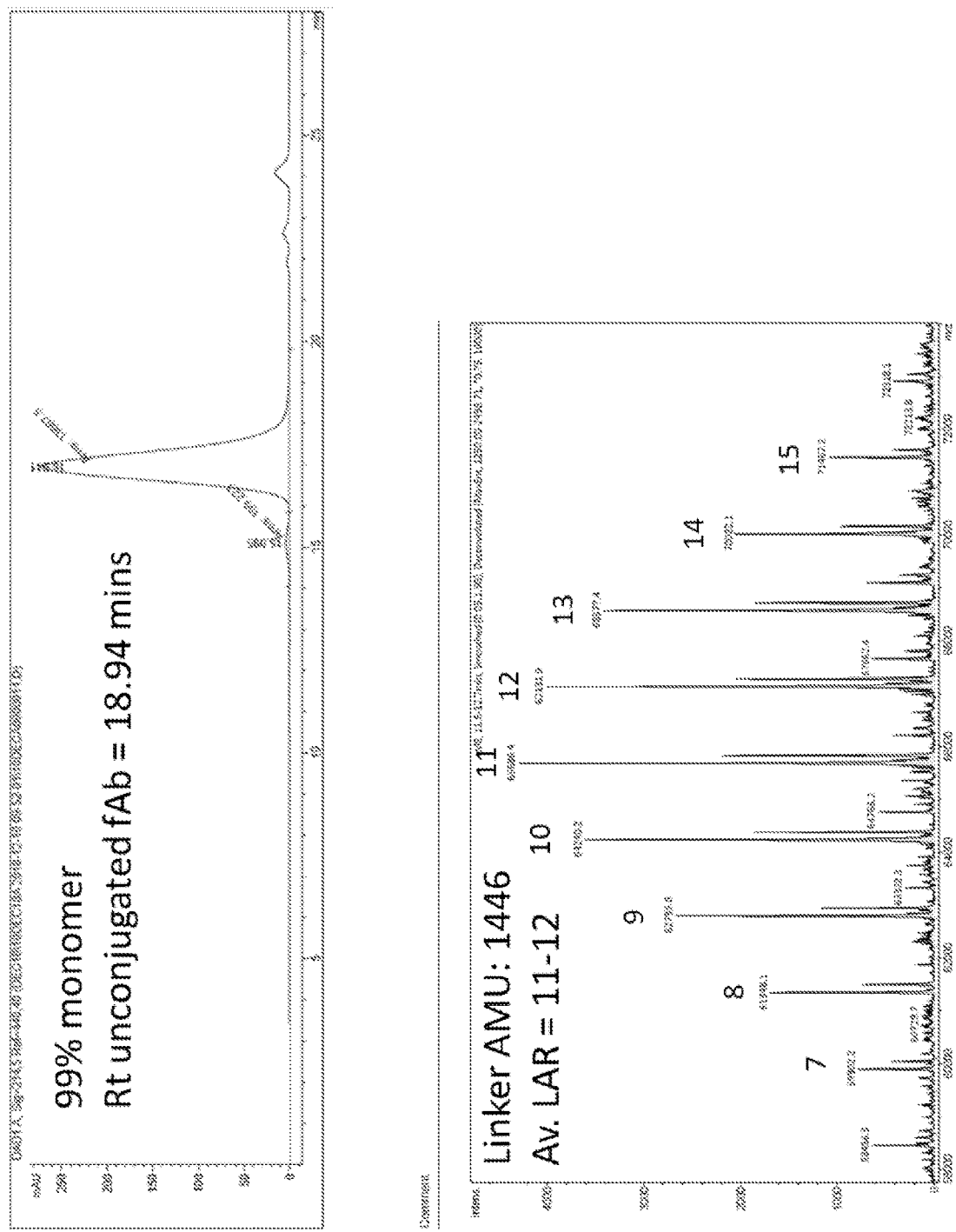
FIG. 16: Analysis of monomer content: SEC for Example 27 compared to cetuximab-fAb (left panel). Electrospray MS (Bruker micrOTOF-Q II) for Example 27 (right panel).
Figure 17:
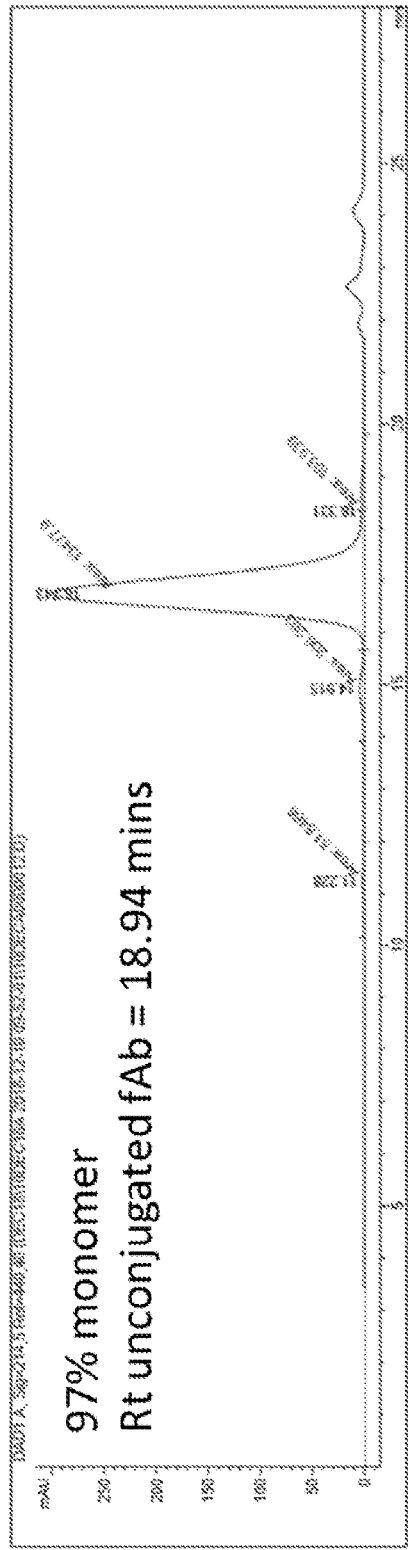
FIG. 17: Analysis of monomer content: SEC for Example 28 compared to cetuximab-fAb (left panel). Electrospray MS (Bruker micrOTOF-Q II) for Example 28 (right panel).
Figure 17:
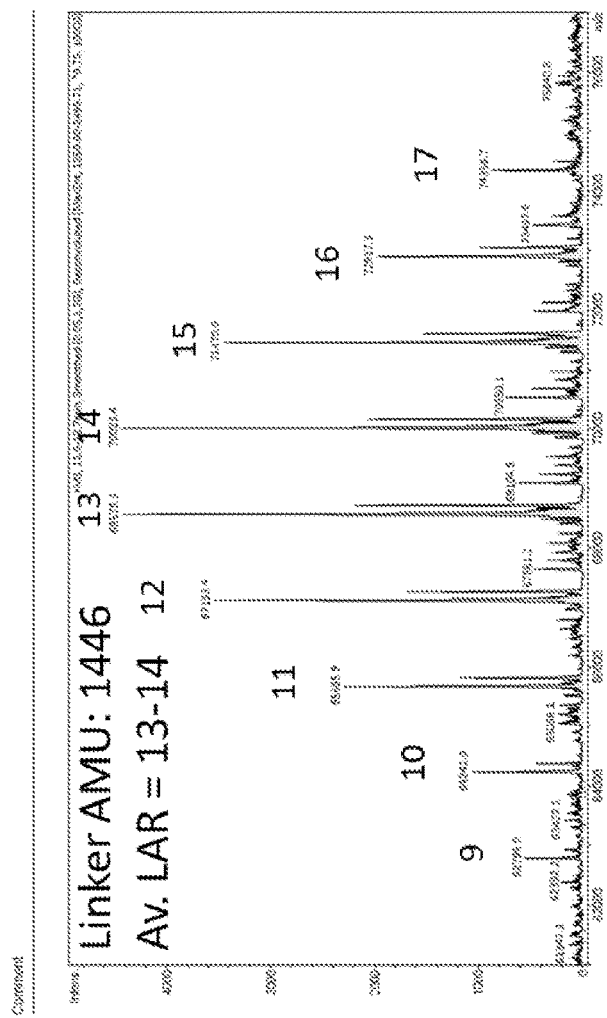
Figure 18:
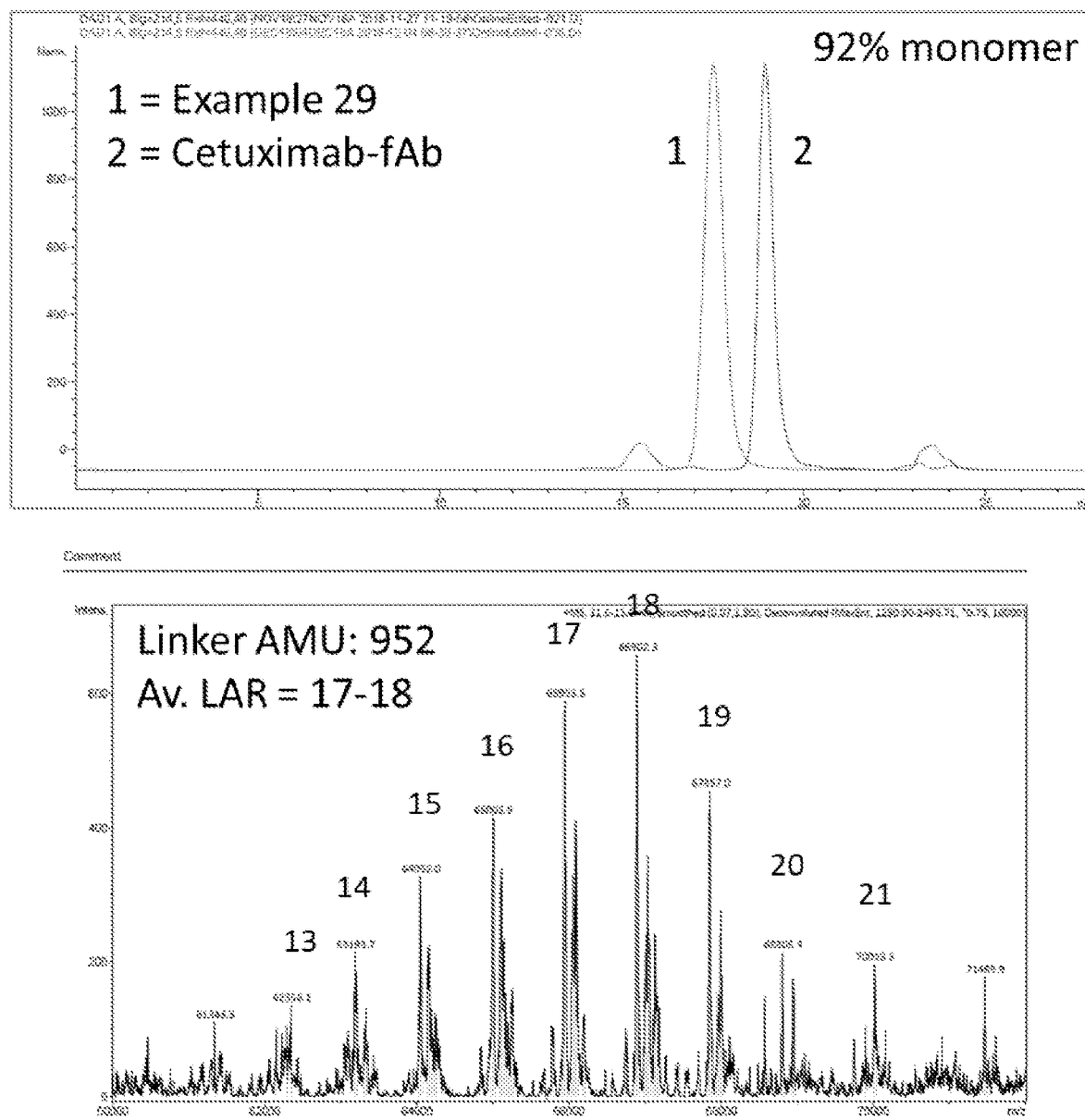
FIG. 18: Analysis of monomer content: SEC for Example 29 compared to cetuximab-fab (upper panel). Electrospray MS (Bruker micrOTOF-Q II) for Example 29 (lower panel).
Figure 19:
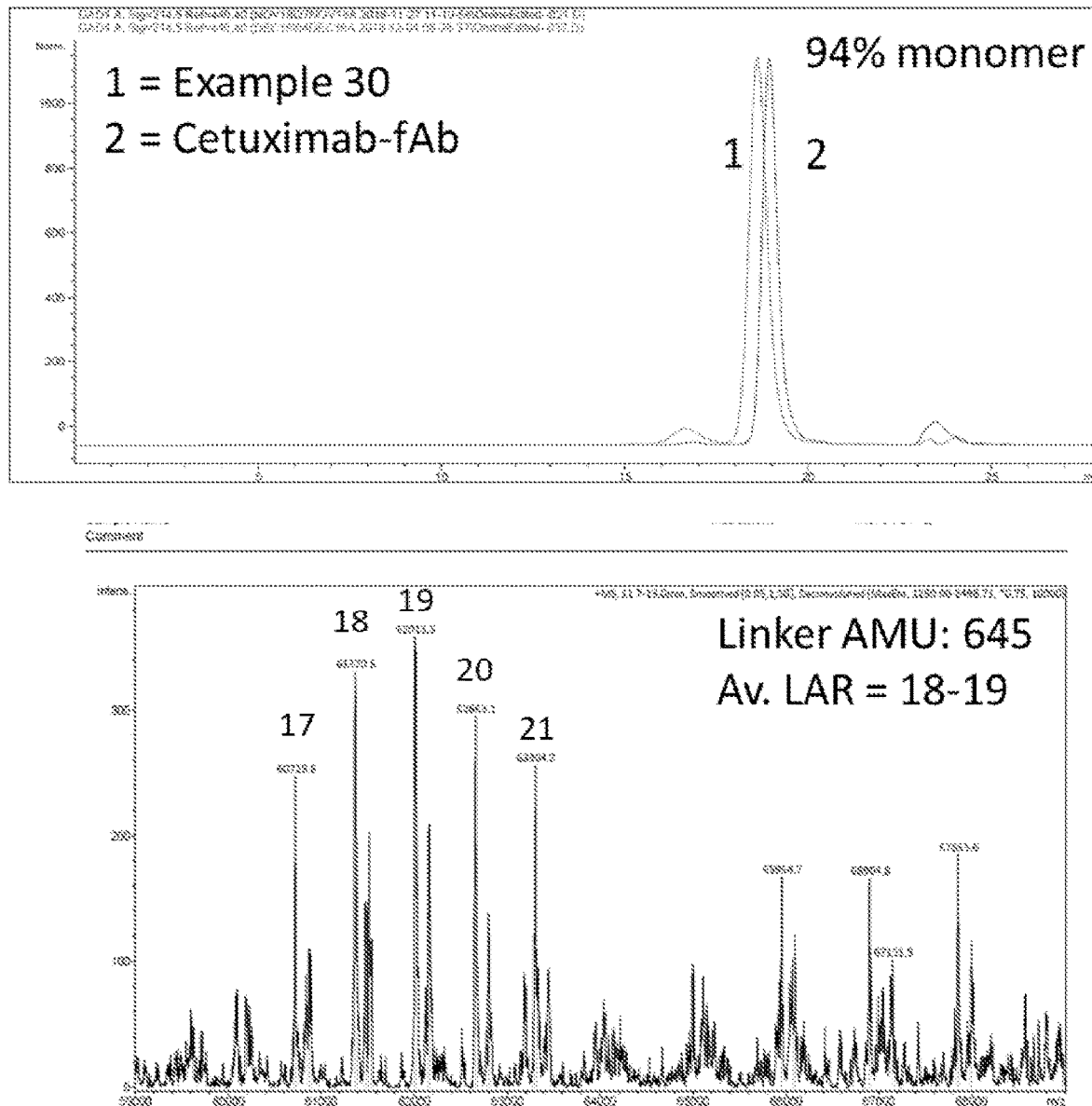
FIG. 19: Analysis of monomer content: SEC for Example 30 compared to cetuximab-fAb (upper panel). Electrospray MS (Bruker micrOTOF-Q II) for Example 30 (lower panel).
Figure 20:
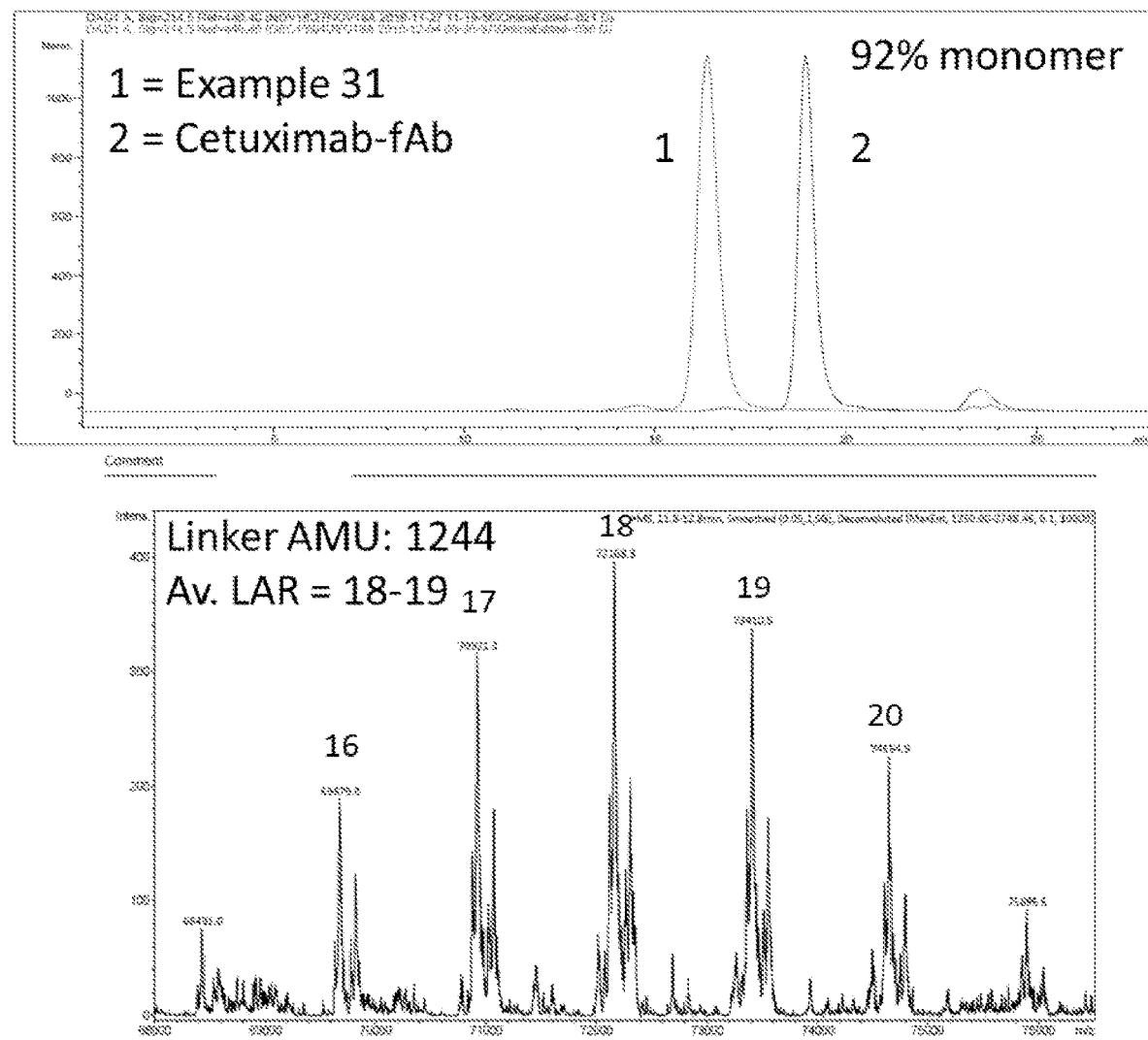
FIG. 20: Analysis of monomer content: SEC for Example 31 compared to cetuximab-fAb (upper panel). Electrospray MS (Bruker micrOTOF-Q II) for Example 31 (lower panel).
Figure 21:
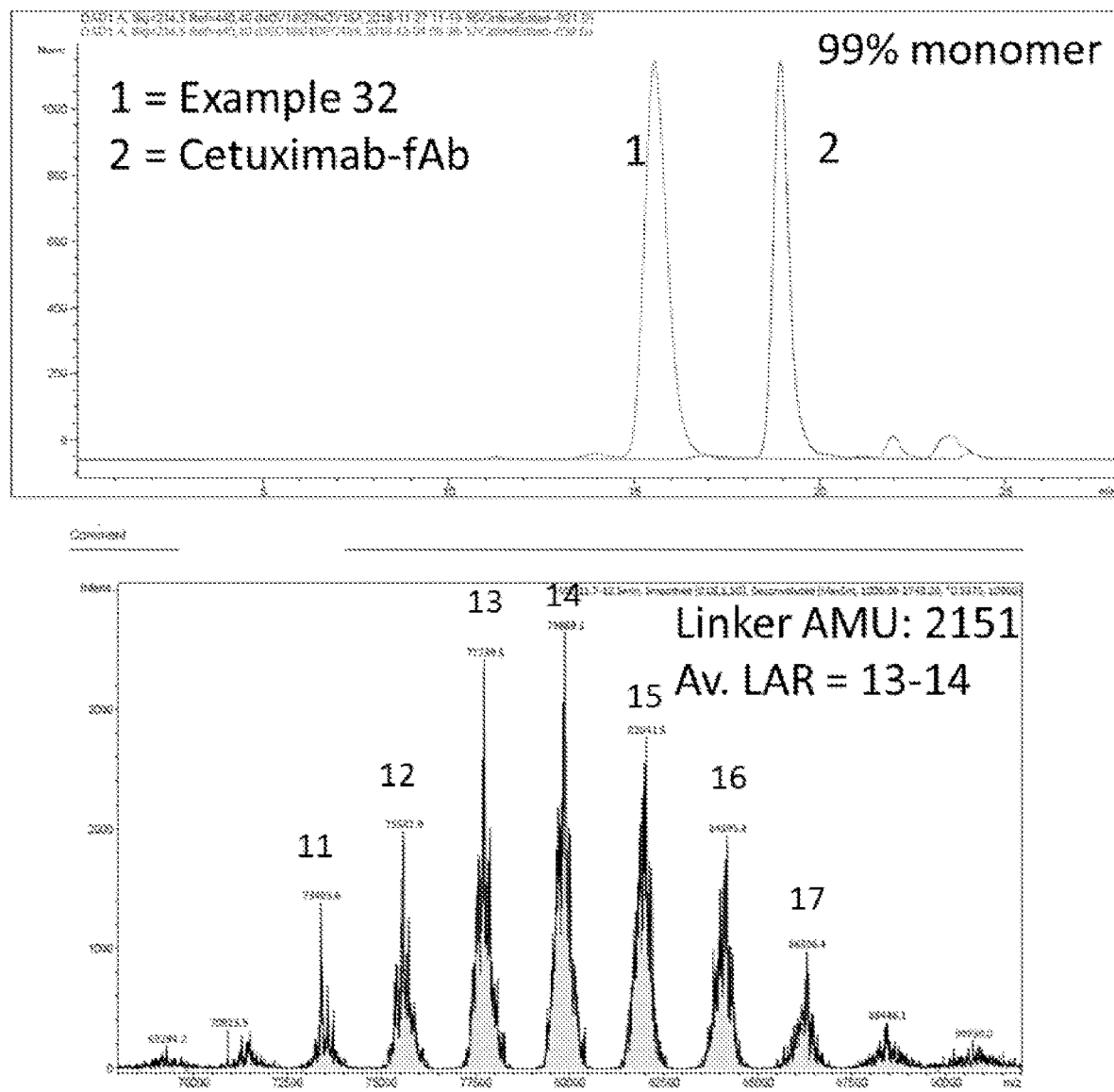
FIG. 21: Analysis of monomer content: SEC for Example 32 compared to cetuximab-fAb (upper panel). Electrospray MS (Bruker micrOTOF-Q II) for Example 32 (lower panel).
Figure 22:
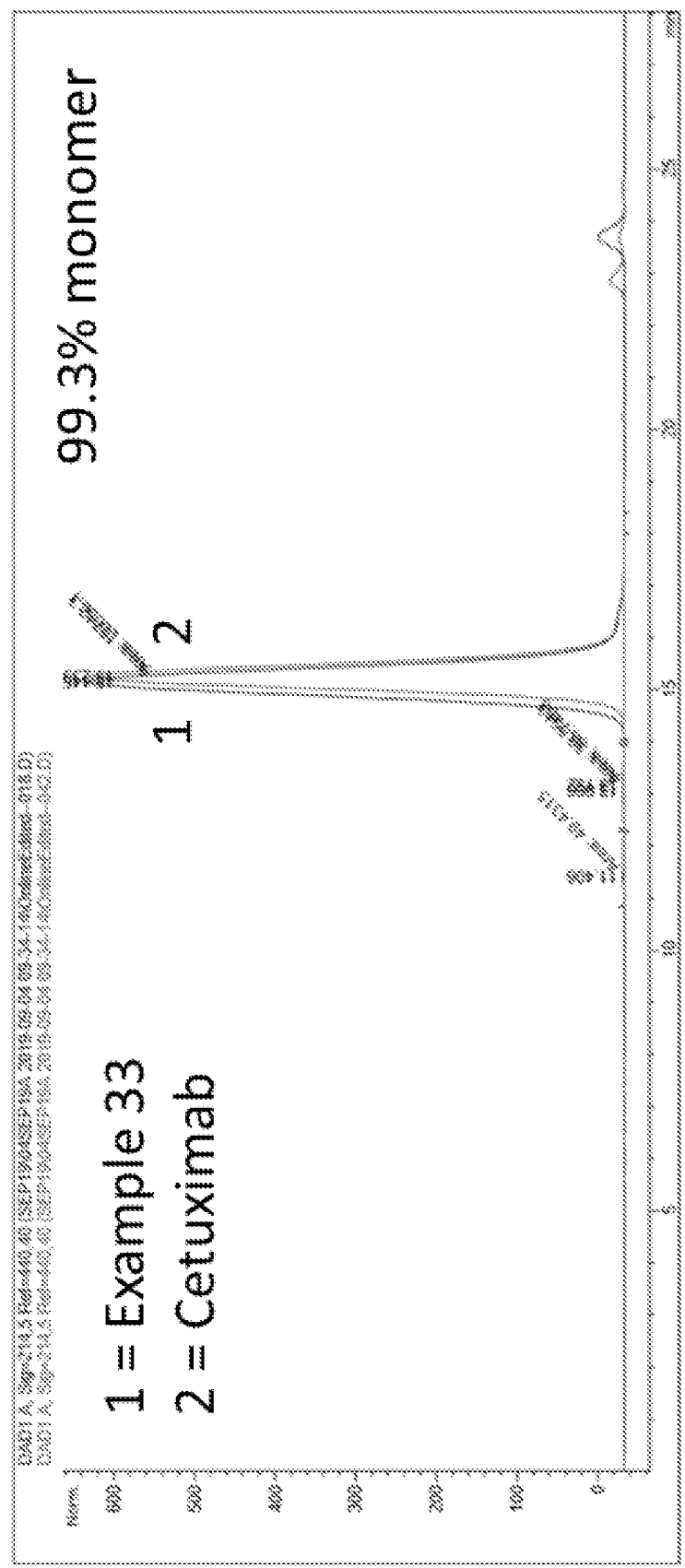
FIG. 22: Analysis of monomer content: SEC for Example 33 compared to cetuximab.
Figure 23:
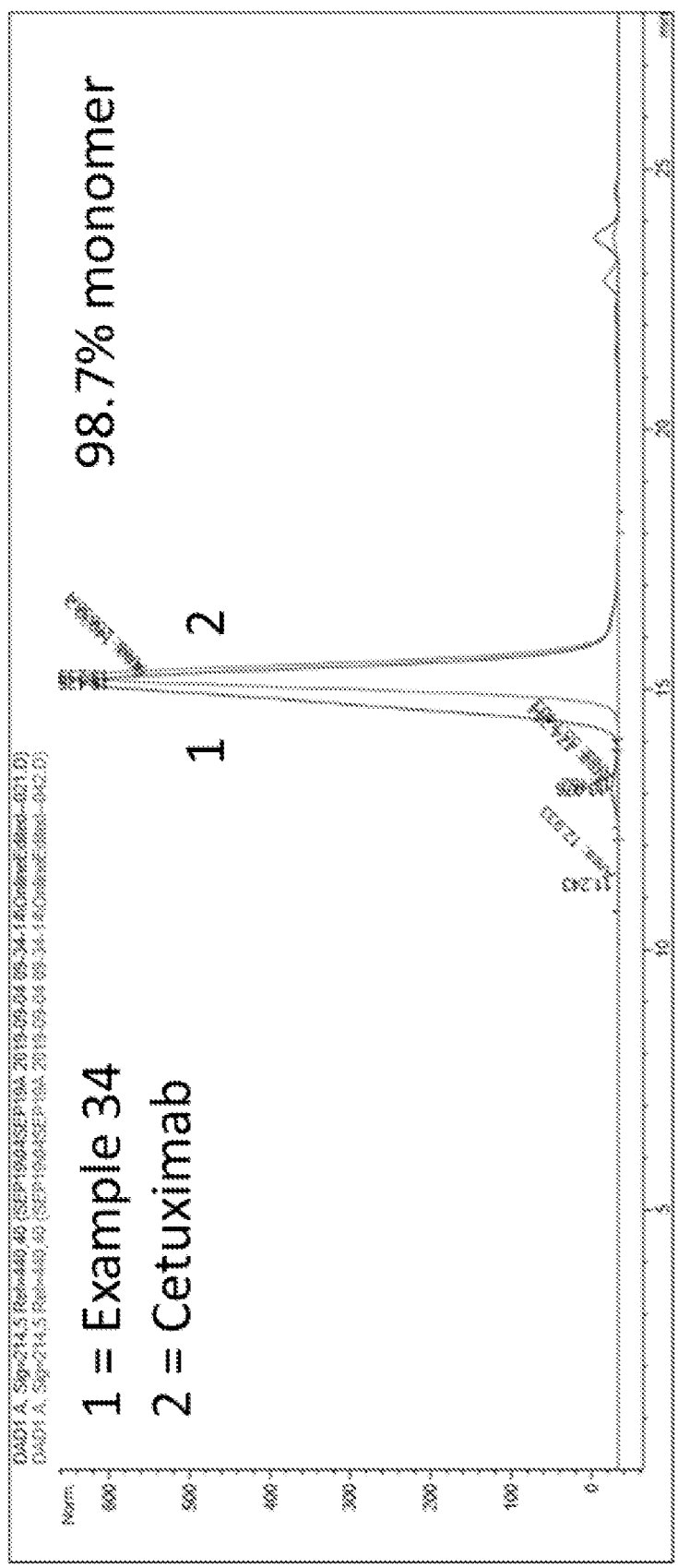
FIG. 23: Analysis of monomer content: SEC for Example 34 compared to cetuximab.
Figure 24:
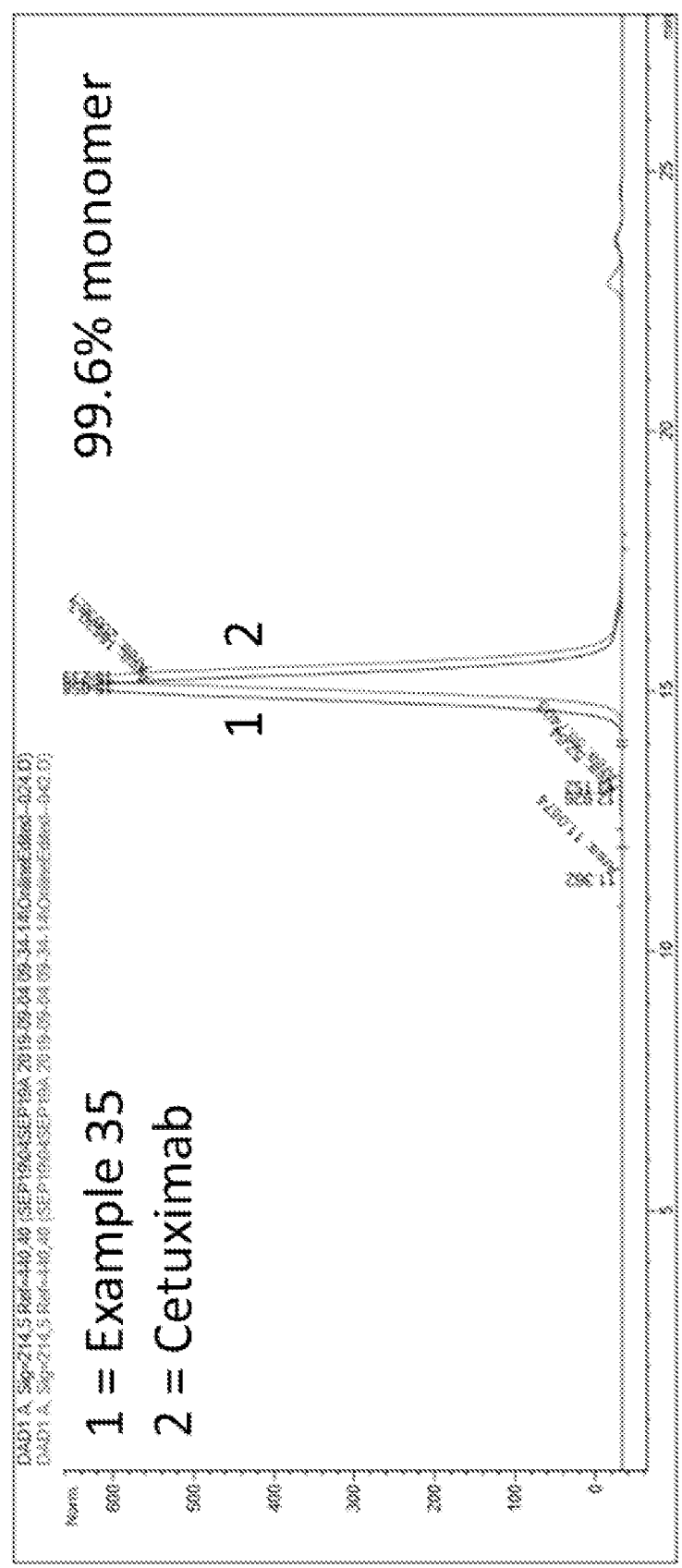
FIG. 24: Analysis of monomer content: SEC for Example 35 compared to cetuximab.
Figure 25:
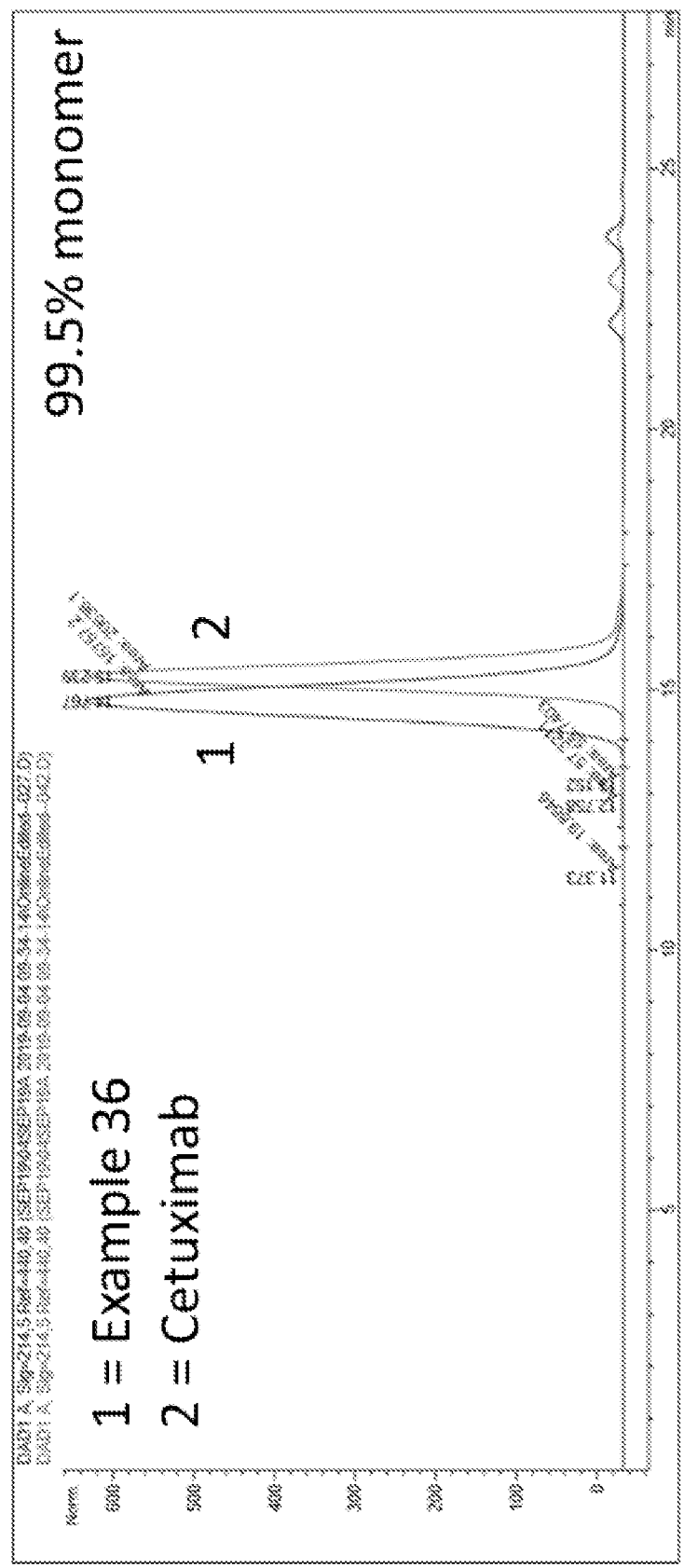
FIG. 25: Analysis of monomer content: SEC for Example 36 compared to cetuximab.
Figure 26:
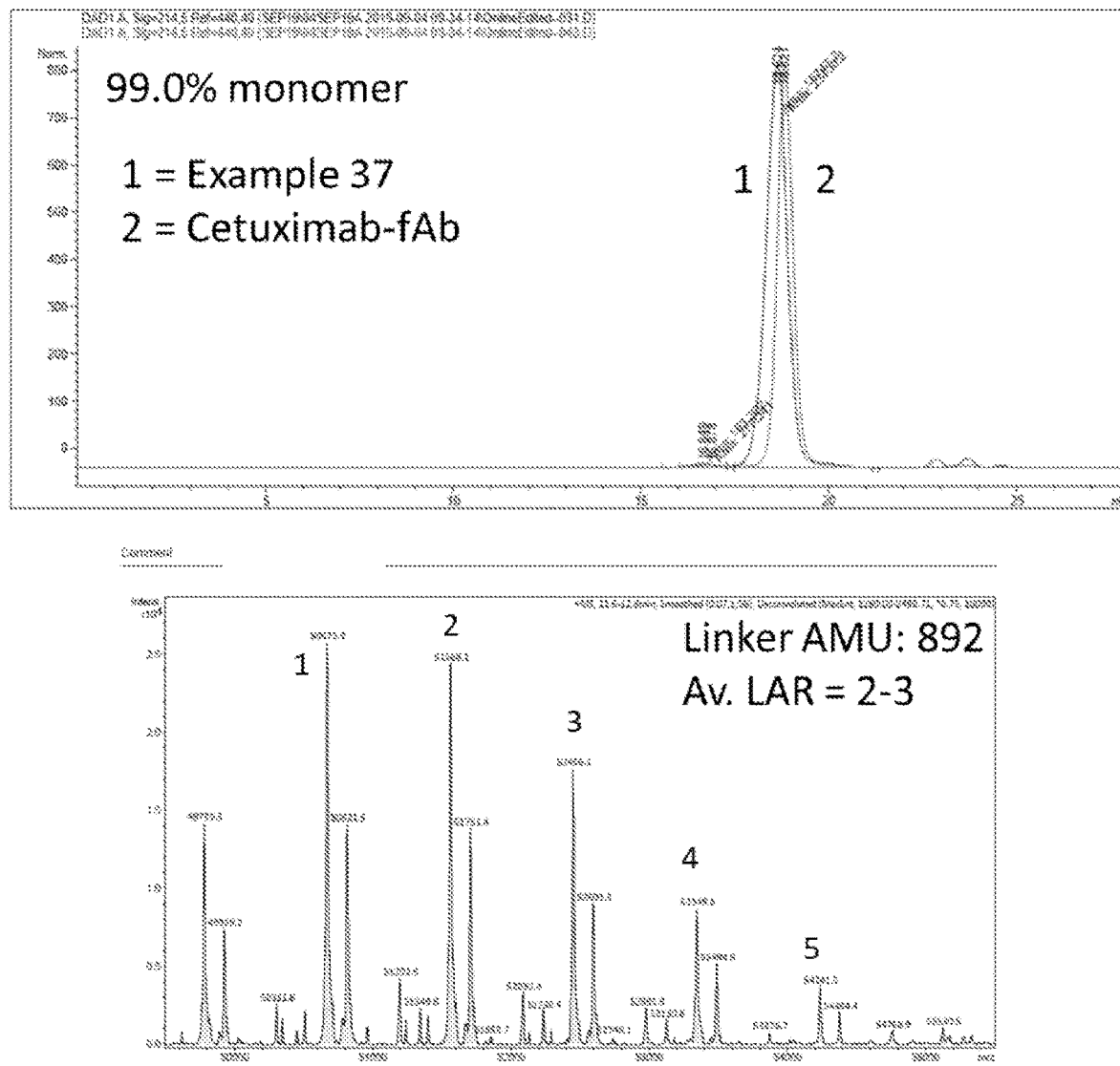
FIG. 26: Analysis of monomer content: SEC for Example 37 compared to cetuximab-fAb (upper panel). Electrospray MS (Bruker micrOTOF-Q II) for Example 37 (lower panel).
Figure 27:
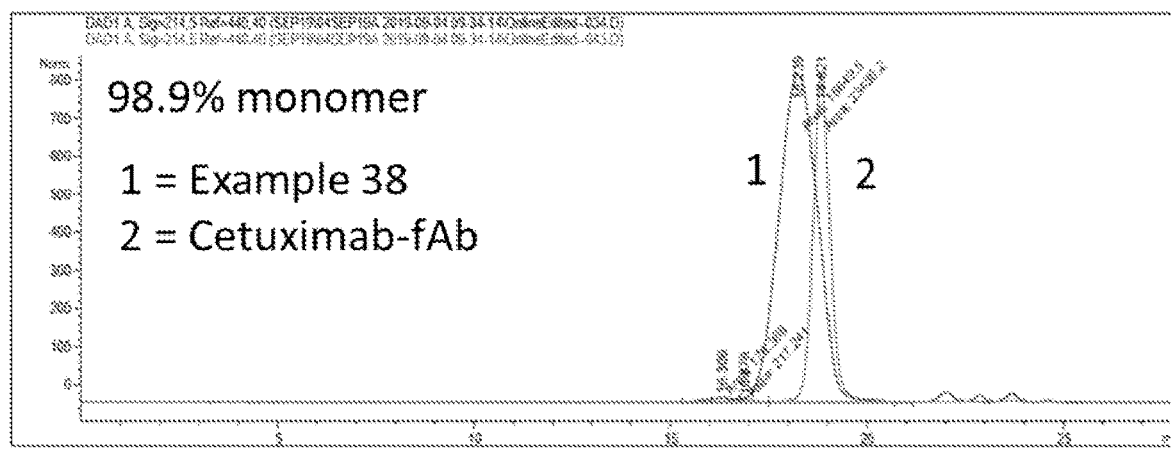
FIG. 27: Analysis of monomer content: SEC for Example 38 compared to cetuximab-fAb (upper panel). Electrospray MS (Bruker micrOTOF-Q II) for Example 38 (lower panel).
Figure 27:
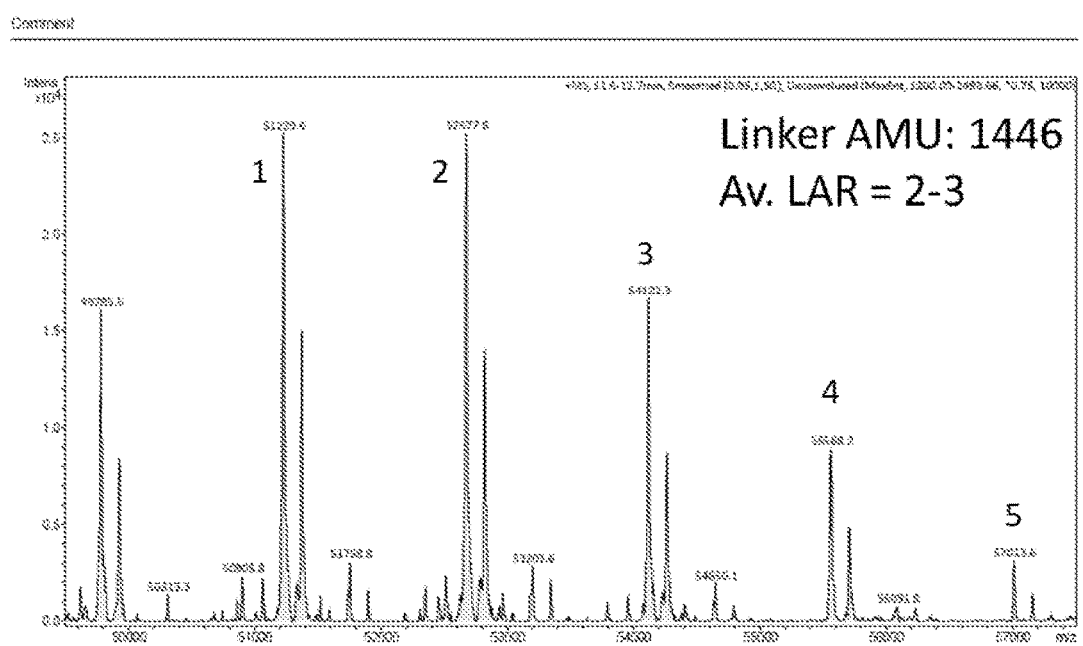
Figure 28:
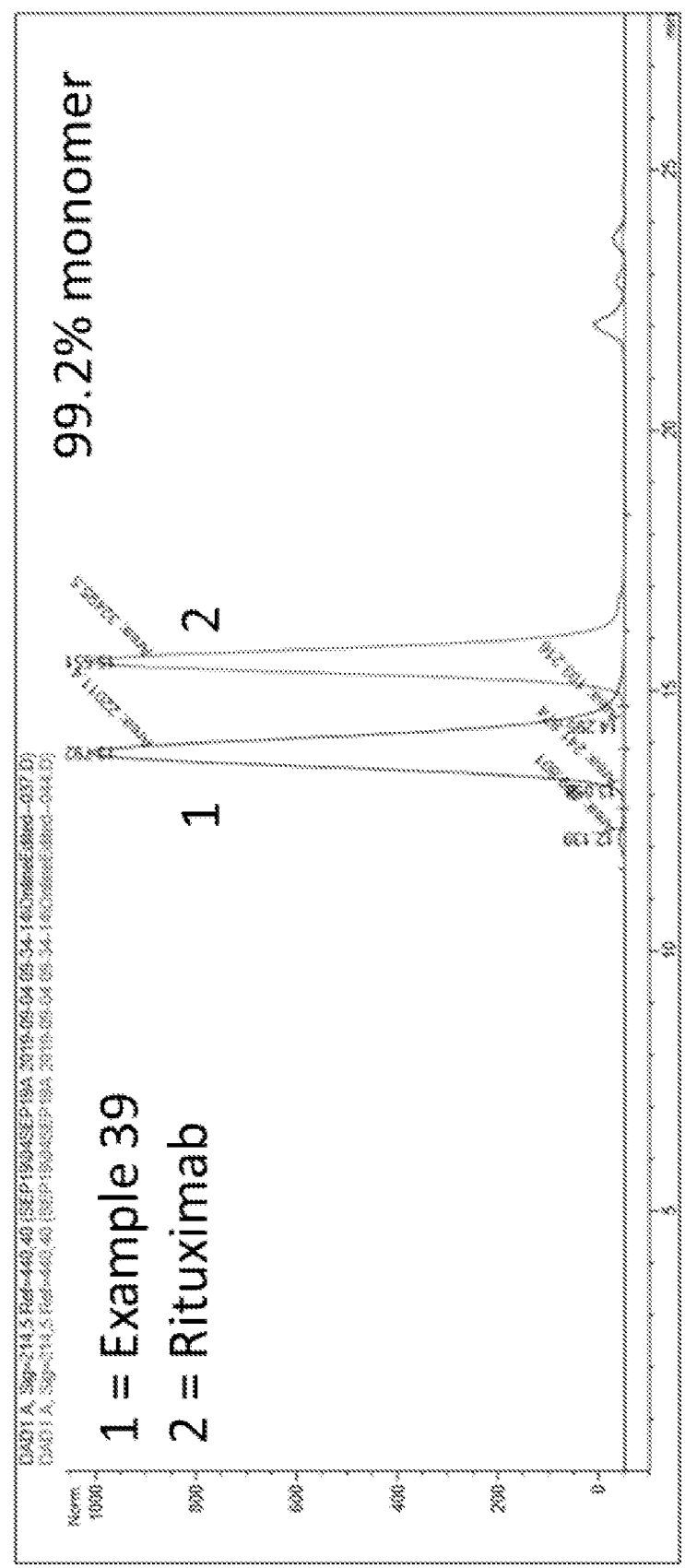
FIG. 28: Analysis of monomer content: SEC for Example 39 compared to rituximab.
Figure 29:
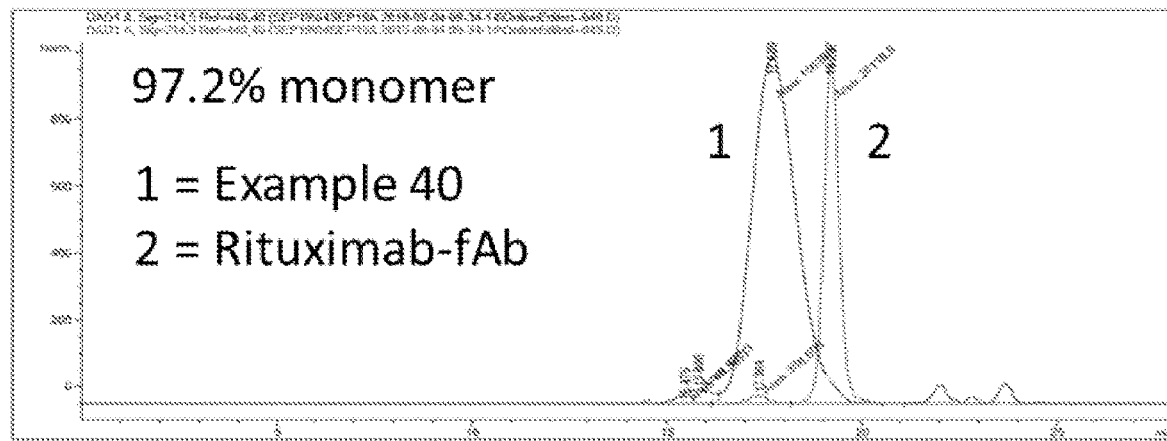
FIG. 29: Analysis of monomer content: SEC for Example 40 compared to cetuximab-fAb (upper panel). Electrospray MS (Bruker micrOTOF-Q II) for Example 40 (lower panel).
Figure 29:
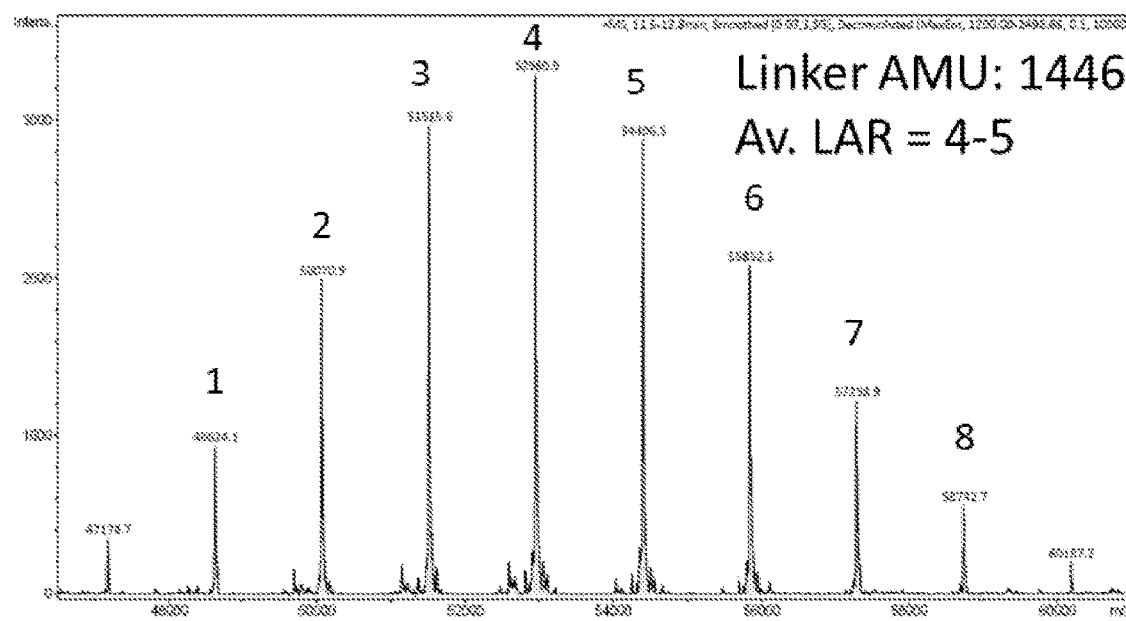
Figure 30:
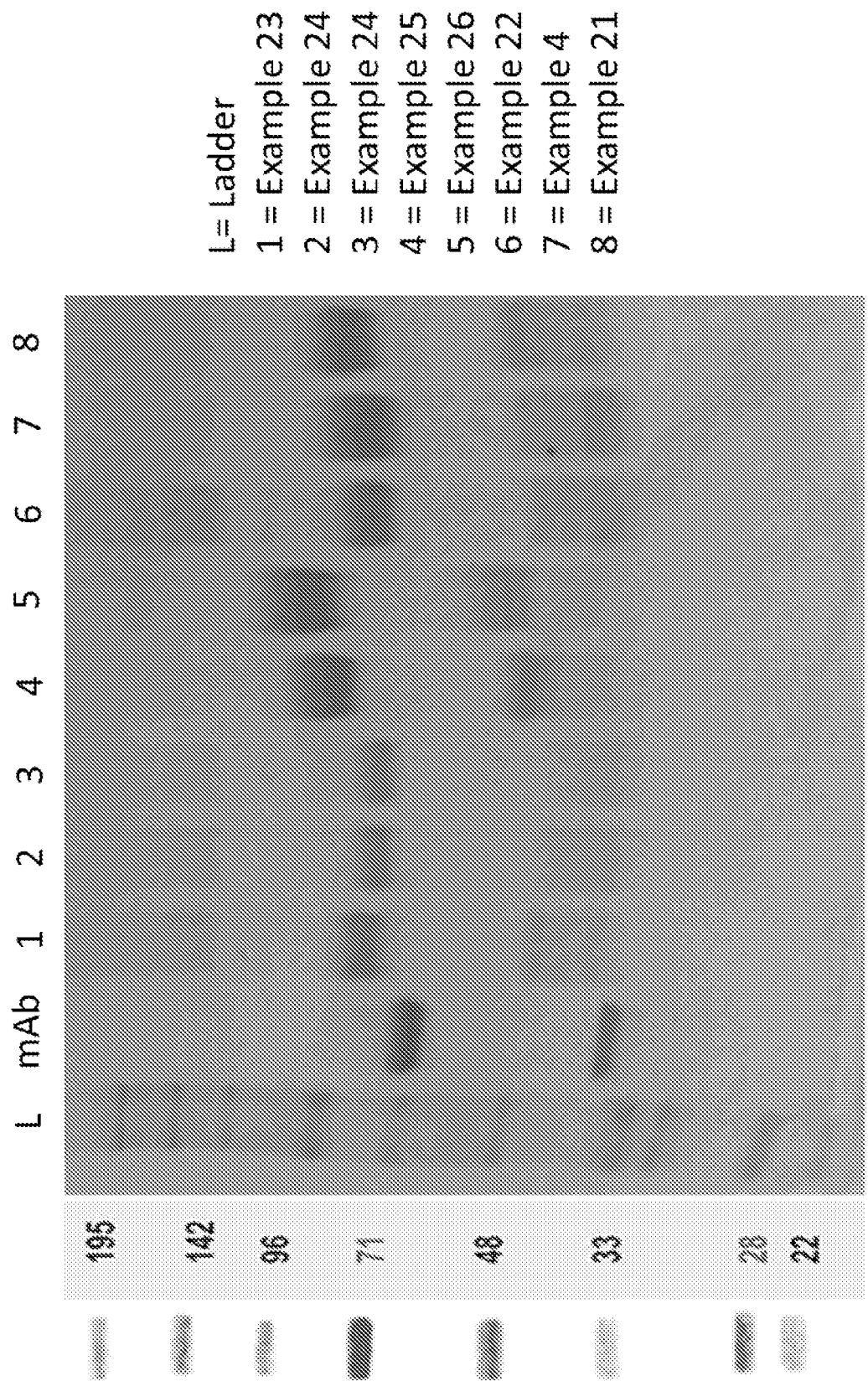
FIG. 30: Reducing SDS PAGE-Gel Analysis for Examples 21-26 compared to Example 4.
Figure 31:
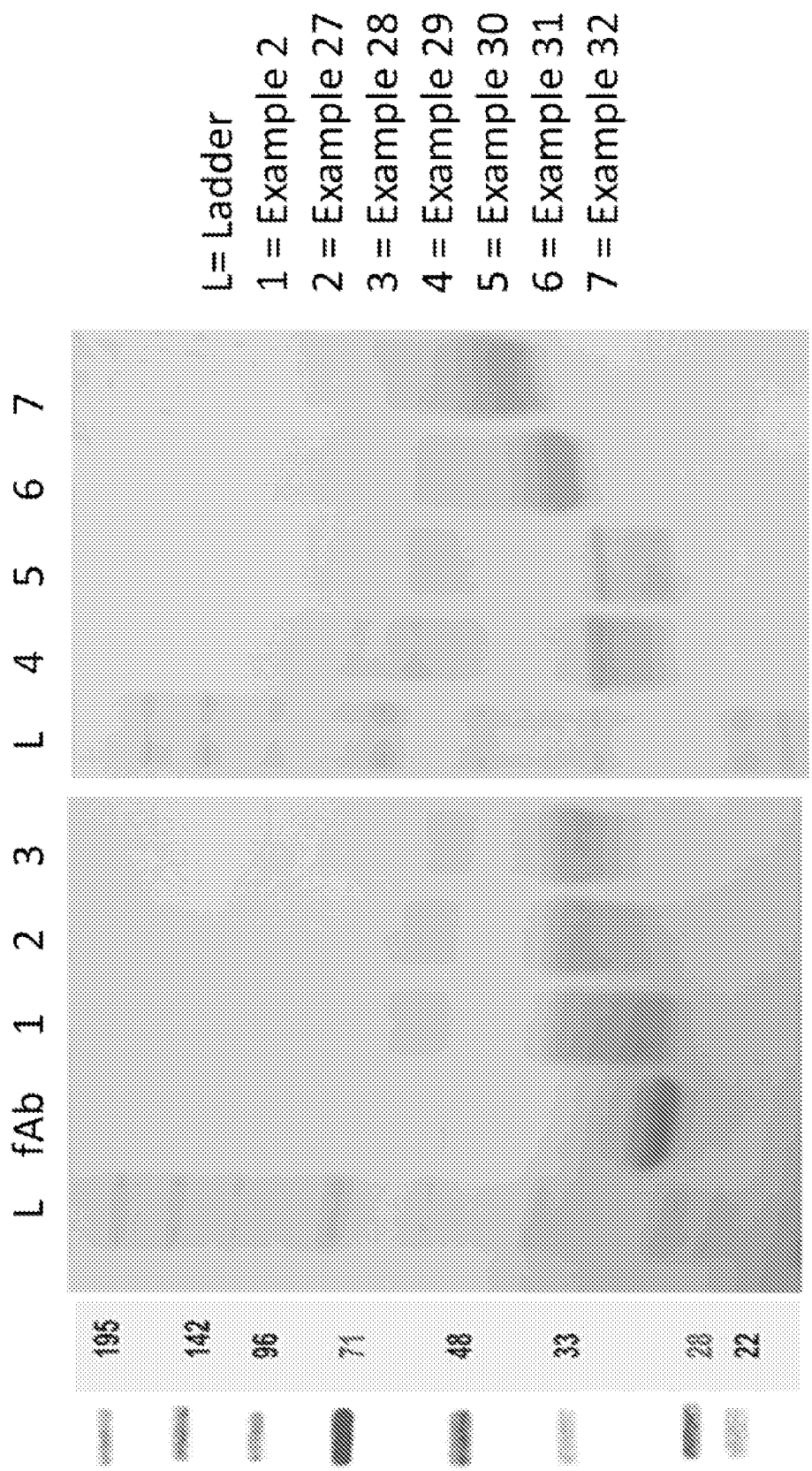
FIG. 31: Reducing SDS PAGE-Gel Analysis for Examples 27-32 compared to Example 2.
Figure 32:
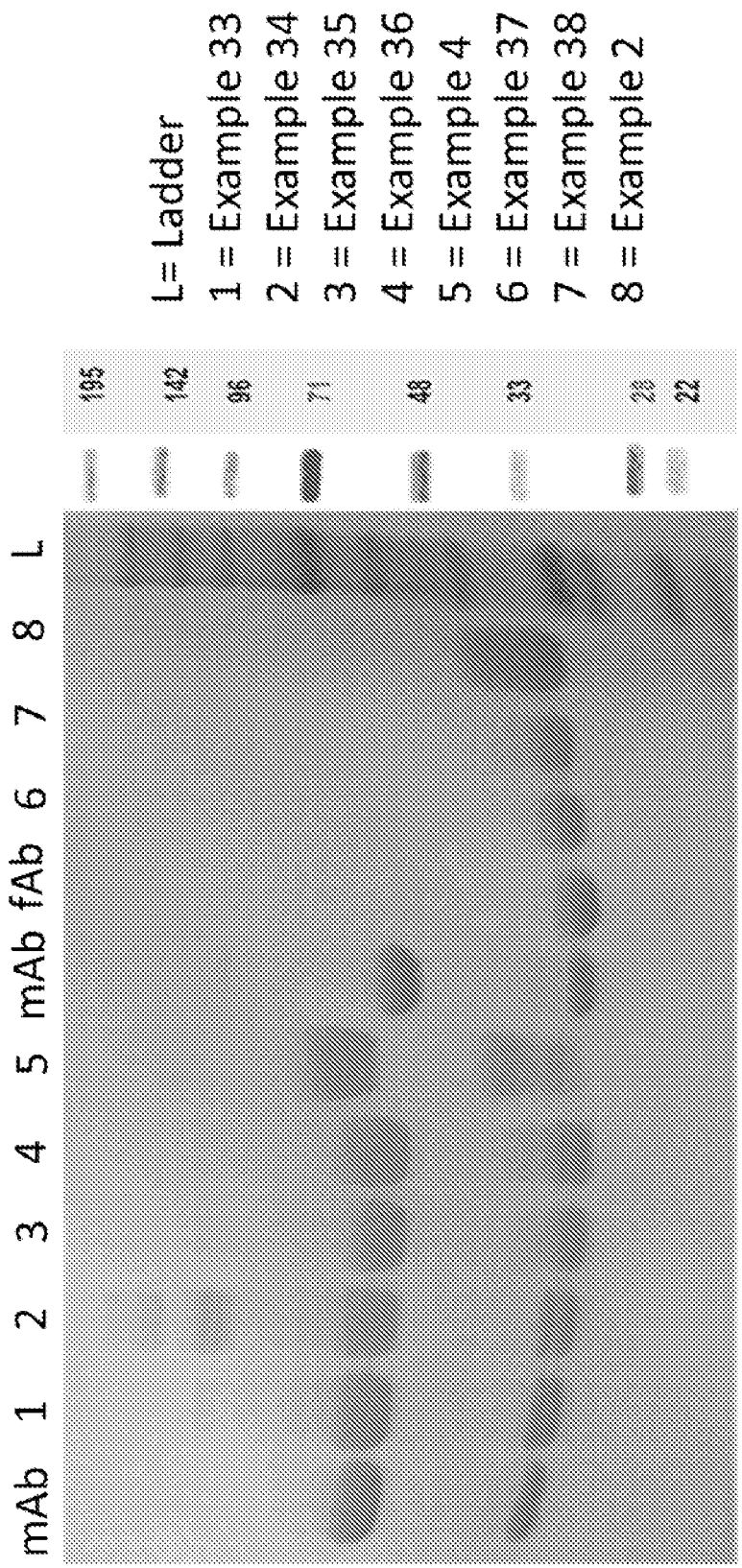
FIG. 32: Reducing SDS PAGE-Gel Analysis for Examples 33-38 compared to Examples 2 and 4.
Figure 33:
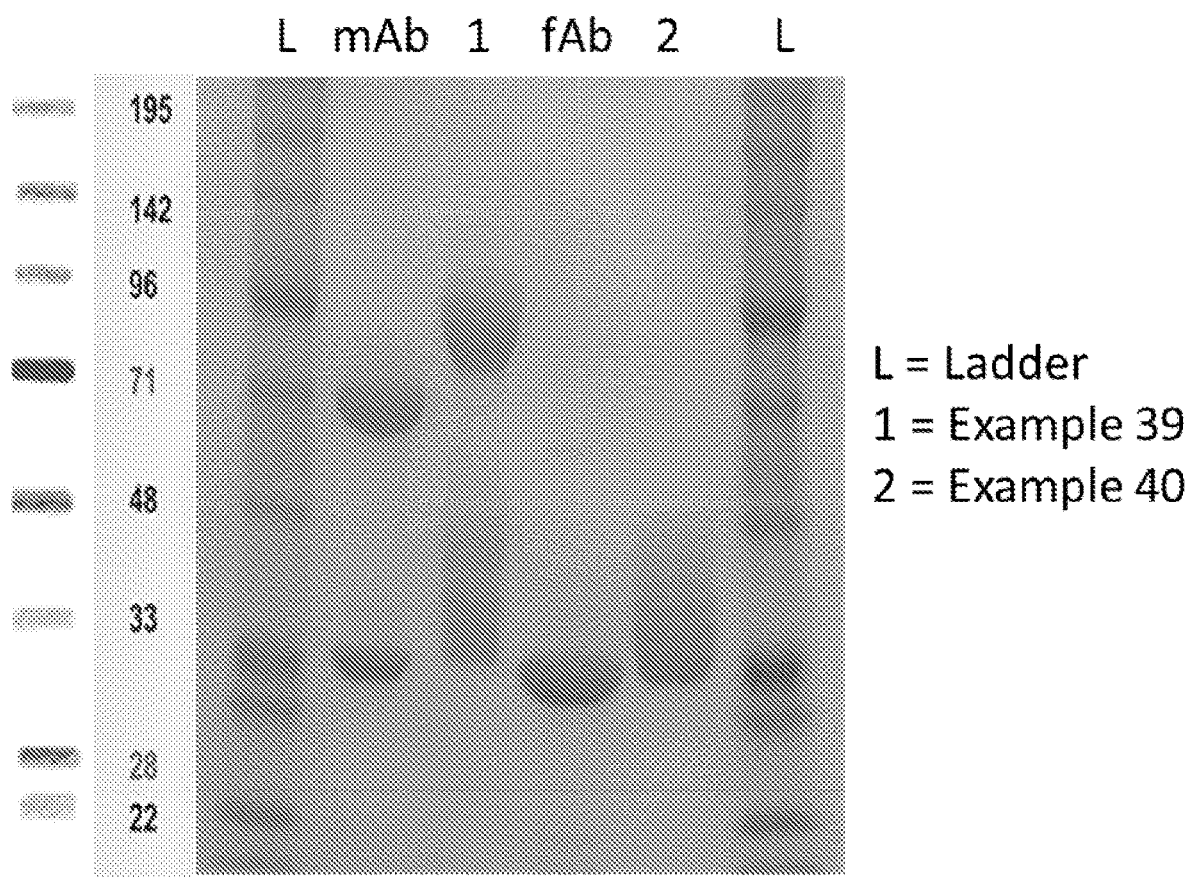
FIG. 33: Reducing SDS PAGE-Gel Analysis for Examples 39-40.
Figure 34:
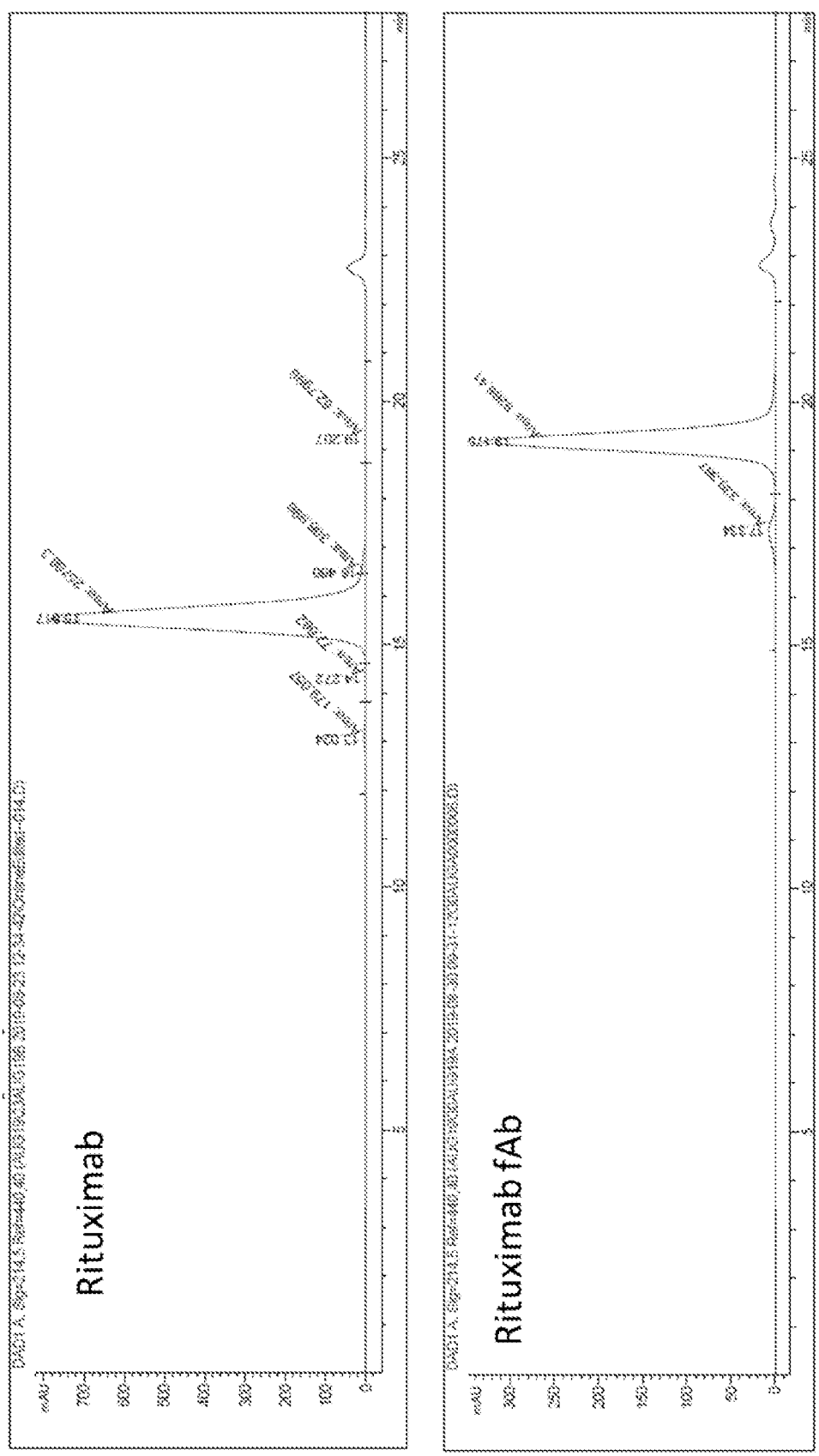
FIG. 34: SEC for rituximab and rituximab-fAb.

FIG. 9 demonstrates the level of C3b deposition on A431 cells with varying concentrations of Examples 1-4, compared to cetuximab Fab fragment and/or cetuximab. The results in FIG. 9 demonstrates dose-related level of C3b deposition observed for Examples 1-4. The data demonstrates that C3b deposition is much higher for Examples 1-4 when compared to cetuximab or cetuximab-Fab Phagocytosis of Target Cells by Macrophages Phagocytosis was used to demonstrate the functional effect of the binding of L (as the Fab fragment of cetuximab) to a receptor on a cell line and F (as the carbohydrate molecule capable of binding to a human anti-rhamnose antibody). A431 cells expressing EGFR were loaded with CellTrace™ Far-Red and used as target cells. Human monocyte derived macrophages were used as effector cells. In the presence of anti-Rhamnose antibody, an increase in macrophages positive for the far-red signal is observed due to phagocytosis of the labelled A431 cells.

Briefly for the generation of human monocyte derived macrophages, NHSBT leukocyte cones were purchased from the National Health Service (London Tooting Blood Donor Centre). Peripheral blood mononuclear cells (PBMCs) were isolated following gradient centrifugation in Ficol Paque™ PLUS (GE Healthcare 17-1440-02). Monocytes were isolated from PBMCs by CD14 positive selection using Miltenyi Biotec MACS™ CD14 Micro beads (130-050-021) following the manufactures instructions. CD14 monocytes were differentiated to M0 macrophage by culturing on 100 cm Square Petri dishes (Sterilin, Fisher Scientific UK Ltd 11349273) at $1\times10^7$ cells/plate in complete macrophage medium (CMM: RPMI (Sigma R8758) supplemented with 10% heat inactivated foetal bovine serum (Sigma F0804), 100 units/mL Penicillin, 100 µg/mL Streptomycin (Fisher Scientific 11548876), 1 mM sodium Pyruvate (Fisher Scientific 12539059) and 25 mM Hepes buffer (Fisher Scientific 12509079) with recombinant human GM-CSF (Peprotech 300-03) at 100 ng/ml for 5 days in a cell culture incubator (5% $CO_2$, 37° C.). The macrophages were then harvested following treatment with 0.25% Trypsin (Sigma T4049) using Cell lifters (VWR76036-004) and harvested M0 macrophage stored in Cryostor™ CS10 cryopreservation media at $5\times10^6$ cells/mL (Sigma C2874) in a liquid nitrogen cell store.

M0 macrophages were thawed when required and polarised towards the M1 phenotype on 24 well plates (Costar 35241) at $1\times10^5$ cells/well in CMM supplemented with 100 ng/ml IFN-γ (R&D systems 285-IF/CF) and 1 ng/ml lipopolysaccharide (Sigma L4391) for two days in a humidified cell culture incubator (5% $CO_2$, 37° C.).

A431 Target cells (ATCC CRL-1555) were cultured in Dulbecco's Modified Eagle's Medium (Sigma D5796) supplemented with 10% heat inactivated Foetal Bovine Serum (Sigma F0804) 2 mM L-Glutamine (Sigma G7513), 100 units/mL Penicillin and 100 µg/mL Streptomycin (Fisher Scientific 11548876).

A341 cells were harvested using 0.25% Trypsin (Sigma T4049), counted and loaded with 0.5 µM CellTrace™ far-red dye (Invitrogen C34572) at $1\times10^7$ cells/mL in phosphate buffered saline without calcium or magnesium (PBS-/-: Sigma D8537) for 20 mins at 37° C., as described in the manufactures instructions, finally resuspending in PBS-/-.

Far-Red loaded A431 cells ($3\times10^5$/sample) were then treated with a range of compound concentrations (Examples) or Cetuximab-Fab for 1 hr at RT with shaking. The cells were washed in ice cold PBS-/- and incubated with 100 µg/ml anti Rhamnose IgG (custom purification from Human Gamma Globulin, MP Biomedicals 82310)) in PBS-/- for 30 mins at 4° C. The far-red loaded A431 target cells were further washed in ice cold PBS-/- and resuspended in 100 µL CMM, prior to being co-cultured with the previously prepared M1 macrophage effector cells (target: effector ratio 3:1) for 1 hour at 37° C.

After incubation, the phagocytosis assay plates were washed twice with PBS-/- and cells harvested following treatment with 0.25% Trypsin (Sigma T4049) using Cell lifters (VWR76036-004). Samples were then transferred to 1.5 mL Eppendorf tubes, centrifuged at 500×g for 5 minutes to pellet the cells and resuspended in 100 µL FACS Buffer (PBS (Sigma D8662)+0.1% BSA (Bovine Serum Albumin—Sigma A2153))+2.5 µL Fc block (Human TruStain Biolegend). The samples were transferred to 96 well V bottomed plates (Greiner 651 180) and incubated for 20 minutes at 4° C. The Fc blocked samples were washed in 1×150 µL FACS buffer and resuspended in 100 µL FACS buffer+3 µL HLA-DR-PE antibody (Biolegend 327008) and incubated for 20 minutes at 4° C. The cells were then washed in 1×150 µL FACS buffer and resuspended in 100 µL SYTOX™ blue live dead stain (Invitrogen S34857-1 µL/mL FACS buffer). Stained samples were analysed by FLOW cytometry (Beckman Coulter CytoFLEX™) and FlowJo v10 or Beckman Kaluza v2.1 software. Negative gates were set on live HLA-DR stained macrophage and the % of far-red stained macrophage determined (% phagocytosis). Phagocytosis data were plotted using Graph Pad Prism Software.

FIGS. 36-39 demonstrate compound driven phagocytosis with cetuximab-fAb conjugate Examples.

---

The invention claimed is:

1. A compound of formula (I) or a pharmaceutically acceptable salt thereof:

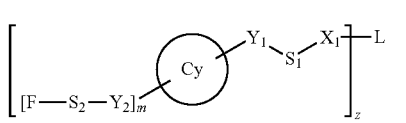

(I)

wherein L represents a binding moiety selected from an antibody or antigen binding fragment thereof that binds to a tumor-associated antigen;

$S_1$ represents a spacer selected from a —$(CH_2)_a$— or —$(CH_2)_b$—$(CH_2$—$CH_2$—$O)_c$—$(CH_2)_d$— group, wherein one to ten of said —$CH_2$— groups may optionally be substituted by one or more groups selected from —O—, —S—, =N(H)—, —C(=O)—, —C(O)NH—, —NHC(O)—, cyclohexyl or pyrrolidine-2,5-dione;

a represents an integer selected from 1 to 35;
b represents an integer selected from 0 to 5;
c represents an integer selected from 1 to 20;
d represents an integer selected from 1 to 20;

$S_2$ represents a spacer selected from a —$(CH_2)_e$— or —$(CH_2)_f$—$(CH_2$—$CH_2$—$O)_g$—$(CH_2)_h$— group, wherein one to five of said —$CH_2$— groups may optionally be substituted by one or more groups selected from —N(H)—, —C(O)NH— and —NHC(O)—;

e represents an integer selected from 1 to 15;
f represents an integer selected from 1 to 10;
g represents an integer selected from 1 to 20;
h represents an integer selected from 1 to 5;
z represents an integer selected from 1 to 50;
$X_1$ represents an antibody or antigen binding fragment attachment moiety;
$Y_1$ and $Y_2$ independently represent a bond, —O—, —S—, —NH—, —NHC(O)—, —C(O)NH—, —OC(O)—, —C(O)O—, —SC(O)—, —C(O)S—, —NHSO_2—, —SO_2NH— or —NHC(O)NH— group;
F represents rhamnose;
m represents an integer selected from 1 to 5; and
Cy represents phenyl, biphenyl, triphenyl, such that when Cy represents biphenyl or triphenyl said —$Y_1$—$S_1$—$X_1$-L group may be present on any of said phenyl rings and said [F—$S_2$—$Y_2$]_m— group or groups may be present on any of said phenyl rings.

2. The compound as defined in claim 1, wherein $S_1$ represents a spacer selected from:
—$(CH_2)_a$—, wherein 2, 3 or 5 of said —$CH_2$— groups may optionally be substituted by one or more groups selected from —S—, =N(H)—, —C(=O)—, —NHC(O)—, cyclohexyl or pyrrolidine-2,5-dione; or
—$(CH_2)_b$—$(CH_2$—$CH_2$—$O)_c$—$(CH_2)_d$—, wherein 2 of said —$CH_2$— groups may optionally be substituted by one or more groups selected from —NHC(O)— or pyrrolidine-2,5-dione;
or $S_1$ represents a spacer selected from:
—$(CH_2)_a$—, wherein 2, 3 or 5 of said —$CH_2$— groups may optionally be substituted by one or more groups selected from —S—, =N(H)—, —C(=O)—, —NHC(O)—, cyclohexyl or pyrrolidine-2,5-dione;
or $S_1$ represents a spacer selected from:
—$(CH_2)_a$—, wherein 2 of said —$CH_2$— groups may optionally be substituted by one or more groups selected from —C(=O)— and —NHC(O)—.

3. The compound as defined in claim 1, wherein a represents an integer selected from 6 to 30.

4. The compound as defined in claim 1, wherein b represents an integer selected from 0 to 3.

5. The compound as defined in claim 1, wherein c represents an integer selected from 1 to 15.

6. The compound as defined in claim 1, wherein d represents an integer selected from 1 to 15.

7. The compound as defined in claim 1, wherein $Y_1$ represents a bond, —C(O)NH— or —O—; or $Y_1$ represents —C(O)NH—.

8. The compound as defined in claim 1 wherein $S_2$ represents a spacer selected from:
—$(CH_2)_e$—, wherein one or two of said —$CH_2$— groups are optionally substituted by one or two groups selected from —O—, —N(H)—, —C(O)NH-and-NHC(O)—; or
—$(CH_2)_f$—$(CH_2$—$CH_2$—$O)_g$—$(CH_2)_h$—, wherein one to five of said —$CH_2$— groups are optionally substituted by one to three —O— or —NHC(O)— groups;
or $S_2$ represents a spacer selected from:
—$(CH_2)_e$—, wherein one or two of said —$CH_2$— groups are optionally substituted by a —O—, —C(O)NH— or —NHC(O)— group; or
—$(CH_2)_f$—$(CH_2$—$CH_2$—$O)_g$—$(CH_2)_h$—, wherein one to five of said —$CH_2$— groups are optionally substituted by a —O—, —C(O)NH— or —NHC(O)— group;
or $S_2$ represents a spacer selected from:
—$(CH_2)_e$—, wherein one or two of said —$CH_2$— groups are optionally substituted by one or two —O— or —NHC(O)— groups; or
—$(CH_2)_f$—$(CH_2$—$CH_2$—$O)_g$—$(CH_2)_h$—, wherein one to five of said —$CH_2$— groups are optionally substituted by one to three —O— or —NHC(O)— groups;
or $S_2$ represents a spacer selected from:
—$(CH_2)_e$—, wherein one or two of said —$CH_2$— groups are optionally substituted by one or two groups selected from —O—, —N(H)—, —C(O)NH-and-NHC(O)—; or
—$(CH_2)_f$—$(CH_2$—$CH_2$—$O)_g$—$(CH_2)_h$—, wherein one to five of said —$CH_2$— groups are optionally substituted by one to three —O— or —NHC(O)— groups;
or $S_2$ represents a spacer selected from:
—$(CH_2)_e$—, wherein one or two of said —$CH_2$— groups are optionally substituted by one or two groups selected from —O—, —N(H)—, —C(O)NH-and-NHC(O)—;
or $S_2$ represents a spacer selected from:
—$(CH_2)_e$—, wherein one or two of said —$CH_2$— groups are optionally substituted by a —O— or —NHC(O)— group; or
—$(CH_2)_f$—$(CH_2$—$CH_2$—$O)_g$—$(CH_2)_h$—, wherein one to five of said —$CH_2$— groups are optionally substituted by an —O— or —NHC(O)— group;
or $S_2$ represents a spacer selected from:
—$(CH_2)_e$—, wherein two of said —$CH_2$— groups are optionally substituted by a —O— or —NHC(O)— group; or
$(CH_2)_f$—$(CH_2$—$CH_2$—$O)_g$—$(CH_2)_h$—, wherein three of said —$CH_2$— groups are optionally substituted by an —O— or —NHC(O)— group;
or $S_2$ represents a spacer selected from:
—$(CH_2)_f$—$(CH_2$—$CH_2$—$O)_g$—$(CH_2)_h$—, wherein three of said —$CH_2$— groups are optionally substituted by an —O— or —NHC(O)— group.

9. The compound as defined in claim 1, wherein e represents an integer selected from 3 to 10.

10. The compound as defined in claim 1, wherein f represents an integer selected from 2 to 8.

11. The compound as defined in claim 1, wherein g represents an integer selected from 4 to 12.

12. The compound as defined in claim 1, wherein h represents an integer selected from 1 to 4.

13. The compound as defined in claim 1, wherein $Y_2$ represents a bond, —O— or —NHC(O)—; or $Y_2$ represents a bond or —O—; or $Y_2$ represents —O—.

14. The compound as defined in claim 1, wherein m represents an integer selected from 1 to 4; or 1 to 3; or 1 or 3; or 2 or 3; or 1 or 2; or 1; or 2; or 3; or 4.

15. The compound as defined in claim 1, wherein z represents an integer selected from 1 to 36.

16. The compound as defined in claim 1, wherein Cy represents phenyl or biphenyl; or biphenyl or triphenyl; or phenyl or triphenyl; or biphenyl.

17. The compound as defined in claim 1, wherein $X_1$ represents —S— or —N(H)—; or $X_1$ represents —N(H)—.

18. The compound as defined in claim 1, which is a compound of formula (I)$^a$ or a pharmaceutically acceptable salt thereof:

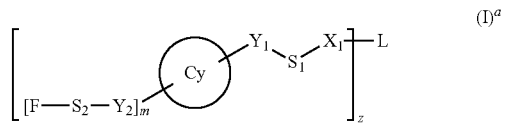

wherein L represents a binding moiety selected from an antibody or antigen binding fragment thereof that binds to a tumor-associated antigen;
$S_1$ represents a spacer selected from —$(CH_2)_a$—, wherein two of said —$CH_2$— groups may optionally be substituted by one or more groups selected from —NHC(O)—, C(═O)—, cyclohexyl or pyrrolidine-2,5-dione;
a represents an integer selected from 7;
$S_2$ represents a spacer selected from:
—$(CH_2)_e$—, wherein two of said —$CH_2$— groups is optionally substituted by a —O— or —NHC(O)— group; or
—$(CH_2)_f$—$(CH_2$—$CH_2$—$O)_g$—$(CH_2)_h$—, wherein three of said —$CH_2$— groups are optionally substituted by an —O— or —NHC(O)— group;
e represents an integer selected from 7;
f represents an integer selected from 4;
g represents an integer selected from 4 or 12;
h represents an integer selected from 4;
z represents an integer selected from 6 to 36;
$X_1$ represents —N(H)—;
$Y_1$ represents —C(O)NH—;
$Y_2$ represents —O—;
F represents rhamnose;
m represents an integer selected from 1 to 3; and
Cy represents biphenyl, such that said —$Y_1$—$S_1$—$X_1$-L group may be present on either of said phenyl rings and said [F—$S_2$—$Y_2$]$_m$— group or groups may be present on either of said phenyl rings.

19. The compound as defined in claim 1, which is a compound of formula (I) b or a pharmaceutically acceptable salt thereof:

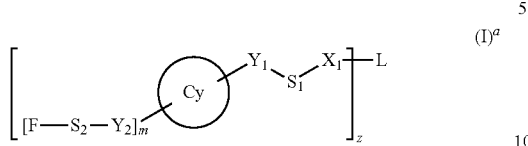

wherein L represents a binding moiety selected from an antibody or antigen binding fragment thereof that binds to a tumor-associated antigen;
$S_1$ represents a spacer selected from —$(CH_2)_a$—, wherein two of said —$CH_2$— groups may optionally be substituted by a —NHC(O)— or C(=O)— group;
a represents an integer selected from 7;
$S_2$ represents a spacer selected from —$(CH_2)_f$—$(CH_2$—$CH_2$—$O)_g$—$(CH_2)_h$—, wherein three of said —$CH_2$— groups are optionally substituted by an —O— or —NHC(O)— group;
f represents an integer selected from 4;
g represents an integer selected from 4;
h represents an integer selected from 4;
z represents an integer selected from 6 to 36;
$X_1$ represents —N(H)—;
$Y_1$ represents —C(O)NH—;
$Y_2$ represents —O—;
F represents rhamnose;
m represents an integer selected from 1 or 2; and
Cy represents biphenyl, such that said —$Y_1$—$S_1$—$X_1$-L group may be present on either of said phenyl rings and said [F—$S_2$—$Y_2$]$_m$— group or groups may be present on either of said phenyl rings.

20. The compound as defined in claim 1, wherein said antibody is a polyclonal antibody, a humanized antibody, a human antibody, a murine antibody, a chimeric antibody, or a single domain antibody (sdAb).

21. The compound as defined in claim 1, wherein said antigen binding fragment thereof is an antigen-binding fragment (Fab) or a single-chain variable fragment (scFv), or said fragment is selected from the group consisting of Fab, Fab', F(ab)2, F(ab')2, and scFv.

22. The compound as defined in claim 1, wherein said antibody or antigen binding fragment thereof is selected from:
an EGFR antibody selected from cetuximab, cetuximab Fab or nimotuzumab or
a CD20 antibody selected from rituximab or rituximab Fab; or
a HER2 antibody selected from trastuzumab or trastuzumab Fab.

23. A compound or a pharmaceutically acceptable salt thereof, which is selected from any one of Examples 1-40;

Example 1

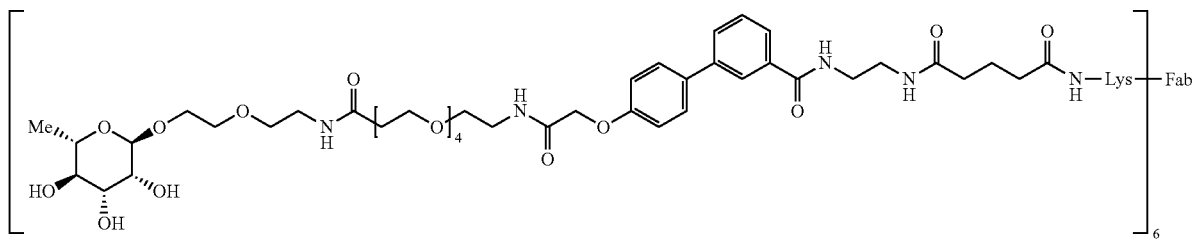

Example 2

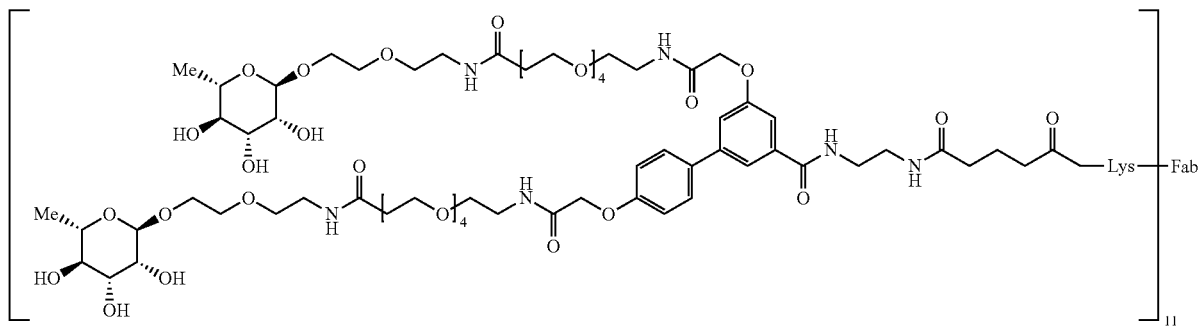

Example 3
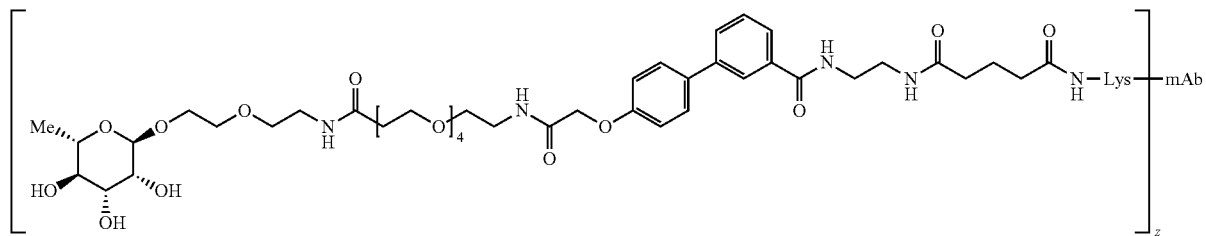
Example 4
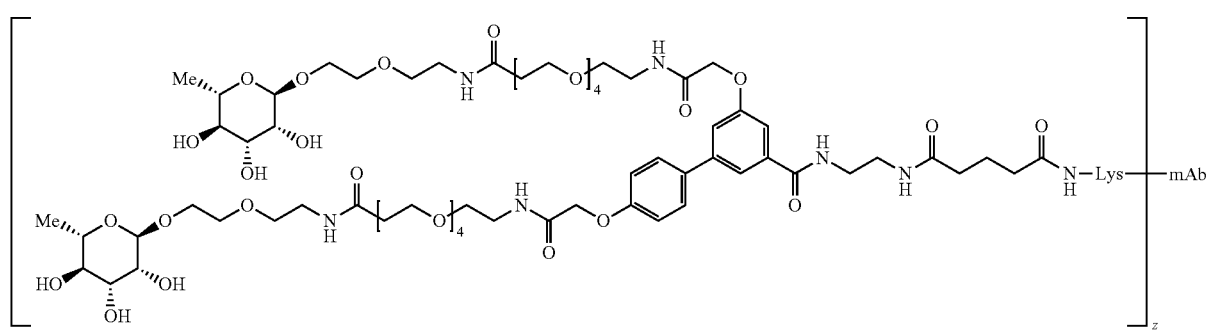
Example 5
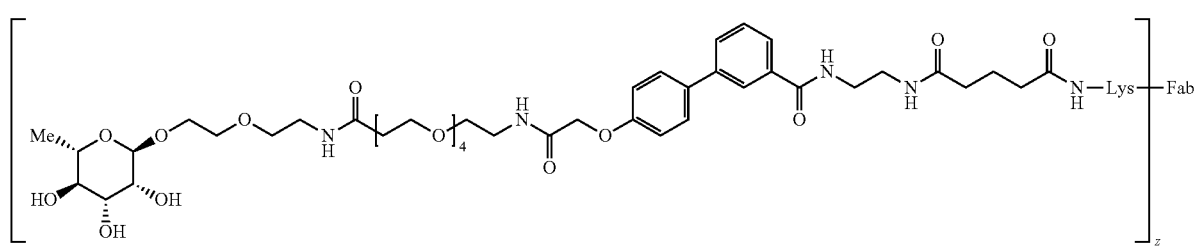
Example 6
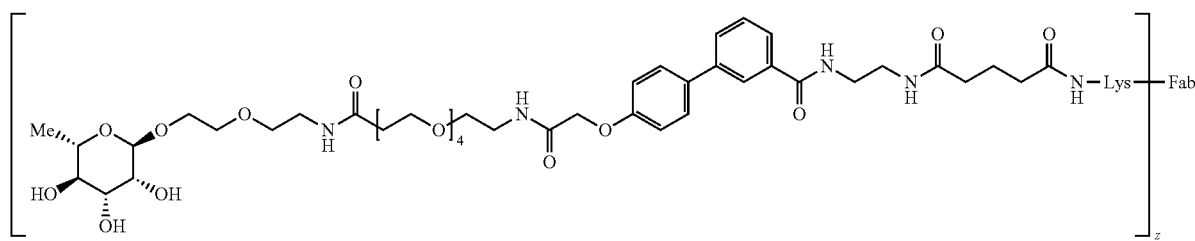

Example 7
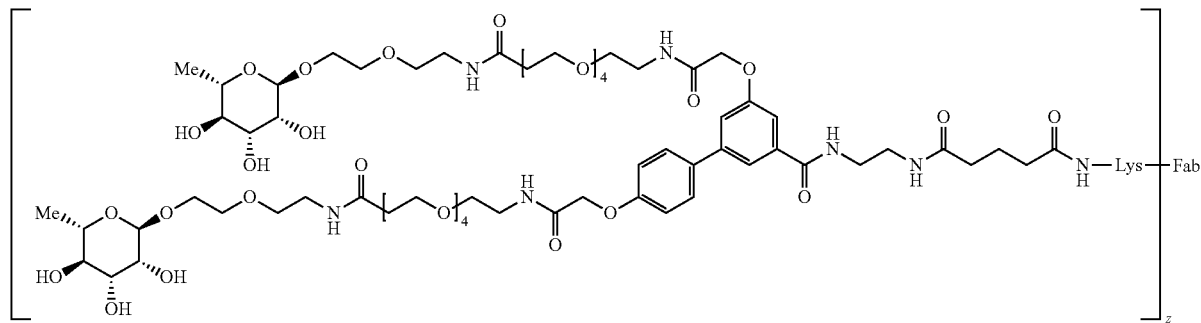
Example 8
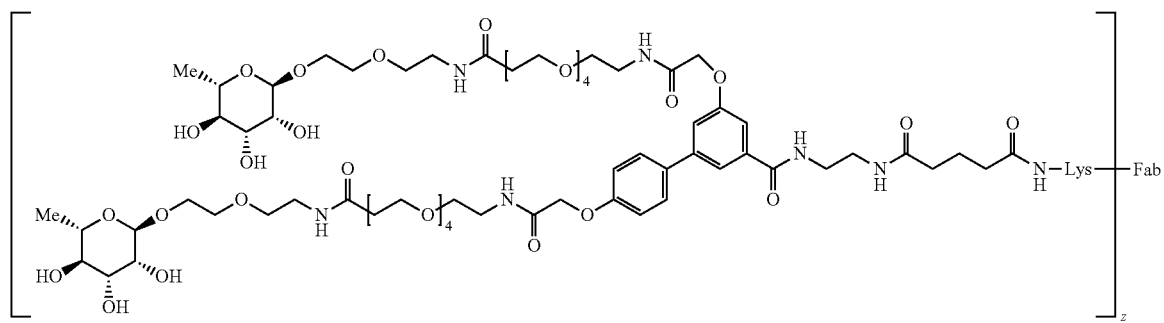
Example 9
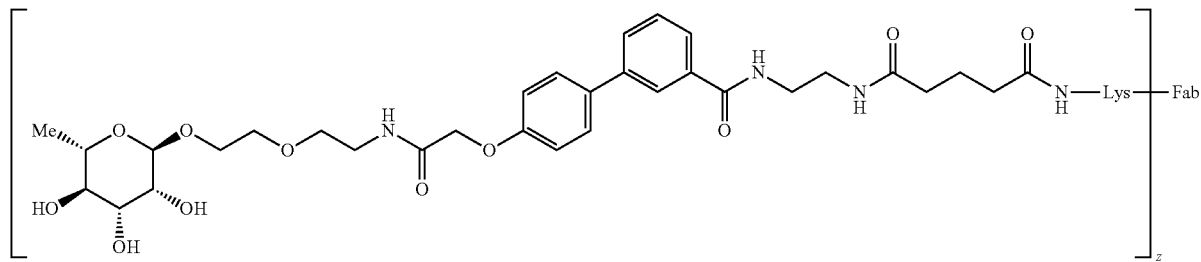

Example 10
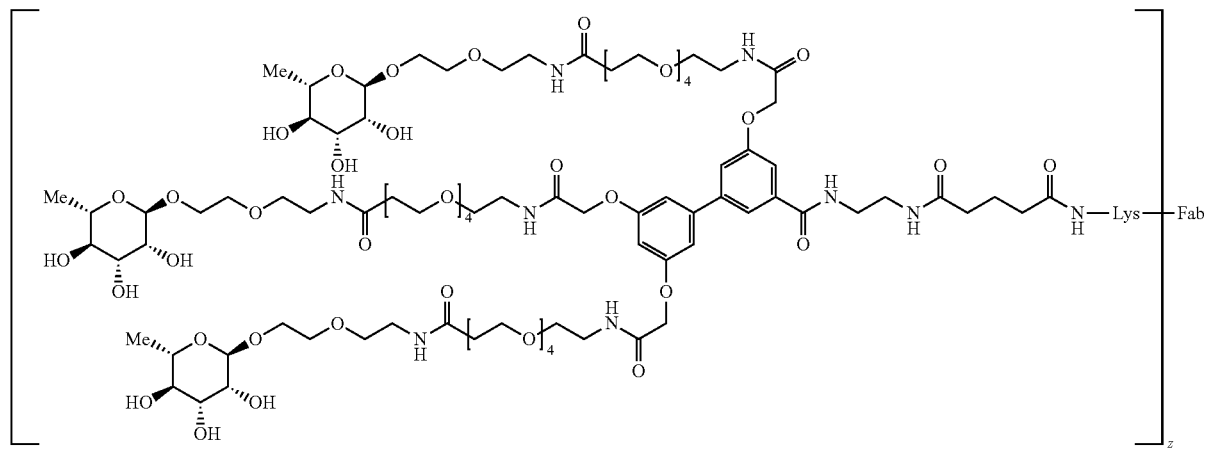
Example 11
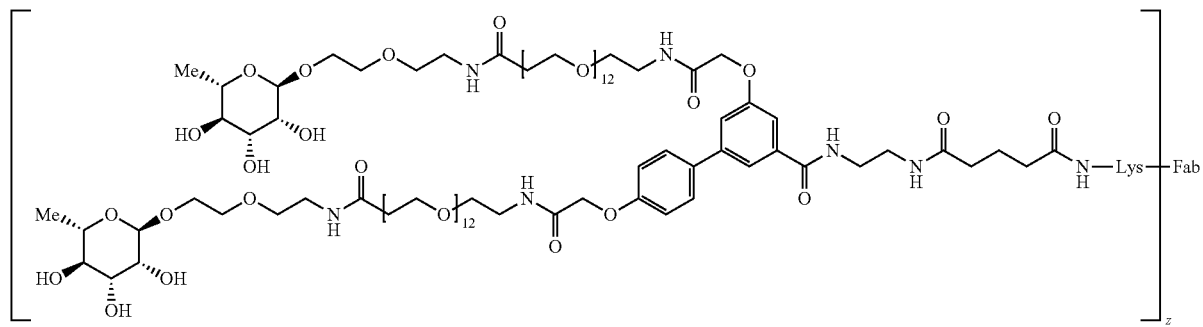
Example 12
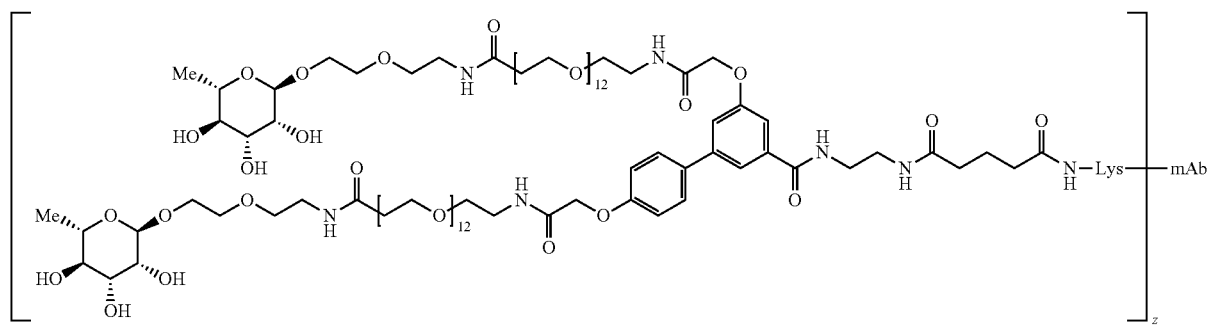

Example 13
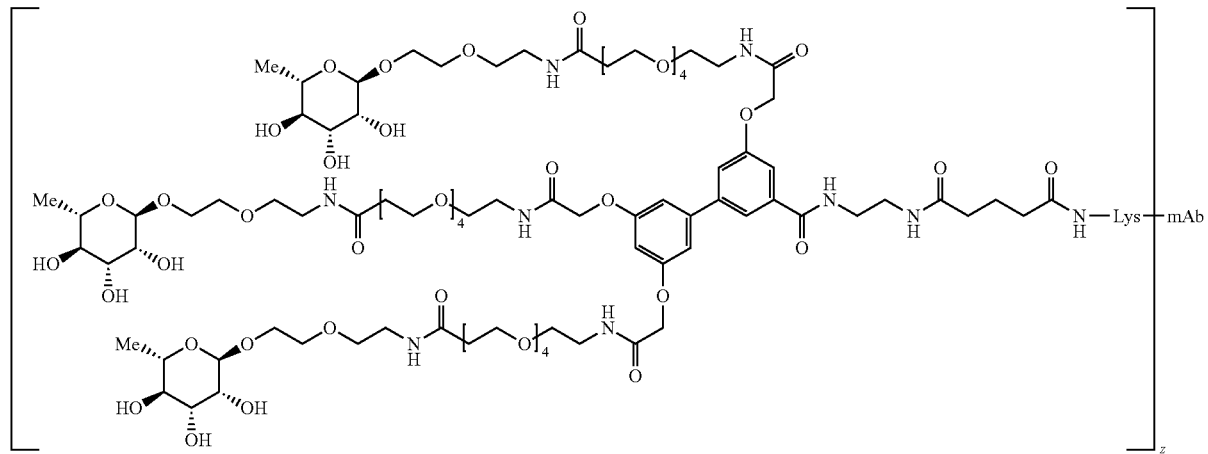
Example 14
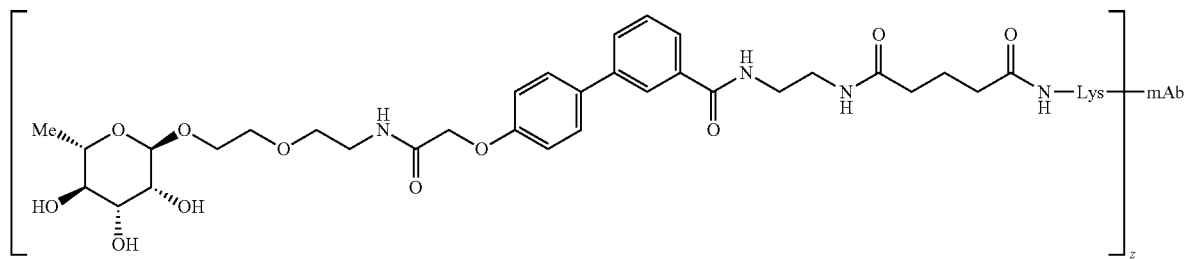
Example 15
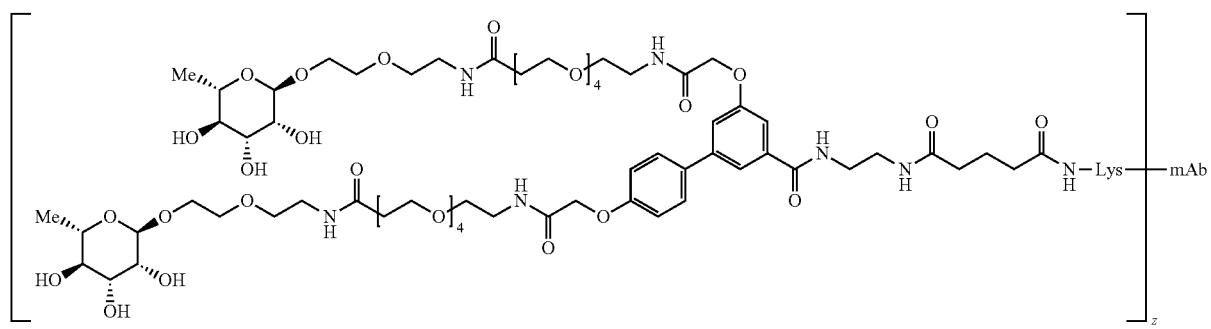

Example 16
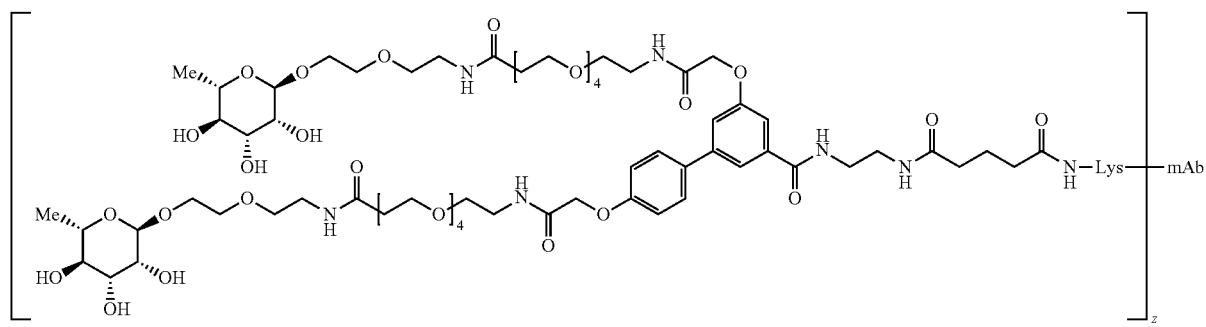
Example 17
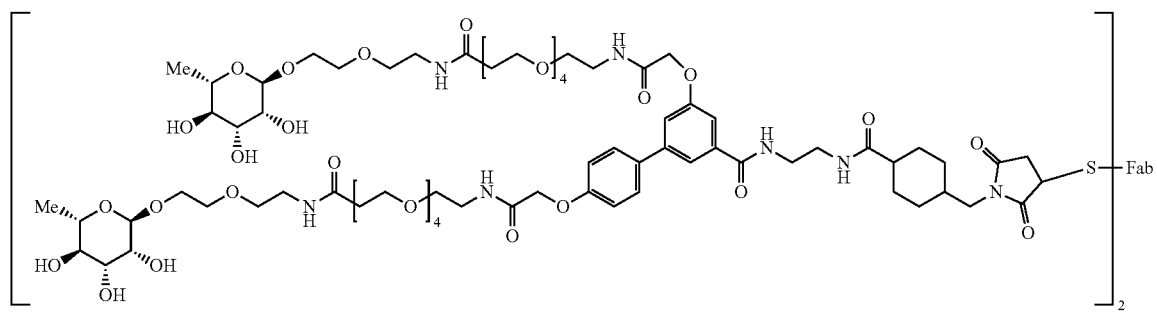
Example 18
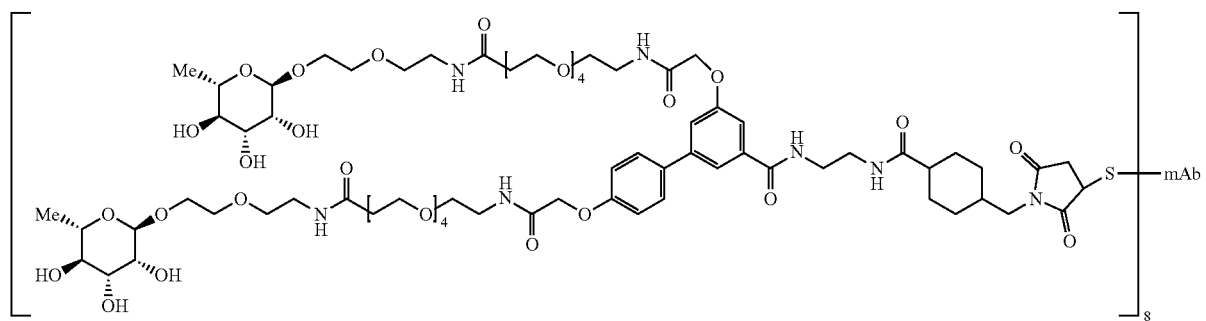
Example 19
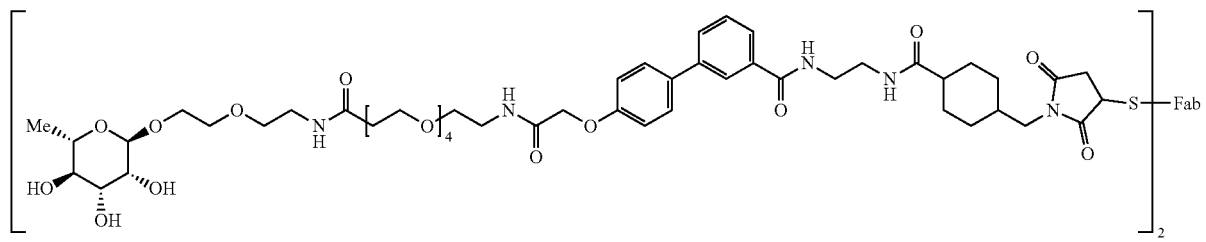

Example 20
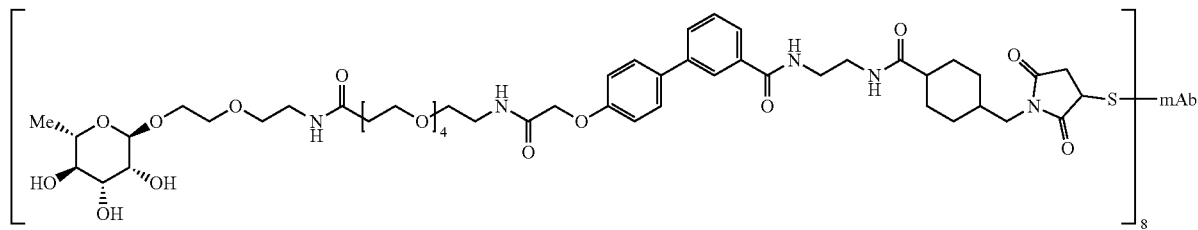
Example 21
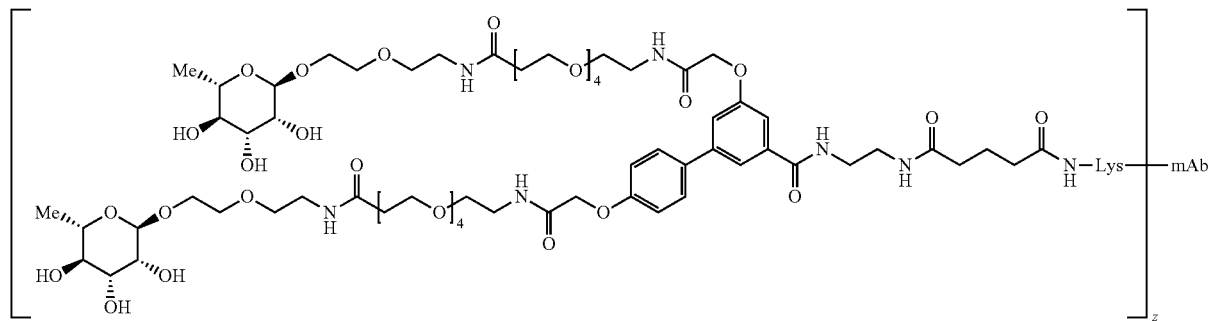
Example 22
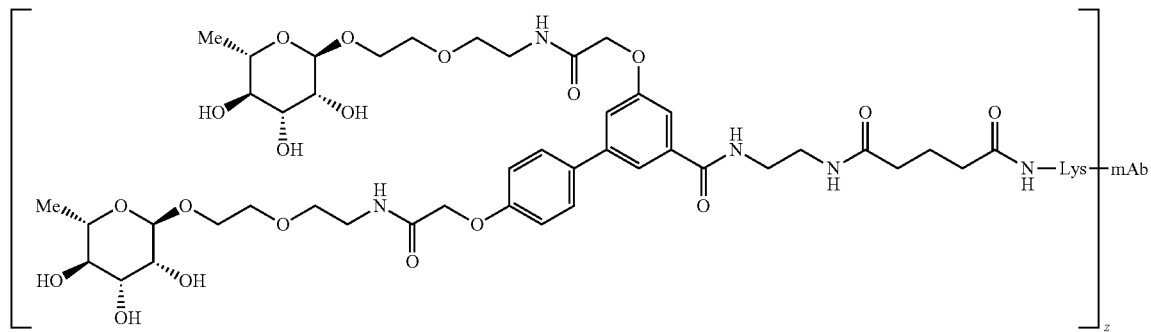
Example 23
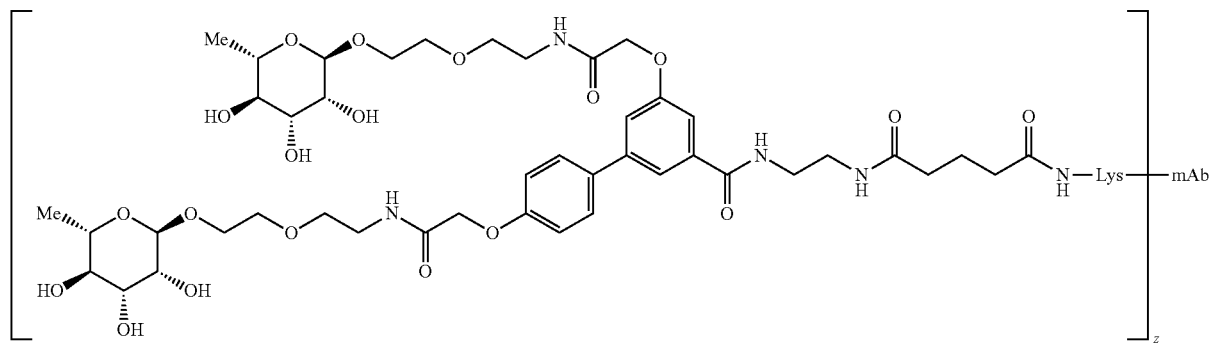

Example 24
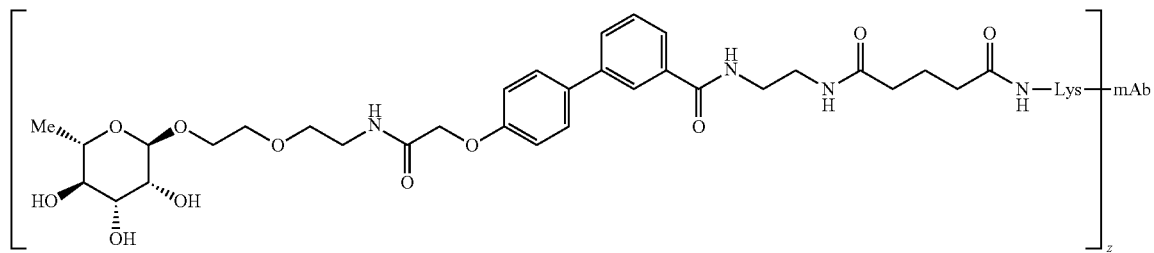
Example 25
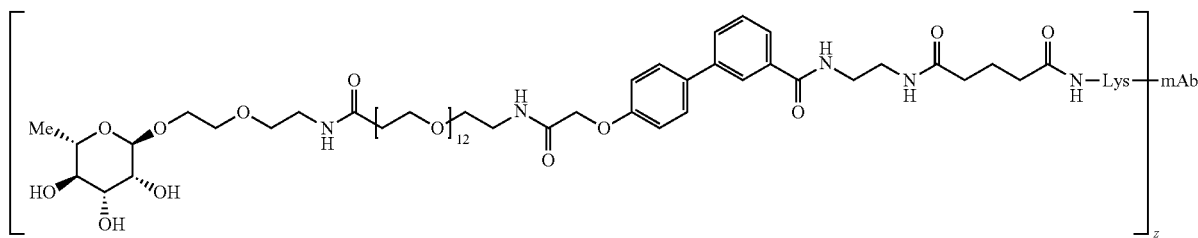
Example 26
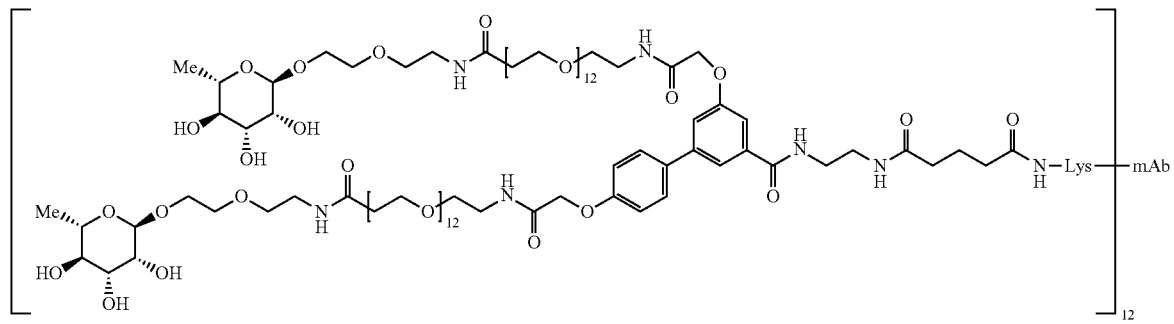
Example 27
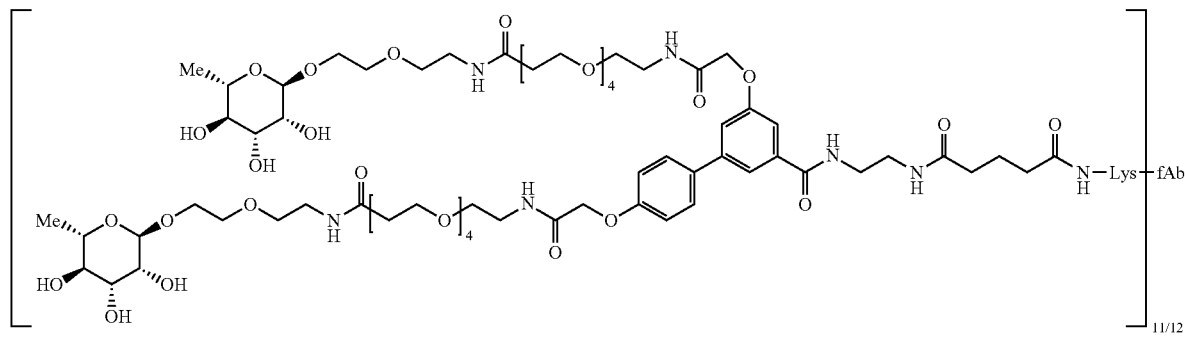

Example 28
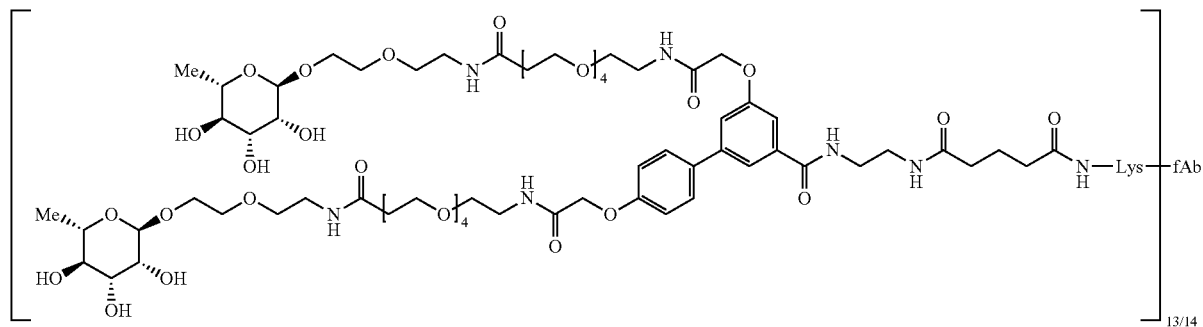
Example 29
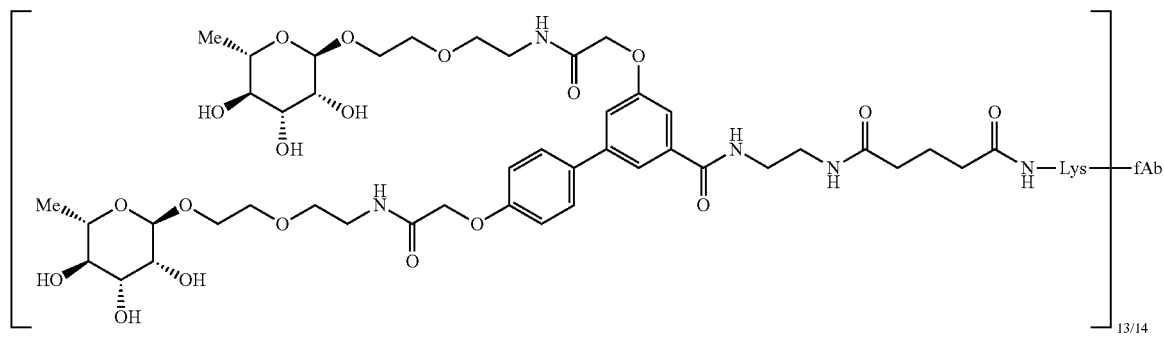
Example 30
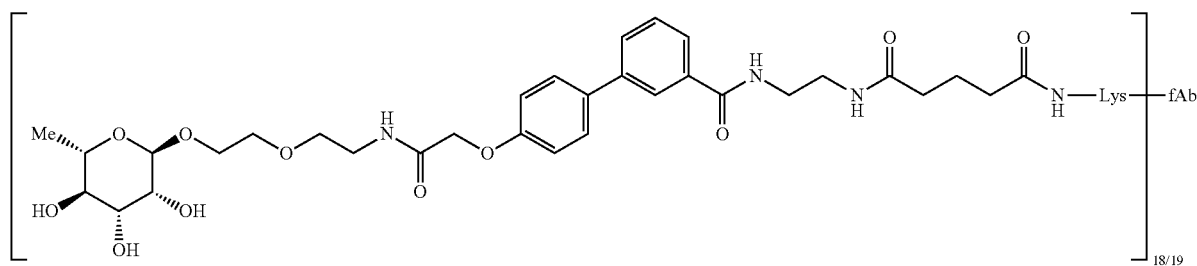
Example 31
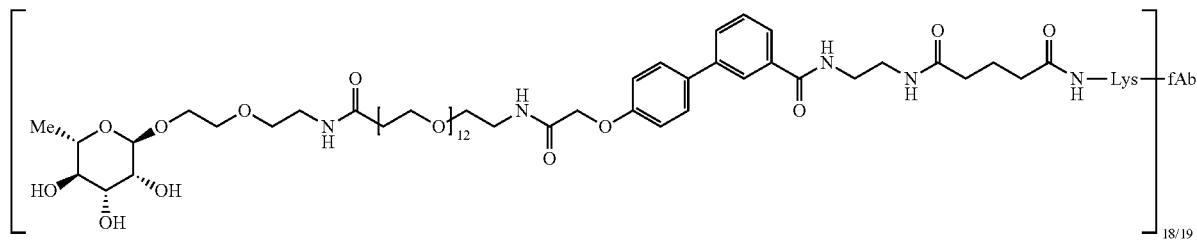

Example 32
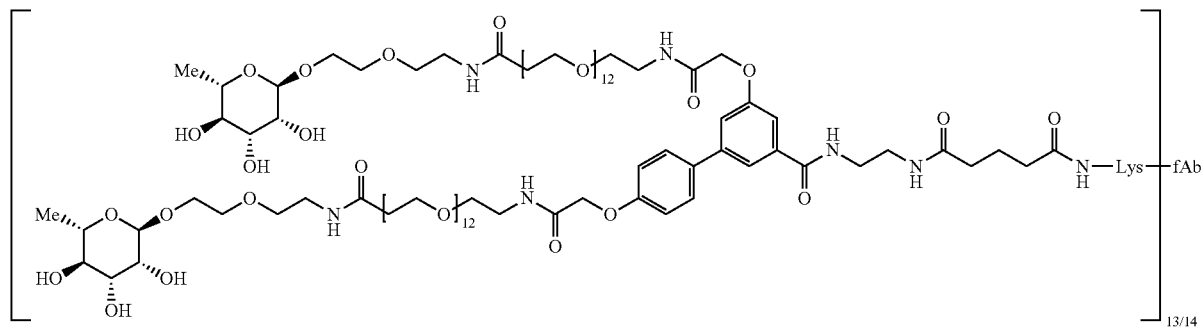
Example 33
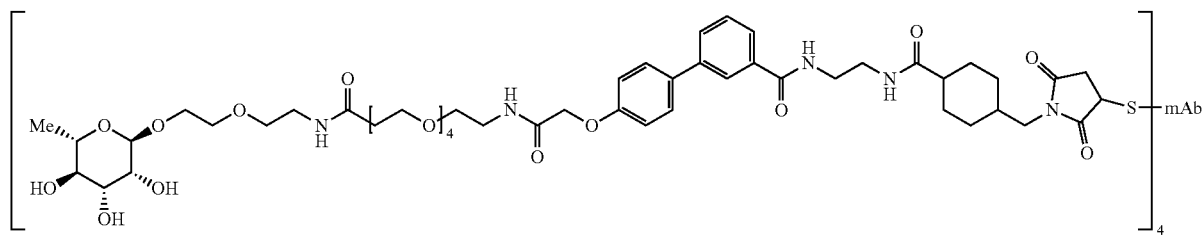
Example 34
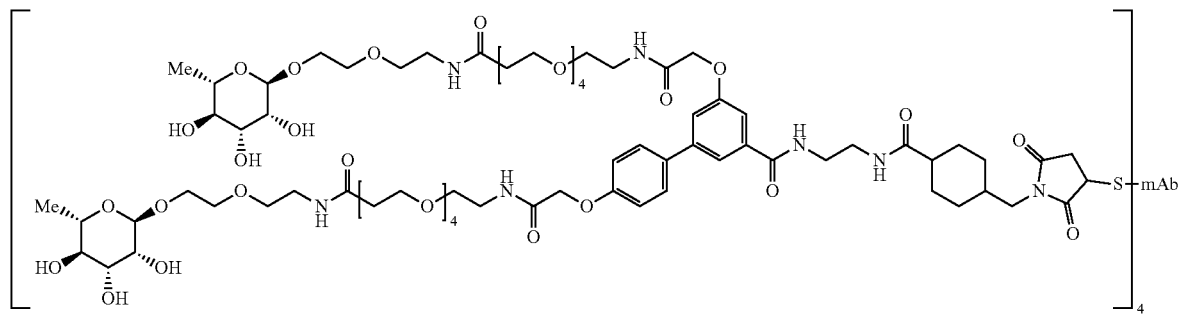
Example 35
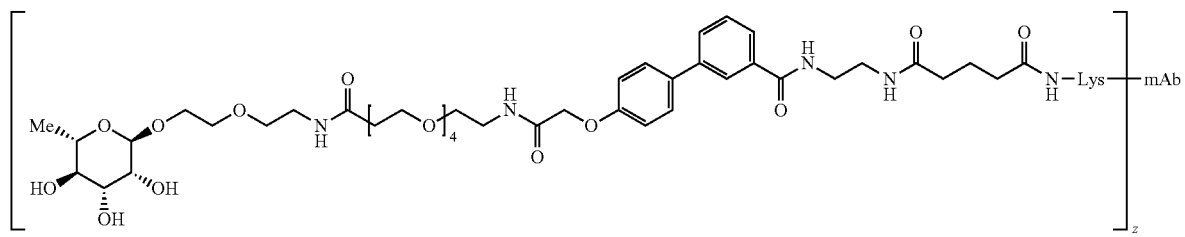

Example 36
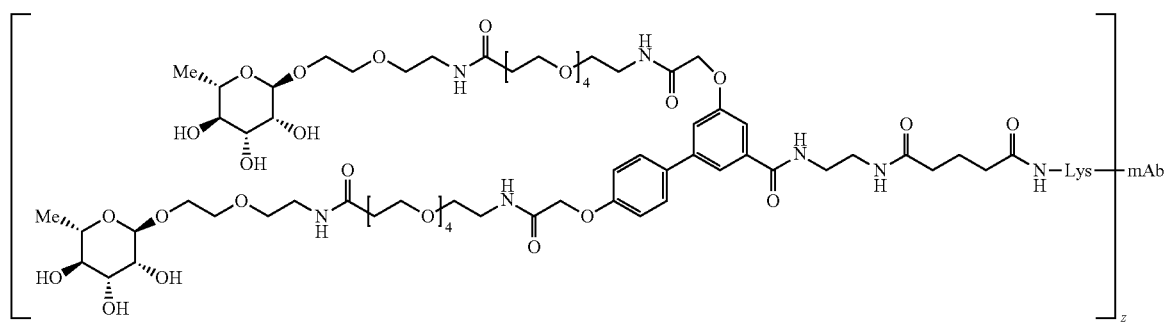
Example 37
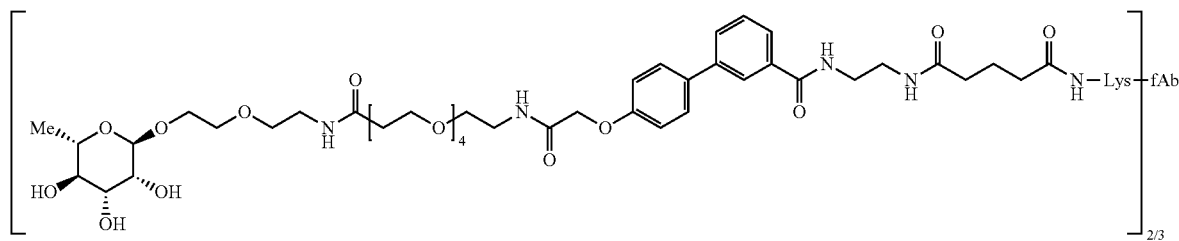
Example 38
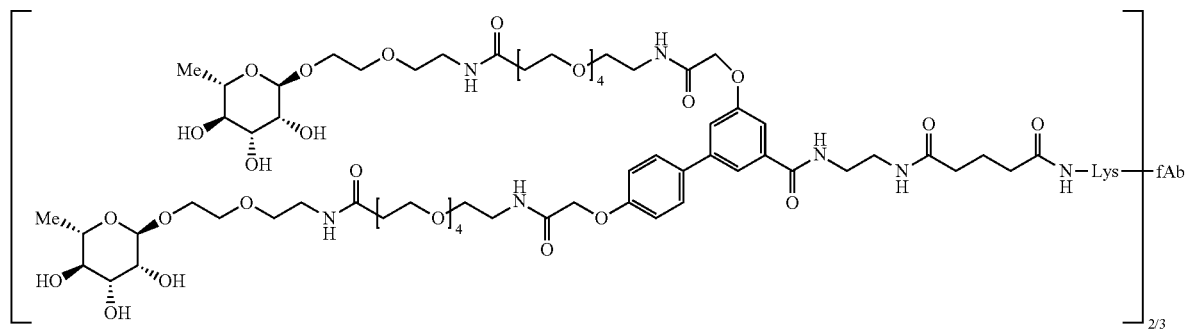
Example 39
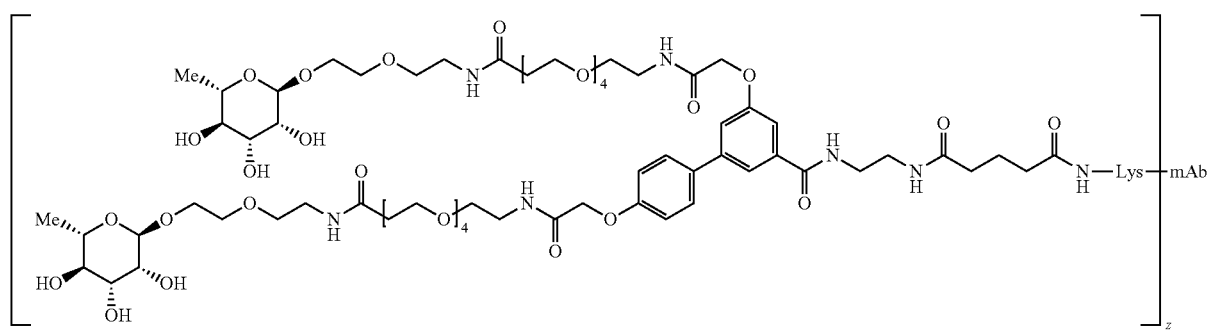

Example 40

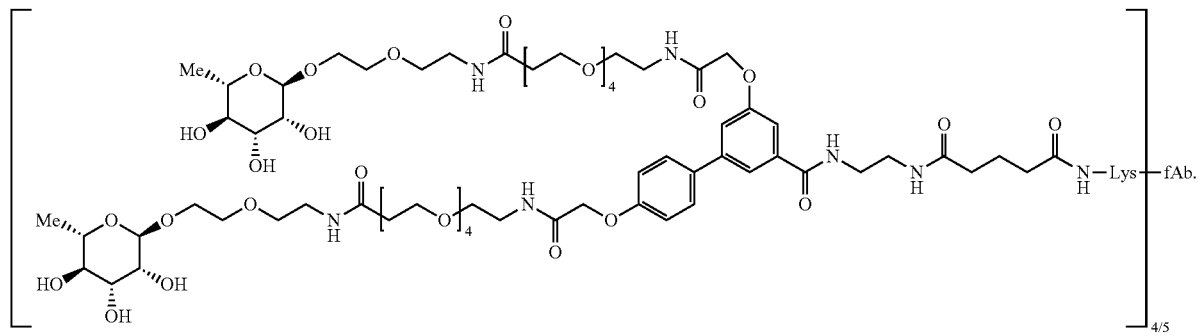

24. A pharmaceutical composition comprising a compound as defined in claim 1 or a pharmaceutically acceptable salt thereof.

25. The pharmaceutical composition as defined in claim 24, which additionally comprises one or more further therapeutic agents.

26. A method of treating cancer or a bacterial infection comprising administering to an individual in need thereof a compound as defined in claim 1 or a pharmaceutically acceptable salt thereof.

27. A process for preparing an immunoconjugate as defined in claim 1 which comprises:

(a) preparing a compound of formula (IA) wherein $X_1$ represents —NH— by reacting a compound of formula (IIA) wherein $S_1$ is terminated with a N-hydroxysuccinimide group with compounds of formula (IIIA) wherein the antibody or antigen binding fragment contains at least one reactive amino group:

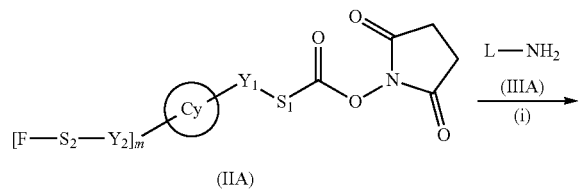

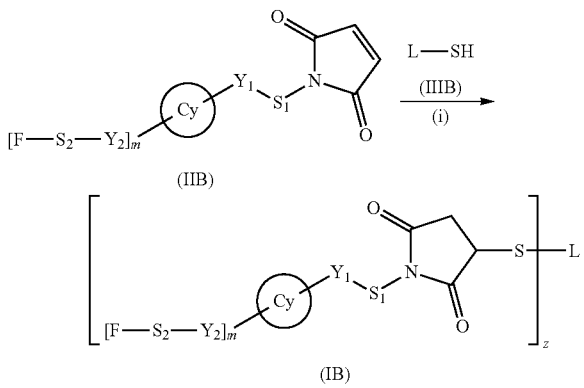

wherein F, $S_2$, $Y_2$, m, z, Cy, $Y_1$, $S_1$ and L are as defined in claim 1; or (b) preparing a compound of formula (IB) wherein $X_1$ represents —S— by reacting a compound of formula (IIIB) wherein the antibody or antigen binding fragment contains at least one reactive thiol group with a compound of formula (IIB) wherein $S_1$ is terminated with maleimide:

wherein F, $S_2$, $Y_2$, m, z, Cy, $Y_1$ and $S_1$ are as defined in claim 1; and/or (c) interconversion of a compound of formula (I) or protected derivative thereof to a further compound of formula (I) or protected derivative thereof.

28. The compound as defined in claim 1, wherein $S_1$ represents a spacer selected from:
—$(CH_2)_2$—NHCO-cyclohexyl-$CH_2$-3-pyrrolidine-2,5-dione-, —$(CH_2)_2$—NHCO-cyclohexyl-$CH_2$-3-pyrrolidine-2,5-dione-S—$(CH_2)_3$—C($=$NH)— or —$(CH_2)_2$—NHCO—$(CH_2)_3$—CO—; or
—$(CH_2)_2$—NHCO—$(CH_2CH_2O)_4$—$(CH_2)_2$-3-pyrrolidine-2,5-dione-;
or $S_1$ represents a spacer selected from:
—$(CH_2)_2$—NHCO-cyclohexyl-$CH_2$-3-pyrrolidine-2,5-dione-, —$(CH_2)_2$—NHCO-cyclohexyl-$CH_2$-3-pyrrolidine-2,5-dione-S—$(CH_2)_3$—C($=$NH)— or —$(CH_2)_2$—NHCO—$(CH_2)_3$—CO—;
or $S_1$ represents a spacer selected from:
—$(CH_2)_2$—NHCO—$(CH_2)_3$—CO—.

29. The compound as defined in claim 1 wherein $S_2$ represents a spacer selected from:
—$(CH_2)_2$—O—$(CH_2)_2$—NHCO—$CH_2$—, —$(CH_2)_3$—NHCO—$CH_2$—, —$(CH_2)_3$—, —$(CH_2)_3$—NHCO—$(CH_2)_4$—CONH—$CH_2$—, —$(CH_2)_3$—NH—$CH_2$— or —$(CH_2)_3$—NHCO—$(CH_2)_3$—NHCO—$CH_2$—; or
—$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$—, —$(CH_2)_3$—NHCO—$(CH_2CH_2O)_4$—$(CH_2)_2$—NHCO—$CH_2$—, —$(CH_2)_3$—NHCO—$(CH_2CH_2O)_{12}$—$(CH_2)_2$—NHCO—$CH_2$— or —$(CH_2)_3$—NHCO—$(CH_2)_3$—NHCO—$(CH_2CH_2O)_4$—$(CH_2)_2$—NHCO—$CH_2$—;

or $S_2$ represents a spacer selected from:

—$(CH_2)_2$—O—$(CH_2)_2$—NHCO—$CH_2$—, —$(CH_2)_3$—NHCO—$CH_2$—, —$(CH_2)_3$—NHCO—, —$(CH_2)_3$—, —$(CH_2)_3$—NHCO—$(CH_2)_4$—CONH—$CH_2$— or —$(CH_2)_3$—NH—$CH_2$—; or

—$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$—, —$(CH_2)_3$—NHCO—$(CH_2)_2$—$(OCH_2CH_2)_4$—NHCO—$CH_2$— or —$(CH_2)_4$—NHCO—$(CH_2)_2$—$(OCH_2CH_2)_4$—NHCO—$CH_2$—;

or S2 represents a spacer selected from:

—$(CH_2)_2$—O—$(CH_2)_2$—NHCO—$CH_2$—, —$(CH_2)_3$—NHCO—$CH_2$— or —$(CH_2)_3$—NHCO—$(CH_2)_3$—NHCO—$CH_2$—; or

—$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$—, —$(CH_2)_3$—NHCO—$(CH_2CH_2O)_4$—$(CH_2)_2$—NHCO—$CH_2$—, —$(CH_2)_3$—NHCO—$(CH_2CH_2O)_{12}$—$(CH_2)_2$—NHCO—$CH_2$— or —$(CH_2)_3$—NHCO—$(CH_2)_3$—NHCO—$(CH_2CH_2O)_4$—$(CH_2)_2$—NHCO—$CH_2$—;

or S2 represents a spacer selected from:

—$(CH_2)_2$—O—$(CH_2)_2$—NHCO—$CH_2$— or —$(CH_2)_3$—NHCO—$CH_2$—; or

—$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$— or —$(CH_2)_3$—NHCO—$(CH_2CH_2O)_4$—$(CH_2)_2$—NHCO—$CH_2$—;

or S2 represents a spacer selected from:

—$(CH_2)_2$—O—$(CH_2)_2$—NHCO—$CH_2$— or —$(CH_2)_3$—NHCO—$CH_2$—;

or S2 represents a spacer selected from:

—$(CH_2)_2$—O—$(CH_2)_2$—NHCO—$CH_2$— or —$(CH_2)_3$—NHCO—$CH_2$—; or

—$(CH_2)_2$—O—$(CH_2)_2$—NHCO—$(CH_2CH_2O)_4$—$(CH_2)_2$—NHCO—$CH_2$—, —$(CH_2)_2$—O—$(CH_2)_2$—NHCO—$(CH_2CH_2O)_{12}$—$(CH_2)_2$—NHCO—$CH_2$— or —$(CH_2)_3$—NHCO—$(CH_2CH_2O)_4$—$(CH_2)_2$—NHCO—$CH_2$—, or S2 represents a spacer selected from:

—$(CH_2)_2$—O—$(CH_2)_2$—NHCO—$CH_2$—; or

—$(CH_2)_2$—O—$(CH_2)_2$—NHCO—$(CH_2CH_2O)_4$—$(CH_2)_2$—NHCO—$CH_2$— or —$(CH_2)_2$—O—$(CH_2)_2$—NHCO—$(CH_2CH_2O)_{12}$—$(CH_2)_2$—NHCO—$CH_2$—;

or S2 represents a spacer selected from:

—$(CH_2)_2$—O—$(CH_2)_2$—NHCO—$(CH_2CH_2O)_4$—$(CH_2)_2$—NHCO—$CH_2$—.

30. The compound as defined in claim 1, wherein a represents an integer selected from 6, 7 or 11.

31. The compound as defined in claim 1, wherein e represents an integer which is 7.

32. The compound as defined in claim 1, wherein f represents an integer which is 6.

33. The compound as defined in 4, wherein g represents an integer selected from 4, 8 or 12.

34. The compound as defined in claim 1, wherein h represents an integer which is 4.

35. The compound as defined in claim 1, wherein z represents an integer selected from 18 or 19.

* * * * *

SEQUENCE LISTING

```
<160> NUMBER OF SEQ ID NOS: 6

<210> SEQ ID NO 1
<211> LENGTH: 449
<212> TYPE: PRT
<213> ORGANISM: Artificial
<220> FEATURE:
<223> OTHER INFORMATION: Monoclonal Antibody

<400> SEQUENCE: 1

Gln Val Gln Leu Lys Gln Ser Gly Pro Gly Leu Val Gln Pro Ser Gln
1               5                   10                  15

Ser Leu Ser Ile Thr Cys Thr Val Ser Gly Phe Ser Leu Thr Asn Tyr
            20                  25                  30
```

Gly Val His Trp Val Arg Gln Ser Pro Gly Lys Gly Leu Glu Trp Leu
                35                  40                  45

Gly Val Ile Trp Ser Gly Gly Asn Thr Asp Tyr Asn Thr Pro Phe Thr
 50                  55                  60

Ser Arg Leu Ser Ile Asn Lys Asp Asn Ser Lys Ser Gln Val Phe Phe
 65                  70                  75                  80

Lys Met Asn Ser Leu Gln Ser Asn Asp Thr Ala Ile Tyr Tyr Cys Ala
                 85                  90                  95

Arg Ala Leu Thr Tyr Tyr Asp Tyr Glu Phe Ala Tyr Trp Gly Gln Gly
                100                 105                 110

Thr Leu Val Thr Val Ser Ala Ala Ser Thr Lys Gly Pro Ser Val Phe
                115                 120                 125

Pro Leu Ala Pro Ser Ser Lys Ser Thr Ser Gly Gly Thr Ala Ala Leu
                130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
                195                 200                 205

Ser Asn Thr Lys Val Asp Lys Lys Val Glu Pro Lys Ser Cys Asp Lys
                210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
                275                 280                 285

Ala Lys Thr Lys Pro Arg Glu Glu Gln Tyr Asn Ser Thr Tyr Arg Val
                290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
                340                 345                 350

Leu Pro Pro Ser Arg Asp Glu Leu Thr Lys Asn Gln Val Ser Leu Thr
                355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

Lys

<210> SEQ ID NO 2
<211> LENGTH: 214
<212> TYPE: PRT
<213> ORGANISM: Artificial
<220> FEATURE:
<223> OTHER INFORMATION: Monoclonal Antibody

<400> SEQUENCE: 2

Asp Ile Leu Leu Thr Gln Ser Pro Val Ile Leu Ser Val Ser Pro Gly
1               5                   10                  15

Glu Arg Val Ser Phe Ser Cys Arg Ala Ser Gln Ser Ile Gly Thr Asn
            20                  25                  30

Ile His Trp Tyr Gln Gln Arg Thr Asn Gly Ser Pro Arg Leu Leu Ile
        35                  40                  45

Lys Tyr Ala Ser Glu Ser Ile Ser Gly Ile Pro Ser Arg Phe Ser Gly
    50                  55                  60

Ser Gly Ser Gly Thr Asp Phe Thr Leu Ser Ile Asn Ser Val Glu Ser
65                  70                  75                  80

Glu Asp Ile Ala Asp Tyr Tyr Cys Gln Gln Asn Asn Asn Trp Pro Thr
                85                  90                  95

Thr Phe Gly Ala Gly Thr Lys Leu Glu Leu Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 3
<211> LENGTH: 451
<212> TYPE: PRT
<213> ORGANISM: Artificial
<220> FEATURE:
<223> OTHER INFORMATION: Monoclonal Antibody

<400> SEQUENCE: 3

Gln Val Gln Leu Gln Gln Pro Gly Ala Glu Leu Val Lys Pro Gly Ala
1               5                   10                  15

Ser Val Lys Met Ser Cys Lys Ala Ser Gly Tyr Thr Phe Thr Ser Tyr
            20                  25                  30

Asn Met His Trp Val Lys Gln Thr Pro Gly Arg Gly Leu Glu Trp Ile
        35                  40                  45

Gly Ala Ile Tyr Pro Gly Asn Gly Asp Thr Ser Tyr Asn Gln Lys Phe
    50                  55                  60

Lys Gly Lys Ala Thr Leu Thr Ala Asp Lys Ser Ser Ser Thr Ala Tyr
65                  70                  75                  80

```
Met Gln Leu Ser Ser Leu Thr Ser Glu Asp Ser Ala Val Tyr Tyr Cys
                85                  90                  95

Ala Arg Ser Thr Tyr Tyr Gly Gly Asp Trp Tyr Phe Asn Val Trp Gly
            100                 105                 110

Ala Gly Thr Thr Val Thr Val Ser Ala Ala Ser Thr Lys Gly Pro Ser
            115                 120                 125

Val Phe Pro Leu Ala Pro Ser Ser Lys Ser Thr Ser Gly Gly Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
            195                 200                 205

Lys Pro Ser Asn Thr Lys Val Asp Lys Lys Ala Glu Pro Lys Ser Cys
210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
            275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Asp Glu Leu Thr Lys Asn Gln Val Ser
            355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
            435                 440                 445

Pro Gly Lys
    450

<210> SEQ ID NO 4
<211> LENGTH: 213
<212> TYPE: PRT
<213> ORGANISM: Artificial
<220> FEATURE:
<223> OTHER INFORMATION: Monoclonal Antibody
```

<400> SEQUENCE: 4

Gln Ile Val Leu Ser Gln Ser Pro Ala Ile Leu Ser Ala Ser Pro Gly
1               5                   10                  15

Glu Lys Val Thr Met Thr Cys Arg Ala Ser Ser Val Ser Tyr Ile
                20                  25                  30

His Trp Phe Gln Gln Lys Pro Gly Ser Ser Pro Lys Pro Trp Ile Tyr
            35                  40                  45

Ala Thr Ser Asn Leu Ala Ser Gly Val Pro Val Arg Phe Ser Gly Ser
        50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Thr Ser Asn Pro Pro Thr
                85                  90                  95

Phe Gly Gly Gly Thr Lys Leu Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
210

<210> SEQ ID NO 5
<211> LENGTH: 449
<212> TYPE: PRT
<213> ORGANISM: Artificial
<220> FEATURE:
<223> OTHER INFORMATION: Monoclonal Antibody

<400> SEQUENCE: 5

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
                20                  25                  30

Tyr Ile His Trp Val Arg Gln Ala Pro Gly Lys Gly Leu Glu Trp Val
            35                  40                  45

Ala Arg Ile Tyr Pro Thr Asn Gly Tyr Thr Arg Tyr Ala Asp Ser Val
        50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
        115                 120                 125

```
Phe Pro Leu Ala Pro Ser Ser Lys Ser Thr Ser Gly Gly Thr Ala Ala
    130                 135                 140
Leu Gly Cys Leu Val Lys Asp Tyr Phe Pro Glu Pro Val Thr Val Ser
145                 150                 155                 160
Trp Asn Ser Gly Ala Leu Thr Ser Gly Val His Thr Phe Pro Ala Val
                165                 170                 175
Leu Gln Ser Ser Gly Leu Tyr Ser Leu Ser Ser Val Val Thr Val Pro
            180                 185                 190
Ser Ser Ser Leu Gly Thr Gln Thr Tyr Ile Cys Asn Val Asn His Lys
        195                 200                 205
Pro Ser Asn Thr Lys Val Asp Lys Lys Val Glu Pro Lys Ser Cys Asp
210                 215                 220
Lys Thr His Thr Cys Pro Pro Cys Pro Ala Pro Glu Leu Leu Gly Gly
225                 230                 235                 240
Pro Ser Val Phe Leu Phe Pro Pro Lys Pro Lys Asp Thr Leu Met Ile
                245                 250                 255
Ser Arg Thr Pro Glu Val Thr Cys Val Val Val Asp Val Ser His Glu
            260                 265                 270
Asp Pro Glu Val Lys Phe Asn Trp Tyr Val Asp Gly Val Glu Val His
        275                 280                 285
Asn Ala Lys Thr Lys Pro Arg Glu Glu Gln Tyr Asn Ser Thr Tyr Arg
    290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Ala Leu Pro Ala Pro Ile Glu
                325                 330                 335
Lys Thr Ile Ser Lys Ala Lys Gly Gln Pro Arg Glu Pro Gln Val Tyr
            340                 345                 350
Thr Leu Pro Pro Ser Arg Glu Glu Met Thr Lys Asn Gln Val Ser Leu
        355                 360                 365
Thr Cys Leu Val Lys Gly Phe Tyr Pro Ser Asp Ile Ala Val Glu Trp
    370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Lys Leu Thr Val Asp
                405                 410                 415
Lys Ser Arg Trp Gln Gln Gly Asn Val Phe Ser Cys Ser Val Met His
            420                 425                 430
Glu Ala Leu His Asn His Tyr Thr Gln Lys Ser Leu Ser Leu Ser Pro
        435                 440                 445
Gly

<210> SEQ ID NO 6
<211> LENGTH: 214
<212> TYPE: PRT
<213> ORGANISM: Artificial
<220> FEATURE:
<223> OTHER INFORMATION: Monoclonal Antibody

<400> SEQUENCE: 6

Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Asp Val Asn Thr Ala
            20                  25                  30
```

```
Val Ala Trp Tyr Gln Gln Lys Pro Gly Lys Ala Pro Lys Leu Leu Ile
        35              40              45

Tyr Ser Ala Ser Phe Leu Tyr Ser Gly Val Pro Ser Arg Phe Ser Gly
    50              55              60

Ser Arg Ser Gly Thr Asp Phe Thr Leu Thr Ile Ser Ser Leu Gln Pro
65              70              75              80

Glu Asp Phe Ala Thr Tyr Tyr Cys Gln Gln His Tyr Thr Thr Pro Pro
                85              90              95

Thr Phe Gly Gln Gly Thr Lys Val Glu Ile Lys Arg Thr Val Ala Ala
            100             105             110

Pro Ser Val Phe Ile Phe Pro Pro Ser Asp Glu Gln Leu Lys Ser Gly
        115             120             125

Thr Ala Ser Val Val Cys Leu Leu Asn Asn Phe Tyr Pro Arg Glu Ala
        130             135             140

Lys Val Gln Trp Lys Val Asp Asn Ala Leu Gln Ser Gly Asn Ser Gln
145             150             155             160

Glu Ser Val Thr Glu Gln Asp Ser Lys Asp Ser Thr Tyr Ser Leu Ser
            165             170             175

Ser Thr Leu Thr Leu Ser Lys Ala Asp Tyr Glu Lys His Lys Val Tyr
            180             185             190

Ala Cys Glu Val Thr His Gln Gly Leu Ser Ser Pro Val Thr Lys Ser
        195             200             205

Phe Asn Arg Gly Glu Cys
        210
```